(12) United States Patent
Hagiuda et al.

(10) Patent No.: US 6,182,225 B1
(45) Date of Patent: Jan. 30, 2001

(54) NETWORK DATA BASE CONTROL DEVICE AND METHOD THEREOF

(75) Inventors: Tadashi Hagiuda; Masatoshi Otani; Yoshito Maekawa; Yoshinori Takahashi, all of Yokohama; Noboru Hamada; Masahito Hirai, both of Kawasaki, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/016,389

(22) Filed: Feb. 2, 1998

(30) Foreign Application Priority Data

Feb. 3, 1997 (JP) .................................................. 9-034342
Feb. 3, 1997 (JP) .................................................. 9-034344

(51) Int. Cl.⁷ ...................................................... G06F 12/14
(52) U.S. Cl. ............................................ 713/201; 713/202
(58) Field of Search ............................. 713/1, 200, 201, 713/202; 714/732; 709/1, 100, 106, 202, 203, 220, 225, 226, 221, 222, 223

(56) References Cited

U.S. PATENT DOCUMENTS

| 4,672,572 | 6/1987 | Alsberg ................................. 364/900 |
| 4,734,796 | 3/1988 | Grynberg et al. ...................... 360/60 |
| 5,261,044 | * 11/1993 | Dev ..................................... 395/159 |
| 5,483,631 | * 1/1996 | Nagai ................................... 395/155 |
| 5,535,409 | * 7/1996 | Larvoire ............................... 395/800 |
| 5,544,083 | * 8/1996 | Iizuka ............................. 364/709.01 |
| 5,592,553 | * 1/1997 | Guski ..................................... 380/23 |
| 5,684,950 | * 11/1997 | Dare ................................ 395/187.01 |
| 5,720,015 | * 2/1998 | Martin et al. ........................ 395/114 |
| 5,805,891 | * 9/1998 | Bizuneh ............................... 395/704 |
| 5,953,422 | * 9/1999 | Angelo ................................... 380/23 |

FOREIGN PATENT DOCUMENTS

| 0 717 339 | 6/1996 | (EP) . |
| 0 752 636 A2 | 1/1997 | (EP) . |
| 6-350602 | 12/1994 | (JP) . |
| 7-200209 | 8/1995 | (JP) . |
| 8-278865 | 10/1996 | (JP) . |
| 8-286854 | 11/1996 | (JP) . |
| WO 94/06096 | 3/1994 | (WO) . |

OTHER PUBLICATIONS

"Logon Assist For Multiple Logons," IBM Technical Disclosure Bulletin, vol. 32, No. 8A, Jan. 1990, pp. 303–305.

* cited by examiner

Primary Examiner—Dennis M. Butler
(74) Attorney, Agent, or Firm—Fitzpatrick, Cella, Harper & Scinto

(57) ABSTRACT

A network device control unit and method are provided in which the same password is used for both starting up the network management software, and for acquiring information and making settings in the target network device, so that password entry for access to a network device can be omitted and the operability of network management software can be greatly improved. To implement the unit and method, the password entered by the user at start-up of NetSpot is detected, and when the network device to be controlled is selected, the password previously set to control access to this selected network device is acquired. Then this network device password is compared with the NetSpot password, and when the passwords match each other, the password entry for that network device is omitted and the detailed information for that network device is acquired and displayed.

16 Claims, 86 Drawing Sheets

| Joint Expansion | | ☒ |
|---|---|---|
| Default cassette paper size (C) : | A3 ◀▶ | Paper direction : ↑A ↑A  ⦿ Vertical (L)  ○ Horizontal (W) |
| ☑ Job time out (T) : 20 seconds ◀▶ (5 ~ 300) | | ☑ Time until sleep (P) : 15 minutes ▼ |
| ☑ Auto error skip (X) | ☑ Warning display (D) | |
| Warning response : ⦿ Continue (K) ○ Stop (N) | Buzzer alarm : ⦿ Ring once (F) ○ Continuous (O) | Panel display : ⦿ Japanese (J) ○ English (E) |
| Vertical offset (U) : | 1.0mm ◀▶ (−50.0 ~ 50.0) | |
| Horizontal offset (Y) : | 1.0mm ◀▶ (−50.0 ~ 50.0) | |
| OK | CANCEL | UPDATE (A)   HELP (H) |

FIG. 67

Print Ajust

☐ MaxiMem ( M )    Print assurance memory ( P ) : [A3 × 3 ▾]

☑ Band control ( B )    System work memory ( S ) : [Auto ▾]

Image quality warning :    ⦿ Continue ( K ) :

○ Stop ( N ) :

Half-tone adjust select :    ⦿ Pattern 1 ( R )

○ Pattern 2 ( G )

[ OK ]    [ CANCEL ]    [ UPDATE ( A ) ]    [ HELP ( H ) ]

FIG. 68

Operating Mode

Operating mode ( M ) : [Auto ▾]

Auto emulation select ( S ) :
    LIPS
    N201
    ESC / P

Priority operation emulation ( E ) : [NONE ▾]

[ OK ]    [ CANCEL ]    [ UPDATE ( A ) ]    [ HELP ( H ) ]

FIG. 69

| Printer | | | | |
|---|---|---|---|---|
| Paper feed/eject | Shared | LIPS | N201 | ESC/P |

Expand / Reduce (R) : [ NO ▶ ]

Print multiple pages (N) : [ NO ▶ ]

Print direction : [A] ⦿ Portrait (P)  [A] ○ Landscape (L)

Chinese character code (K) : [ JIS ▶ ]

Character size (S) : [ 8 point ▶ ]

Chinese character style (J) : [ Mincho ▶ ]

ANK style (I) : [ Mincho ▶ ]

[ UTILITY(U)... ]  [ HELP(H) ]

[ EXPAND(E)... ]  [ UPDATE(A) ]

[ OK ]  [ CANCEL ]

FIG. 70

LIPS Expansion

Number of Lines:
- ○ 6LPI (B)
- ○ 8LPI (G)
- ● Set nember of lines (L): [15 lines ▲▼] (10~99)

Number of Rows:
- ○ Auto (V)
- ○ 12CPI (M)
- ○ 10CPI (I)
- ○ 15CPI (E)
- ● Set nember of rows (C): [20 rows ▲▼] (10~200)

☑ Auto new page (P)  LF function: ● LF (U)  ○ LF + CR (R)

☑ Auto new line (D)  CR function: ● CR (J)  ○ CR + LF (E)

☑ Auto paper economy (W)  Chinese character graphic set: ● JIS78 (O)  ○ JIS90 (N)

☑ Time-out control (T)  Crosshatch resolution: ● Fine (X)  ○ Quick (Y)

Start-up Macro (S): [30]  (0~32767)

☑ Overlay1 (K): [1]  (0~32767)

☑ Overlay2 (Q): [2]  (0~32767)

[OK]  [CANCEL]  [UPDATE (A)]  [HELP (H)]

FIG. 76

Printer

| Paper feed/eject | Shared | LIPS | N201 | ESC/P |

Page format (P) : [Actual size (vertical) ▼]

Paper position : ● Center (Y)
○ Left (L)

Upper border (W) : [10 ▲▼] (-127 ~ 127)
Paper position fine adjust (B) : [20 ▲▼] (-127 ~ 127)

☑ Image correction (I)

Paper size (D) : [Current paper ▼]

Chinese character style (J) : [Mincho ▼]

Font ID (E) : [30 ▲▼] (1 ~ 999)

Chinese character size (S) : [System ▼]

2 page printing setting (N) : [Do not ▼]

External character size : ● 10.8 point (G)
○ 10 point (M)

Graphic : ● Native (Q)
○ Copy (R)

[EXPAND1 (K)...] [EXPAND2 (X)...] [UTILITY (U)...]

[OK] [CANCEL] [UPDATE (A)] [HELP (H)]

FIG. 79

| N201 Expansion1 | | |
|---|---|---|
| Zone : | ◉ Standard (Q) | Right margin previous value : ◉ 136 row (Y) |
| | ○ Wide (W) | ○ Right edge (R) |
| ☑ Single form paper length function (S) | | Dashed line skip (M) : [◀▶] 20 lines (0~197) |
| ☑ Paper length function (L) | | Paper length setting (D) : [◀▶] 10 lines (1~199) |
| Registration level : | ○ Permanent (P) | ◉ Temporary (T) |
| Zero style : | ◉ 0 (E) | ○ Ø (F) |
| COUNTRY characters (C) : | Japan [▶] | |
| Chinese character graphic set : ◉ JIS78 (O) | | ○ JIS90 (N) |
| CR function : | ◉ Return only (G) | ○ Return/Line feed (J) |
| Print command : | ◉ CR only (V) | ○ CR etc. (K) |
| Buffer full : | ◉ Return/Line feed (I) | ○ Return only (U) |

OK    CANCEL    UPDATE (A)    HELP (H)

FIG. 82

| N201 Expansion 2 | | | ☒ |
|---|---|---|---|
| ☐ Fixed Line function (L) | Fixed number of lines (E) : | 10 lines ◁▷ | (10~400) |
| ☐ Fixed column function (C) | Fixed number of columns (N) : | 10 columns ◁▷ | (10~400) |

OCR font (F) : Do not use ▷

New line width (D) : 3LPI ▷

Chinese character rate (R) : 2/1 ▷

Start-up macro (M) : 0 ◁▷ (0~255)

☐ System overlay (O) : 1 ◁▷ (1~5)

☐ User overlay1 (U)

☐ User overlay2 (V)

LIPS form : ⊙ LIPS2 (P)

☐ Ignore new line after HEX mode (I)     ○ LIPS4 (S)

☐ HEX/LIPS function (X)

[ OK ]  [ CANCEL ]  [ UPDATE (A) ]  [ HELP (H) ]

FIG. 88

| Printer |
|---|

| Paper feed/eject | Shared | LIPS | N201 | ESC/P |

Page format (P): [Actual size (Vertical) ▷]

Upper border (W): [10 ◁▷] (−127 ~ 127)

Paper position fine adjust (B): [20 ◁▷] (−127 ~ 127)

☑ Reduced character printing (I)

☑ Image correction (M)

Paper size (D): [Current paper ▷]

2-page printing setting (N): [Do not ▷]

Chinese character style (J): [Mincho ▷]

Font ID (E): [30 ◁▷] (1 ~ 999)

Chinese character size (S): [System ▷]

[EXPAND1 (K)...] [EXPAND2 (X)...] [UTILITY(U)...]

[OK] [CANCEL] [UPDATE (A)] [HELP (H)]

FIG. 91

| ESC/P Expand 1 | | | | X |
|---|---|---|---|---|
| Zone : | ⊙ Standard (Q) | | Right margin previous value : ⊙ 136 row (Y) | |
| | ○ Wide (W) | | ○ Right edge (R) | |

☐ Continuous paper length function (L) : [1 line ◁▷] ( 1 ~ 199 )

☐ Single form paper length (S) : [1 line ◁▷] ( 1 ~ 199 )

☐ Dashed line skip (M) : [1 line ◁▷] ( 1 ~ 31 )

Character table : ⊙ Katakana (J)   Country characters (C) : [Japan ▷]
　　　　　　　　○ Graphic (O)

Registration level : ○ Permanent (P)   New line function : ⊙ Await LF command (F)
　　　　　　　　　 ⊙ Temporary (T)　　　　　　　　　　　 ○ New line (E)

[ OK ]　[ CANCEL ]　[ UPDATE (A) ]　[ HELP (H) ]

FIG. 94

ESC/P Expand 2

☐ Fixed line function (L)  Number of fixed lines (E): [10 lines] ◁▷ (10~400)

☐ Fixed column function (C)  Number of fixed columns (N): [10 columns] ◁▷ (10~400)

Chinese character rate (R): [2/1] ▷

Start-up macro (M): [0] ◁▷ (0~255)

☐ System overlay (O): [1] ◁▷ (1~5)

☐ User overlay1 (U)

☐ User overlay2 (V)

☐ Ignore line feed after HEX mode (I)  LIPS form: ⊙ LIPS2 (P)

☐ HEX/LIPS function (X)  ○ LIPS4 (S)

[OK]  [CANCEL]  [UPDATE (A)]  [HELP (H)]

FIG. 101

Change Printer Queue

New printer queue
NetWare server (S): [HELICON ▷]

Printer queue (Q):
```
HP5SI-1
LBP-A10F-B4-2
LBP-A309GII-1
LBP-B406E-1
LBP-K1F-B4-1
```

[Log-in (L)...]
[Add (A)]

Registered printer queues
[HERICON\\LBP-B406E-1]

[Delete (D)]

[OK]  [CANCEL]  [HELP (H)]

FIG. 102

| Rborovski (LASER SHOT LB) | | | | | [X] |
|---|---|---|---|---|---|
| Device (D) | Display (V) | Setting (S) | Test (T) | Help (H) | |

Printer information
  Manufacturer :            Cacon
  Product title :               LASER SHOT LB
  Installation location :     Canon    Laboratories
  Product version :         R1.11/BEP5H30E
  Toner cartridge model :  EP-W Environmental settings Emulator :                     LIPS
                              N201
                              ESC/P
Total flash ROM capacity :   256 Kbyte
Empty flash ROM capacity :  128 Kbyte
Total RAM capacity :          512 Kbyte
Empty RAM capacity :        256 Kbytes

STATUS   JOB   INFOR-MATION   NETWORK

[ Controller information (M) ]

[ HELP ]

F I G. 103
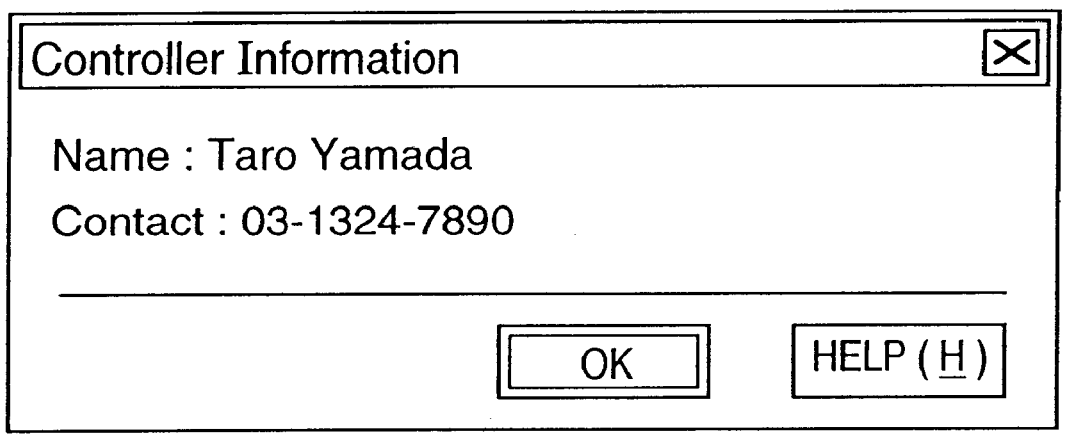

FIG. 105

| Protocol | |
|---|---|
| NetWare | TCP/IP | Apple Talk |

Frame type (F): [Auto Detect ▼]

Network No.: 00005678          Node address: 00008ABCDEF2

Print service setting    ⊙ Print server (S)   ○ Remote printer (R)   ○ None (N)

File server name (E): [HELICON ▼]

Print server name (P): [STYX ▼]

Printer No. (U): [1] (0~15)    Polling Interval (I): [1 second] (1~15)    [LOGIN (L)...]

Form No. (O): [0] (0~255)    Buffer size (B): [3KB] (1~20)

Service mode (M): Service available only for currently set paper.

Print server password (W): [            ]   [Standard (D) ▼]

[OK]   [CANCEL]   [UPDATE (A)]   [HELP (H)]

F I G. 114

| Protocol | | |
|---|---|---|
| NetWare | TCP/IP | Apple Talk |

Frame type (F) : [ETHERNET II ▼]

IP address setting method  ⊙ IP (I)   ○ RARP (R)   ○ BOOTP (B)

IP address (P) : [157 . 54 . 18 . 17]

Subnet mask (M) : [255 . 255 . 255 . 0]

Gateway address (G) : [157 . 54 . 18 . 18]

BOOTP address : 157.54.18.19

Broadcast address : 255

Print service (S) : [LPD ▼]

[OK]  [CANCEL]  [UPDATE (A)]  [Standard (D)]  [HELP (H)]

FIG. 120

| Protocol | | |
|---|---|---|
| NetWare | TCP/IP | Apple Talk |

FrameType (F): [Phase 2 ▽]

Network No. 12134          Node No. 255

Name (E): [lpd - k2f - labo]

Zone: *

Type: LaserShotLT

[Standard (D)]

[OK]  [CANCEL]  [UPDATE (A)]  [HELP (H)]

FIG. 144

Protocol

| NetWare | TCP/IP | Apple Talk |

Frame type (F) : [Auto Detect ▼]

Network No. : 00005678　　　　Node address : 00008ABCDEF2

Print service setting　　⦿ Print server (S)　　◯ Remote printer (R)　　◯ None (N)

File server name (E) : HELICON ▼

Print server name (P) : STYX ▼　　　　　　　　　　　　LOG-IN (L)...

Printer No. (U) : [1] ◀▶ (0~15)　　Polling Interval (I) : [1 second] ◀▶ (1~15)

Form No. (O) : [0] ◀▶ (0~255)　　Buffer size (B) : [3KB] ◀▶ (1~20)

Service mode (M) : Service available only for currently set paper.　　[Standard (D) ▼]

Print server password (W) : [　　　　　]

[ OK ]　　[ CANCEL ]　　[ UPDATE (A) ]　　[ HELP (H) ]

F I G. 155
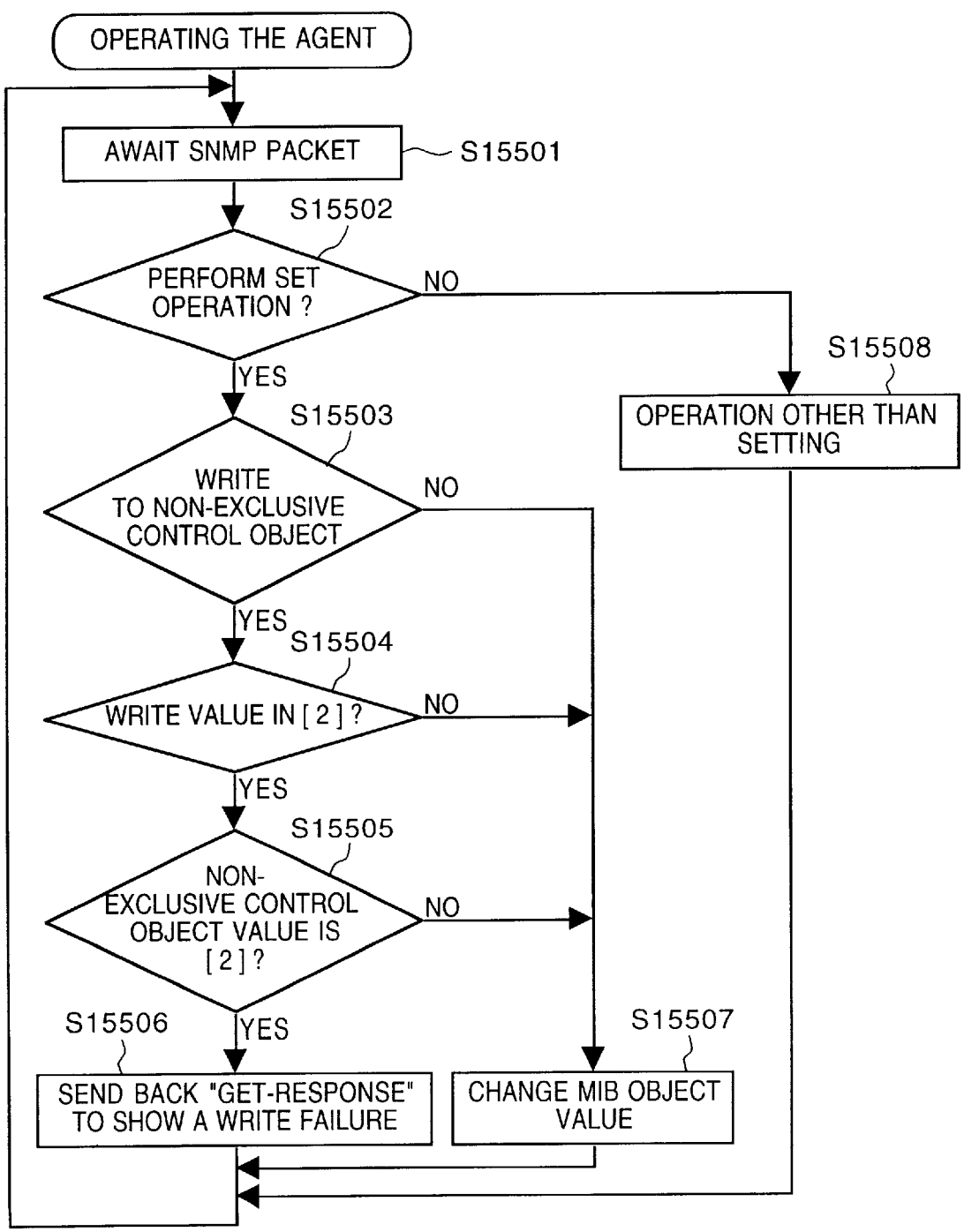

FIG. 157
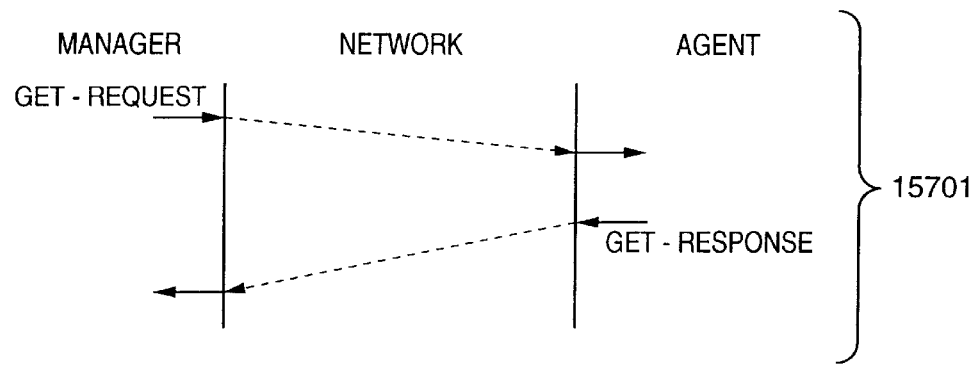
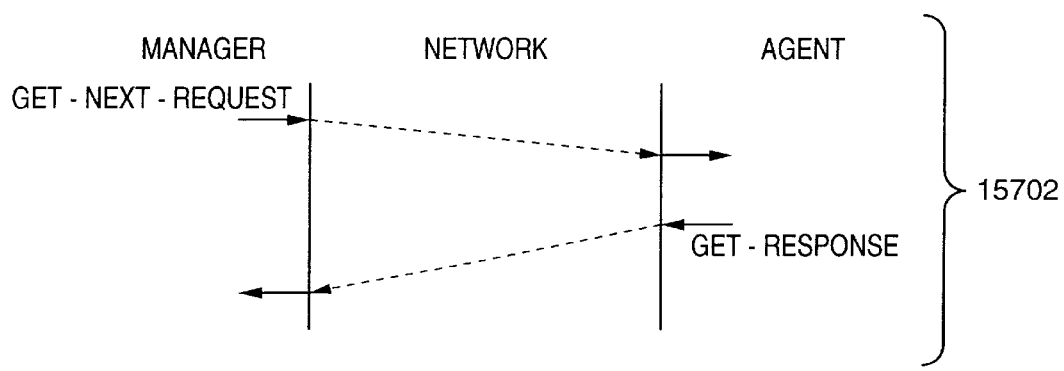
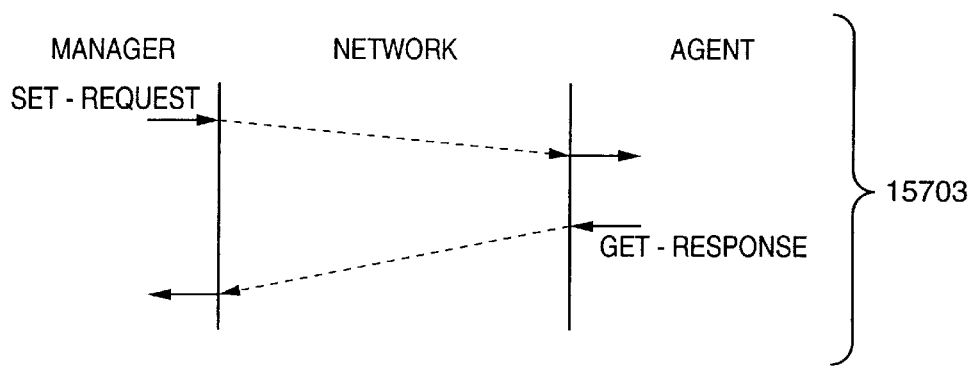
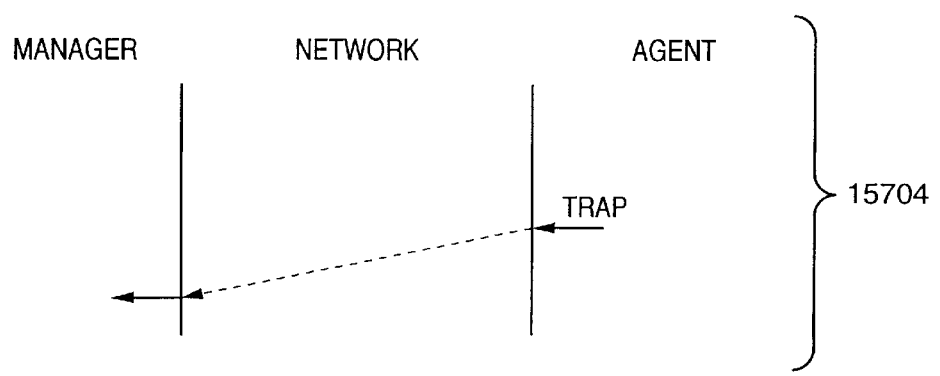

NETWORK DATA BASE CONTROL DEVICE AND METHOD THEREOF

BACKGROUND OF THE INVENTION

This invention relates to a network control device and method including network control software.

In recent years local area networks (LAN) for connecting computers together have become widespread. These type of local area networks are capable of connecting computers in the same floor of a building or the entire building, a group of buildings, a district or even larger areas and can even connect to networks on a worldwide scale. Each of these mutually connected local area networks (LAN) may utilize diverse hardware connection technology or a plurality of network protocol.

Other isolated local area networks (LAN) of simple structure can be supervised by individual users. In other words, the user can replace equipment, install software and diagnose problems.

However, large-scale complex LAN and large, mutually interconnected LAN groups require management referred to here as "Management". This "Management" means both a person to act as the network administrator and the software used by the network administrator. In this document, the term "management" signifies control utilizing software to manage the entire system, and the term "user" signifies the person utilizing the network control software. The user usually acts as the system control administrator. The user can make use of the network control software to obtain control data on the network and change this data.

Large-scale network systems are usually required to be active systems that must constantly perform equipment expansion or removal, software updating and problem detection, etc. Generally, such systems are owned by various persons or exist as various systems supplied by various operators.

Hereafter, the handling of the password as well as the password set in the network device during start-up in the network management program of the conventional art will be described.

When for instance a network management program is started up on a personal computer (PC) connected to a network, and the user selects a desired printer from among a plurality of printers capable of information acquisition and settings by means of this network management program that was started up; the device password information stored in the network board (NB) connected to the selected printer is then acquired. Whether or not a device password was set is determined based on this acquired device password information and when a device password has in fact been set, this device password is input in order to allow acquisition and settings of printer and network board (NB) information from the network management program. In this way, whether or not the device password acquired from the printer, and the device password entered by the user match each other can be determined. When the two passwords match, detailed information acquisition and settings for this printer are performed. However, when the two passwords do not match, the program stands by for entry of the correct device password by the user.

When device password information for this selected printer has not been set, a decision is made from information instructions as to whether to set this password and password setting is then made if in fact determined that the password must be set.

The network management program of the conventional art as explained above, therefore sets a password during start-up of the management program in order to maintain security and the setting of a password for a network device to be controlled is the general practice in such cases.

However, in this network management program of the conventional art, the password needed at start-up of this network management program and the password for the network device to be controlled were separate entities so that when acquiring information and making settings for a network device that was selected for control, a password had to be entered which was identical to that set for the network device to be controlled. This process impeded improved operability of the network management program.

Also, in this network management program of the conventional art, due to the need for security a password had to be set for all network devices subject to control. For the user of the network management program control of numerous network devices therefore involved a big load in terms of password settings and their instructions.

Further, this network management program of the conventional art is configured when used with large-scale networks so that a user sets a controller mode (an administrator mode) for the device and the user is then connected to the network and these device settings are also capable of being changed. Accordingly, if for instance a plurality of users are connected on the network simultaneously to access one device, then a situation will likely occur where those device settings are changed. Under such circumstances, with a plurality of users mutually making diverse settings, setting conflicts are easily prone to occur resulting in problems or breakdowns in the operation of that device.

SUMMARY OF THE INVENTION

In view of the above problems with the conventional art, it is therefore an object of this invention to provide a network device control method and unit in which the same password is used for both starting up the network management software, and for acquiring information and making settings in the target network data base, so that password entry for access to a network device can be omitted and the operability of network management software can be greatly improved.

Another object of this invention is to provide a network device control method and unit in which a password for the network device identical to an the password used during start-up of the control management software are both automatically entered as the network device password for the device to be controlled on the network management software to alleviate the burden of setting a password for the network device to be controlled.

This invention proposes to view of the above mentioned drawbacks in the conventional art, to provide a network device control method and unit in which setting conflicts do not occur since a plurality of users is restricted from accessing the administrator mode which is the mode for changing settings of a device.

Another object of this invention is to provide a network device control method and unit in which when another user accesses the administrator mode for changing the settings of a device, information showing this status is displayed on the screen along with notice that all other users are prohibited from accessing administrator mode.

Yet another object of this invention is to provide a network device control method and unit in which a user can automatically obtain access as an administrator even though another user is accessing the administrator mode for changing the settings of a device.

Still another object of this invention is to provide a network device control method and unit in which access can be obtained to a device in user mode which only displays information, in the event another user is accessing the administrator mode for changing the settings of a device.

In order to achieve the above objects of the invention, the network device control unit is characterized by comprising:

a password detecting unit to detect passwords entered by the user during start-up of the network management software, a selecting unit to select the network device to be controlled, a device password acquiring unit for acquiring the password set to restrict access to the network device selected with the selecting unit, a determining unit to determine if the mode is set to use the password used as the password for the network device at start-up of the network management software, a password comparing unit to compare the network device password with the password at start-up of the network management software and determine if the passwords match each other when the determining unit determines that the mode is set to use the password at start-up of the network management software as the network device password, a controlling unit to omit the entry of the network device password by the user when determined by the password comparing unit that the network device password and the password at start-up of the network management software match each other.

To also achieve the desired objects of the invention, a network device control method is provided, characterized by comprising the steps of:

detecting a password entered by a user during start-up of a network management software, selecting a network device for control, acquiring a password to limit access to the network device chosen in the selection step, determining whether or not a mode is set to utilize the password for network management software as the password for the network device, comparing the network device password with the network management software password to determine whether or not the passwords match each other when determined in the determining step that a mode is set to utilize the password for network management software as the password for the network device and, controlling to omit entry of the network device password when determined in the password comparison step that the network device password matches the network management software password.

A network device control unit of another embodiment comprised as related below, in other words;

a network device control unit for controlling through a network, a device having information indicating whether or not a user performing access as an administrator is present, wherein;

the network device control unit is characterized in having, an inquiring unit to ask whether the user, as an administrator, may access the device subject to control, and an accessing unit for the user to access the device as an administrator when results from the inquiring unit have determined that access by the user of the device as an administrator is possible.

To further achieve the desired objects of the invention, a network device control method is provided as related below, in other words, a network device control method controlling by way of a network a device having information indicating whether a user is performing access as an administrator and the network device control method is characterized by comprising the processes of;

an inquiry process to inquire as to whether access as an administrator is possible to a device targeted for control, an access process to access the device as an administrator when determined from results of the above inquiry that access to the device as an administrator is possible.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 22 is an illustration showing a sample message displayed when an entry outside the allowable limit was entered in "IP Address(A)" of the new device dialog box (1-3).

FIG. 59 is an illustration showing the shared printer environment basic setting sheet.

FIG. 63 is an illustration showing the shared printer expanded environmental setting dialog box.

FIG. 67 is an illustration showing the print adjust dialog box.

FIG. 68 is an illustration showing the print operating mode dialog box.

FIG. 69 is an illustration showing the sample display for the LIPS print environment basic setting sheet.

FIG. 70 is an illustration showing the LIPS print expanded environment dialog box.

FIG. 76 is an illustration showing the N201 print environment basic setting sheet.

FIG. 79 is an illustration showing the N201 print expansion environment 1 dialog box.

FIG. 82 is an illustration showing the N201 print expansion environment 2 dialog box.

FIG. 88 is a sample display showing the ESC/P print environment basic setting sheet.

FIG. 91 is an illustration showing the ESC/P print expansion environment 1 dialog box.

FIG. 94 is an illustration showing the ESC/P print expansion environment 2 dialog box.

FIG. 101 is an illustration showing the printer queue change dialog box.

FIG. 102 is an illustration showing the information sheet.

FIG. 103 is an illustration showing the controller information dialog box.

FIG. 105 is an illustration showing the NetWare sheet.

FIG. 114 is an illustration showing the TCP/IP setting sheet.

FIG. 120 is an illustration showing the AppleTalk setting sheet.

FIG. 121 is an illustration showing the message when a prohibited character code was entered in "Name (E)" of FIG. 120.

FIG. 122 is an illustration showing the message when any of the settings in FIG. 120 was changed and the "OK" button was pressed.

FIG. 123 is an illustration showing the message when any of settings in FIG. 120 was changed and the "Update (A)" button was pressed.

FIG. 124 is an illustration showing the message displayed when any of the required software resets of the network interface board in FIG. 114 were changed and the changes were completed.

FIG. 125 is an illustration showing the message displayed when "Eject (E)" of 817 of FIG. 43 was selected and the printer was on-line.

FIG. 126 is an illustration showing the message displayed when "Printer Reset (R) . . . " of 817 of FIG. 43 was selected.

FIG. 127 is an illustration showing the message displayed when "Printer Initialize (1)" of 817 of FIG. 43 was selected.

FIG. 128 is an illustration showing the message displayed when "Network Interface Board Reset (B)" of 817 of FIG. 43 was selected.

FIG. 129 is an illustration showing the message displayed when "Network Interface Board Initialize (D)" of 817 of FIG. 43 was selected.

FIG. 130 is an illustration showing the message when operation returns to the factory default settings set with the network interface board.

FIG. 131 is an illustration showing the message when printer is on-line and "Test Print (P)" "Status Print (S)" "Font List (F)" were selected I 821 of FIG. 43.

Figure 132:
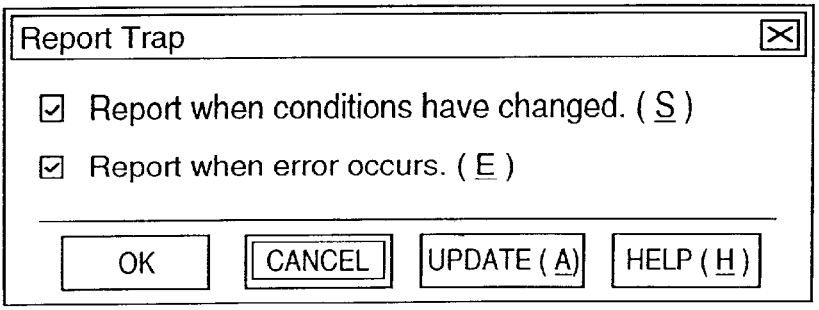

FIG. 132 is an illustration showing the trap report condition dialog box.

Figure 133:
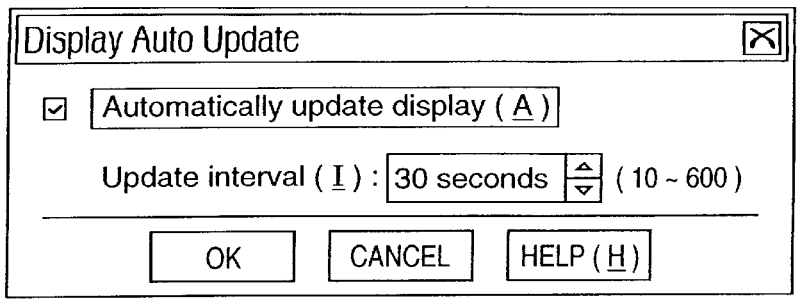

FIG. 133 is an illustration showing the device auto change dialog box.

Figure 134:
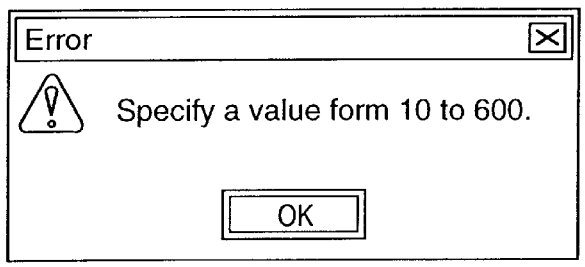

FIG. 134 is an illustration showing the message displayed in "Change Interval (I) when the user made an entry outside the allowable range in FIG. 133.

Figure 135:
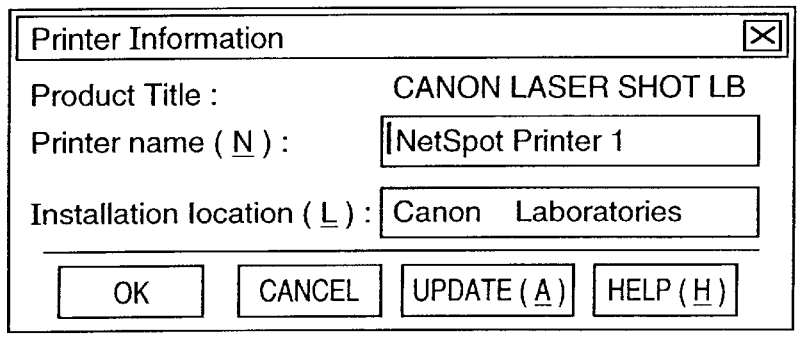

FIG. 135 is an illustration showing the printer information dialog box.

Figure 136:
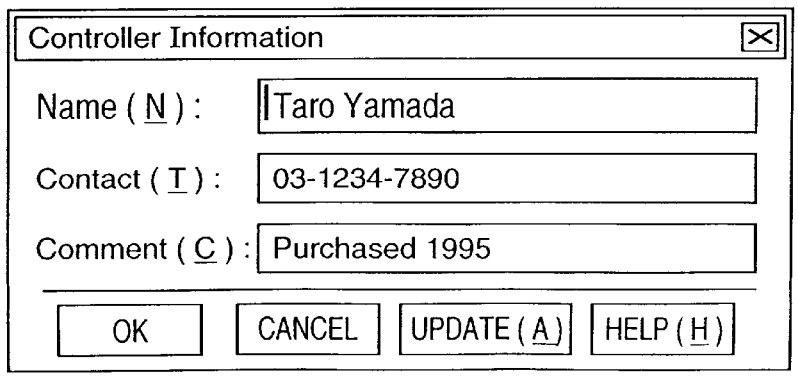

FIG. 136 is an illustration showing the controller information dialog box.

Figure 137:
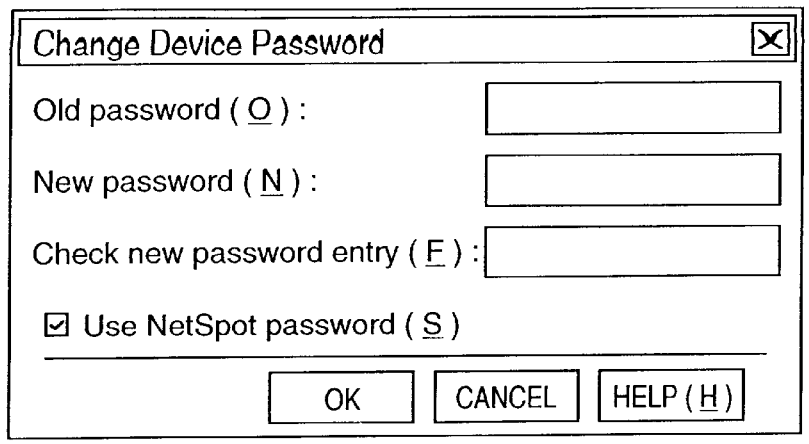

FIG. 137 is an illustration showing the device password change dialog box.

Figure 138:
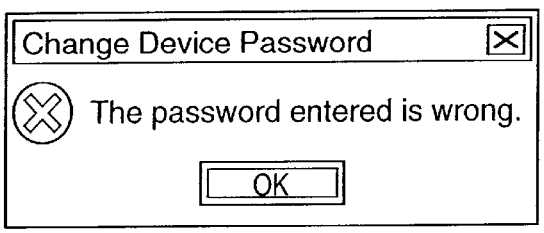

FIG. 138 is an illustration showing the message displayed when a mistake was made in the password entered with the "Old Password (0)" of FIG. 137.

Figure 139:
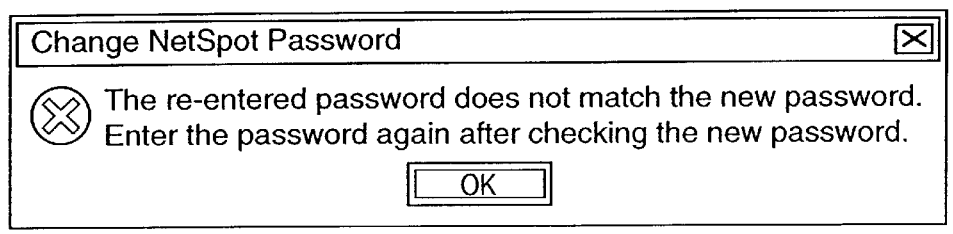

FIG. 139 is an illustration showing the message displayed when the password entered with "New Password (N)" and the "New Password Check Entry (F)" do not match.

Figure 140:

FIG. 140 is an illustration showing the message displayed when the device password has been changed by means of th correct entry by the user.

Figure 141:
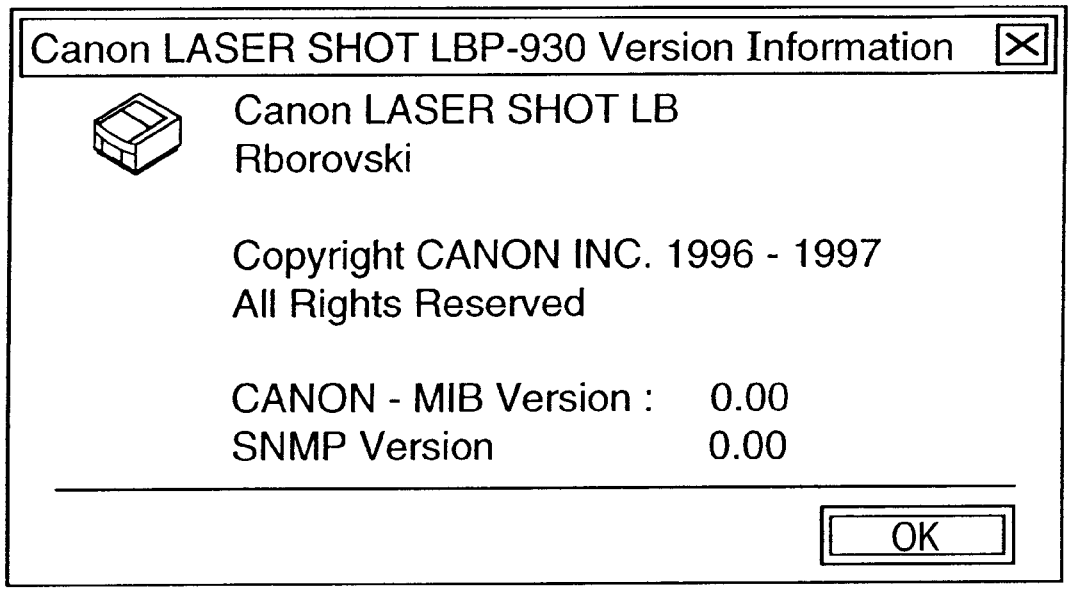

FIG. 141 is an illustration showing the device information dialog box.

Figure 142:
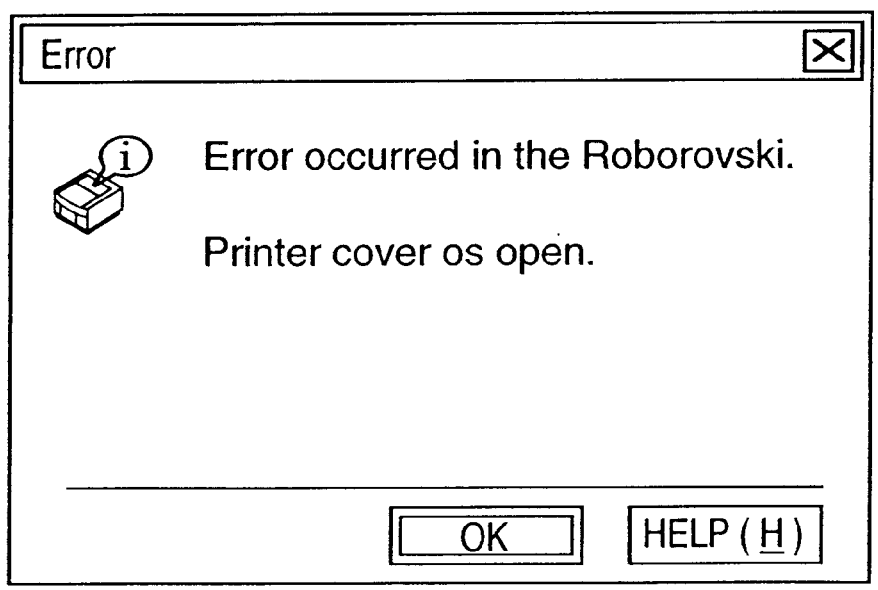

FIG. 142 is an illustration showing the error pop-up window.

Figure 143:
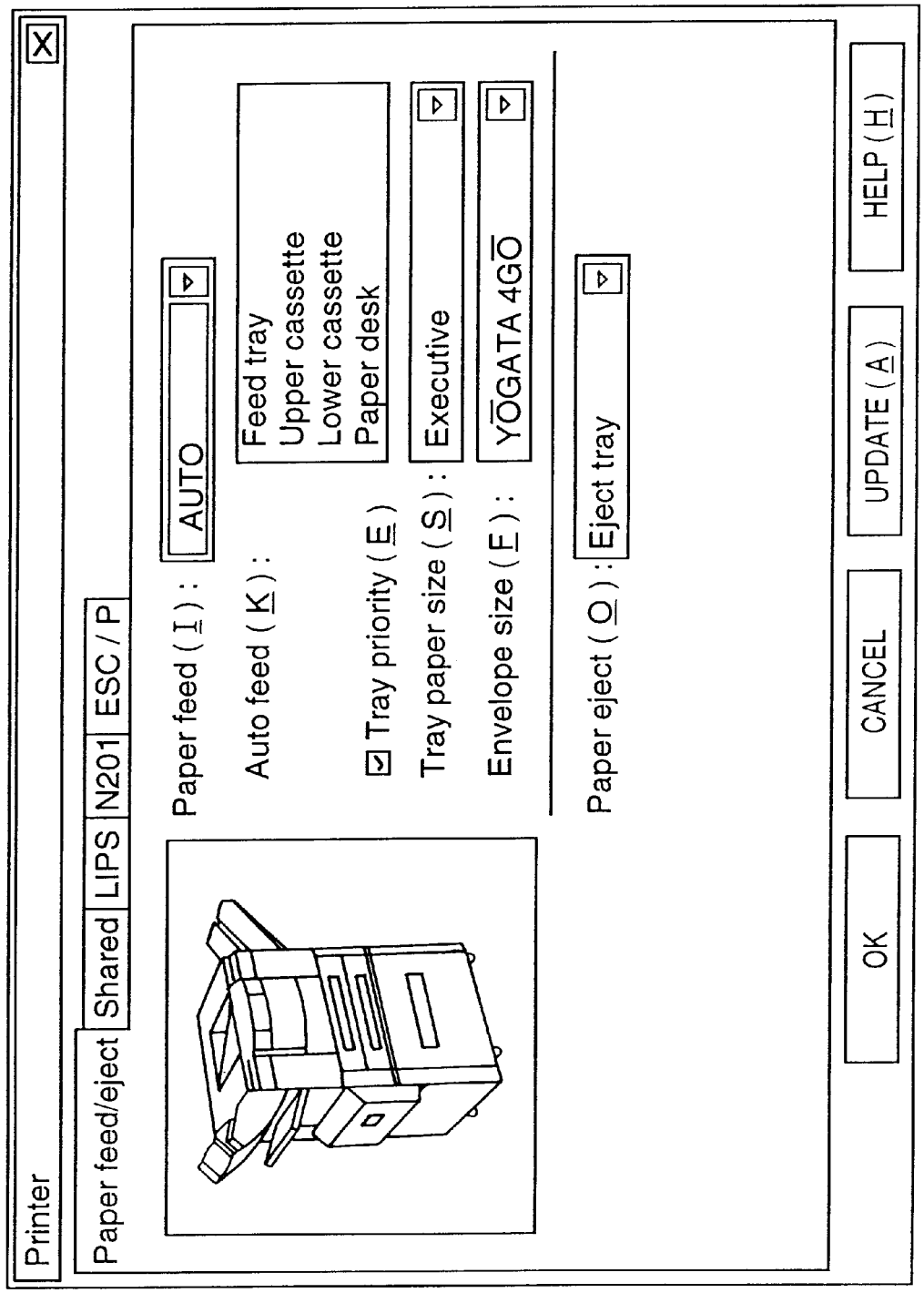

FIG. 143 is an illustration showing the printer environment setting dialog box.

FIG. 144 is an illustration showing the protocol setting dialog box.

Figure 145:
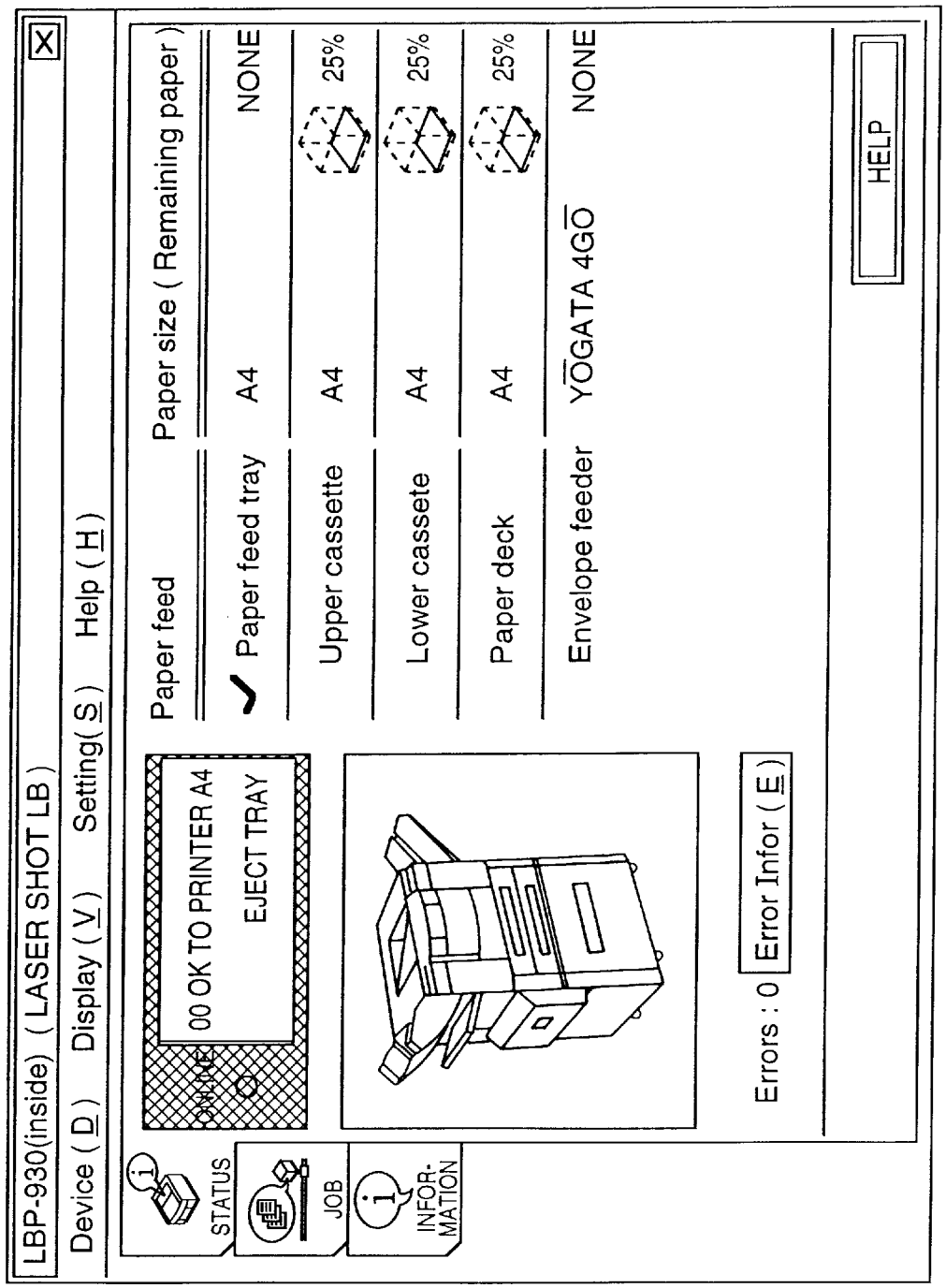

FIG. 145 is an illustration showing the user mode device window.

Figure 146:
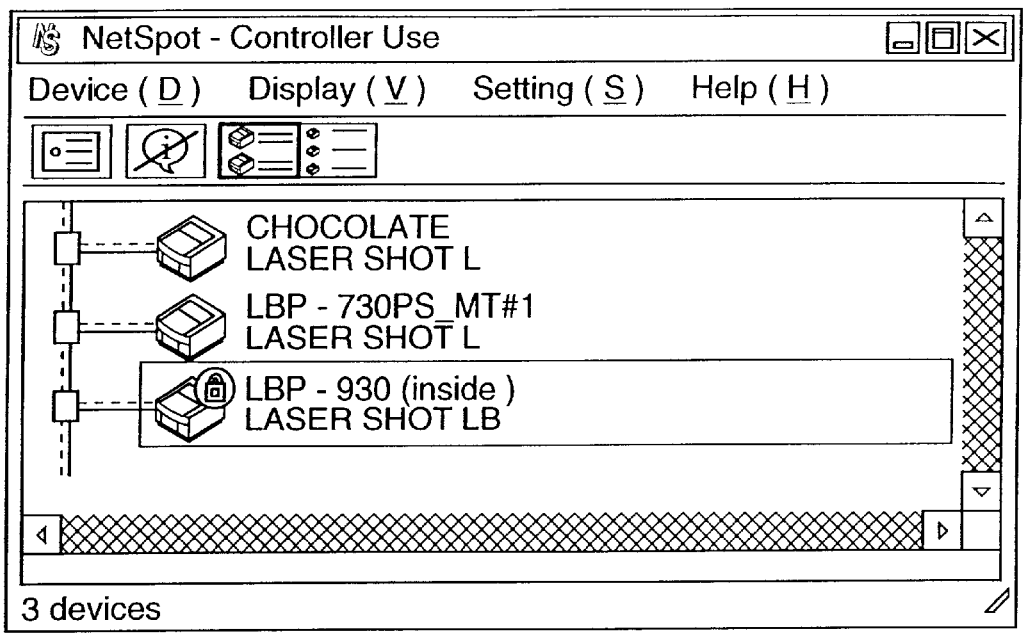

FIG. 146 is an illustration showing the device list window (large icon) when the device window has been opened in controller mode.

Figure 147:
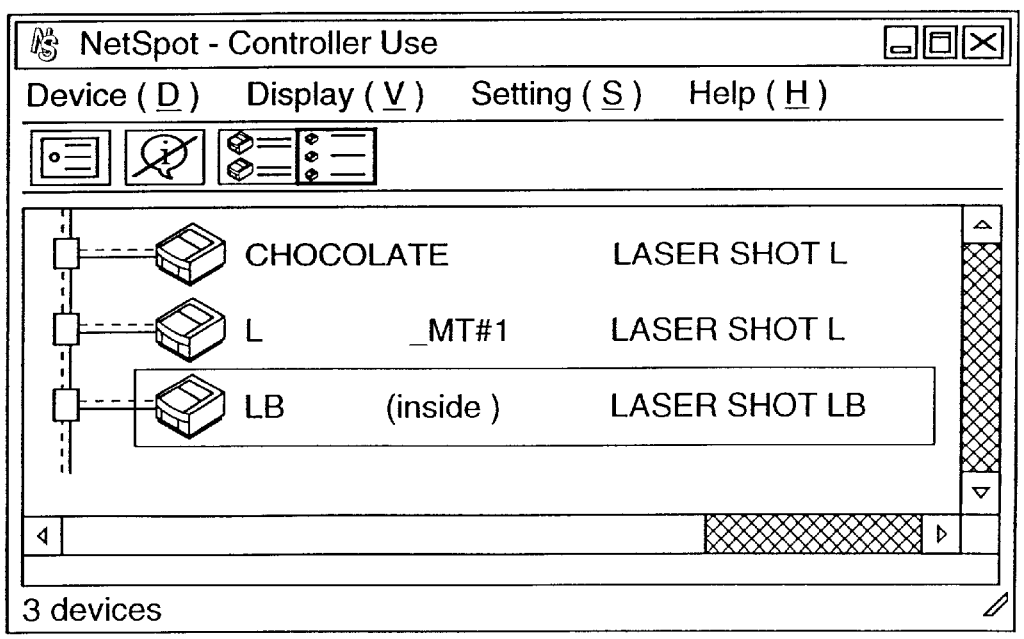

FIG. 147 is an illustration showing the device list window (small icon) when the device window has been opened in controller mode.

Figure 148:
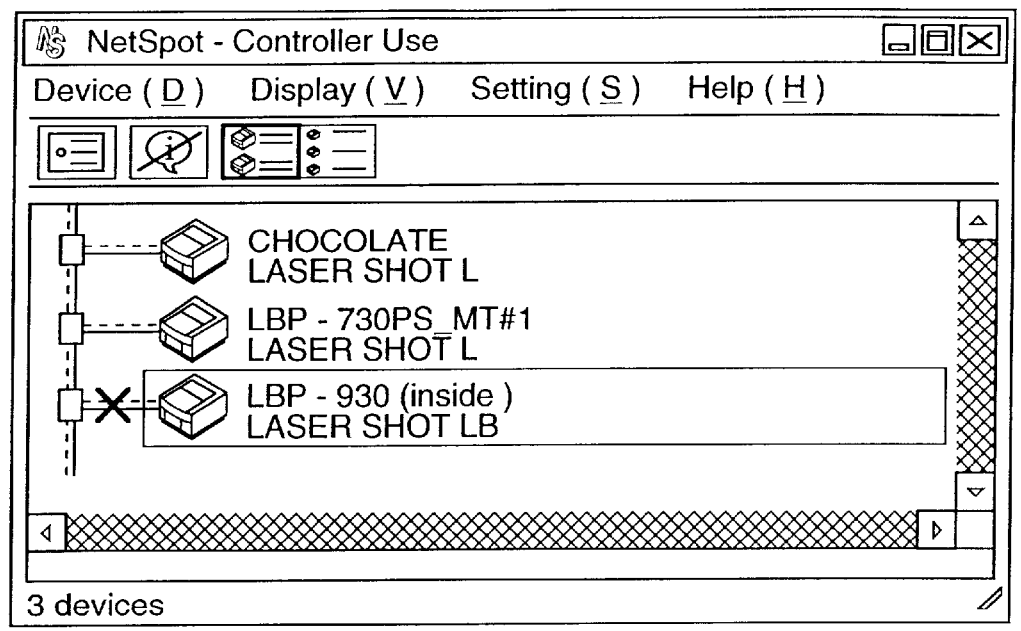

FIG. 148 is an illustration showing the device list window (large icon) when there is no response from the previously detected device.

Figure 149:
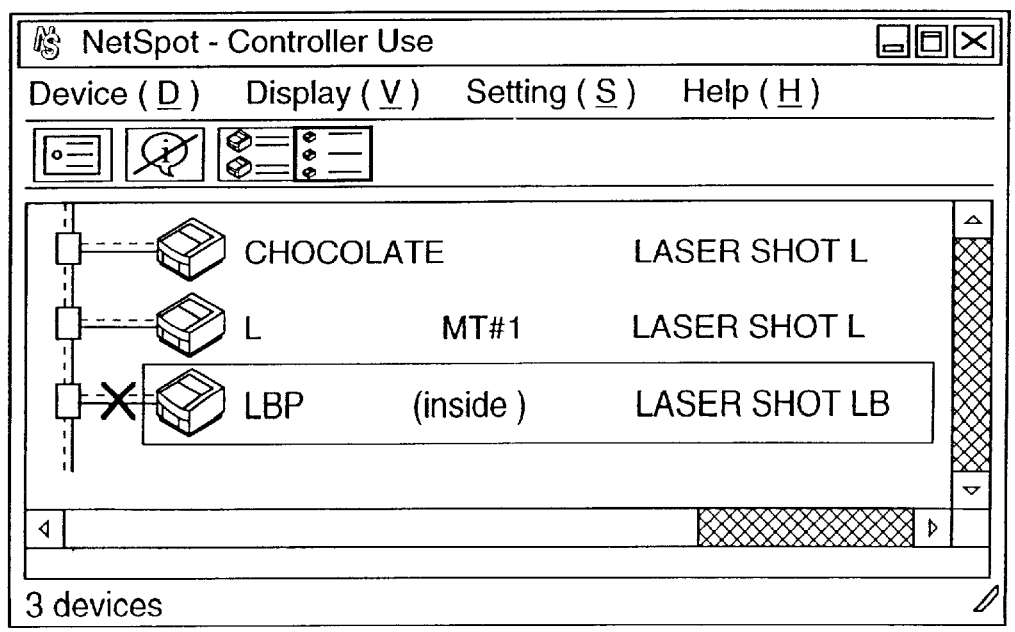

FIG. 149 is an illustration showing the device list window (small icon) when there is no response from the previously detected device.

Figure 150:
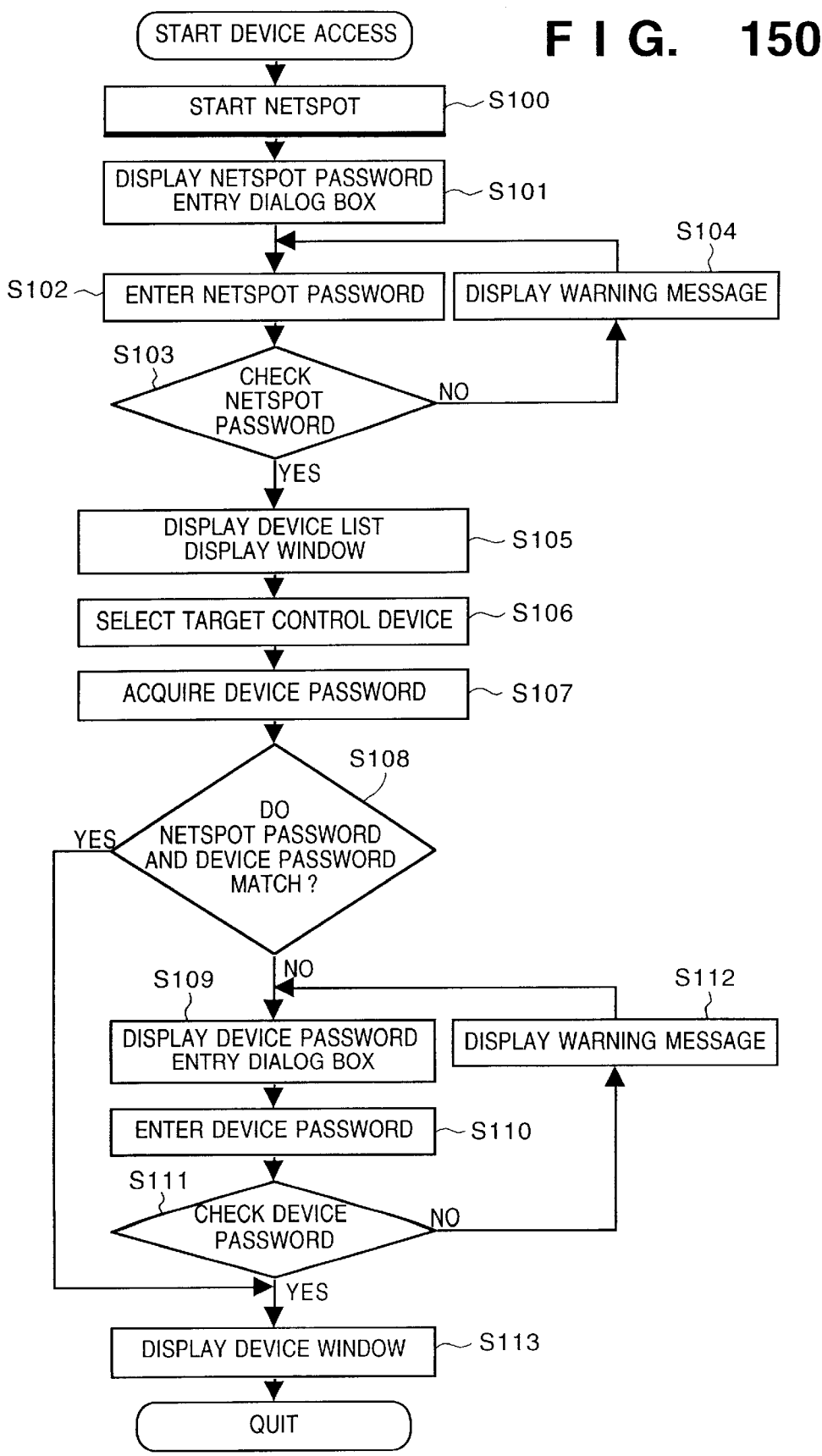

FIG. 150 is a flowchart showing the operation during entry of the network device password in the network management software of the embodiment of this invention.

Figure 151:
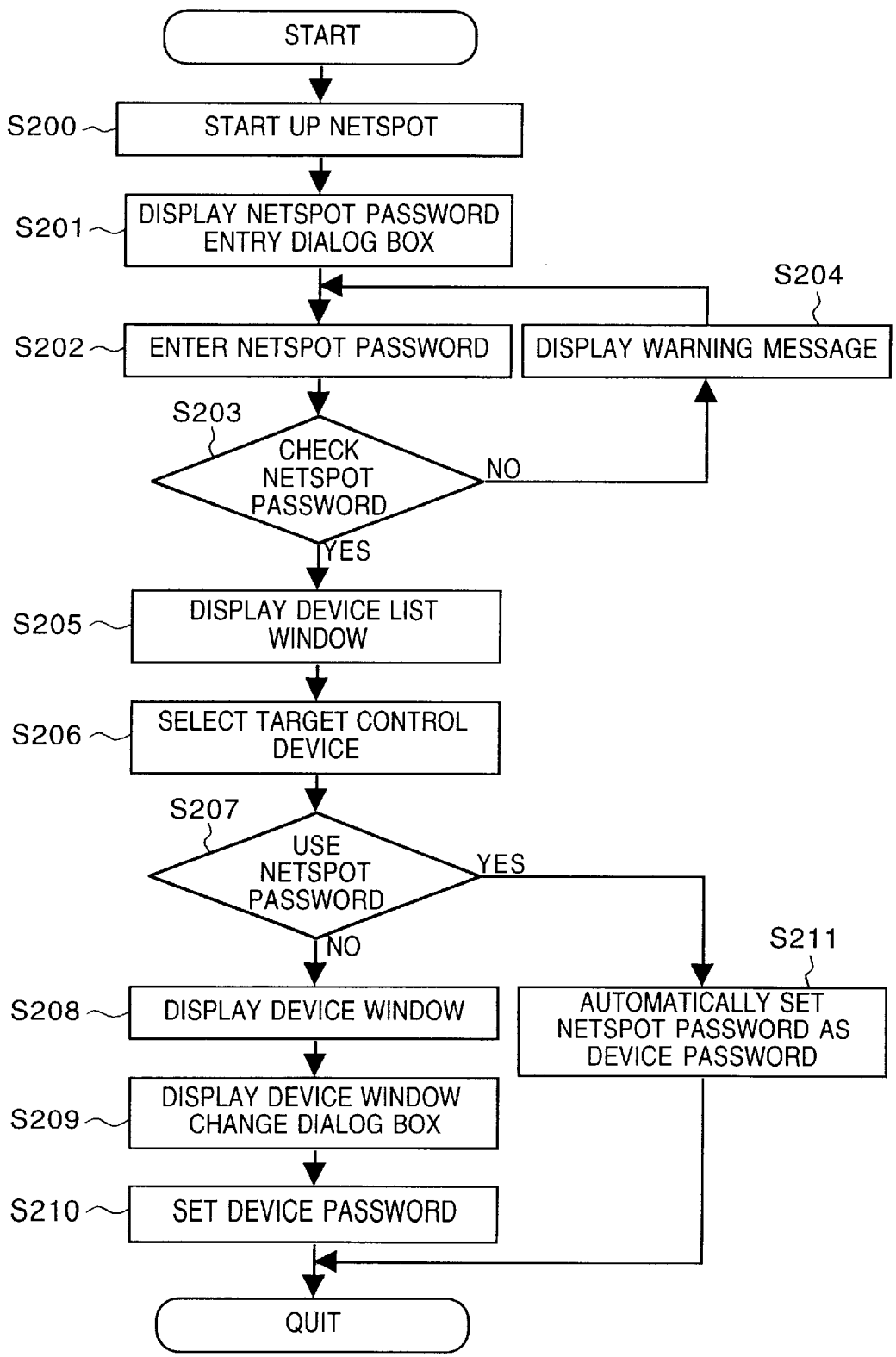

FIG. 151 is a flowchart showing the operation during setting of the network device password in the network management software of the embodiment of this invention.

Figure 152:
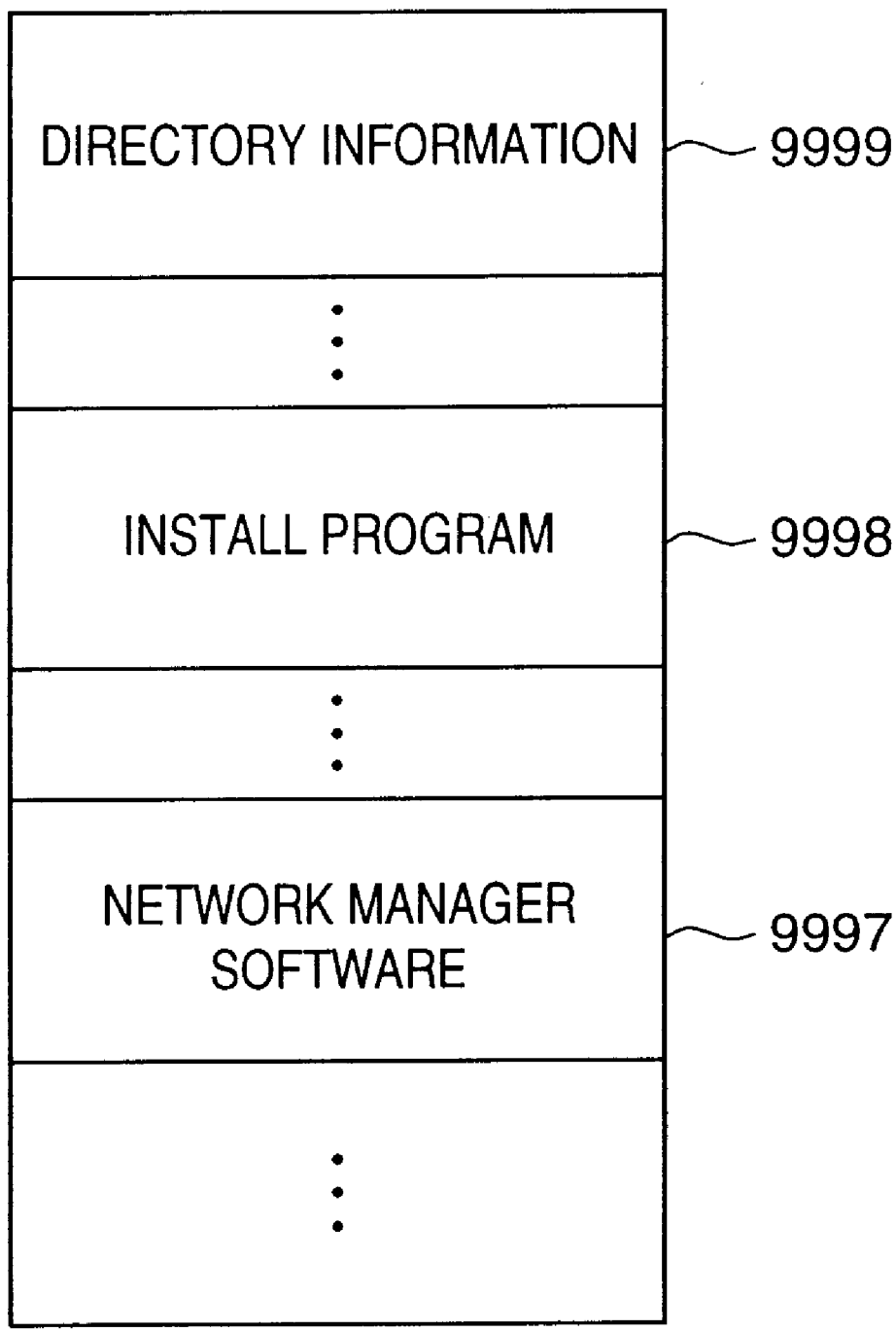

FIG. 152 is a memory map of the recording medium for the embodiment of this invention.

Figure 153:
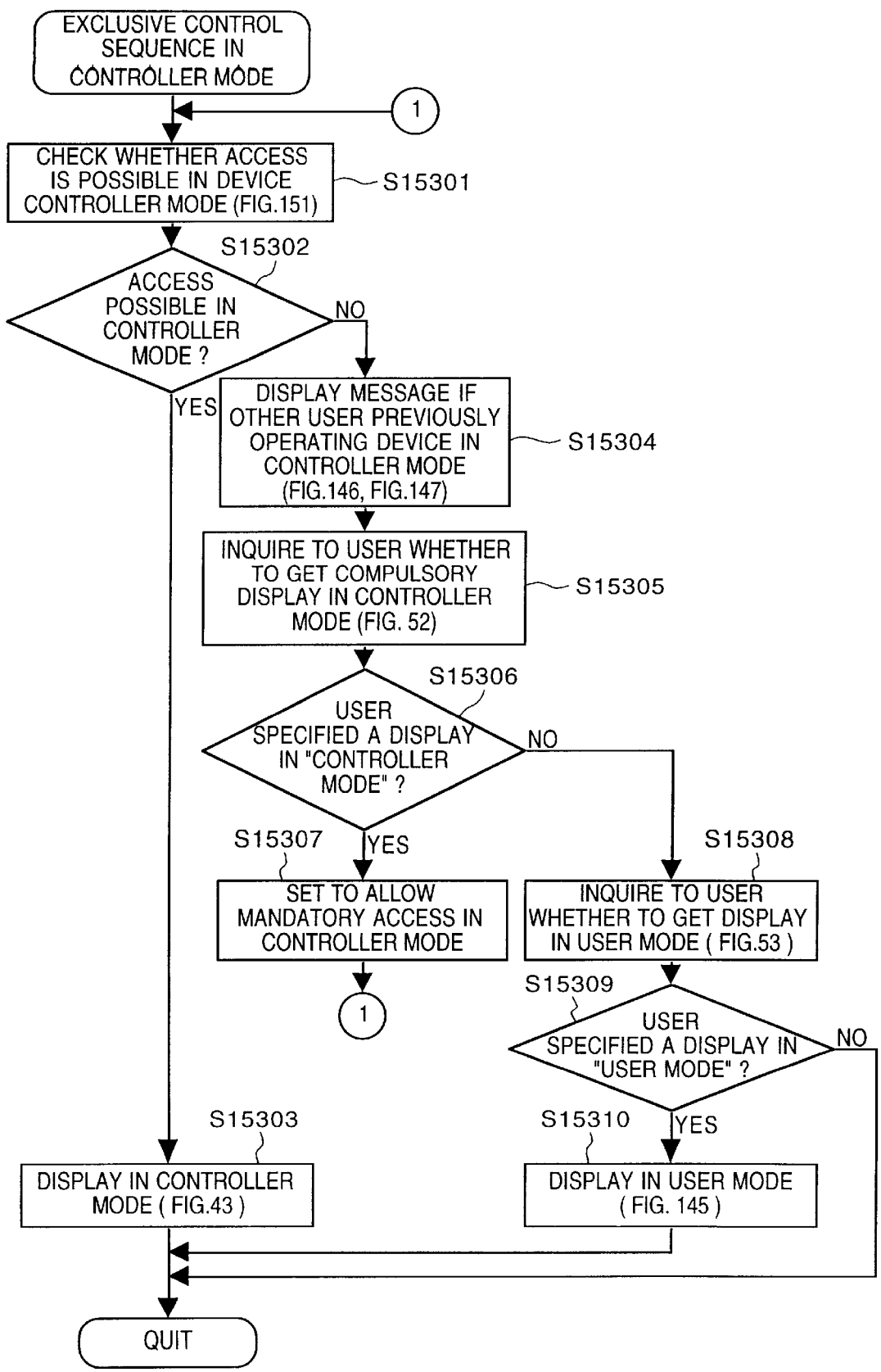

FIG. 153 is a flowchart showing the exclusive control sequence of the controller mode.

Figure 154:
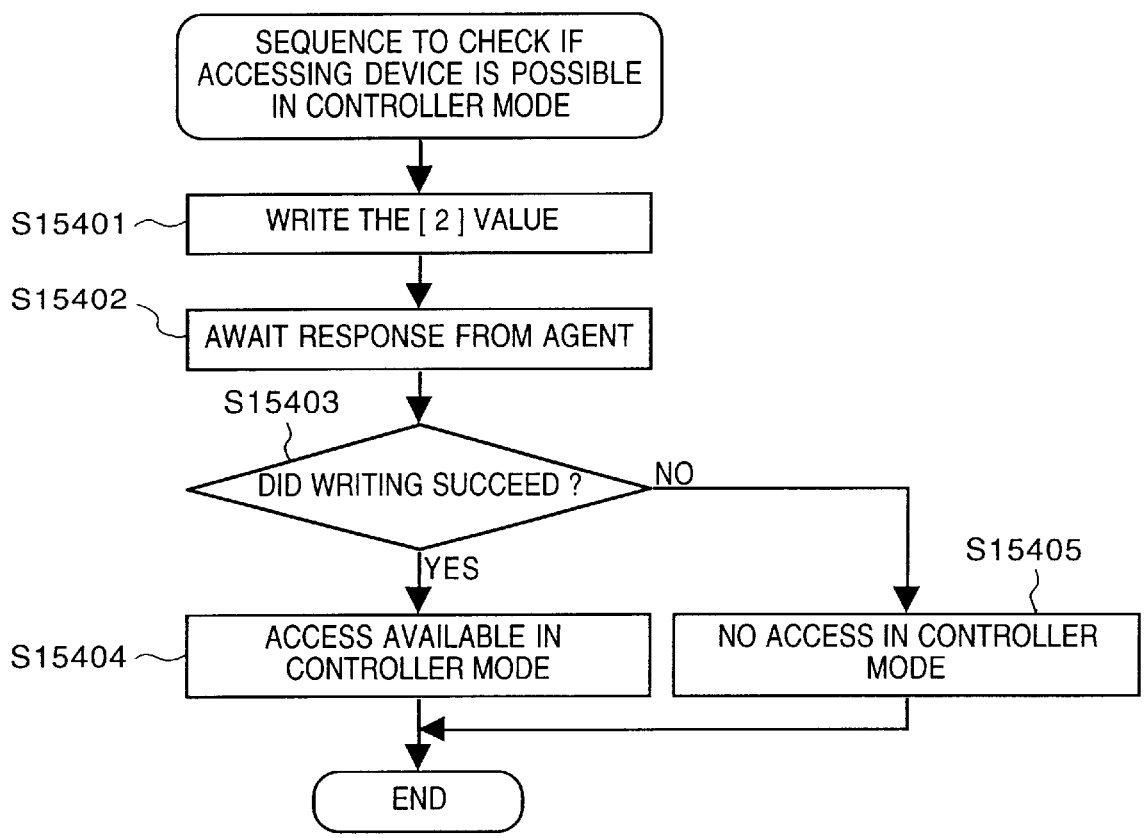

FIG. 154 is a flowchart showing the process for checking whether accessing of the device is possible in controller mode.

FIG. 155 is a flowchart showing the agent operation.

Figure 156:
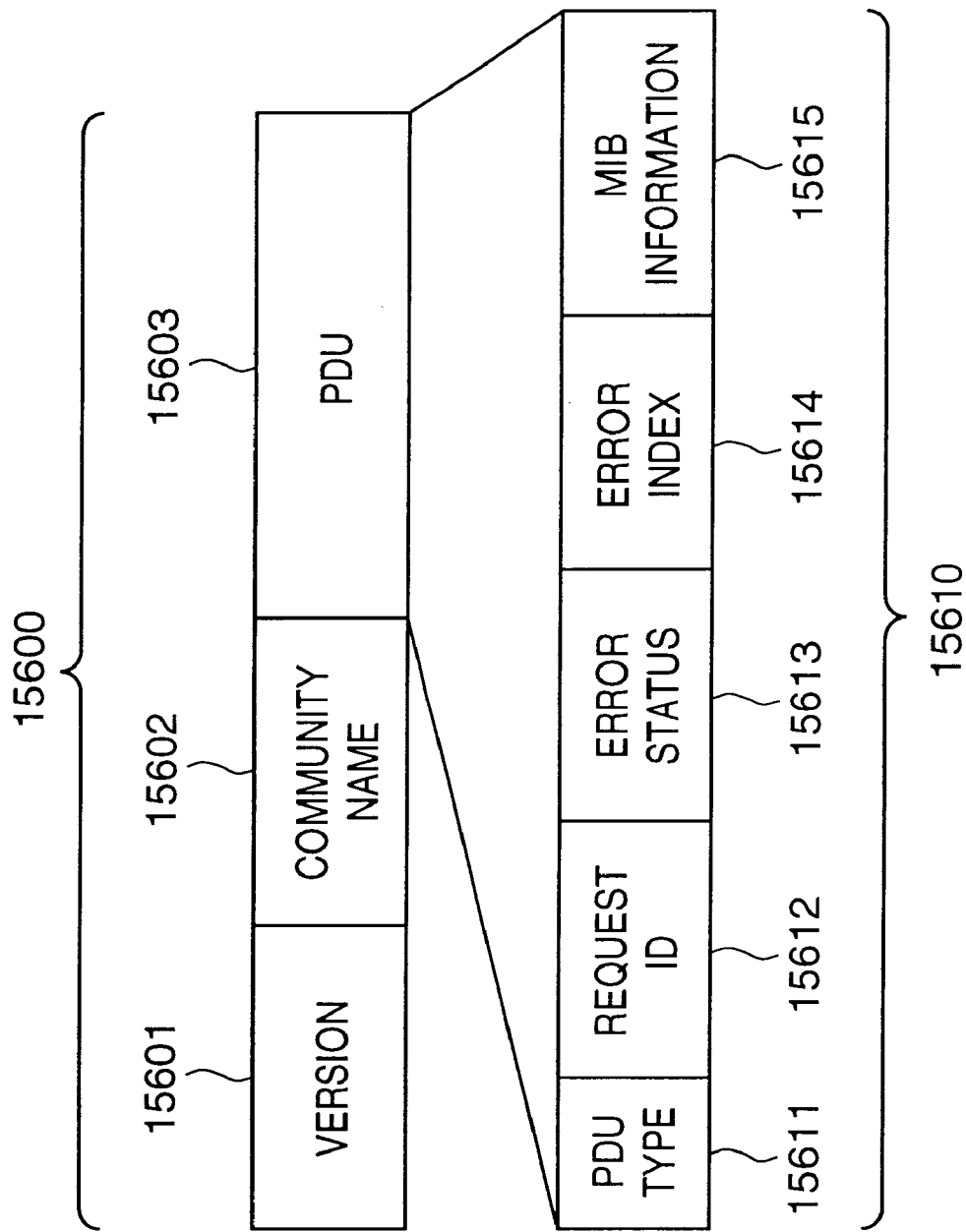

FIG. 156 is a drawing showing the SNMP message format.

FIG. 157 is a drawing for describing the SNMP command interchange between the manager and agent.

Figure 158:
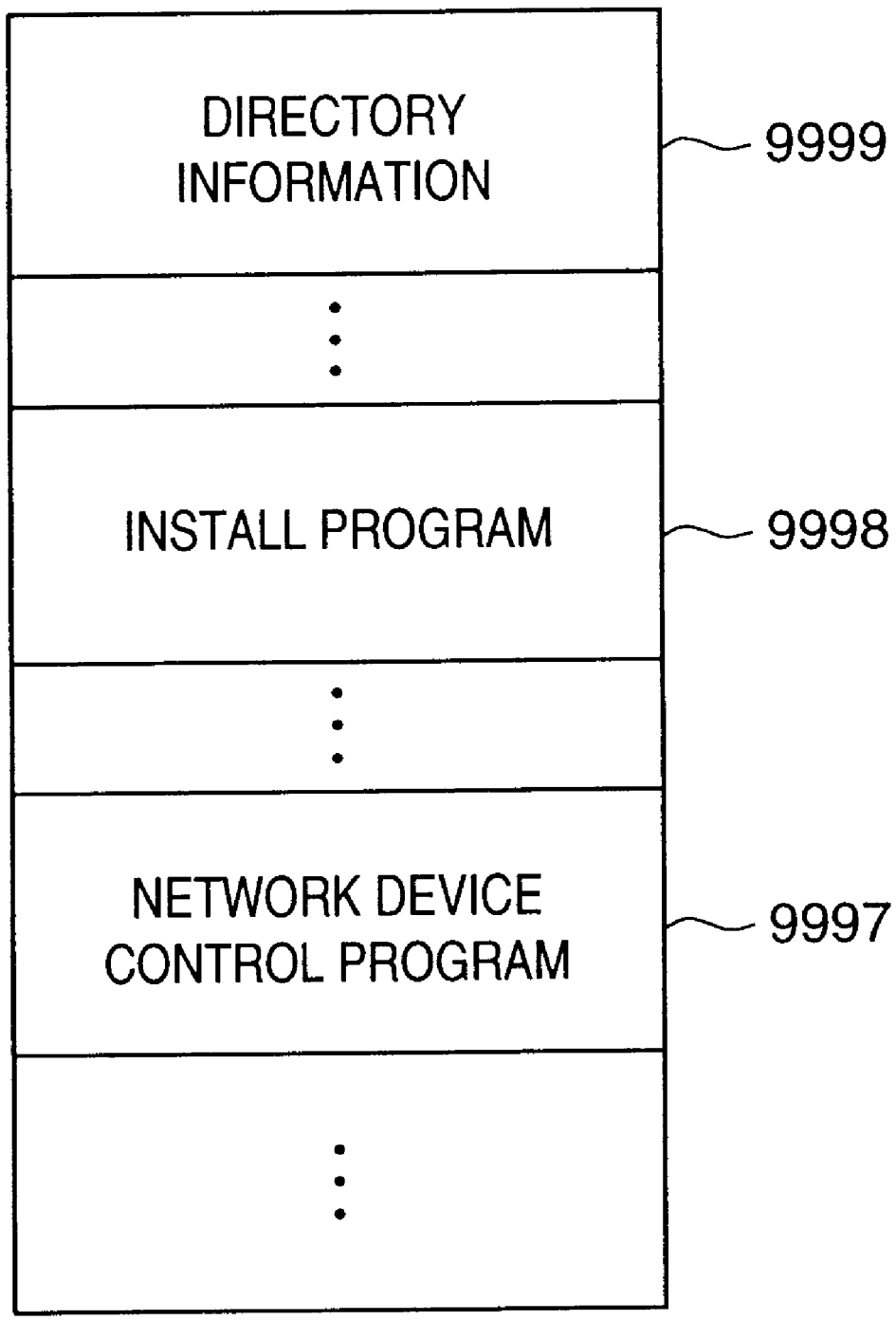

FIG. 158 is a CD-ROM memory map showing one example of a recording medium.

DETAILED DESCRIPTION OF THE PREFERRED EMBODIMENT

Hereafter, the embodiment of the invention will be described while referring to the accompanying drawings.

A large-scale network requiring management by the embodiment of this invention will first be described.

Figure 1:
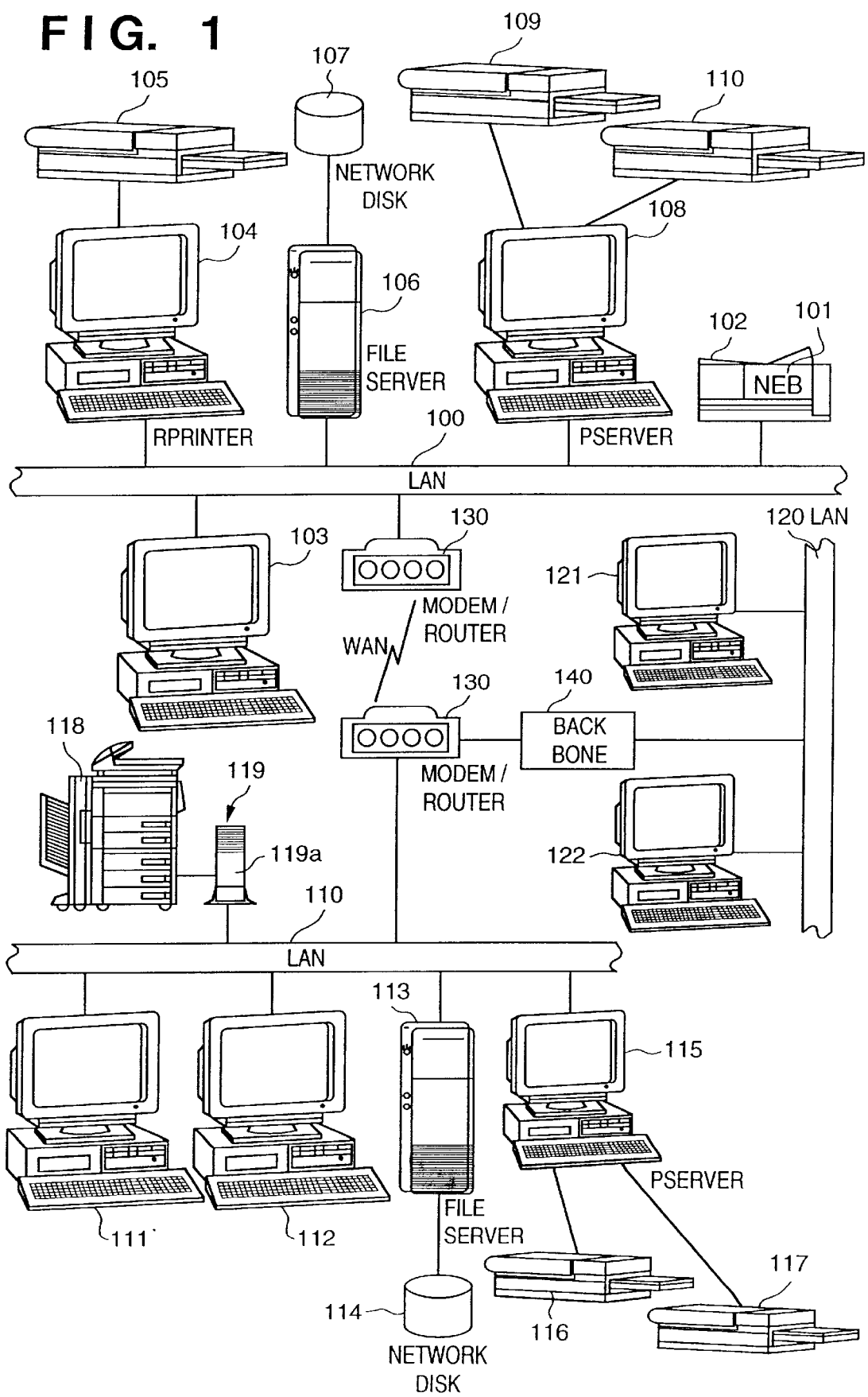
FIG. 1 is a drawing showing network boards for connecting the printers to the network when connected to printers having open style architecture.

FIG. 1 shows a network board (NB) for connecting the printer to the network, connected to a printer 102 having an open-style architecture. The NB101 is connected to the local area network (LAN) 100 by for instance an LAN interface such as Ethernet interface 10Base-2 having a coaxial connector or 10 Base-T having RJ-45.

A plurality of personal computers (PC) such as a PC103 or PC104 are also connected to the LAN 100. The PC103 and PC104 can communicate with NB101 within the network operating system. One personal computer such as the PC103 can be directed to function as the network controller. Also, a printer 105 connected to the PC104 can be connected to the PC103.

A file server 106 is connected to the LAN 100. This file server 106 controls access to files stored in a large-capacity (for example 10 billion byte) network disk 107. A printer server 108 performs printer on the connected printers 109a, 109b or with printer 105 in a remote location, etc. Other peripheral equipment not shown in the drawing may also be connected to the LAN100.

More specifically, the network shown in FIG. 1 can utilize network software such as Novell or Unix software for achieving efficient communications between the various network members. Any network software is capable of being used such as NetWare (commercial trademark of the Novell Company, omitted hereafter). A detailed explanation relating to this software package may be found by referring to the on-line documentation enclosed with the NetWare package. This explanation can also be purchased along with the NetWare package from the Novell Company.

In a simplified description of the layout of FIG. 1, a file server 106 fulfills the function of file manager for receiving data files, storing, queueing, caching and transmission of data files with the LAN members. For instance, files made on the PC103 and PC104 are respectively sent to the file server 106 which sorts these files in order, and in compliance with commands from the print server 108, sends these ordered data files to the printer 109a.

The data files created on the PC103 and PC104 are sent to the LAN100 and files received from the LAN100 or such kind of files are labeled and processed on a computer configured to perform such tasks. The computer equipment is shown in FIG. 1, however other computer equipment suitable for running the network software may also be included. For instance, when using UNIX software, a UNIX workstation can be incorporated into the network and under appropriate conditions, can be used along with the computers shown in the figure.

Usually, a local area network such as the LAN100 provides services to a certain number of local user groups such as on one floor of a building, or a plurality of connected floors in a building. For instance, a wide area network (WAN) can be formed to handle users isolated from other users such as users in other buildings or in other prefectures, etc. The WAN is fundamentally an aggregate consisting of high-speed digital lines such as telephones lines of high-speed digital networks (ISDN) to connect a plurality of LAN.

Accordingly, as shown in FIG. 1, the LAN100, LAN110 and LAN120 form WAN connected by modulators/demodulators (modem) and a transponder 130 and a backbone 140. These are simple electrical connections implemented by several bus lines. Each LAN incorporates a custom personal computer. Though not always needed, a file server and a print server are normally incorporated into the LAN.

Therefore, as shown in FIG. 1, the LAN110 incorporates a PC111, a PC112, a file server 113, a network disk 114, a print server 115, a printer 116 and a printer 117. In contrast, the LAN120 incorporates only a PC121 and PC122. The equipment connected with the LAN100, LAN110 and LAN120 can access other LAN equipment functions by means of WAN connections.

Up until now different methods have been attempted with standards systems from many organizations as methods for controlling devices on networks comprising a large-scale network system. The International Standards Organization (ISO) has proposed a general-purpose standards framework called the Open System Interconnection (OSI) model. The network control protocol for the OSI model is called the Common Management Information Protocol. The Common Management Information Protocol or CMIP is a common network control protocol from Europe.

Also, from the USA, a network management protocol for greater common use is known as Simple Network Management Protocol (SNMP) which is a complete change from the CMIP associated with it. (See "Introduction to TCP/IP Network Management—For Practical Network Control" by M. T. Rose, translated by Takeshi Nishida, First edition Aug. 20, 1992 Toppan.)

This Simple Network Management Protocol has at least one network management station (NMS) in the network management system. Each station has a plurality of management nodes including agents, as well as a network protocol so that the management stations and agents can exchange management information. The user can therefore obtain data on the network and also make changes to this data by utilizing electronic communication (modem) and the agent software for the management node via this network management software on NMS (network management station).

The agent here, refers to the software running as a background process of the target devices. When the user requests management data for equipment on the network, the management software places the object identification information in a management packet frame and sends this object information to the target agent. The agent interprets this object identification information, extracts data corresponding to this object identification information, places this data back in the packet and sends this packet back to the user. In some cases, a process corresponding to the data that was extracted, may be called up.

Figure 4:
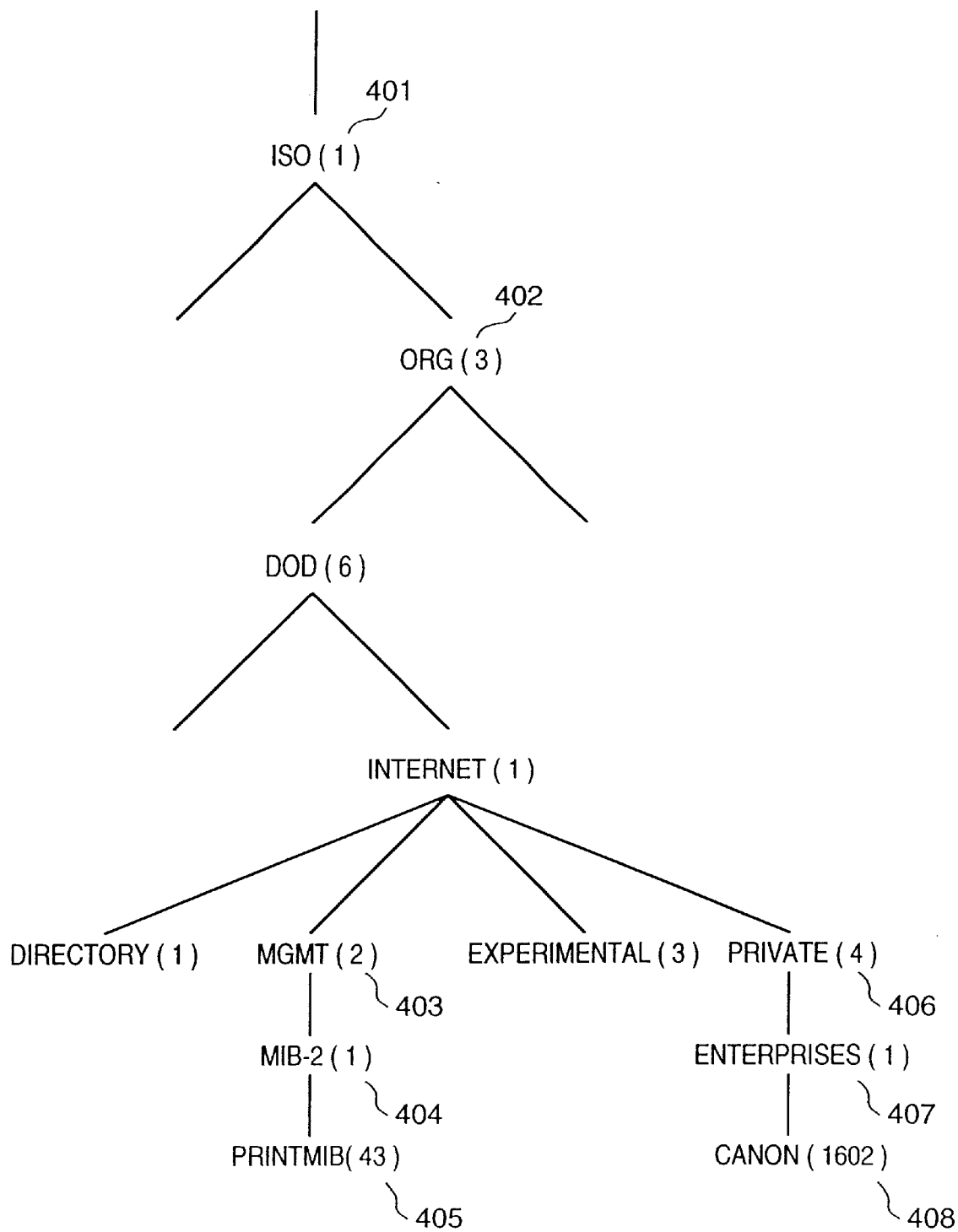
FIG. 4 is a concept view showing the configuration of the management information base (MIB).

This agent also maintains data regarding its own status in a data base configuration. This data base is called a Management Information Base (MIB)). FIG. 4 shows a concept view of the MIB configuration. As shown in FIG. 4, the MIB has a tree type data structure and all nodes are affixed with a number. The number inside the parentheses in FIG. 4 is an identifier for that node.

For instance, the identifier for node 401 is "1". The identifier for node 402 is a "3" under node 401 and therefore listed as "1•3". In the same way, the identifier for node 403 is listed as "1•3•6•1•2". The identifier for these nodes is known as the object identifier.

The structure of this MIB is called the Structure of Management Information (SMI) and conforms to the specifications in "RC1155 Structure and Identification of Management Information for TCP/IP-based Internets".

Only a portion of the MIB specified as a standard has been extracted and shown in FIG. 4.

In FIG. 4, the numeral 404 is a node representing the peak of the object group and referred to as a standard MIB provided as a standard feature in equipment managed by Simple Network Management Protocol (SNMP). The detailed structure of the objects ranked below this node are specified in "RFC1213 Management Information Base for Network Management of TCP/IP-based internets: MIB-II. The numeral 405 is a node at the peak of the object group called the printer MIB and is provided as a standard item in printers managed by Simple Network Management Protocol (SNMP). The detailed structure of the objects ranked below this node are specified in "RFC1759 Printer MIB. Further, the numeral 406 is referred to as a private MIB and is a peak node for defining autonomous MIB such as used by companies and organizations. The numeral 407 is called a company expansion MIB and is a peak node for autonomous expansion of a company within the private MIB. The Canon Corporation has been assigned "1602" as a company number for definition as an autonomous entity and the peak node 408 for defining Canon MIB which is a Canon autonomous MIB and "408" is ranked at a position below the node 407 which signifies companies. The object identifier "1•3•6•1•4•1602" is for the peak node of the Canon MIB.

Installing agents on network boards

Agents are installed on network boards for connecting the printer to the network. This process allows the printer to be controlled by the network management software. The user can acquire or change the status of the information for the printer subject to control by the network control software. More specifically for instance, the characters shown on the liquid crystal display of a printer can be acquired or the default paper feed cassette changed. Hereafter, a sample connection to a printer, of a network board (NB) mounted with an agent will be described.

Figure 2:
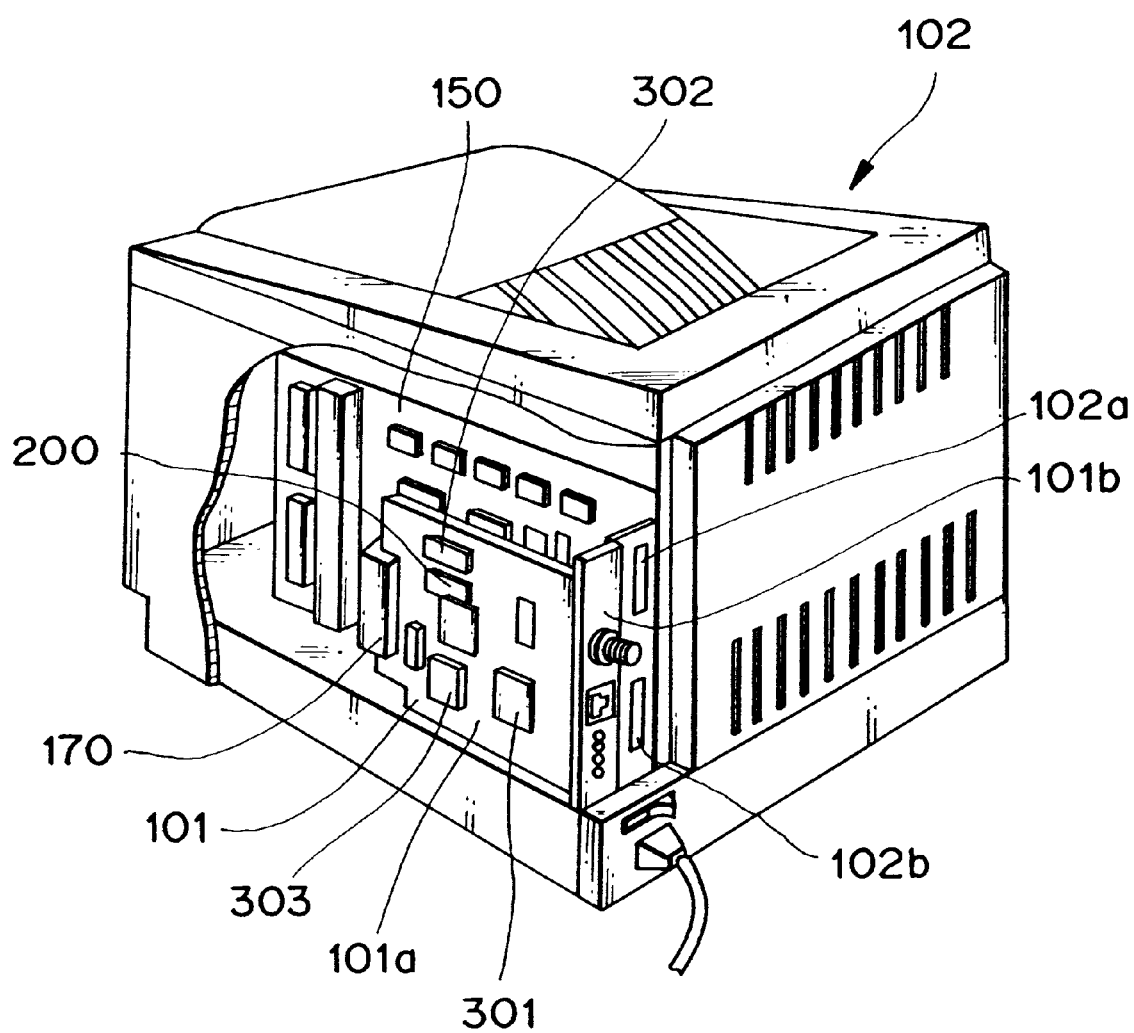
FIG. 2 is a cross sectional fragmentary view of the configuration for connecting to the printer, a network board mounted with an agent.

As shown in FIG. 2, the NB101 is preferably mounted in the internal expansion slot of the printer 102. The NB101 becomes a "built-in" network node having a data storage function and performing the processing shown below. The structure of this NB101 has the merit of possessing special auxiliary functions for integrating and controlling a large multi-area WAN network. These auxiliary functions for instance, include printer control and status monitoring of remote network locations (for instance offices of network coordinators) and automatic control and printer load characteristics of the printer for providing a guaranteed initial printer environment for the next printer user once the current printing job is finished or may include access through the network for setting a schedule for toner cartridge replacement and incorporating a printer log or statistical records.

An essential element in this NB design is the function for accessing printer control status from NB101 by way of a two-way interface such as the shared memory 200. Besides this shared (or joint) memory, an interface such as an SCSI interface can also be used. Thus, print operation information for a plurality of convenient auxiliary function programs can be sent to the NB101 or to external network nodes. The print image data and control information blocks are formed by a microprocessor 301 on the NB101, listed in the shared memory 200 and then loaded into the printer 102. At the same time, the printer status information is sent from the printer 102 to the shared memory 200 and then loaded by means of the microprocessor 301 on the NB.

FIG. 2 shows a fragmentary view of the NB101 installed in the printer 102. As shown in FIG. 2, the NB101 is comprised of a print circuit board 101a installed on a faceplate 101b for making the network connection and connected to the printer interface card 150 by means of the connector 17. The printer interface card 150 directly controls the printer engine of the printer 102. The printing data and the printer commands are input to the printer interface card 150 by way of the connector 170 from the NB101, while the printer status information is acquired by way of the connector 170 from the printer interface card 170. The NB101 communicates this information to the LAN100 by way of the network connector of the faceplate 101b. At the same time, the printer 102 can also receive printing data from the serial port 102a and the parallel port 102b, etc.

Figure 3:
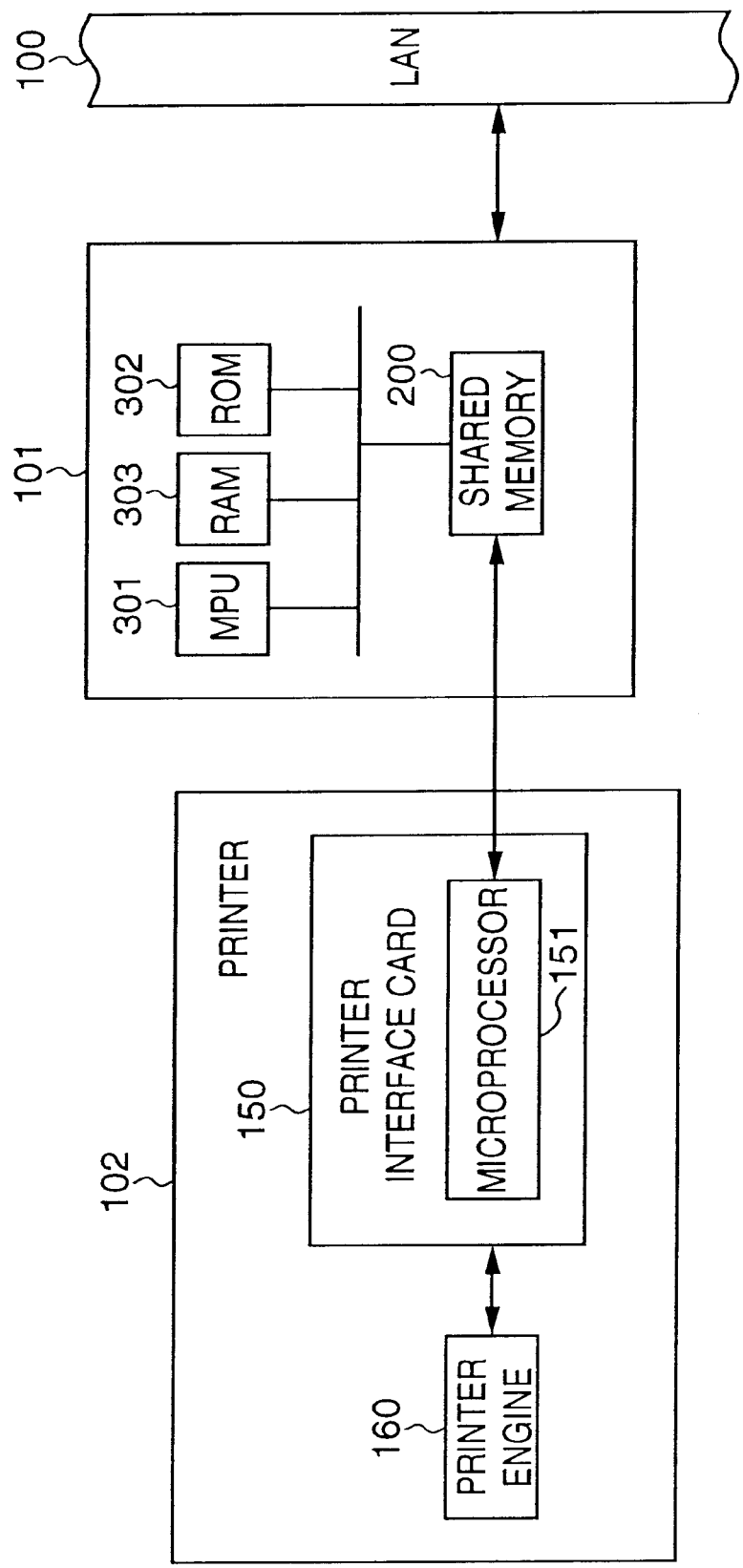
FIG. 3 is a block diagram showing the electrical connections of the network board, printer and LAN.

FIG. 3 is a block diagram showing the electrical connections of the NB101, the printer 102 and the LAN100. The NB11 is directly to the LAN100 by way of the LAN interface and connected by way of the printer interface card 150 to the printer 102. The NB101 is comprised of a microprocessor 301 to control the NB101, a ROM 303 to store the operating program for the microprocessor 301, a RAM 302 for utilizing the program run by the microprocessor 301 as work, and a shared memory 200 for exchanging data between the NB101 and the printer interface card 150 and these various components are mutually connected by internal buses. The program used by the NB101 for operating the SNMP agent is stored in the ROM303. The microprocessor 301 performs operation in compliance with the program stored in the ROM303 and utilizes the RAM 302 as the work area. The shared memory 200 is utilized as the buffer zone for communication with printer interface card 150.

The microprocessor 151 on the printer interface card 150 performs data access with the NB101 by way of the shared memory 200 installed in the NB101. The microprocessor 151 of the printer interface card 150 also performs communication with the printer engine 160 for actually moving the printer mechanism.

PC Configuration

The configuration of the personal computer operating the network management software is described as follows.

Figure 5:
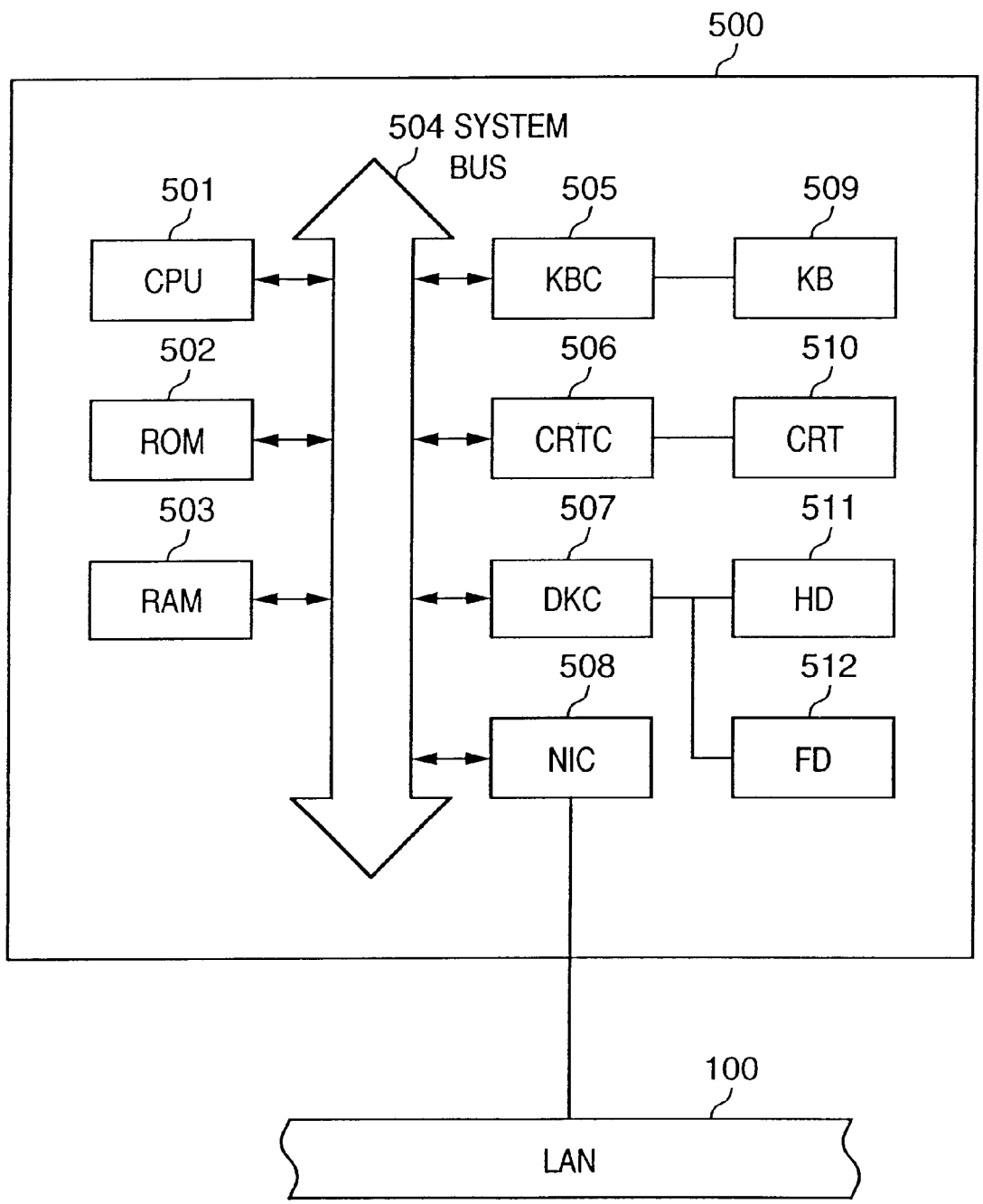
FIG. 5 is a block diagram showing the computer configuration capable of being operated by the network management software.

FIG. 5 is a block diagram showing the configuration of the PC capable of being operated by the network management software.

The reference numeral 500 in FIG. 5 denotes the PC operated by the network management software and is equivalent to numeral 103 in FIG. 1. The PC500 is controlled by a network management program executed by a CPU501 supplied with the program from a floppy disk drive (FD) 512 or stored in a ROM 502 or in a hard disk (HD) 511. Devices connected to the system through the system bus 504 are driven by this network management program in a coordinated manner. The numeral 503 is a RAM which functions as the main memory of CPU 501 or the work area and the like. The numeral 505 denotes a keyboard (KBC) controller for performing control via instructional inputs from a keyboard (KB) 509 and a pointing device not shown in the figure. The numeral 506 is a CRT controller (CRTC) which controls the display on the CRT (510). The numeral 507 denotes a disk controller (DKC) which controls access with a floppy disk controller (FD) 512 and a hard disk (HD) 511 for storing boot programs, various applications, edit files, user files and network management programs, etc. The numeral 508 denotes a network interface card (NIC) which performs two-way data exchanges between the agent or the network equipment by way of the LAN100.

Network Management Software Modular Structure

The configuration of the network management structure will next be described.

The network control device of this embodiment is attained by a PC configured as shown for a network control unit in FIG. 5. The hard disk (HD) 511 stores the network management program performing the main operation of this embodiment as is described later on. In all explanations related from hereon, the CPU501 will serve as the main element of the hardware unless otherwise stated. However, the main item in software control is the network management software stored in the hard disk (HD) 511. The operating system (OS) of this embodiment is assumed to be Windows95 (Microsoft) however the OS need not be restricted to Windows95. The network management program relating to this embodiment may be provided in a form stored on a recording medium such as floppy disks or a CD-ROM, etc. In such a case, a floppy disk controller (FD) 512 such as shown in FIG. 5 or a CD-ROM drive not shown in the drawing may be utilized to load the program from the recording medium and install the program in the hard disk (HD) 511.

Figure 6:
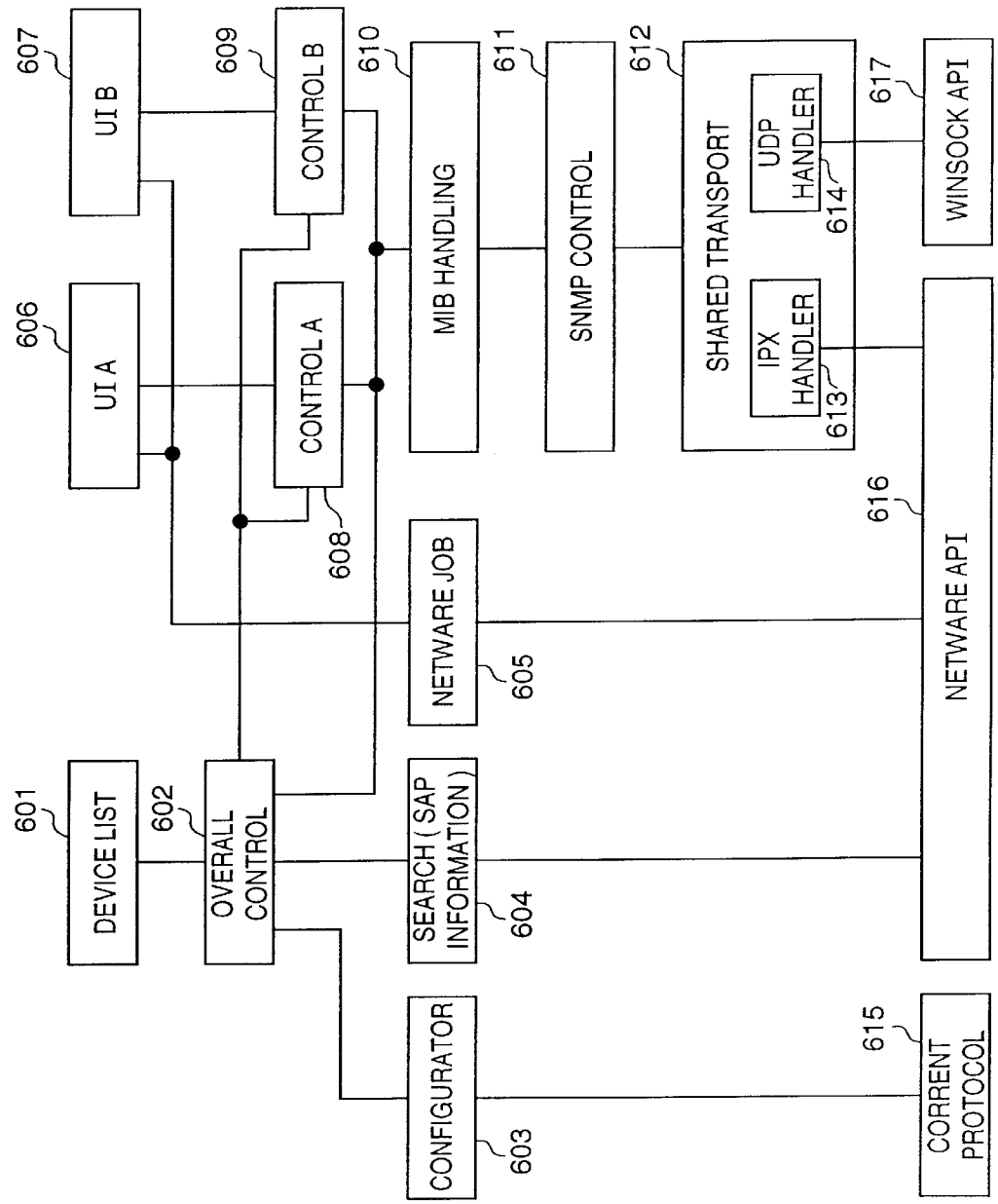
FIG. 6 is a block view of the network management software module.

FIG. 6 is a block diagram view of a modular structure of the network management software relating to the embodiment of this invention. This network management software is stored in the hard disk 511 of FIG. 5 and the software is run by means of the CPU501. In such cases, the CPU501 uses the RAM 503 as the work area.

The numeral 601 in FIG. 6 denotes the device list module which is a module for displaying on a list, all the devices connected to the network (this list is given in more detail in FIG. 15 as explained later). The numeral 602 denotes the overall control module which serves to coordinate the other modules based on instructions from the device list. The numeral 603 denotes the configurator which is the module that performs special processing relating to network settings for the agent. The numeral 604 denotes the search module which searches for a device connected to the network. Devices that the module 604 searches for are displayed on a device list 601. The numeral 605 is a network job module for acquiring print job status from the network server by utilizing the NetWare API616. (For details on NetWare API refer for instance, to the "NetWare Programmer's Guide for C" issued by the Novell Company. This text may be purchased from the Novell Company.) The numerals 606 and 607 denote the UI module for displaying the device window as related later. A UI module is provided for each model displaying detailed information. The numerals 608 and 609 denote the control modules which handle special control of models acquiring detailed information. These control modules, just as with the control modules are provided for each model displaying detailed information. The control A module 608 and the control B module 609 acquire MIB data from the device subject to net control by utilizing the MIB module 610 and then convey this data to the corresponding UI A module 606 or the UI B module 607.

An MIB module 601 performs object identifier and object key conversions. Here, the object key is a 32 bit integer matching the object identifier in a one to one relationship. The object identifier is an identifier of variable length. This variable object identifier is difficult to handle when installed as is in the network management software so the network management software of this document utilizes an object identifier and fixed length identifier internally in a one to one relationship. The host module for the MIB module 610 handles the MIB information utilizing this object key and this arrangement allows easy use in the network management software.

The numeral 611 denotes the SNMP module for sending and receiving the SNMP packet. The numeral 612 denotes the shared transport module that absorbs differences in lower ranked (downstream) protocol for transporting the SNMP data. During actual operation, the IPX handler 613 or the UDP handler 614 has the role of transporting the data. The UDP handler utilizes WinSock 617 for installation. (Refer to specifications for instance for Windows Socket API v1.1 for details on WinSock. This document can be procured from a plurality of locations and comes enclosed with Visual C++ a compiler of the Microsoft Corporation.) The numeral 615 denotes the current protocol utilized by the configurator 603 and during operation shows either the IPX protocol or the UDP protocol selected by the user. In the following explanation, the network management software of this document is called "NetSpot" (A commercial trademark of the Canon Corporation.)

NetSpot Install

The files required for install of NetSpot are usually taken from a recording medium such as a floppy disk (FD) or a CD-ROM or else may be transferred by way of the network. After the user has obtained the files needed for NetSpot install by one of these methods, the NetSpot install is commenced in compliance with the specified install procedure. This NetSpot install procedure is similar to other general software installation procedures. Namely, in that the user starts up the NetSpot installer on the personal computer (PC) and the installer then automatically performs the install. The installer copies the necessary files from the hard disk of the PC and when needed also has the user input required information so that the necessary files for NetSpot operation are edited or created.

The information entered by the user during this NetSpot install includes selection of the following two types of operating modes (controller mode and general user mode).

NetSpot Operating Mode

NetSpot has the following two types of operating modes; a controller mode and a general user mode. One of these two modes is specified. Basically, the NetSpot install must be corrected in order to change the NetSpot operating mode.

Controller Mode (administrator mode): A mode utilized by users have specially designated rights (for instance, the network administrator or network peripheral equipment administrator).

General User Mode (user mode): A mode utilized by a general user having no specially designated rights.

Functions that support the general user mode are functions supported with limits applied in the controller mode. In other words, the functions supported in the general user mode are equivalent to a portion of the functions supported in the controller mode.

A list of functions supported by NetSpot are related below for both the controller mode and the general user mode.

CONTROLLER (ADMINISTRATOR) MODE FUNCTION:

(1) Device list window

List of devices connected to network

Device information display (per each device)

Tool bar display

Status bar display (2) Device list window menu

Device window display menu

New device window menu

Printer driver install menu

Quit NetSpot

Display select menu

Icon order display menu

Updated information menu

Display option menu

Protocol select menu

Error report select menu

Device search range set menu

Device display set menu

Display auto change set menu

NetWare server menu

Password change menu

Help menu

Version information display menu
(3) Device window menu
Printer control
Network interface board control
Quit device window
Display menu
Trap report condition set menu
Display auto change set menu
Printer information set menu
Controller information set menu
Printer environment set menu
Protocol set menu
Device window password change menu
Common utility menu
Help menu
Version information display menu
(4) Error pop-up window
Report occurrence of device errors
(5) Status sheet
Printer external bitmap display
Operating panel status display
Paper feed status display
Paper eject status display
Error information display
Online help display for errors
Error reset operation
(6) Printer environment dialog box
Printer paper eject settings
Common print environment basic settings
Common print environment expansion settings
Print adjust settings
Print operating mode settings
LIPS custom print environment basic settings
LIPS custom print environment expansion settings
LIPS custom utility
N201 custom print environment basic settings
N201 custom print environment expansion1 settings**
N201 custom print environment expansion2 settings
N201 custom utility
ESC/P custom print environment basic settings
ESC/P custom print environment expansion1 settings
ESC/P custom print environment expansion2 settings**
ESC/P custom utility
(** indicates only when option is installed)
(7) Jobs sheet
Monitoring of all jobs
Job execute control held by the logged-in user
Control of all jobs (administrator only)
Changes in printer queue settings
(8) Information sheet
Printer information display
Environmental setting information display
Controller information display
(9) Network sheet
Network interface board information display
Network information display
TCP/IP information display
AppleTalk information display
SNMP information display
(10) Protocol setting dialog box
NetWare settings
TCP/IP settings
AppleTalk settings
GENERAL USER MODE FUNCTIONS:
(1) Device list display window
Device list display of devices connected to network
Device information display (per each device)
Tool bar display
Status bar display
(2) Device list window menu
Device window display menu
Printer driver install menu
Quit NetSpot
Display select menu
Icon order display menu
Updated information menu
Display option menu
Protocol select menu
Error report select menu
Device search range set menu
Device display set menu
Display auto change set menu
NetWare server menu
Help menu
Version information display menu
(3) Device window menu
Quit device window menu
Display menu
Display auto change set menu
Help menu
Version information display menu
(4) Error pop-up window
Report occurrence of device errors
(5) Status sheet
Printer external bitmap display
Operating panel status display
Paper feed status display
Paper eject status display
Error information display
Online help display for errors
(6) Jobs sheet
Monitoring of all jobs
Job execute control held by the logged-in user
Control of all jobs (administrator only)
Changes in printer queue settings
(8) Information sheet
Printer information display
Environmental setting information display
Controller information display The above mentioned functions are all explained in detail later on.

NetSpot Start-Up and Password Approval

Figure 10:
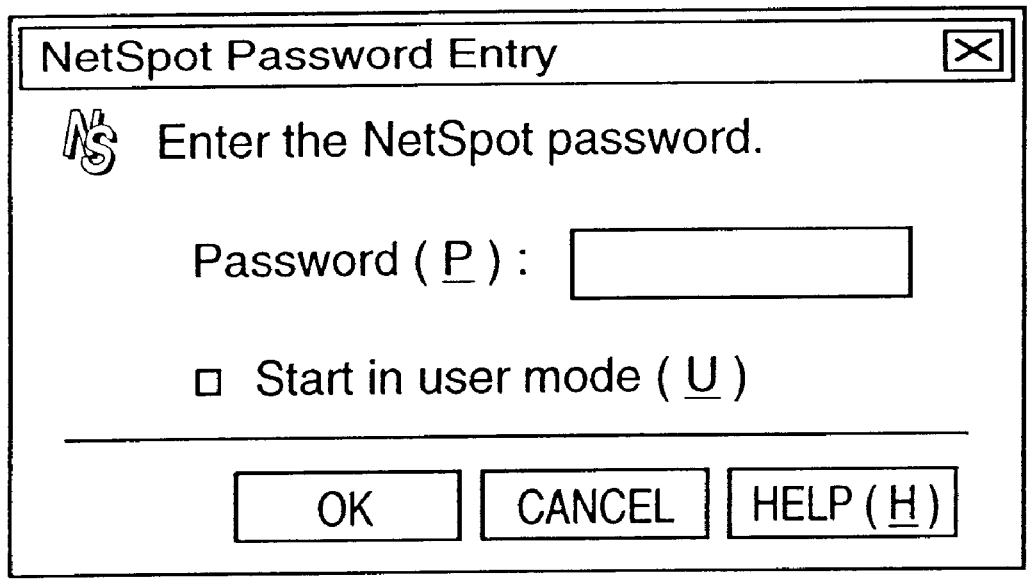
FIG. 10 is an illustration showing one example of the NetSpot password dialog box.

When NetSpot is installed in the general user mode, the user can start NetSpot just by executing the NetSpot file. However, when NetSpot is installed in the controller mode, entry of the NetSpot password is requested after the user executes the NetSpot file. The NetSpot cannot start at this time in controller mode, unless the user enters the correct password. In NetSpot controller mode, the user can make all types of network peripheral equipment (device) settings. A mistake in these settings can cause misoperation or equipment breakdowns. So during startup in controller mode in NetSpot, the user is requested to enter the NetSpot password in order to prevent using controller mode by the general user. However, when entry of the NetSpot password is requested, the user can start up NetSpot in the general user mode without entering the password. This process is described in detail later on in the description of the NetSpot password entry dialog box (FIG. 10).

During install of NetSpot in controller mode, the user performing the install can set the NetSpot password during controller mode startup.

Figure 38:
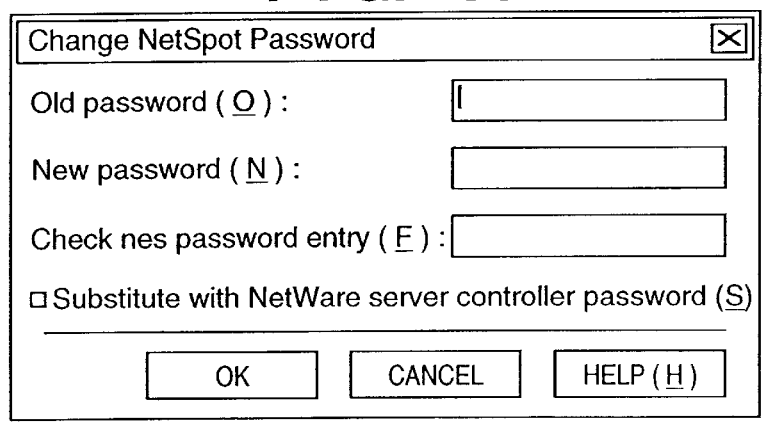
FIG. 38 is an illustration showing the NetSpot password dialog box.

Further, after the user has started up NetSpot in controller mode, the NetSpot password can be set or changed at controller mode startup. Details are related later on, in the explanation of the NetSpot password change dialog box (FIG. 38).

The NetSpot password which has been set or changed is used from the next time NetSpot is started in controller mode. NetSpot controller mode will start if the NetSpot password entered during controller mode startup matches the actual entry but will not start if the two passwords do not match.

In NetSpot controller mode, instead of requesting the NetSpot password from the user during start-up, a check can be made in the NetWare file server for log-in by the administrator. In other words, during start-up in NetSpot controller mode, the request for entry of the NetSpot can be omitted if the user has previously logged-in to the NetWare file server as the administrator.

In actual network operation, there may be a plurality of administrators in one network environment and the administrator may vary with each piece of network peripheral equipment (device). So in NetSpot controller mode, a device password can be set as an option for each network interface board, in addition to the NetSpot password during start-up of the controller mode. This allows approval of a device password for each piece of network peripheral equipment selected by the user from the device list display window (FIG. 15) described later on.

The controller can set a device password as needed for each network interface board during selection of network peripheral equipment. When a device password has been set in the network interface board, at the time of new selection of network peripheral equipment by the user in NetSpot controller mode from the device list display window (FIG. 15) or in other words when the device window has been opened again, the device password set by the controller for each network interface board is approved.

Entry of the device password during new selection of network peripheral equipment from the device list display window in the NetSpot controller mode can be omitted if the user sets the NetSpot password during controller mode start-up as equivalent to the device password at the time of network peripheral equipment selection.

This process is related more specifically, in the explanation for the device password entry dialog box (FIG. 50) and the device password change dialog box (FIG. 137).

In password approval as described above, approval of the device password during the latter selection of network peripheral equipment is performed by implementing the Canon MIB for the network interface board so this function is not supported for network interface boards not implementing the Canon MIB.

NetSpot Exclusive Control

A conflict may possible occur between the network peripheral equipment (device) settings and the network settings, when a plurality of NetSpot controller modes are started up for one piece of network peripheral equipment. Therefore, the number of NetSpot controller modes that can be started versus one piece of peripheral equipment are restricted to one mode. In other words, the same piece of network peripheral equipment cannot be selected by a plurality of NetSpot controller modes. In contrast, a plurality of general user modes can be started for one piece of network peripheral equipment. In other words, the same piece of network peripheral equipment can be selected on more than one NetSpot general user mode.

In the exclusive control in the type of controller mode related above, the network interface boards are implemented by a Canon MIB so this exclusive control function is not supported on network interface boards not implemented by a Canon MIB. When exclusive control is not implemented then network peripheral equipment on the same network can be selected by more than one NetSpot controller mode just the same as in the NetSpot general user mode.

Figure 9:
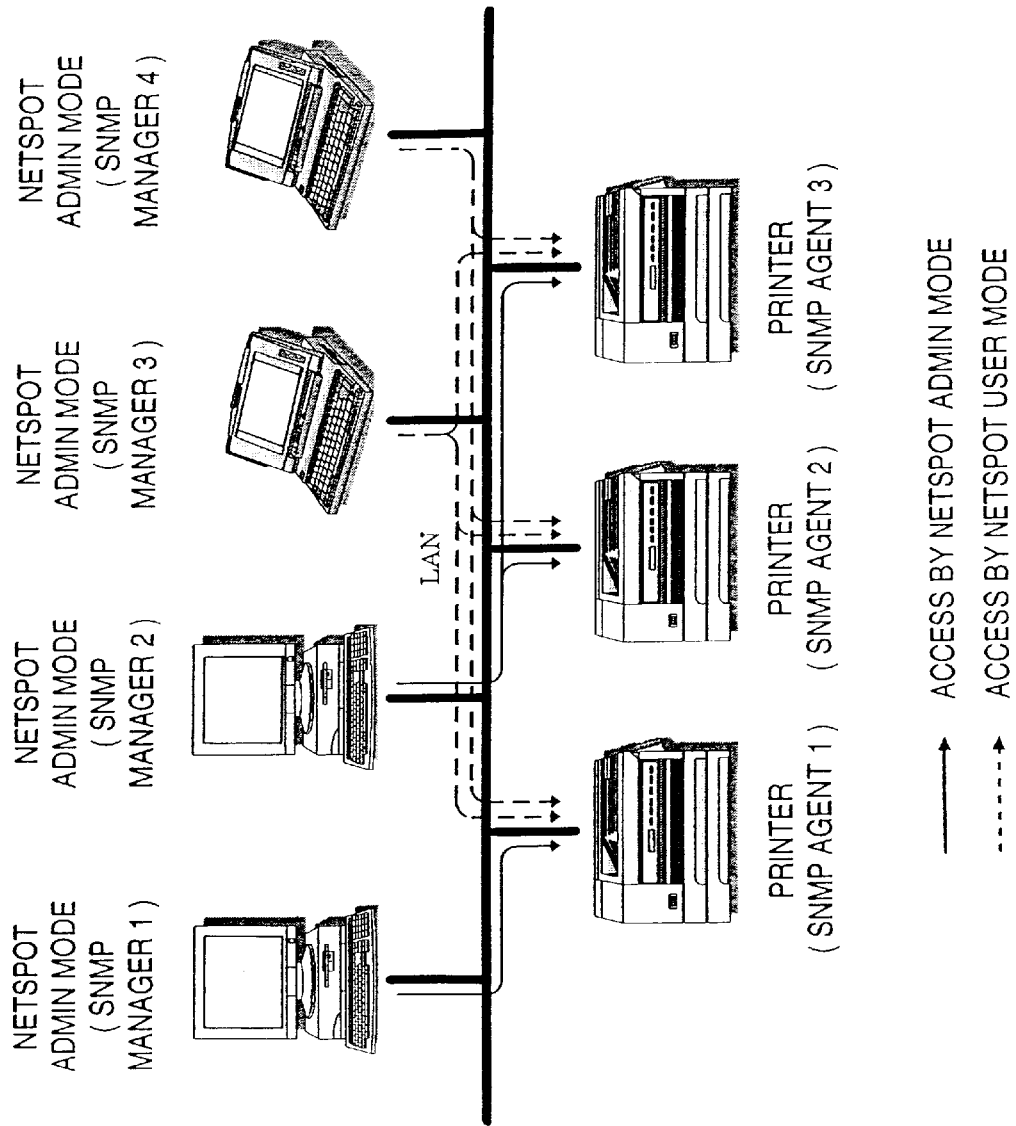
FIG. 9 is a drawing illustrating the exclusive limit concept in the controller mode.

An illustration demonstrating the concept of exclusive control in the controller mode is shown in FIG. 9.

Transition Chart of Windows displayed by NetSpot

Figure 7:
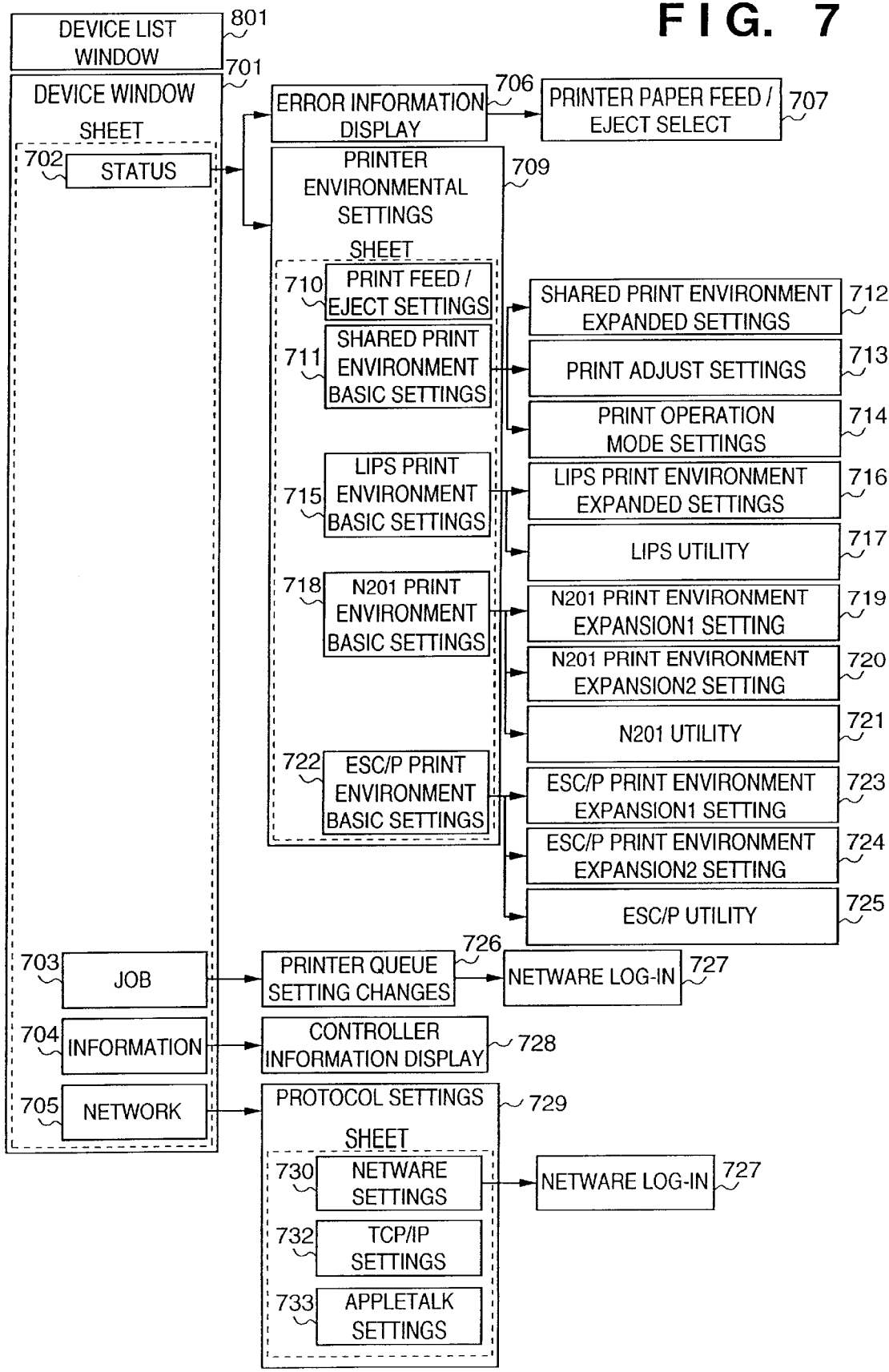
FIG. 7 is a chart showing window transition during startup of NetSpot in controller mode.
Figure 8:
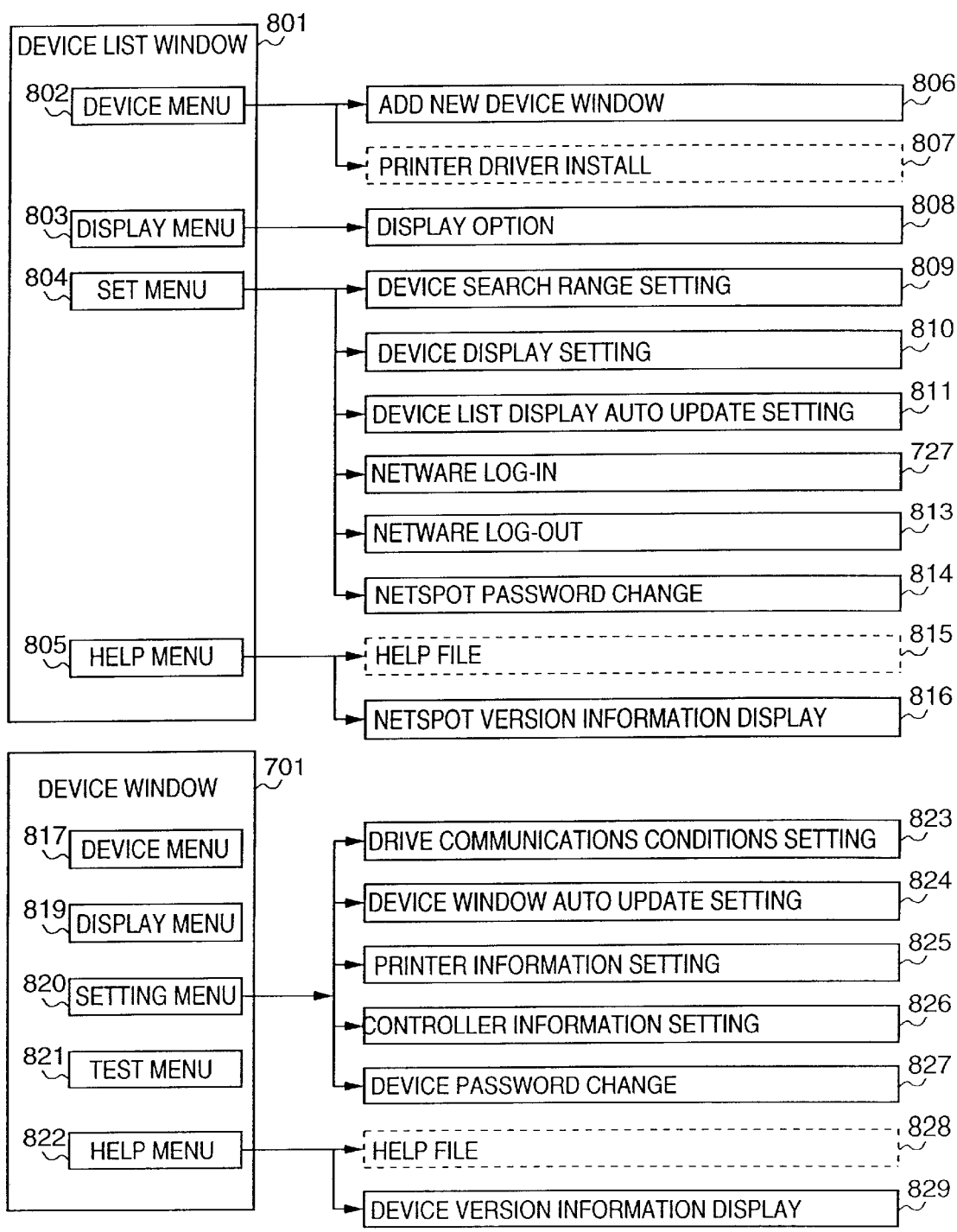
FIG. 8 is a chart showing window transition during startup of NetSpot in controller mode.

FIGS. 7 and 8 are window transition drawings showing in sequence the NetSpot changes in response to user instructions when the user has started NetSpot in controller mode. However, the windows shown in FIG. 7 and FIG. 8 do not represent all the windows that NetSpot displays. Even when NetSpot receives no instructions from the user, all types of windows are automatically displayed according to the NetSpot operating status and information acquired from the network. These windows are however explained later on so a description is omitted here. A screen transition view of NetSpot when started in general user mode is omitted and fractional views are shown respectively in FIGS. 7 and 8.

The user can monitor the network peripheral equipment status (device) by viewing the information displayed on the respective window shown by NetSpot and can set a suitable value in these windows in order to control the network peripheral equipment (device).

When NetSpot is started in controller mode a list on a dialog box as shown in FIG. 7 is called up from each sheet related later on.

Figure 43:
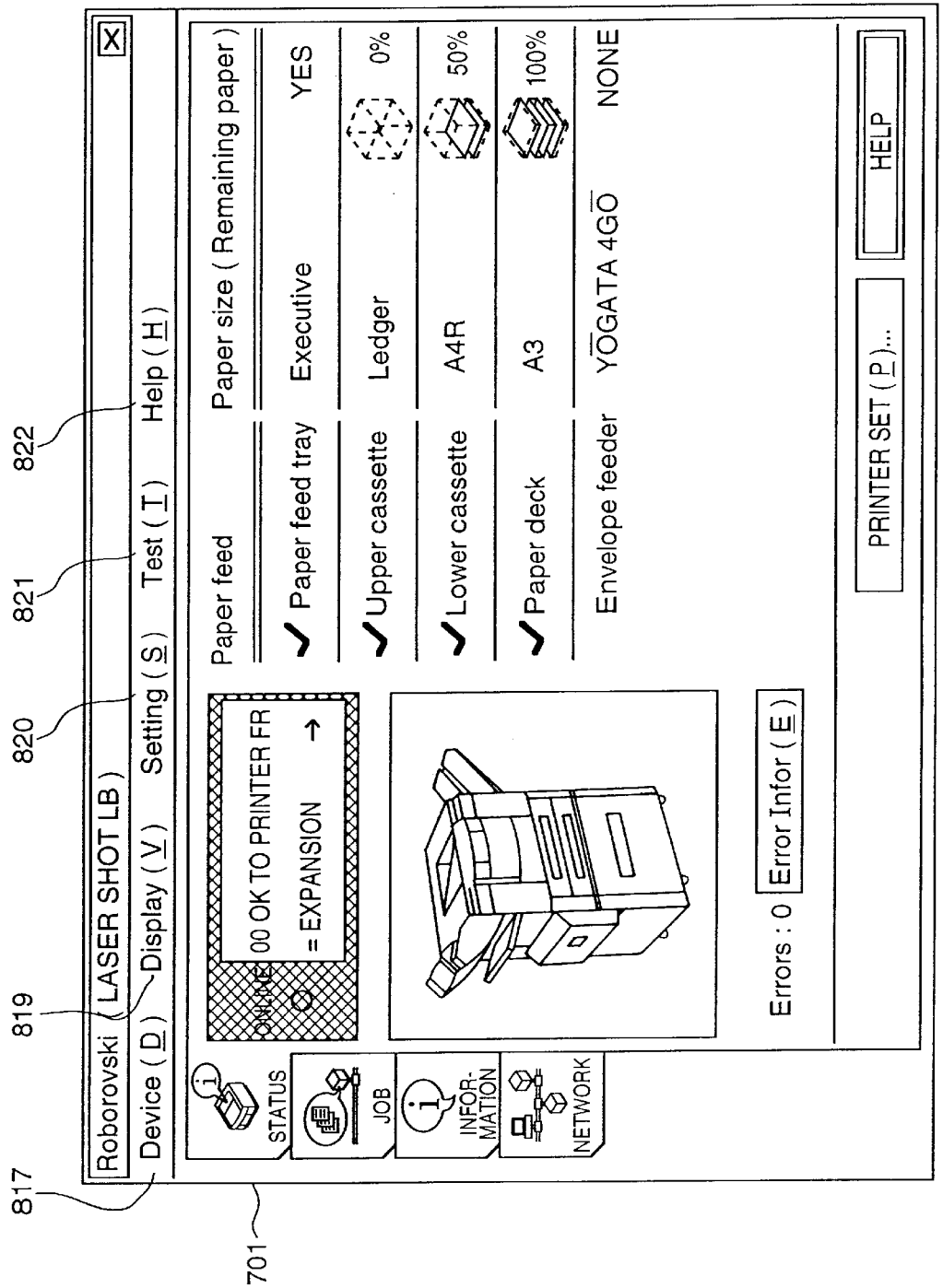
FIG. 43 illustration showing the device window.

The numeral 701 in FIG. 7 denotes the device window shown in FIG. 43. This window 701 has four sheets consisting of a status sheet 702 shown in FIG. 54, a job sheet 703 shown in FIG. 100, an information sheet 704 shown in FIG. 102 and a network sheet 705 shown in FIG. 104.

Figure 55:
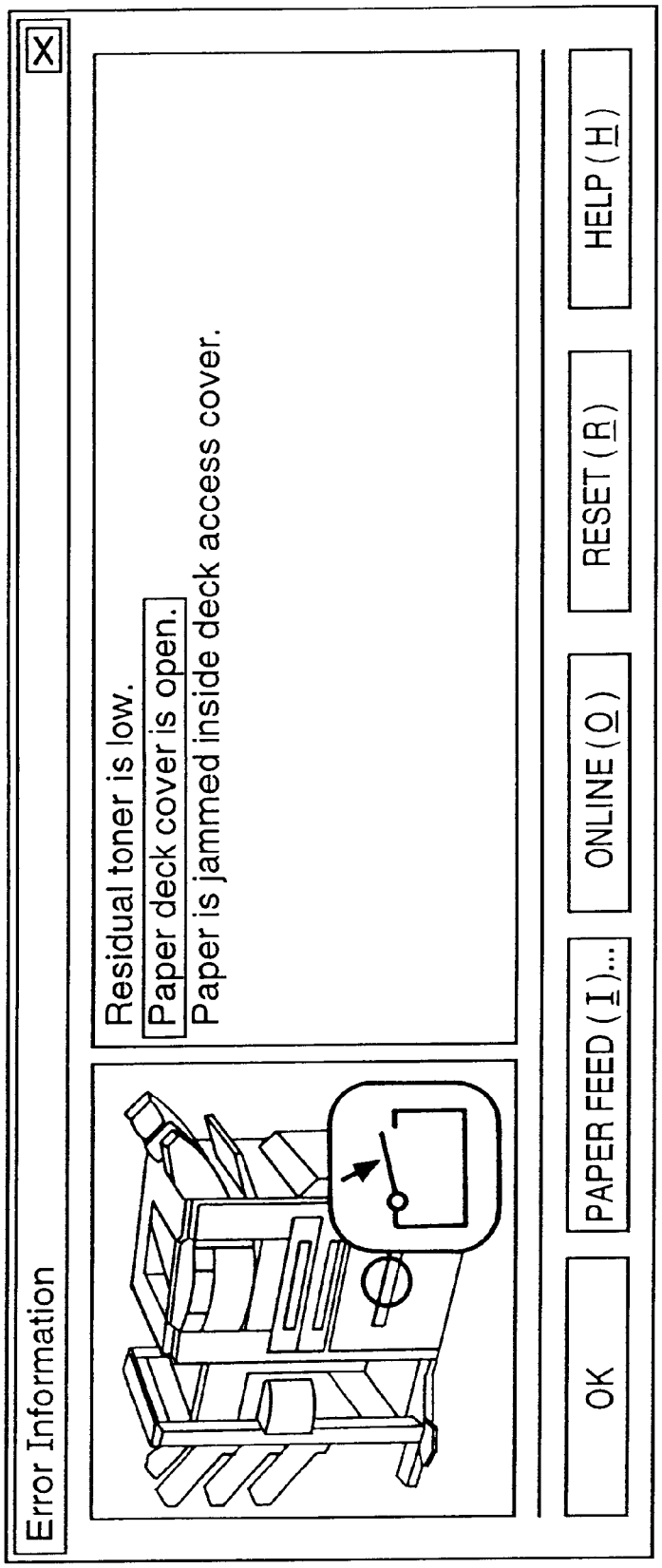
FIG. 55 is an illustration showing the error information dialog box.
Figure 57:
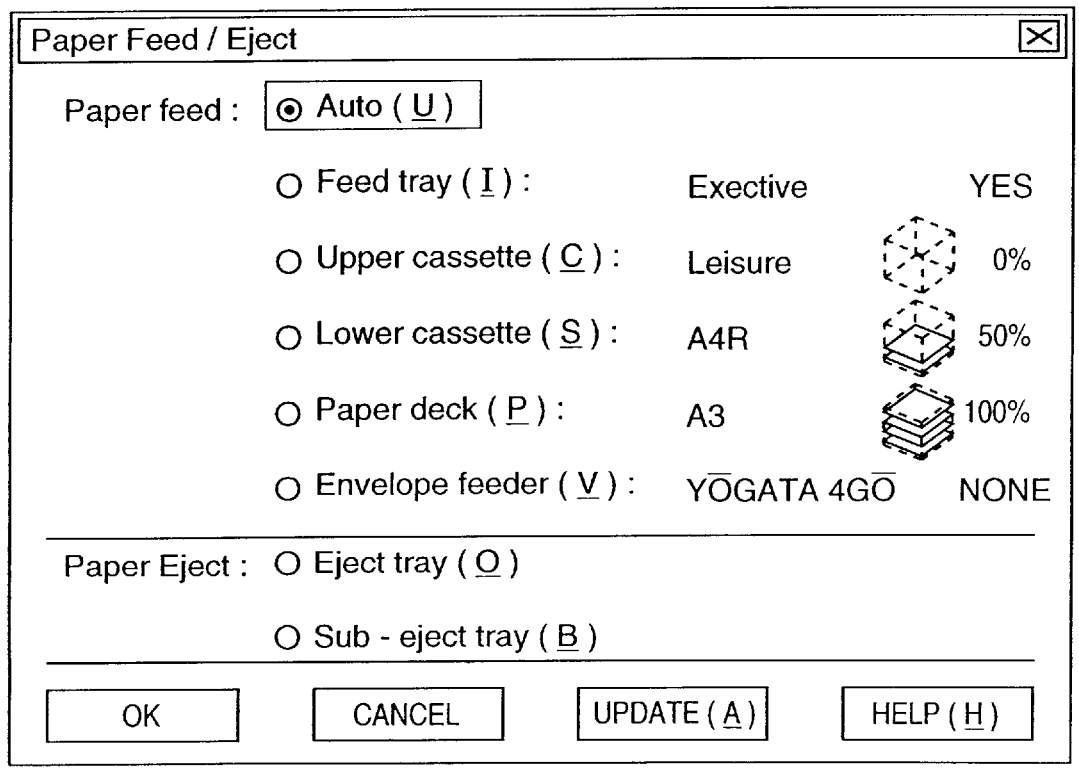
FIG. 57 is an illustration showing the paper feed-eject dialog box.

Here, from status sheet 702, is the error information display dialog box 706 shown in FIG. 55, and the printer environmental setting dialog box 709 shown in FIG. 143. The printer paper eject select dialog box 707 shown in FIG. 57 is selected from this error information display dialog box 706.

Figure 58:
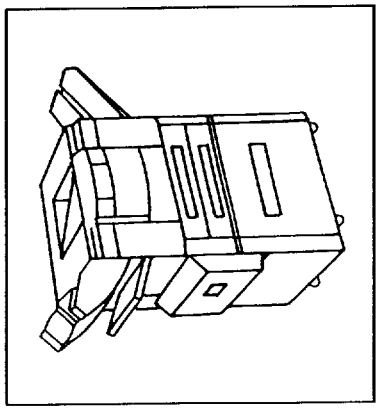
FIG. 58 is an illustration showing the paper feed-eject setting sheet.
Figure 59:
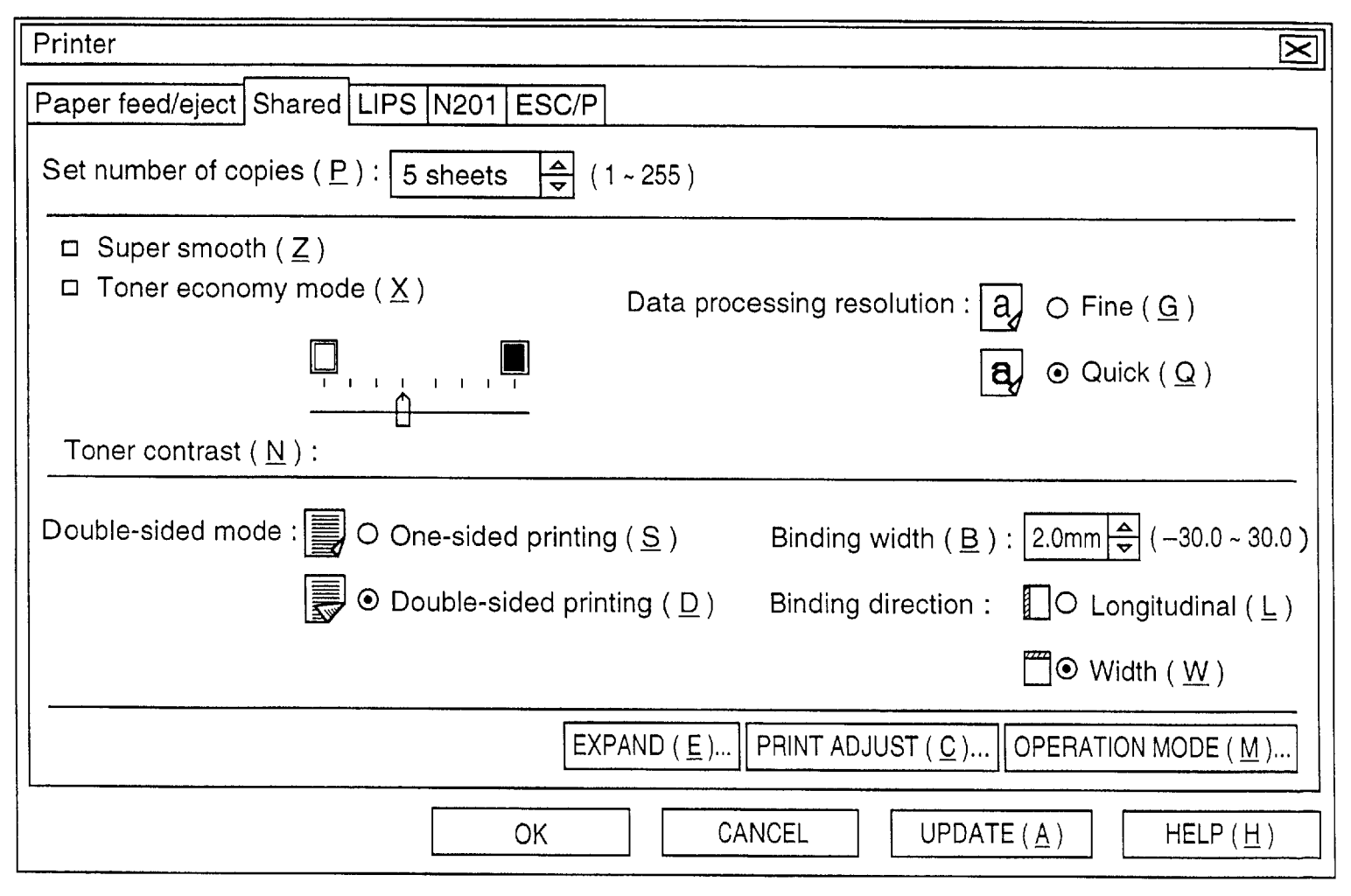

Further, the printer environmental set dialog box 709 contains five sheets consisting of: the printer eject set sheet 701 shown in FIG. 58, the shared printer environment basic set sheet 711 shown in FIG. 59, the LIPS print environment basic set sheet 715 shown in FIG. 69, the N201 print environment basic set sheet 718 shown in FIG. 76, and the ESC/P print environment basic set sheet 722 shown in FIG. 88. Here, the LIPS, N201, ESC/P are respectively one type of printer descriptive language.

The shared printer environment expansion dialog box 712 shown in FIG. 63, the print adjust set dialog box 713 shown in FIG. 67 and the print operation mode dialog box 714 shown in FIG. 68 are called up from the shared printer environment basic set sheet 711.

Figure 74:
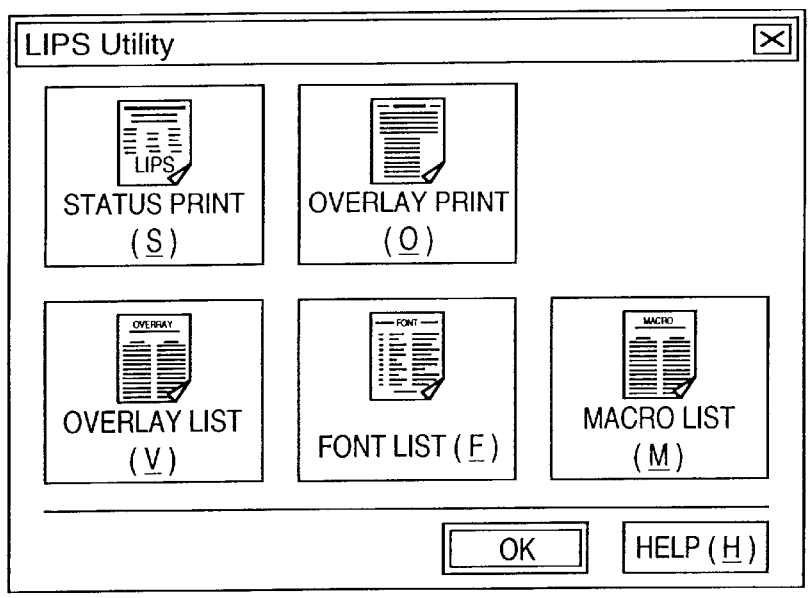
FIG. 74 is an illustration showing the LIPS utility dialog box.

The LIPS printer environment expansion dialog box 716 shown in FIG. 70, and the LIPS utility dialog box 717 shown in FIG. 74 are called up from the LIPS print environment set sheet 715.

Figure 86:
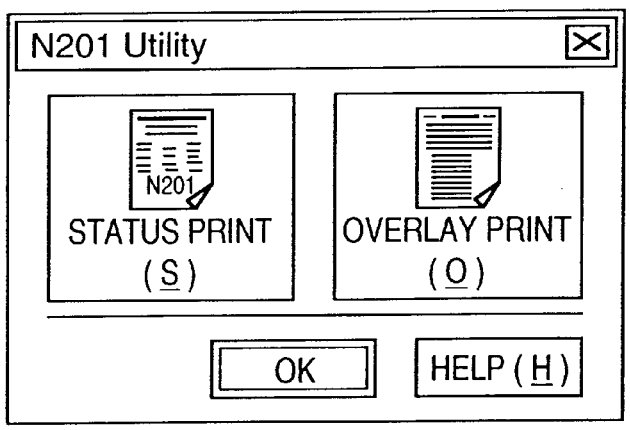
FIG. 86 is an illustration showing the N201 utility dialog box.

The N201 print environment expansion 1 set dialog box 719 shown in FIG. 79, N201 print environment expansion 2 set dialog box 720 shown in FIG. 82, and the N201 utility dialog box 721 shown in FIG. 86 are called up from the N201 print environment basic set sheet 718.

Figure 98:
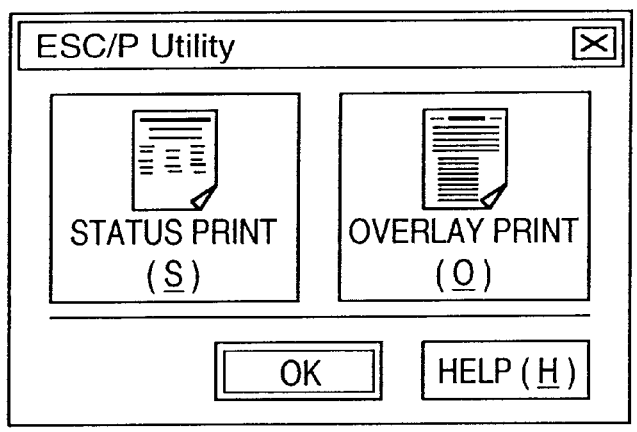
FIG. 98 is an illustration showing the ESC/P utility dialog box.

The ESC/P print environment expansion 1 set dialog box 723 shown in FIG. 91, the ESC/P print environment expansion 2 set dialog box 724 shown in FIG. 94 and the ESC/P utility dialog box 725 shown in FIG. 98 are called up from the ESC/P print environment basic setting sheet 722.

Figure 34:
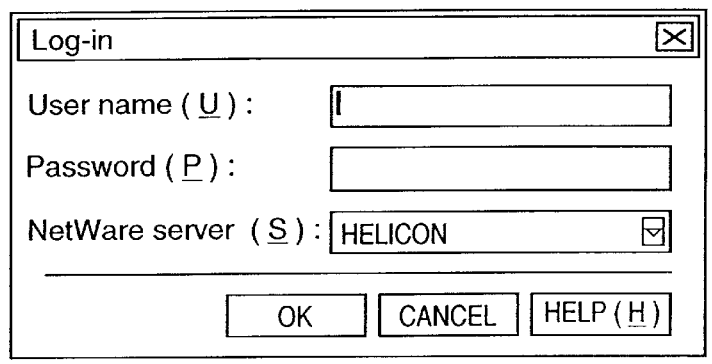
FIG. 34 is an illustration showing the NetWare log-in dialog box.

Next, the printer queue set dialog box 726 shown in FIG. 10 is called up from the job sheet 703, the NetWare dialog box 727 shown in FIG. 34 is called up from the printer queue set dialog box 726. The controller information dialog box 728 shown in FIG. 103 is called up from the information sheet 704. Finally, the protocol set dialog box 729 shown in FIG. 144 is called up from the network sheet 705.

The protocol set dialog box 729 contains the three sheets consisting of the NetWare setting sheet 730 shown in FIG. 105, the TCP/IP set sheet shown in FIG. 114 and the AppleTalk set sheet 733 shown in FIG. 120. The NetWare dialog box 727 shown in FIG. 34 is called up from the NetWare set sheet 730. The description for the device list window 801 is associated with the description for FIG. 8 and so is apportioned here.

FIG. 8 is a block diagram showing the list of dialog boxes called up from the menus related later, when the NetSpot is started in controller mode.

Figure 15:
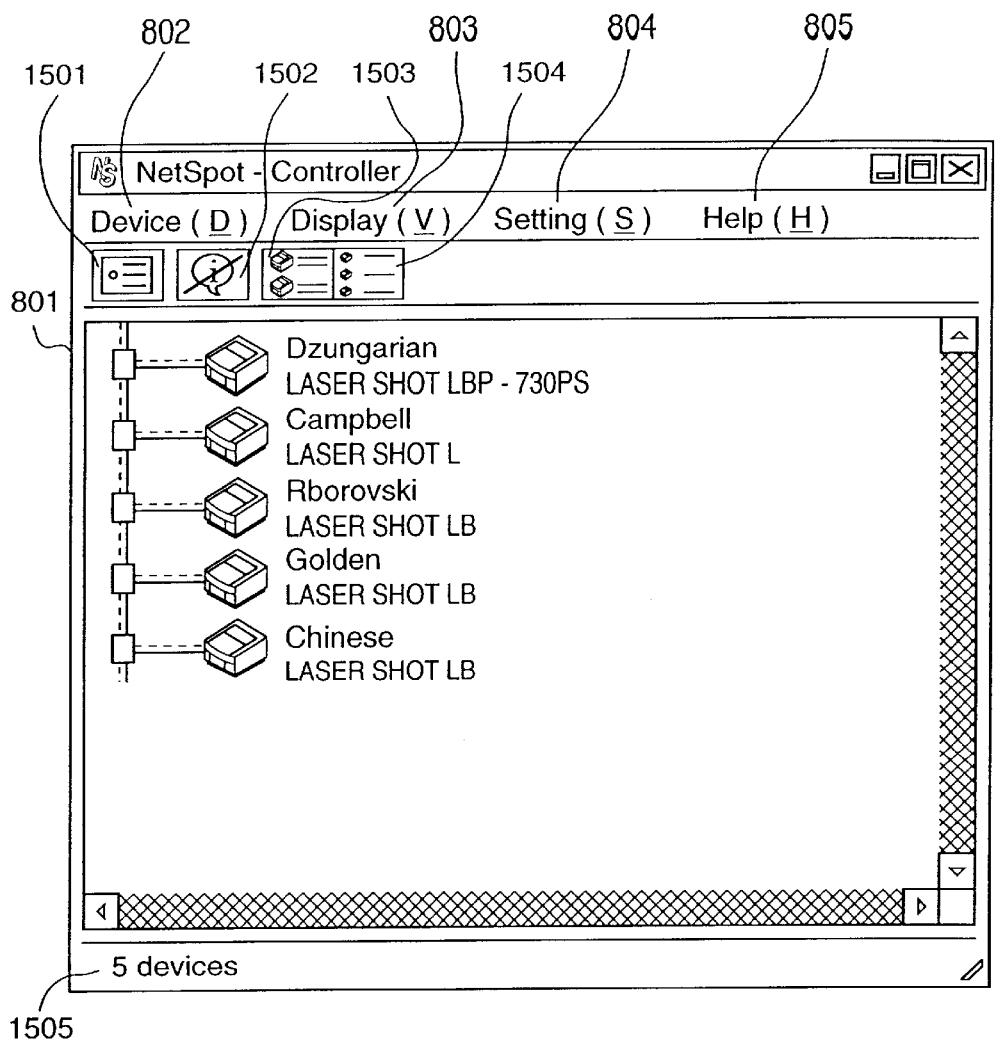
FIG. 15 is an illustration showing one example of a device list window.
Figure 29:
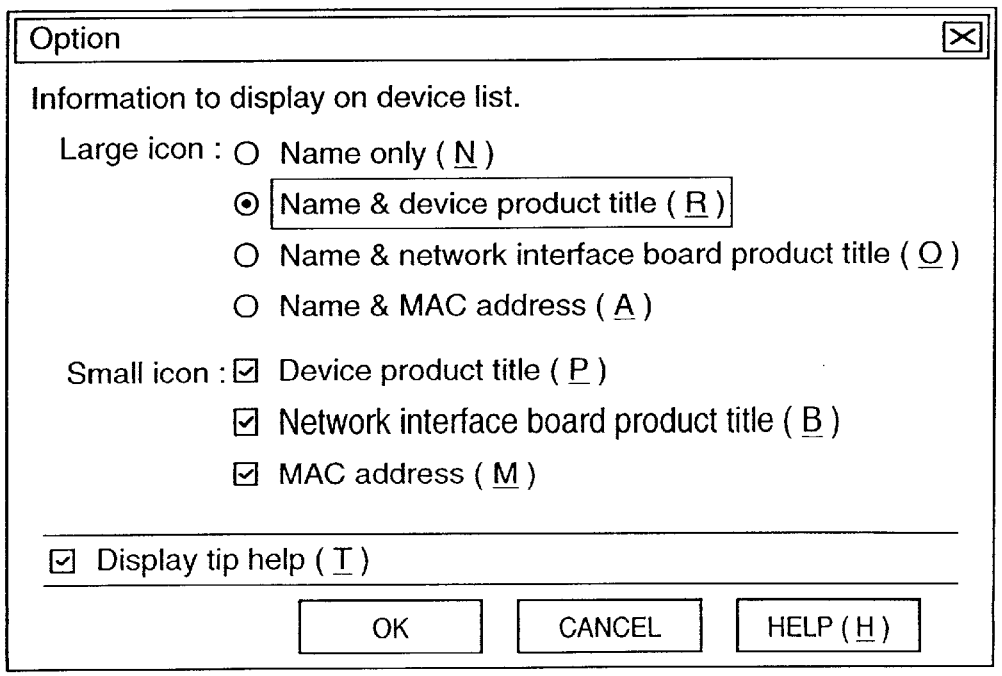
FIG. 29 is an illustration showing the display option dialog box.
Figure 42:
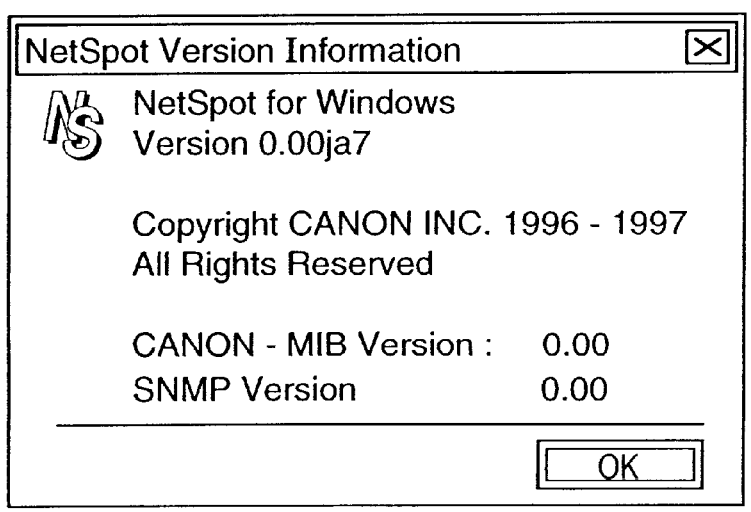
FIG. 42 is an illustration showing the NetSpot version information dialog box.

The numeral 801 in FIG. 8 denotes the device list window shown in FIG. 15. The device list window 801 contains four menus consisting of the device menu 802, display menu 803, setting menu 804 and help menu 805. Among these, the new window device dialog box 806 shown in FIG. 22, the (standard) printer driver install window 807 in the operating system is called up from the device menu 802. Next, the display option dialog box 808 shown in FIG. 29 is called up from the display menu 803. Further, the device search range dialog box 809 shown in FIG. 30, the device display setting dialog box 810 shown in FIG. 31, the device list auto change setting dialog box 811 shown in FIG. 32, the NetWare log-in dialog box 727 shown in FIG. 34, the NetWare log-out dialog box 813 shown in FIG. 36, and the NetSpot password change dialog box 814 for changing the password utilized in running the NetSpot shown in FIG. 38 are called up from the setting menu 804. Finally, the help file window 815 showing the NetSpot help, the NetSpot version information dialog box 816 for displaying the NetSpot version shown in FIG. 42 are called up from the help menu 805.

Next, the menu for the device window 701 explained in FIG. 7 is described.

The device window 701 contains the five menus consisting of: the device menu 817, the display menu 819, the set menu 820, the test menu 821, and the help menu 822. The trap report condition set dialog box 823 shown in FIG. 132, the device display auto change dialog box 824 shown in FIG. 133, the printer information set dialog box 825 shown in FIG. 135, the controller information dialog box 826 shown in FIG. 136, the device password change dialog box 827 shown in FIG. 137 are called up from the setting menu 820. Next, the help file window 828 for showing the NetSpot help, the device version information dialog box 829 shown in FIG. 141 are called up from the help menu 822.

Hereafter a detailed explanation of each of the above mentioned windows as well as a detailed explanation of NetSpot functions associated with each window are given.

NetSpot Password Entry Dialog Box (See FIG. 10)

When NetSpot is started in controller mode, the NetSpot password entry dialog box shown in FIG. 10 is displayed only in cases when the NetSpot password has been set. The NetSpot password entry dialog box is a dialog box for the user to enter the NetSpot password at start-up of NetSpot. The NetSpot password entry dialog box does not appear in the NetSpot general user mode. Also, when ON has been selected in "Substitute NetWare server controller password" in the NetSpot password change dialog box (FIG. 38), the controller mode then starts up if the user has logged-in as the controller in the NetWare file server so that the NetSpot password entry dialog box does not appear. On the other hand, when the user has not logged-in as the controller in the NetWare file server, the NetSpot password entry dialog box will appear.

Detailed Specifications

Password (P): A NetSpot password entered by the user in a character string of 0 to 15 spaces.

User Mode Start (U): Only valid when OFF is selected here. Large letters and small letters are separated.

User Mode Start (U): The user selects here whether or not to start in general user mode. The user selects either ON or OFF.

OK button: The user selects this button to enable the current dialog box setting and close the dialog box.

CANCEL button: The user selects this button to disable the current dialog box setting and close the dialog box. (Quits NetSpot)

HELP (H) button: The user selects this button to display the online help.

Figure 11:
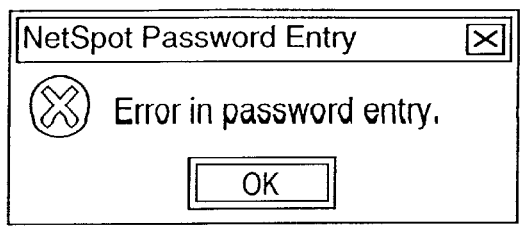
FIG. 11 is an illustration showing a message displayed when a mistake in the NetSpot password was entered.

Other operations: When the user made a mistake in the NetSpot password entry, the message in FIG. 11 is displayed and the NetSpot password entry dialog box is again displayed.

Figure 12:
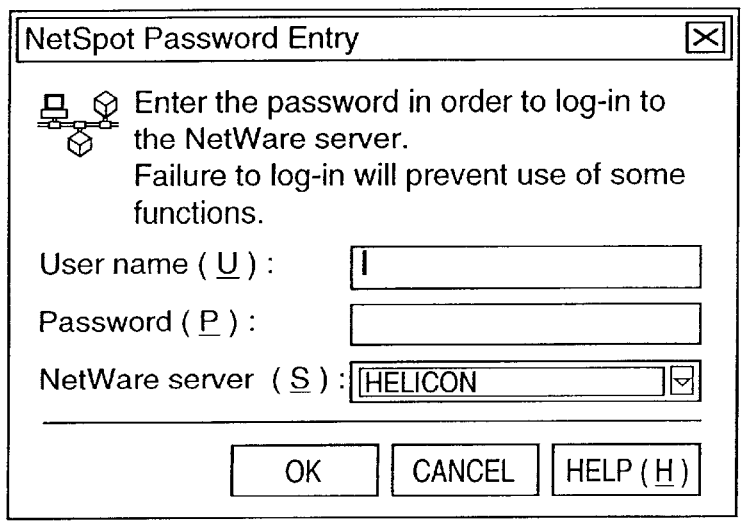
FIG. 12 is an illustration showing one example of the NetWare server password dialog box.

NetWare Server Password Entry Dialog Box (See FIG. 12)

When the NetSpot password entry process is complete, a check by NetSpot is made as to whether the user has logged-in to the NetWare file server. If the NetWare server is available for use at this time and if the user has not logged in to the NetWare file server, then the NetWare server password entry dialog box of FIG. 12 is displayed. This NetWare server password entry dialog box is for entry by the user, of the NetWare file server password during NetSpot start-up, which is required for logging in to the NetWare file server.

Detailed Specifications

User Name (U): The user enters his name here in order to log in to the NetWare file server. When the user has previously logged in to NetWare file server by means of this dialog box, then the user name entered from the previous log-in has been stored.

Password (P): A password entered by the user in order to log-in to the NetWare file server.

NetWare Server (S): Here, the user selects the NetWare file server that should be logged into. The user makes a selection from the NetWare file servers registered in the bindery.

OK button: The user selects this button to enable the current dialog box setting and close the dialog box.

CANCEL button: The user selects this button to disable the current dialog box setting and close the dialog box. (Quits NetSpot)

HELP (H) button: The user selects this button to display the online help.

Figure 13:
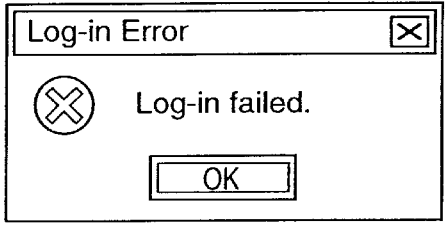
FIG. 13 is an illustration showing a sample message when a error was made in log-in to the NetWare file server.

Other operations: When the user made a mistake in the NetWare file server log-in, the message in FIG. 13 is displayed and the NetWare log-in dialog box is again displayed.

Figure 14:
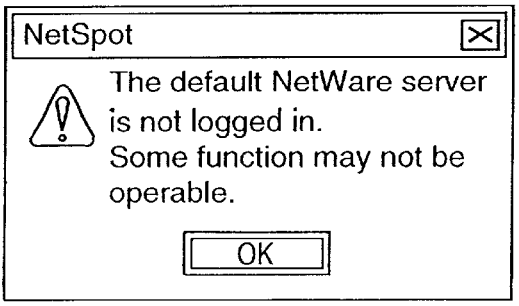
FIG. 14 is an illustration showing a sample message when the "CANCEL" button of FIG. 12 was pressed.

When the user selects the "Cancel" button in the NetWare server password entry dialog box, the message of FIG. 14 is displayed with a caution note for the user.

Device List Window (See FIG. 15)

The device list window appears as shown in FIG. 15 when the NetSpot start-up process is complete. This device list window is an icon with a list showing network peripheral equipment (devices) connected to the current network.

In controller mode and general user mode, the device list window (of FIG. 15) offers the functions shown in Table 1.

TABLE 1

List of functions supported by the device list window

| ITEM NO. | FUNCTION | Admin | User |
|---|---|---|---|
| 1 | Display list of devices connected to network | ○ | ○ |
| 2 | Display [Large icon] for each device<br>Display [Small icon] for each device<br>Display information for each device | | |
| 3 | Display user defined name<br>Display device product name<br>Display product name of network interface board<br>Display MAC address display<br>Display tool bar | ○ | ○ |
| 4 | [Open] tool bar<br>[Update latest information] tool bar<br>[Large icon] tool bar<br>[Small icon] tool bar<br>Display status bar | ○ | ○ |
|  | Display number of device | | |

The icon design indicates the type of device and device operation status. Devices shown on NetSpot are only network devices implemented for SNMP/Canon-MIB. Network devices other than this cannot be displayed. Devices not connected to the network or devices whose power is off are also not displayed. Further, devices not triggered by network protocol used by NetSpot are also not displayed.

A user defined name is also displayed along with the icon showing the device. The Japanese language can also be used for this user defined name. The user can change the user defined name only in controller mode in the device window (FIG. 43) described later.

The list of devices can be periodically updated and this change in device operating status reflected in the icon by polling the device connection status and operating status at fixed intervals. When a device is newly detected, that device icon is added to the device list.

When there is no response from a device that has been detected up until now and that device window (FIG. 43) did not open, then a red X is displayed on the line connecting to the device icon. Also, when there is no reply from the device after a fixed number of tries, that device icon is deleted.

Detailed Specifications (see FIG. 15)

[Open] Tool Bar 1501: Selection of this by the user opens the device window (FIG. 43) for the device selected by the user. This is only displayed when the menu function [Display]-[Tool bar] menu of the menu function of device list window 801 has been selected. A device that has been selected is only valid when there is no red X mark on the device.

[Update latest information] tool bar 1502: Updates the latest information on the device list display when this item is selected by the user. This is only displayed when the menu function [Display]-[Tool bar] menu of the menu function of device list window 801 has been selected.

[Large Icon] tool bar 1503: Displays the device list on a large icon when this item is selected by the user. This is only displayed when the menu function [Display]-[Tool bar] menu of the menu function of device list window 801 has been selected.

[Small Icon] tool bar 1504: Displays the device list on a small icon when this item is selected by the user. This is only displayed when the menu function [Display]-[Tool bar] menu of the menu function of device list window 801 has been selected.

Large icon display: When the [Large Icon] tool bar 1503 is selected, an item specified in the option display dialog box (FIG. 29) is displayed relating to the device display setting dialog box (FIG. 31) along with the large icon. In such a case, items specified from among the large icon, name, device product name, product name for network interface board, and MAC address are displayed. When the device window (FIG. 43) is open in the controller mode, a mark appears on the device icon (FIG. 146). When there is no reply from a previously detected device, a red X is displayed on the line that connects the device icon (FIG. 148). Also, when there is no reply from the device after a fixed number of tries, that device icon is deleted.

Small icon display: When the [Small Icon] tool bar 1504 is selected, an item specified in the option display dialog box (FIG. 29) is displayed relating to the device display setting dialog box (FIG. 31) along with the large icon. In such a case, items specified from among the small icon, name, device product name, product name for network interface board, and MAC address are displayed. When the device window (FIG. 43) is open in the controller mode, a mark appears on the device icon (FIG. 147). When there is no reply from a previously detected device, a red X is displayed on the line that connects the device icon (FIG. 149). Also, when there is no reply from the device after a fixed number of tries, that device icon is deleted.

Status bar display 1505: Displays the number of displayed devices.

Figure 16:
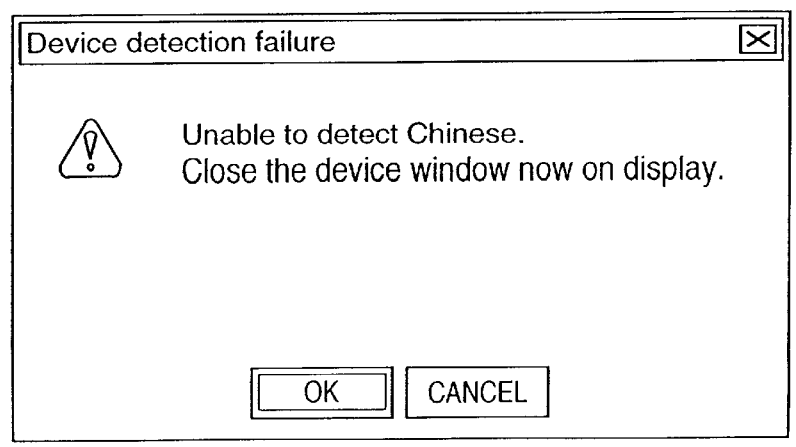
FIG. 16 is an illustration showing a sample message when the device opened with the device window cannot be detected.

Other operations: The message in FIG. 16 appears when a device is not detected with the opened device window (FIG. 43). The "Chinese" in the message on FIG. 16 is the device name (attached beforehand by the user) for the device which cannot be detected, but is displayed on the device list of FIG. 15. When the user selects the [OK] button in response to the displayed message, along with deleting the icon showing the device that cannot be detected in the device list window 801, the device window (FIG. 43) is closed for the device that cannot be detected. However, when the user selects the [CANCEL] button, the icon displays for the device that cannot be detected, and the display of the device window (FIG. 43) for the device that cannot be detected, is continued.

Device List Window Menu Function (see FIG. 15)

NetSpot provides menu functions shown in Table 2 through Table 4 for menu bars (802–805) of the device list window (FIG. 15).

TABLE 2

List (1) of menu functions supported on device windows

| ITEM NO. | FUNCTION | Admin | User |
|---|---|---|---|
| 1 | Display window menu<br>Open selected device window ([Device]- [Open]or [File]- [Open])<br>Close selected device window ([Device]- [Close]or [File]- [Close])<br>Close all device windows ([Device]-[All Close] or [File]-[All Close]) | ○ | ○ |
| 2 | New device menu<br>Setup new device in device list ([Device] - [Add New]) | ○ | |
| 3 | Printer driver install menu<br>Printer driver install ([Device] - [Printer driver install]) | ○ | ○ |
| 4 | Quit NetSpot<br>([Device]-[Quit NetSpot] or [File]-[Quit]) | ○ | ○ |
| 5 | Display select menu<br>Select tool bar display ([Display] [Tool bar])<br>Display status bar ([Display]-[Status bar])<br>Constant display ([Display] - [Display Near Operator])<br>Select large icon ([Display] - [Large icon])<br>Select large icon ([Display]-[Small icon]) | ○ | ○ |
| 6 | Icon sequence menu ([Display]-[Icon sequence])<br>In name sequence<br>In type sequence<br>In MAC address sequence | ○ | ○ |

TABLE 3

List (2) of menu functions supported on device windows

| ITEM NO. | FUNCTION | Admin | User |
|---|---|---|---|
| 7 | latest information display menu<br>Update icon to latest information ([Display]-[Change To Latest Information]) | ○ | ○ |
| 8 | Option menu ([Display]-[Option . . .])<br>Select item for large icon display<br>Select item for small icon display<br>Select chip help display | | |
| 9 | Protocol select menu<br>Select protocol for use next time NetSpot starts<br>(Netware or TCP/IP) ([Set]-[Select protocol] | ○ | ○ |
| 10 | Error report method menu ([Set]-[Error report method])<br>Select error pop-up window display<br>Select beep tone sound | ○ | ○ |
| 11 | Device search range menu<br>Set range of device search (TCP/IP and AppleTalk only) ([Set]-[Device Search Range]) | ○ | ○ |
| 12 | Device display set menu<br>Select device for display ([Set] [Device display]) | ○ | ○ |
| 13 | Display auto change set menu<br>Auto change select and change interval of device list window ([Set]-[Display Auto change . . .]) | ○ | ○ |
| 14 | NetWare server menu<br>Log-in to file server ([Set]-[Log-in . . .])<br>Log-out from file server ([Set]-[Log-out . . .]) | ○ | ○ |
| 15 | Password change menu | | ○ |
| 15 | Change NetSpot password ([Set]-[Change Netspot password]) | | |

TABLE 4

List (3) of menu functions supported on device windows

| ITEM NO. | FUNCTION | Admin | User |
|---|---|---|---|
| 16 | Help menu<br><br>Index ([Help])--[Index])<br>Search keyword ([Help])--[Search by keyword]) | ○ | ○ |
| 17 | Version information menu<br><br>([Help])--([Version information]) or ([Apple menu)]-[For NetSpot])<br>NetSpot version<br>Canon MIB version used by Netspot<br>SNMP version used by NetSpot | ○ | ○ |

Detailed Specifications (See FIG. 15)]

[Device (D)]-[Open (O)]: The user selects this item to open the device window (FIG. 43). The selected device is only valid when no red X mark has been attached to this device.

[Device (D)]-[Close (C)]: The user selects this item to close the device window (FIG. 43). In a selected device, and further a device selected with an opened device window (FIG. 43) this is only valid when the device window (FIG. 43) is not already being used (direct operation possible of device window (FIG. 43).

[Device (D)]-[All Close (A)]: The user selects this item to close all device windows (FIG. 43). This item is valid when a device is present in open device window (FIG. 43). The device window (FIG. 43) cannot be closed during operation.

[Device (D)]-[Add New (N)]: The device selected by the user is setup and a add new device setting dialog box (FIG. 22) is opened in order to add a device for display. (Controller mode only)

[Device (D)]-[Printer driver install (D)]: The user selects this item to install the printer driver. This calls up the printer menu on the control panel.

[Device(D)]-[Quit NetSpot (X)]: The user selects this item to quit NetSpot.

[Display (V)]-[Tool bar (T)]: The user selects this item to select whether to display the tool bar or not. The user can set either ON or OFF.

[Display (V)]-[Status bar (B)]: The user selects this item to select whether to display the status bar or not. The user can set either ON or OFF.

[Display (V)]-[Display Near Operator(P)]: The user selects this item to constantly display the device list window nearby. The user can set either ON or OFF.

[Display (V)]-[Large icon (G)]: The user selects this item to display large icons on the device list. When the user sets [Large icon] to ON, the [Small Icon] sets to OFF simultaneously.

[Display (V)]-[Small icon (M)]: The user selects this item to display small icons on the device list. When the user sets [Small icon] to ON, the [Large Icon] sets to OFF simultaneously.

[Display(V)]-[Icon sequence (S)]: The user selects this item to display the devices in sequence. The user selects from "Name Sequence (N)" "Type Sequence (T)" and "MAC Address (M)".

[Display (V)]-[Change To Latest Information (R)]: The user selects this item to change the latest information on the device list display.

[Display (V)]-[Option (O) . . . ]: The user selects this item to open the display option.

[Set (S)]-[Select protocol (P)]: The user selects this item to choose the protocol to operate NetSpot. The user selects from "NetWare"" and "TCP/IP".

[Set(S)]-[Error report method (E)]: The user selects this item to specify the error report method. The user selects either ON or OFF in "Open pop-up window (P). The user selects either ON or OFF for "Sounding beep tone (B)".

[Set(S)]-[Device Search Range (S) . . . ]: The user selects this item to open the device search range dialog box (FIG. 30) in order to specify the search range for the device. The currently used network protocol is only valid for TCP/IP.

[Set(S)]-[Device display (V)]: The user selects this item to open the device display set dialog box (FIG. 31) in order to specify the device for display from the devices searched for.

[Set(S)]-[Display Auto Change (A) . . . ]: The user selects this item to open the device list auto change dialog box (FIG. 32) in order to specify the automatic change interval for device list display.

[Set(S)]-[Log-in(I) . . . ]: The user selects this item to open the NetWare log-in dialog box (FIG. 34) for logging in to the NetWare file server. This function is only valid when the NetWare service is usable.

[Set(S)]-[Log-out(O) . . . ] The user selects this item to open the NetWare log-out dialog box (FIG. 36) in order to log out from the NetWare file server. This function is only valid when the NetWare service is usable.

[Set(S)]-[Change NetSpot password (W) . . . ]: The user selects this item to open the NetSpot password change dialog box (FIG. 38) in order to change the password at start-up of NetSpot. (Controller mode only)

[Help(H)]—[Index (C)]: The user selects this item to display the index for the NetSpot online help.

[Help](H))—[Search by keyword (S) . . . ]: The user selects this item to display the NetSpot online help keyword search.

[Help(H)]—([Version information (A)]: The user selects this item to open the NetSpot version information dialog box (FIG. 42) in order to display the NetSpot version information.

Figure 17:
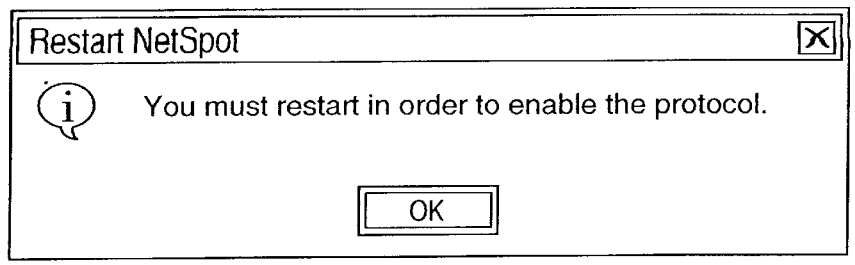
FIG. 17 is an illustration showing a sample message when the protocol has been changed and the device window was opened in controller mode.

Other operations:

When the user changes the operating protocol with [Set (S)]-[Select protocol (P)], the message shown in FIG. 17 is displayed advising the user to restart NetSpot if the device window is open in controller mode. When the device window (FIG. 43) is open in controller mode, the restart of NetSpot cannot be selected so after the user has closed all device windows (FIG. 43) in controller mode, protocol can again be selected or NetSpot must once again be started after quitting NetSpot.

Figure 18:
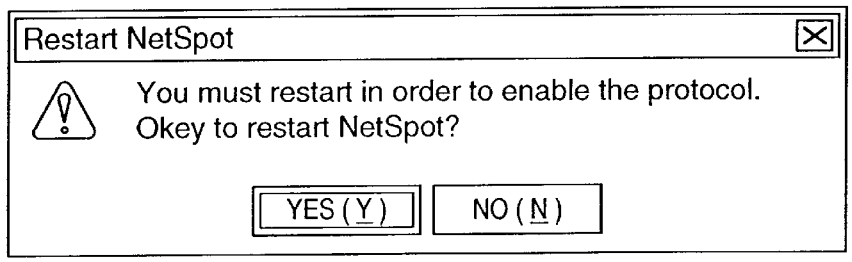
FIG. 18 is an illustration showing a sample message when the protocol has been changed and the device window was not opened in controller mode.

When the user changes the operating protocol with [Set (S)]-[Select protocol (P)], if the device window (FIG. 43) is not open in controller mode, the message in FIG. 18 appears advising the user to restart NetSpot. Here, if the user selects the [Yes(Y)] button then NetSpot restarts. If the user selects the [No(N)] button then the display status returns to the device list window of FIG. 15.

Figure 19:
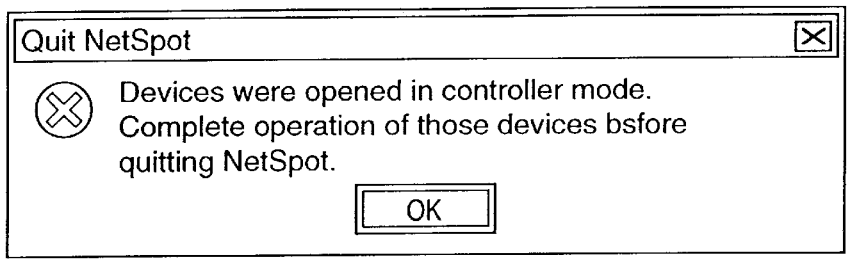
FIG. 19 is an illustration showing a sample message when the device window has been opened in the controller mode or the device window when work is in progress after NetSpot has been quit in the controller mode.

When [Device(D)]-[Quit NetSpot (X)] is selected in controller mode and the device window (FIG. 43) is opened in controller mode or an operation is in-progress on the device window (FIG. 43) (So that FIG. 43 cannot be directly used) then the message in FIG. 19 appears urging the user to quit the operation in all device windows (FIG. 43) and to close all controller mode device windows (FIG. 43)

Figure 20:
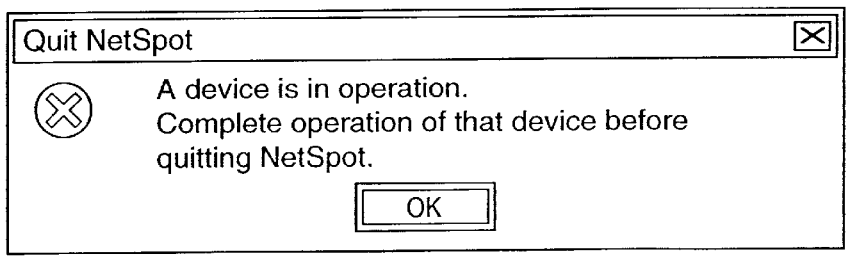
FIG. 20 is an illustration showing a sample message when the device window has been opened in the controller mode or the device window when work is in progress after NetSpot has been quit in the general user mode.

When [Device(D)]-[Quit NetSpot (X)] is selected in general user mode and the device window (FIG. 43) is opened in controller mode or an operation is in-progress on the device window (FIG. 43) (So that FIG. 43 cannot be directly used) then the message in FIG. 20 appears urging the user to quit the operation in all device windows (FIG. 43) and to close all controller mode device windows (FIG. 43)

Figure 21:
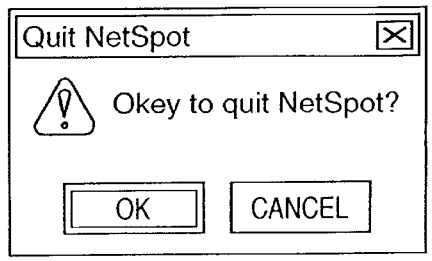
FIG. 21 is an illustration showing a sample message displayed when quitting NetSpot is possible.

When the user selects [Device(D)]-[Quit NetSpot (X)] or [File]-[Quit], the message in FIG. 21 appears if it is possible to quit NetSpot. Here, NetSpot is quit if the user selects the [OK] button. If the user selects the [Cancel] button then the display returns to the device list window with no other action performed.

The display on the new device add dialog box may differ according to the network protocol currently used in the user network environment. Whereupon the following explanation for both (1) NetWare and (2) TCP/IP is given.

(1) Add new device dialog box for NetWare

Figure 22:
FIG. 22 is an illustration showing the new device dialog box (1-1).

[Add new device dialog box (1-1) (See FIG. 22)

When the currently used network protocol is NetWare, the user can select the device list window (FIG. 15) of the [Device (D)]-[Add New (N)] menu in order to display the add new device dialog box (1-1) shown in FIG. 22. When the currently used network protocol is NetWare, this add new device dialog box (1-1) serves as a dialog box allowing the user to select a network interface board for new devices displayed in the device window (FIG. 15).

Detailed Specifications

[Network Interface Board (N)]: The user uses this to select the network interface board connected to the add new device. In FIG. 22, EB-1 and "NB-1" are displayed as product names for network interface boards connected to the add new device.

[<Return (B)] button: The user selects this button to return to the device list window (FIG. 15) and close the current dialog box (1-1) (FIG. 22) however usually this is disabled (a state where user cannot select this button).

Figure 23:
FIG. 23 is an illustration showing the new device dialog box (1-2).

[To Next>] button: The user selects this button to close the current dialog box (1-1) (FIG. 22) after storing the information displayed in (FIG. 22) in this dialog box (1-1) and display the add new device dialog box (1-2) (FIG. 23).

[Cancel] button: The user selects this button to invalidate all settings in the add new device setting and close this dialog box (1-1) (FIG. 22) and return to the device list window (FIG. 15).

[Help(H)] button: The user selects this button to display online help.

[Add new device dialog box (1-2) (See FIG. 23)]

When the user selects the network interface board per the add new device dialog box (1-1) (See FIG. 22) and then selects the [To Next] button, the add new device dialog box (1-2) shown in FIG. 23 is displayed. Hereafter, the network interface board mounted in the network printer subject to NetSpot control is called the "NB-1 board". This add new device dialog box (1-2) is a dialog box for specifying the address held by the NB-1 board connected to the new add device displayed in the device list window (FIG. 15) when the currently used network protocol is NetWare. Here, when the user finishes inputting the address and selects the [To Next] button, detection of the device with the specified address is performed. At this time, a display shows the detection of the device in the add new device dialog box (1-2) (See FIG. 23) is in progress.

Detailed Specifications

[MAC address (M)]: The user enters the 12 digit base 16 MAC address here.

[Network No. (N)]: The user enters the 8 digit base 16 network number here.

[<Return (B)] button: The user selects this button to close the current dialog box (1-2) (FIG. 23) without saving the information displayed in this dialog box (1-2) (FIG. 23) and to return to the add new device dialog box (1-2) (See FIG. 23). At this time, the display contents of add new device dialog box (1-1) (See FIG. 22) are the previously displayed contents.

[To Next] button: The user selects this button to close the current dialog box (1-2) (FIG. 23) after saving the information displayed in this dialog box (1-2) (FIG. 23) and detecting the device based on this information. The add new device dialog box (1-2) (See FIG. 23) is then displayed. This [To Next] button is only valid when all the digits in the [MAC address (M)] and the [Network No. (N)] have been entered.

[Cancel] button: The user selects this button to invalidate all settings in the add new device setting and close this dialog box (1-2) (FIG. 23) and return to the device list window (FIG. 15).

[Help(H)] button: The user selects this button to display online help.

[Add new device dialog box (1-3) (See FIG. 24)]

If the device detection ends correctly in add new device dialog box (1-2) (See FIG. 23), then the add new device dialog box (1-3) is displayed. This add new device dialog box (1-3) is a dialog box for the user to set the protocol information of the NB-1 board connected to the new add device shown in the device list window (FIG. 15) when the currently used network protocol is NetWare. Here, when the user completes entry of the protocol information and selects the [To Next] button, the specified protocol information for the NB-1 board is set.

Detailed Specifications

[NetWare frame type (N)]: The user selects this item to choose the NetWare frame type. The user selects from among " Invalid" "Auto Detect" "Ethernet II" Ethernet 802.2" "Ethernet 802.3" and "Ethernet Snap".

[Priority (R)]: The user selects this item to choose the frame type to have priority when using auto detection for the NetWare frame type. This is only valid when "Auto Detect" is selected in "NetWare Frame type (N)". The user selects from among: "Ethernet II" "Ethernet 802.2" "Ethernet 802.3" and "Ethernet Snap".

[TCP/IP frame type (T)]: The user uses this item to select the TCP/IP frame type. The user selects from among: "Invalid" and "Ethernet II".

[IP address (A)]: Here, the user enters a base 10×4 item IP address from 0–255 digits.

[AppleTalk phase (P)]: The user uses this item to select AppleTalk phase. The user selects from among: "Invalid" and "Phase2".

[<Return(B)] button: The user selects this item to close the current dialog box (1-3) (FIG. 24) without saving the information displayed in this dialog box (1-3) (FIG. 24) and to return to the add new device dialog box (1-2) (See FIG. 23). At this time, the contents of the add new device dialog box (1-2) (See FIG. 23) from the previous display are retained.

[To Next] button: The user selects this button to close the current dialog box (1-3) (FIG. 24) after saving the information displayed in this dialog box (1-3) (FIG. 24) and setting the protocol information for the network interface board based on this information. The add new device dialog box (1-4) (See FIG. 26) is then displayed.

[Cancel] button: The user selects this button to invalidate all settings in the add new device setting, then close this dialog box (1-3) (FIG. 24) and return to the device list window (FIG. 15).

[Help(H)] button: The user selects this button to display online help.

Figure 24:
FIG. 24 is an illustration showing the new device dialog box (1-3).
Figure 25:
FIG. 25 is

Other operations:

When the user enters a value of 256 or more in [IP address (A)], the message shown in FIG. 25 is displayed and the display returns to add new device dialog box (1-3) (See FIG. 24)

[Add new device dialog box (1-4) (See FIG. 26)]

Figure 26:
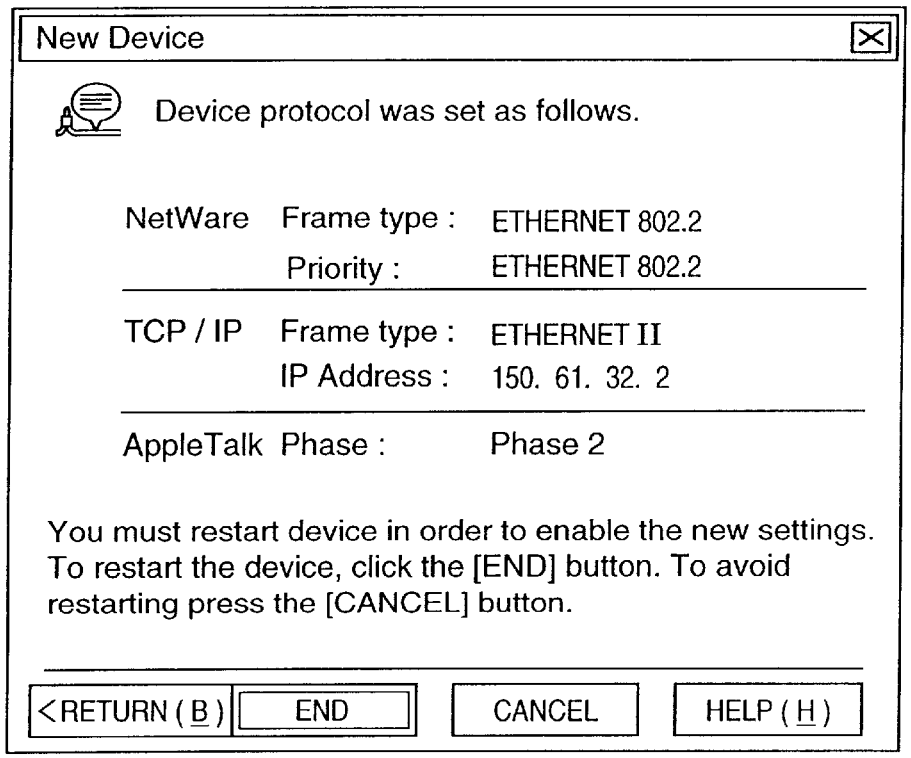
FIG. 26 is an illustration showing the new device dialog box (1-4).

When the setting of protocol information in the add new device dialog box (1-3) (See FIG. 24) has ended, the add new device dialog box (1-4) of FIG. 26 is displayed. When the currently used network protocol is NetWare, this add new device dialog box (1-4) serves as a dialog box for the user to set protocol information on the NB-1 board connected to the new add devices displayed in the device list window (FIG. 15). In the case of the NB-1 board, when the user selects the [End] button, the network interface board automatically resets and the new settings are now valid.

Detailed Specifications

[<Return (B)] button: The user selects this button to close the current dialog box (1-4) (FIG. 26) and to return to the add new device dialog box (1-3) (See FIG. 24). This button is however usually invalid (a state where the user cannot select this button).

[End] button: The user selects this button to close the current dialog box (1-4) (FIG. 26) after resetting the network interface board, and return to the device list window (FIG. 15).

[Cancel] button: The user selects this button to close the dialog box (1-4) (FIG. 26) and return to the device list window (FIG. 15) without resetting the network interface board.

[Help (H)] button: The user selects this button to display online help.

Figure 27:
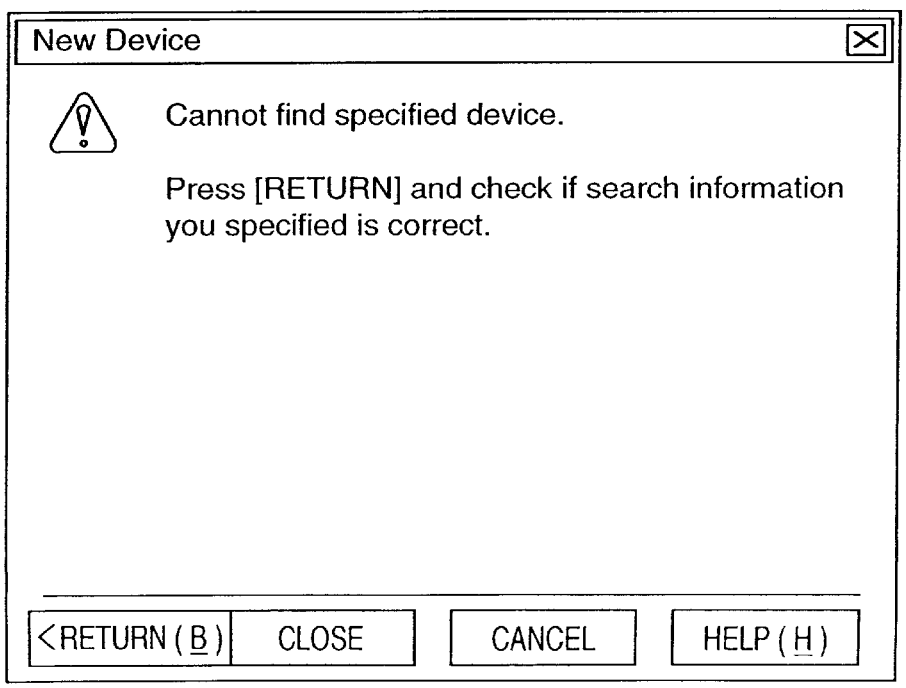
FIG. 27 is an illustration showing the new device dialog box (1-5).

[Add new device dialog box (1-5) (See FIG. 27)]

If the device detection did not end correctly in the add new device dialog box (1-2) (See FIG. 23), then the add new device dialog box (1-5) is displayed. When the currently used network protocol is NetWare, this add new device dialog box (1-5) serves as a dialog box to show that new add devices displayed in the device list window (FIG. 15) connected to the NB-1 port cannot be detected.

Detailed Specifications

[<Return (B)] button: The user selects this button to close the current dialog box (1-5) (FIG. 27) and to return to the add new device dialog box (1-2) (See FIG. 23). At this time, the contents of the add new device dialog box (1-2) (FIG. 23) from the previous display are retained.

[Close] button: Same function as the [Cancel] button.

[Cancel] button: The user selects this button to close the dialog box (1-5) (FIG. 27) and return to the device list window (FIG. 15) after invalidating all settings relating to the add new device window.

[Help(H)] button: The user selects this button to display online help.

(2) Add new device dialog box when using TCP/IP)

[Add new device dialog box (2-1) (See FIG. 22)]

When the currently used network protocol is TCP/IP the user can select the device list window (FIG. 15) of the [Device]-[Add New] menu in order to display the add new device dialog box (2-1) shown in FIG. 22. When the currently used network protocol is TCP/IP, this add new device dialog box (1-1) serves as a dialog box allowing the user to select a network interface board connected to the new device displayed in the device list window (FIG. 15). In the case of TCP/IP, only devices existing in the same subnet as NetSpot can be added.

Detailed Specifications

[Network Interface Board (N)]: The user uses this to select the network interface board connected to the new device. In FIG. 22, "EB-1" and "NB-1" are displayed as product names for network interface boards connected to the add new device.

[<Return (B)] button: The user selects this button to return to the device list window (FIG. 15) and close the current dialog box (2-1) (FIG. 22) however usually this is disabled (a state where user cannot select this button).

Figure 28:
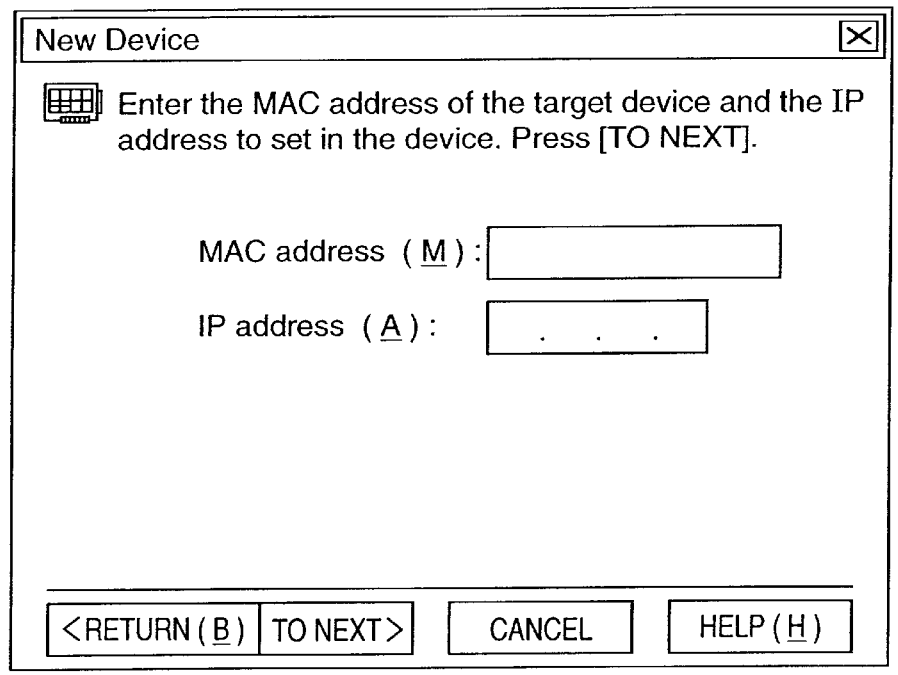
FIG. 28 is an illustration showing the new device dialog box (2-2).

[To Next>] button: The user selects this button to close the current dialog box (2-1) (FIG. 22) after storing the information displayed in (FIG. 22) in this dialog box (2-1) and display the add new device dialog box (2-2) (FIG. 28).

[Cancel] button: The user selects this button to invalidate all settings made in the add new device setting, and close this dialog box (2-1) (FIG. 22) and return to the device list window (FIG. 15).

[Help (H)] button: The user selects this button to display online help.

[Add new device dialog box (2-2) (See FIG. 28)]

When the user selects the network interface board per the add new device dialog box (2-1) (See FIG. 22) and (here related for when "NB-1" is selected") then selects the [To Next] button, the add new device dialog box (2-2) shown in FIG. 28 is displayed.

This add new device dialog box (2-2) is a dialog box for specifying the address held by the NB-1 board connected to the new add device displayed in the device list window (FIG. 15) when the currently used network protocol is TCP/IP. Here, when the user finishes inputting the address and selects the [To Next] button, detection of the device with the specified address is performed. At this time, a display shows that detection of the device in the add new device dialog box (2-2) is in progress.

Detailed Specifications

[MAC address (M)]: The user enters the 12 digit base 16 MAC address here.

[IP address (A)]: Here, the user enters a base 10×4 item IP address from 0–255 digits. The IP address is entered for setting in a device to be newly added or an IP address that has already been set is entered. The actual search is performed with [MAC address (M)] but search may not be possible if the user does not enter the correct IP address.

[<Return (B)] button: The user selects this button to close the current dialog box (2-2) (FIG. 28) without saving the information displayed in this dialog box (2-2) (FIG. 28) and to return to the add new device dialog box (2-1) (See FIG. 22). At this time, the display contents of add new device dialog box (2-1) (See FIG. 22) are the previously displayed contents.

[To Next] button: The user selects this button to close the current dialog box (2-2) (FIG. 28) after saving the information displayed in this dialog box (2-2) (FIG. 28) and detecting the device based on this information. The add new device dialog box (2-3) (See FIG. 24) contents are then displayed. This [To Next] button is only valid when all the digits in the [MAC address (M)] have been entered.

[Cancel] button: The user selects this button to invalidate all settings in the add new device setting and close this dialog box (2-2) (FIG. 28) and return to the device list window (FIG. 15).

[Help(H)] button: The user selects this button to display online help.

Other operations:

When the user enters a value of 256 or more in [IP address (A)], the message shown in FIG. 25 is displayed and the display returns to the add new device dialog box (2-2) (See FIG. 28)

[Add new device dialog box (2-3) (See FIG. 24)]

When device detection in the add new device dialog box (2-2) (See FIG. 28) has ended correctly, the add new device dialog box (2-3) of FIG. 24 is displayed. When the currently used network protocol is TCP/IP, this add new device dialog box (2-3) serves as a dialog box for the user to set protocol information on the NB-1 board connected to the add new devices displayed in the device list window (FIG. 15).Here, when the user finishes entry of the protocol information, and selects the [TO NEXT] button, the new settings specified by the user as protocol information for the NB-1 board are now valid.

Detailed Specifications

[NetWare frame type (N)]: The user selects this item to choose the NetWare frame type. The user selects from among: "Invalid Auto Detect" "Ethernet II" "Ethernet 802.2" "Ethernet 802.3" and "Ethernet Snap".

[Priority(R)]: The user selects this item to choose the frame type to have priority when using auto detection for the NetWare frame type. This is only valid when "Auto Detect" is selected in "NetWare Frame type (N)". The user selects from among: "Ethernet II" "Ethernet 802.2" "Ethernet 802.3" and "Ethernet Snap".

[TCP/IP frame type(T)]: The user uses this item to select the TCP/IP frame type. The user selects from among: "Invalid" and "Ethernet II".

[IP address (A)]: Here, the user enters a base 10×4 item IP address from 0–255 digits.

[AppleTalk phase (P)]: The user uses this item to select AppleTalk phase. The user selects from among: "Invalid" and "Phase2".

[<Return(B)] button: The user selects this item to close the current dialog box (2-3) (FIG. 24) without saving the information displayed in this dialog box (2-3) (FIG. 24) and to return to the add new device dialog box (2-2) (See FIG. 28). At this time, the contents of the add new device dialog box (2-2) (See FIG. 28) from the previous display are retained.

[To Next] button: The user selects this button to close the current dialog box (2-3) (FIG. 24) after saving the information displayed in this dialog box (2-3) (FIG. 24) and setting the protocol information for the network interface board based on this information. The add new device dialog box (2-4) (See FIG. 26) is then displayed.

[Cancel] button: The user selects this button to invalidate all settings in the add new device setting, then close this dialog box (2-3) (FIG. 24) and return to the device list window (FIG. 15).

[Help(H)] button: The user selects this button to display online help.

Other operations:

When the user enters a value of 256 or more in [IP address (A)], the message shown in FIG. 25 is displayed and the display returns to add new device dialog box (2-3) (See FIG. 24)

[Add new device dialog box (2-4) (See FIG. 26)]

When the setting of protocol information in the add new device dialog box (2-3) (See FIG. 24) has ended, the add new device dialog box (2-4) of FIG. 26 is displayed. When the currently used network protocol is TCP/IP, this add new device dialog box (2-4) serves as a dialog box for the user to check protocol information set on the NB-1 board connected to the new add devices displayed in the device list window (FIG. 15). In the case of the NB-1 board, when the user selects the [End] button, the network interface board automatically resets and the new settings are now valid.

Detailed Specifications

[<Return(B)] button: The user selects this button to close the current dialog box (2-4) (FIG. 26) and to return to the add new device dialog box (2-3) (See FIG. 24). This button is however usually invalid (a state where the user cannot select this button).

[End] button: The user selects this button to close the current dialog box (2-4) (FIG. 26) after resetting the network interface board, and return to the device list window (FIG. 15).

[Cancel] button: The user selects this button to close the dialog box (2-4) (FIG. 26) and return to the device list window (FIG. 15) without resetting the network interface board.

[Help(H)] button: The user selects this button to display online help.

[Add new device dialog box (2-5) (See FIG. 27)]

If the device detection did not end correctly in the add new device dialog box (2-2) (See FIG. 28), then the add new device dialog box (2-5) is displayed. When the currently used network protocol is TCP/IP, this add new device dialog box (2-5) serves as a dialog box to show that new add devices displayed in the device list window (FIG. 15) connected to the NB-1 port cannot be detected.

Detailed Specifications

[<Return(B)] button: The user selects this item to close the current dialog box (2-5) (FIG. 27) and return to the add new device dialog box (2-2) (See FIG. 28). At this time, the contents of the add new device dialog box (2-2) (See FIG. 21 ) from the previous display are retained.

[Close] button: Same function as the [Cancel] button.

[Cancel] button: The user selects this button to close the dialog box (2-5) (FIG. 27) and return to the device list window (FIG. 15) after invalidating all settings relating to the add new device window.

[Help(H)] button: The user selects this button to display online help.

[Display option dialog box (See FIG. 29)

When the user selects [Display]-[Option . . . ] from the device list window (FIG. 15), the option dialog box shown in FIG. 29 is displayed. This is a dialog box to allow the user to select the display options in the device list window (FIG. 15). The printer names added by the user with the printer information set dialog box (FIG. 135) are always displayed in this device list window. When large icons are used, the user can select items besides the name by using the radio buttons. When small icons are used, the user can select items in addition to the name, by using the check box.

Detailed Specifications

[Large Icon]: The user selects this item to display large icons on the device list. In such cases, the user selects from among: "Name only (N)" "Name & Device Product Title (R)" "Name & Network Interface Board Product Title(O)" "Name & MAC Address (A)".

[Small Icon]: The user selects this item to display small icons on the device list. In such cases, the user selects either ON or OFF for: "Device Product Title (P)" "Network Interface Board Product Title(B)" and "MAC Address (M)".

[Tip Help Display(T)]: The user selects whether or not to display the tip help item from the tool bar. The user selects either ON or OFF.

[OK] button: The user selects this item to validate the settings and close the dialog box.

[Cancel] button: The user selects this button to invalidate all settings in the add new device setting and close this dialog box.

[Help(H)] button: The user selects this button to display online help.

[Device search range dialog box (See FIG. 30)]

Figure 30:
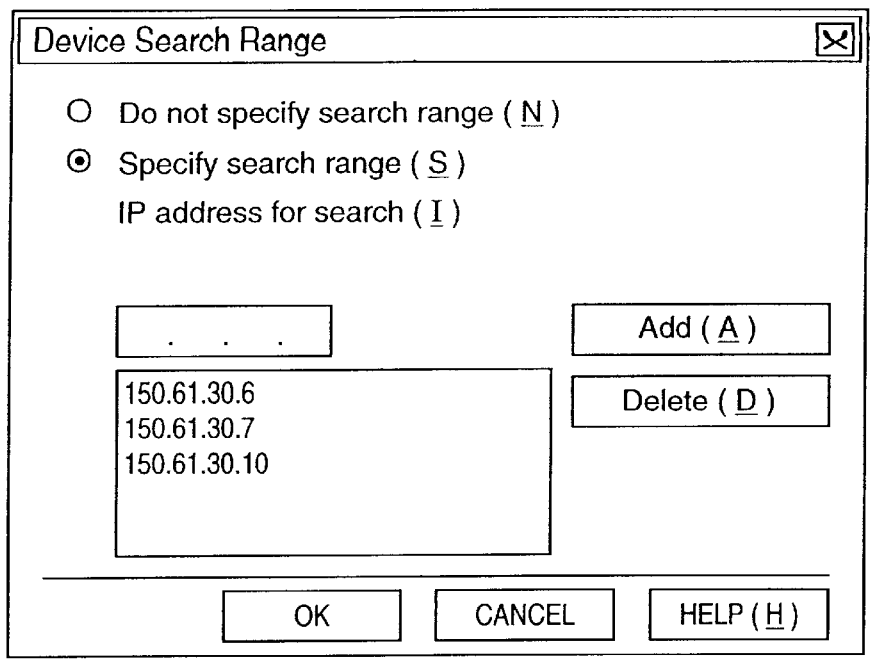
FIG. 30 is an illustration showing the device search range dialog box.

When the user selects the [Set]-[Device search range . . . ] menu from the device list window (FIG. 15), the device search range dialog box shown in FIG. 30 is displayed. This device search range dialog box is for allowing the user to set the device search range shown on the device list window (FIG. 15). The settings on the device search range dialog box are only valid when the currently used network protocol is TCP/IP. The user specifies the IP address for the device search or the broadcast address for each subnet as the device search range. When the user does not specify the device search range, a search of the NetSpot's own subnet is made with the broadcast. When a network device does not respond to the specifications of the broadcast of the network interface board, the user must clearly specify the IP address of the device to be searched, in the device list window, as the search range for the device.

Detailed Specifications

[Specify search range]: The user uses this item to select whether or not to specify the search range. The user selects from among: "Do not specify search range (N)" and "Specify search range (S)". When "Do not specify search range (N)" is selected, a search of the NetSpot's own subnet is made with broadcast. When "Specify search range (S)" is selected, the IP address specified with [Search IP address (I)] is searched for.

[Search IP address (I)]: Here, the user enters a base 10×4 item IP address from 0–255 digits. The user enters the IP address of the device to be searched or the broadcast address for each subnet. A list of the IP addresses for search is displayed. The user selects the IP address from the IP address list of devices for search. This operation is only valid when "Specify search range (S)" is selected in [Specify search range].

[Add(A)] button: The user selects this item to add the IP address entered by the user, onto the IP address list of devices for search. This operation is only valid when "Specify search range (S)" is selected in [Specify search range] and when [Search IP address (I)] is input.

[Delete (D)] button: The user selects this item to delete the IP address selected by the user, from the IP address list of devices for search. This operation is only valid when "Specify search range (S)" is selected in [Specify search range] and when [Search IP address (I)] is input.

[OK] button: The user selects this item to validate the settings and close the dialog box.

[Cancel] button: The user selects this button to invalidate all settings in the add new device setting and close this dialog box.

[Help (H)] button: The user selects this button to display online help.

Other operations:

When the user enters a value of 256 or more in [IP address (A)], the message shown in FIG. 25 is displayed and the display returns to the device search range dialog box (See FIG. 30)

[Device search range dialog box (See FIG. 31)]

Figure 31:
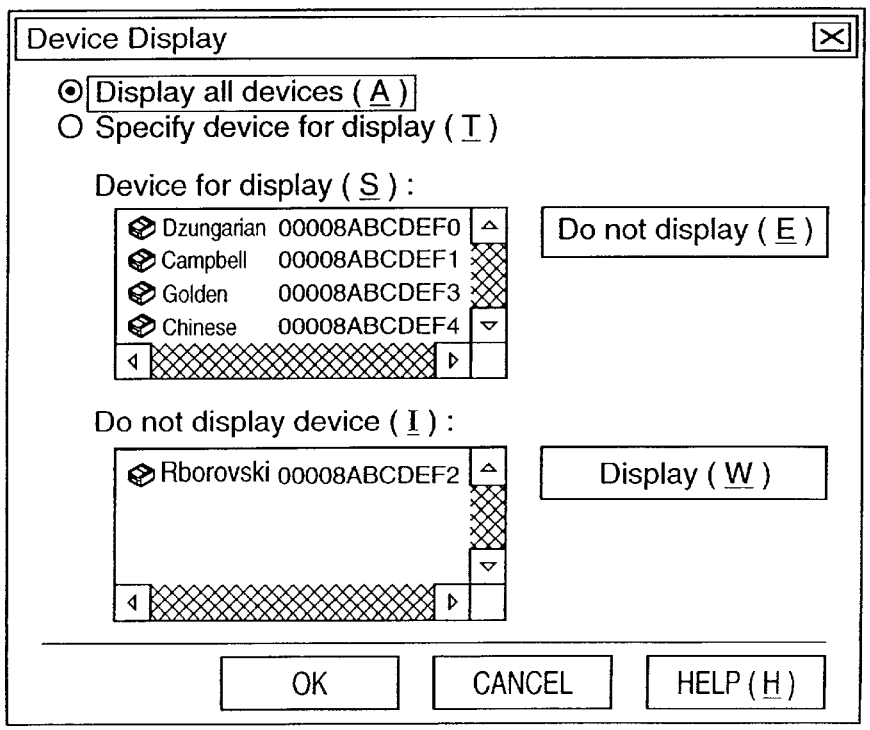
FIG. 31 is an illustration showing the device display dialog box.

When the user selects the device list window (FIG. 15) of the [Set]-[Device Display] menu, the device dialog box shown in FIG. 31 is displayed. The device display set dialog box is for allowing the user to set devices for display in the device list window (FIG. 15).

Detailed Specifications

[Specify display]: Allows user to select whether or not to display the device. The user selects from among: "Display all devices (A)" and "Specify device for display (T)".

[Devices for display (S)]: Displays a list of devices for display. The user selects a device from among a list for display. This operation is only valid when user has selected "Specify device for display (T)" with [Specify display]. In this case, small icons, names and the MAC address are displayed.

[Do not display (E)] button: The user selects a device from the list of devices for display and moves this to the list of devices not for display. This operation is only valid when the user selects "Specify device for display (T)" with [Specify display] and then selects the device from the Device for display list.

[Do not display device (I)]: Display a list of devices not for display. The user selects a device from the list of devices not for display. This operation is only valid when the user selects "Specify device for display (T)" with [Specify display] and then selects the device from the Device for display list. In this case, small icons, names and the MAC address are displayed.

[For display (W)]: When the user selects this (W) button, the device selected by the user from the Devices not for display list is moved to the Device for display list. This operation is only valid when the user selects "Specify device for display (T)" with [Specify display] and then selects the device from the Devices Not for Display List.

[OK] button: The user selects this item to validate the settings and close the dialog box.

[Cancel] button: The user selects this button to invalidate all settings in the add new device setting and close this dialog box.

[Help (H)] button: The user selects this button to display online help.

[Device List Auto Change Dialog Box (See FIG. 32)]

Figure 32:
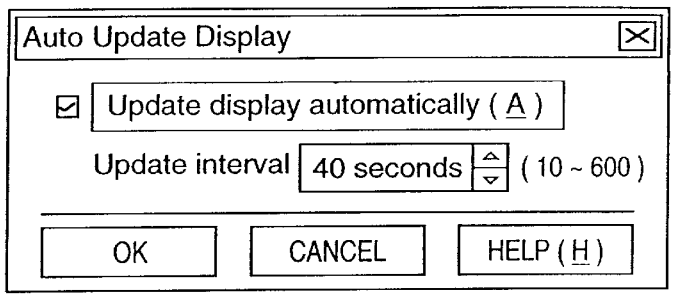
FIG. 32 is an illustration showing the device list auto change dialog box.

When the user selects the [Set]-[Display Auto Change . . . ] menu on the device list window (FIG. 15), the Device Auto Change dialog box shown in FIG. 32 is displayed. The Device Auto Change dialog box (FIG. 32) is for allowing the user to set the auto change interval for the display on the device list window (FIG. 15).

Detailed Specifications

[Change display automatically (A)]: The user selects here whether or not to automatically change the device list display. The user selects ON or OFF.

[Change interval (I)]: The user enters a change interval unit in increments from 10 to 600 seconds. This function is only valid when the user has selected "ON" in [Change display automatically (A)].

[OK] button: The user selects this item to validate the settings and close the dialog box.

[Cancel] button: The user selects this button to invalidate all settings in the add new device setting and close this dialog box.

[Help (H)] button: The user selects this button to display online help.

Figure 33:
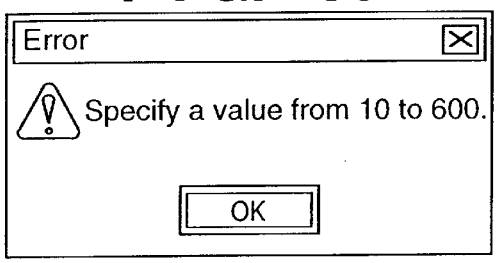
FIG. 33 is an illustration showing the sample message displayed when an entry outside the allowable limit was entered in "Change Interval(1)" of the device list auto change dialog box.

Other operations:

In [Change interval (I)] when the user enters a value outside the range of 10 to 600 seconds, the message in FIG. 33 is displayed and the display returns to the device list Device Auto Change dialog box (FIG. 32).

[NetWare Log-In dialog box (See FIG. 34)

When the user selects the [Set]-[Log-In . . . ] menu on the device list window (FIG. 15), the NetWare Log-In dialog box shown in FIG. 34 is displayed. The NetWare Log-In dialog box (FIG. 34) is for allowing the user to access the NetWare file server. This NetWare Log-In dialog box is only operable when the NetWare service is available for use.

Detailed Specifications

[User Name (U)]: The user enters the user name here in order to log in to the NetWare file server. When a previous log-in was made to the file server with the dialog box, the previous log-in is stored beforehand as the default user name.

[Password (P)]: The user enters the password here in order to log in to the NetWare file server.

[NetWare server (S)]: The user selects the NetWare file server for log-in with this item. The user selects the NetWare file server from the registrations in the bindery.

[OK] button: The user selects this item to validate the settings and close the dialog box.

[Cancel] button: The user selects this button to invalidate all settings in the add new device setting and close this dialog box.

[Help (H)] button: The user selects this button to display online help.

Figure 35:
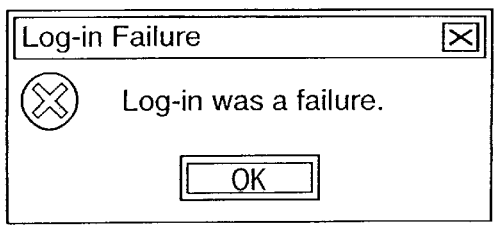
FIG. 35 is an illustration showing the message displayed when log-in to the NetWare file server failed.

Other operations:

When the log-in to the NetWare file server fails, the message in FIG. 35 is displayed and the display returns to the NetWare log-in dialog box (FIG. 34).

Figure 36:
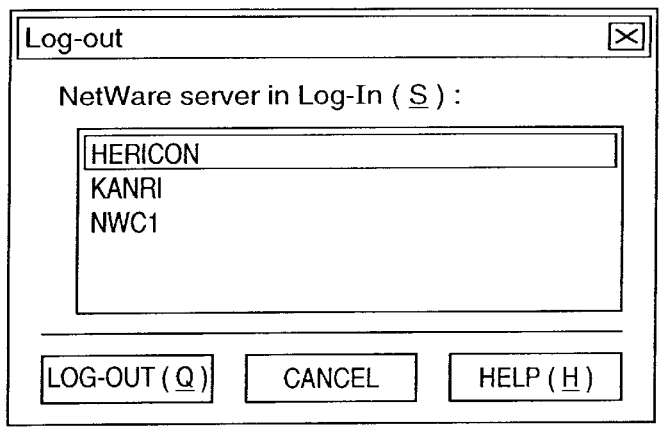
FIG. 36 is an illustration showing the NetWare log-out dialog box.

[NetWare Log-In dialog box (See FIG. 36)

When the user selects the [Set]-[Log-In . . . ] menu on the device list window (FIG. 15), the NetWare Log-Out dialog box shown in FIG. 36 is displayed. The NetWare Log-Out dialog box (FIG. 36) is for allowing the user to log out from the NetWare file server. This NetWare Log-Out dialog box (FIG. 36) is only operable when the NetWare service is available for use.

Detailed Specifications

[NetWare server during log-in (S)]: This is a list displaying the currently logged-in NetWare file servers. The user selects the NetWare file server from the list of currently logged-in NetWare file servers.

[Log-out (O)] button: The user selects this [Log-out (O)] button to log out of the NetWare file server selected with [NetWare server during log-in (S)]. This function is only valid when the user has selected the NetWare file server with [NetWare server during log-in (S)].

[Cancel] button: The user selects this button to invalidate all settings in the add new device setting and close this dialog box.

[Help (H)] button: The user selects this button to display online help.

Figure 37:
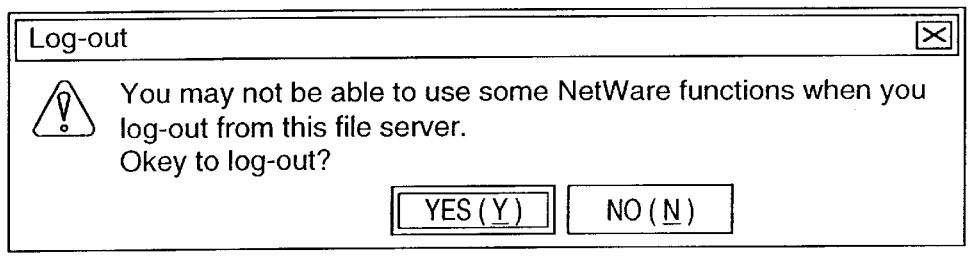
FIG. 37 is an illustration showing the message displayed when the "Log-out(0)" button of FIG. 36 is pressed.

Other operations:

When the user selects the [Log-out (O)] button, the message shown in FIG. 37 appears. When the user selects the [Yes (Y)] button, log-out from the specified NetWare file server is performed, and the display returns to the device list window (FIG. 15). When the user selects the [No (N)] button, the device list window (FIG. 15) returns with no other action performed.

[NetSpot Password Change Dialog Box (See FIG. 38)]

When the user selects the [Set]-[NetSpot password change . . . ] menu on the device list window (FIG. 15), the NetSpot Password Change dialog box shown in FIG. 38 is displayed. The NetSpot Password Change dialog box (FIG. 38) is for allowing the user to change the NetSpot password entered by the user during start-up of NetSpot in controller mode. The NetWare Password Change dialog box (FIG. 38) is only operable in controller mode.

Detailed Specifications

[Old password(O)]: The user enters here a character string of 0 to 15 digits used as the old NetSpot password during NetSpot start-up. This is grouped into upper or lower case letters.

[New password(N)]: The user enters here a character string of 0 to 15 digits used as the new NetSpot password during NetSpot start-up. This is grouped into upper or lower case letters.

[New password check entry (F)]: The user re-enters here a character string of 0 to 15 digits used as the new NetSpot password during NetSpot start-up. This is grouped into upper or lower case letters.

[Substitute NetWare server controller password (S)]: The user selects this item in order to check whether or not log-in to the NetWare file server has been made as a controller, instead of the user entering the NetSpot password at start-up of NetSpot. This is allowable when the same specifications are also set for the device password. This function is only operable when the NetWare service is usable. The user selects ON or OFF for this function.

[OK] button: The user selects this item to validate the settings and close the dialog box.

[Cancel] button: The user selects this button to invalidate all settings in the add new device setting and close this dialog box.

[Help (H)] button: The user selects this button to display online help.

Figure 39:
FIG. 39 is an illustration showing the message displayed when a mistake was made in the NetSpot password entry with "Old Password (0)" of FIG. 38.

Other operations:

When a mistake was made in entering the NetSpot password with [Old password(O)], then the message in FIG. 39 appears. The NetSpot Password Change Dialog Box (FIG. 38) then returns.

Figure 40:
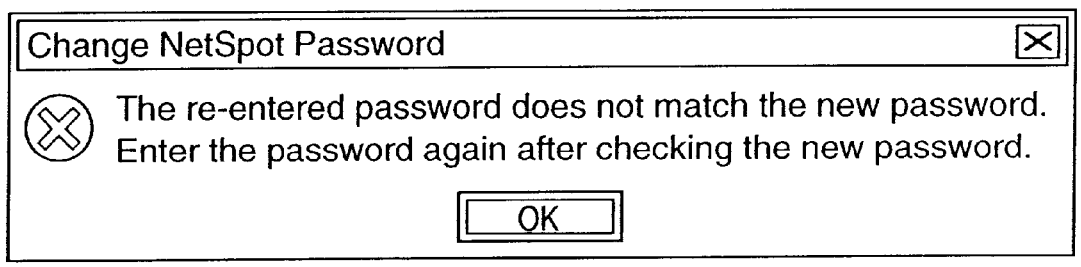
FIG. 40 is an illustration showing the message displayed when the new password and the password check entry do not match.
Figure 41:
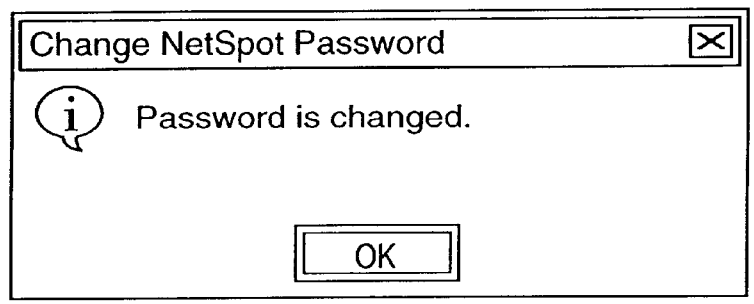
FIG. 41 is an illustration showing the message displayed when the NetSpot password has been changed by means of the correct entry.

When the new NetSpot password entered by the user with [New password(N)] does not match the password re-entered by the user with [New password check entry (F)], then the message in FIG. 40 is shown and the NetSpot Password Change Dialog Box (FIG. 38) then returns. When the NetSpot password was changed with the correct user entry, the message in FIG. 41 then appears and the display returns to the device list window (FIG. 15).

[NetSpot Version Information Dialog Box (See FIG. 42)]

The user selects the [Help]-[Version Info] menu from the device list window (FIG. 15) to display the NetSpot Version Information Dialog Box of FIG. 42. This NetSpot Version Information Dialog Box of FIG. 42 is for displaying the NetSpot version information.

Detailed Specifications

[Version Info]: This displays the NetSpot title and version. The copyright is displayed. The Canon-MIB used by NetSpot is displayed. The SNMP version used by NetSpot is displayed.

[OK] button: The user selects this item to validate the settings and close the dialog box.

[Device Window (See FIG. 43)]

The user double-clicks an icon displayed on the device list window (FIG. 15) to display the Device Window Dialog Box shown in FIG. 43. The number of device windows (FIG. 43) that can be opened by the user is limited to one for each device. The user clicks the tabs ([Status] [Job] [Info] and [Network] on the left side of the Device Window (FIG. 43) to move the sheet for each tab to the leading edge of the Device Window (FIG. 43).

The contents shown in the device window (FIG. 43) differ according to the device model. Also, the contents shown in the device window (FIG. 43) differ according to the controller mode or the general user mode. Basically, the general user mode is limited in display items and changeable items compared to the controller mode. When an item or function cannot be supported due to the target model or mode being started or network protocol being used: then the screen is configured with one of the following techniques.

(1) When item is grayed-out and display is invalid or not possible of being changed (basically there is a possibility the item is valid.)

(2) The item itself cannot be displayed (when basically there is no possibility item is valid.)

(3) When the sheet itself of the device window (FIG. 43) is grayed-out and display is invalid or cannot be selected (When a particular tab does not support all items and basically there is a possibility the item is valid.)

(4) When the sheet itself of the device window (FIG. 43) will not display (When a particular tab does not support all items and basically there is no possibility the item is valid.)

Figure 44:
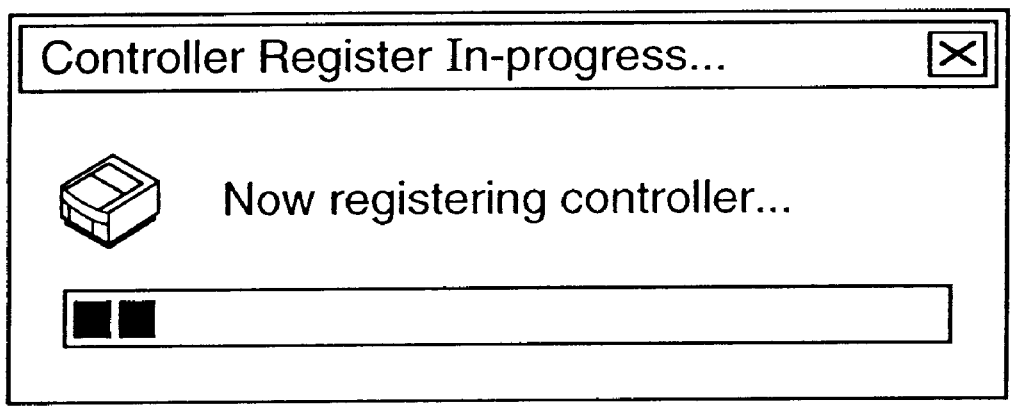
FIG. 44 is an illustration showing the message displayed when time is required for registering the controller on the manager information table.

In controller registration onto the manager information table and time is required for registering the controller onto the manager information table for the device selected by the user; then the message in FIG. 44 appears and the fact that the controller is currently being registered is reported to the user.

Figure 45:
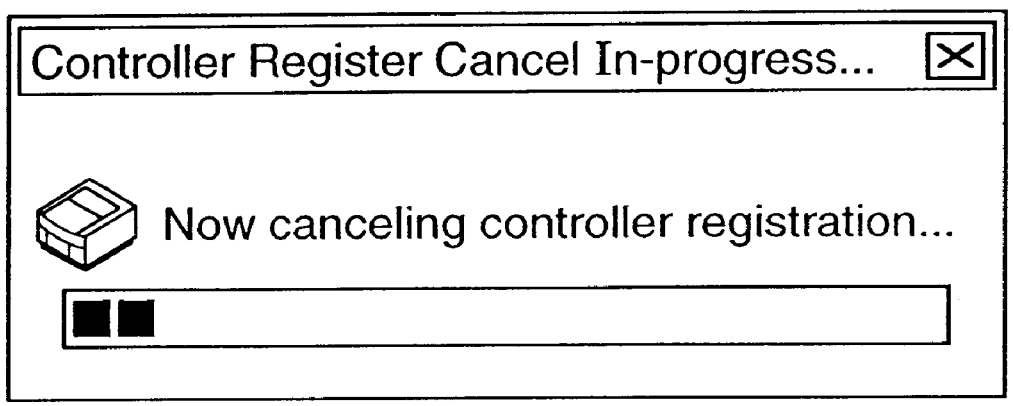
FIG. 45 is an illustration showing a sample message displayed when time is needed for canceling the controller registration on the manager information table.
Figure 46:
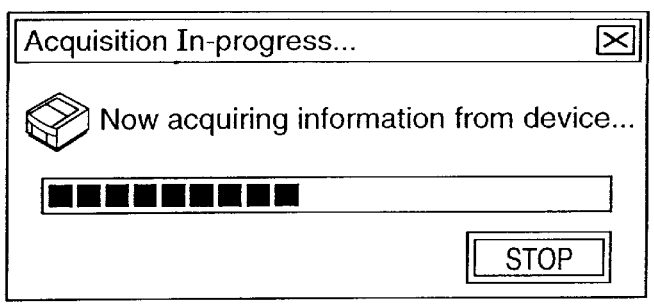
FIG. 46 is an illustration showing a sample message displayed when time is needed for acquiring information when first displaying the sheet dialog box of FIG. 43.

When canceling controller registration onto the manager information table, and time is required for canceling controller registration on the manager information table for the device selected by the user; then the message in FIG. 45 appears and the fact that the controller registration is currently being canceled is reported to the user.

In cases where first displaying a sheet—dialog box on the device window (FIG. 43), and time is required for acquiring information from the device selected by the user, then the fact that information is currently being acquired is reported to the user and when information acquisition is capable of being canceled, the [STOP] is valid.

Figure 47:
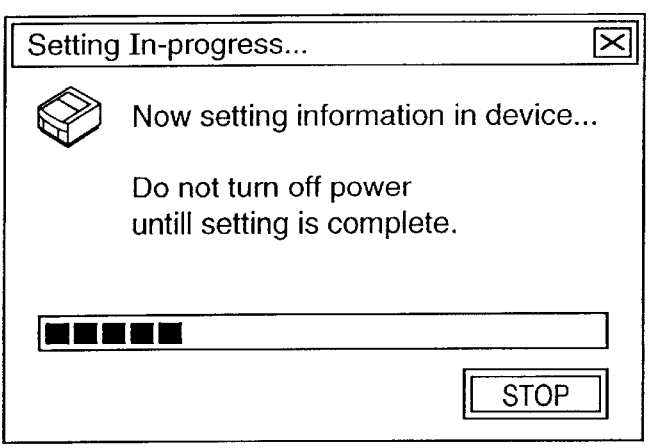
FIG. 47 is an illustration showing a sample message displayed when time is needed for setting information in the sheet dialog box of FIG. 43.

When time is required for setting information to the device selected by the user, in sheet—dialog box on the device window (FIG. 43), then the message in FIG. 47 appears and the fact that information is currently being set is reported to the user. When this setting of information can be canceled, the [STOP] is valid.

Figure 48:
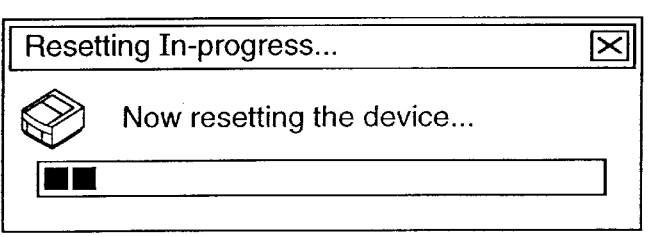
FIG. 48 is an illustration showing a sample message displayed when time is needed for resetting the printer and resetting the network interface board.
Figure 49:
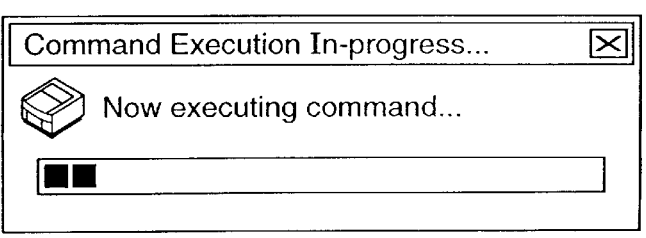
FIG. 49 is an illustration showing a sample message displayed when time is needed for executing commands other than resetting the printer and resetting the network interface board.

Further, during reset of the printer or reset of the network interface board, and time is required for reset of the device selected by the user, the message in FIG. 48 appears and the user is informed that reset is in progress. When implementing commands other than printer reset or network interface board reset and time is required for implementing commands for devices selected by the user such as printer online-off-line, paper eject, printer initialize, network interface board initialize and various utility commands, then the message in FIG. 49 appears and the user informed that the commands are currently being implemented.

[Device Password Entry Dialog Box (See FIG. 50)]

Figure 50:
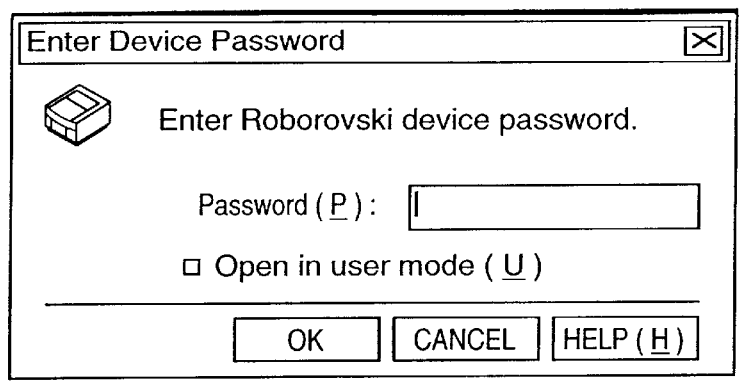
FIG. 50 is an illustration showing the device password entry dialog box.

When the device window is opened (FIG. 43) and the conditions below have been satisfied, the Device Password Entry Dialog Box shown in FIG. 50 is displayed.

(1) Controller mode (2) The NetSpot password is not substituted with the NetWare file server controller password or if substituted, is not logged in as a controller to the NetWare file server. (NetSpot Password Change Dialog Box (See FIG. 38).

(3) Password is set with in device selected by the user (4) Device password for device selected by the user does not match the NetSpot password.

The Device Password Entry Dialog Box (FIG. 50) is for entry by the user of the device password when the device window (FIG. 43) has been opened. In the case of controller mode, after this entry, registration onto the manager information table of the device selected by user is performed.

Detailed Specifications

[Password (P)]: The user enters a device password here in a character string of 0 to 15 spaces. This function is only valid when the user has not selected ON in [Open in User Mode (U)]. Classified separately by large letters and small letters.

[Open in User Mode (U)]: The user selects in general user mode whether to open the device window (FIG. 43). The user selects either ON or OFF.

[OK] button: The user selects this item to validate the settings and close the dialog box.

[Cancel] button: The user selects this button to invalidate all settings in the add new device setting and close this dialog box.

[Help (H)] button: The user selects this but ton to display online help.

Figure 51:
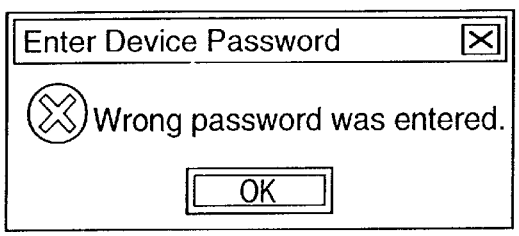
FIG. 51 is an illustration showing a sample message displayed when a mistake was made by the user in entry of the device password.
Figure 52:
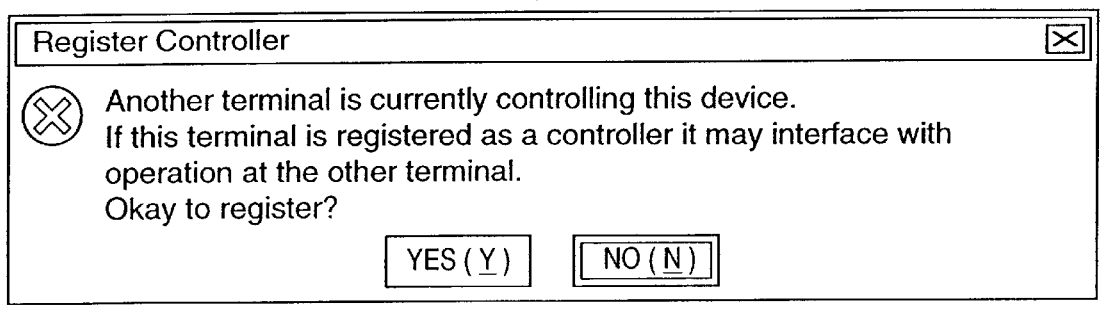
FIG. 52 is an illustration showing a sample message displayed when a previously opened device window was detected by means of another terminal in controller mode.

Other operations:

When the user makes a mistake in entering the device password, the message in FIG. 51 appears and the display returns to the Device Password Entry Dialog Box (FIG. 50).

Figure 53:
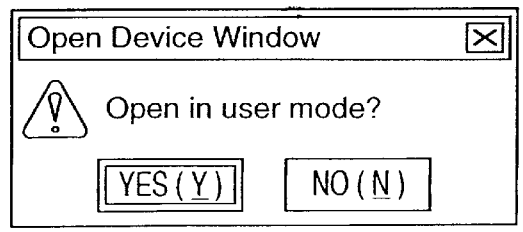
FIG. 53 is an illustration showing a sample message displayed when automatic opening of the device window was not selected in controller mode.

During registration onto the manager information table when the user has selected a device; and it is detected that the device window selected by the user (FIG. 43) is already open by means of NetSpot controller mode at another computer terminal, then the message in FIG. 53 appears. Here, when the user selects the [YES(Y)] button, the device window (FIG. 43) is automatically opened in controller mode. When the user selects the [NO(N)] button, the device window (FIG. 43) does not open in controller mode. Upon detecting that the device window (FIG. 43) for a device selected by a user was already opened in NetSpot controller mode by another computer terminal; and when the user did not select automatically opening the device window (FIG. 43) in controller mode, then the message in FIG. 53 appears. Here, when the user selects the [YES(Y)] button, the device window (FIG. 43) is opened in general user mode. The situation on the device window for user mode is shown in FIG. 145. On the device window (FIG. 145) of user mode, a comparison is made with the device window (FIG. 43) of controller mode, the network sheet and printer set button are canceled, and the setting operation disabled as can be seen just by checking printer related information.

When the user selects the [NO(N)] button, in the situation shown by the message in FIG. 53, the display returns to the device list window (FIG. 15) without performing any other functions.

Figure 54:
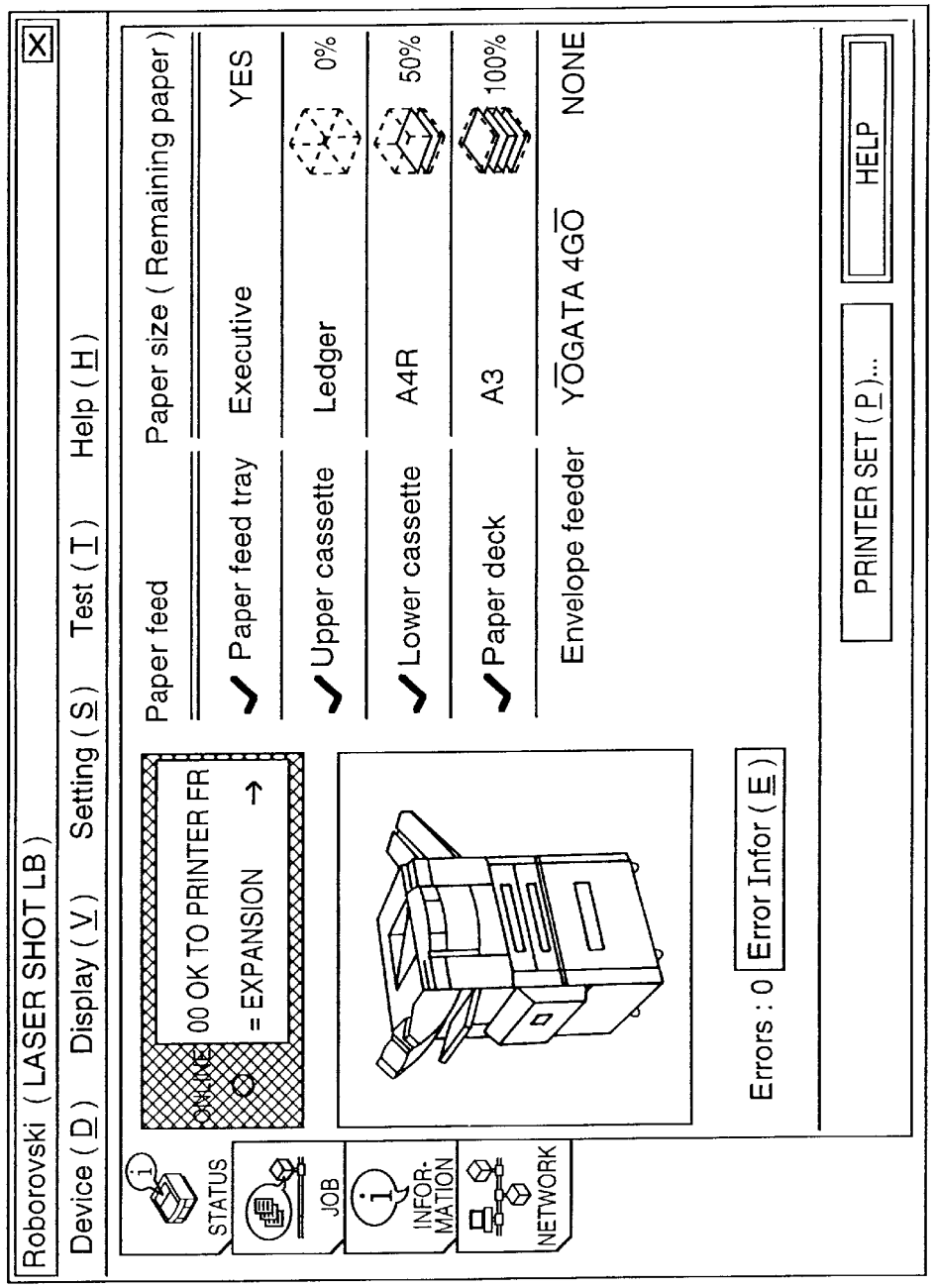
FIG. 54 is an illustration showing the status sheet.

[Status Sheet (See FIG. 54]

The Status Sheet shown in FIG. 54 appears when the user double-clicks the left side [Status] of the device window (FIG. 43) or appears as a default sheet on the leading edge when the user opens the device window (FIG. 43). This status sheet (FIG. 54) is for displaying the current status for devices selected by the user. Table 5 shows functions provided by the Status Sheet (FIG. 54) in the controller mode and in general user mode.

TABLE 5

List of functions supported on status sheet (FIG. 54)

| ITEM NO. | FUNCTION | Admin | User |
|---|---|---|---|
| 1 | Bitmap display of printer exterior<br>Unit design<br>Paper feed section design (equipment info.) | ○ | ○ |

TABLE 5-continued

List of functions supported on status sheet (FIG. 54)

| ITEM NO. | FUNCTION | Admin | User |
|---|---|---|---|
|  | Paper eject section design (eguipment info.)<br>Unit internal design per abnormal section (only in abnormality)<br>Cover design (only in abnormality) |  |  |
| 2 | Operating panel status display<br>Display contents<br>Online key LED status display | ○ | ○ |
| 3 | Paper feed section status display<br>Paper feed section types<br>Paper feed selected by user<br>Paper size<br>Remaining paper | ○ | ○ |
| 4 | Error information display<br>Count of currently occurring errors<br>List of error information of all occurring errors (only when error occurs)<br>Position where error occurred (only when error occurs) | ○ | ○ |
| 5 | Online help display for errors<br>Online help showing error message | ○ | ○ |
| 6 | Restoring operation after error<br>Select printer paper feed/eject<br>Operate online help<br>Operate soft reset for printer | ○ | ○ |

The "Bitmap display of printer exterior" is a bitmap displaying the design of the printer unit. Switching to paper feed sections or paper eject section can be performed according to the option that is installed. When trouble occurs, a symbol indicating an error is displayed. The "Operating panel status display" shows display contents reported by the printer and also performs polling of operating panel status at fixed intervals to periodically update the operating panel status display.

When in "sleep" during an auto energy-saving function, the sleep condition is shown on the operating panel display. The "Error Info" button becomes active when an error including a warning level occurs. When in status where an error is not occurring, the "Error Info" button is inactive. The "Online help display for errors" and the Restoring operation after error" are shown on Error Information Display Dialog Boxes by pressing the "Error Info" button.

Detailed Specifications

[Online LED]: Displays the status of the online LED. Display ON (green) and OFF (black).

[Display]: Displays the message and status in two lines of 16 characters each. During sleep status displays "Sleep".

[Printer Exterior]: Display the printer exterior. The printer exterior design may change according to the paper deck, envelope feeder, and steeplestacker options that are installed. However option installations such as the dual-side unit, network interface board, expansion RAM, font ROM and control ROM do not affect the printer exterior design. When an error occurs in the printer unit (excluding warning level) a symbol mark indicating an error in the printer exterior design is displayed. A red "O" mark is affixed to the location of the error when discovered.

[Paper Feed section]: Displays the names of the paper feed section. Displays "Paper feed tray" "Upper cassette" "Lower cassette" "Paper Deck" and "Envelope Feeder". When not in auto paper feed, a check mark is displayed at the paper feed section selected by the user. A check mark is displayed at the feed section targeted for auto feed. The "Paper deck" and the "Envelope Feeder" are only valid when their respective options have been installed.

[Paper size]: Displays the paper sizes of each paper feed section. Displays "A5" "B5" "A4(R)" "B4" "A3" "Letter (R)" "Legal" "Executive" "Free" "User paper" "YOGATA 4GO" "KAKUGATA 2GO". The "YOGATA 4GO" and "KAKUGATA 2GO" indicate envelope sizes uniquely used in Japan.

[Remaining Paper]: Displays the remaining amount of paper for each feed section. In the case of the paper feed tray and envelope feeder, display is available in two stages "YES" and "NONE". In the case of a cassette, displays in five stages of "0%" "25%" "50%" "75%" and "100%".

[Eject Paper Info (O)] button: Opens the eject section information dialog box for displaying information on the eject section.

[Error Count]: Displays a count of errors currently occurring. The error count also includes warning level errors.

[Error Info (E)] button: The user selects this button to open the error information dialog box in order to display information on errors. This function is only valid when the [Error Count] is greater than one.

[Printer Set (P)] button: The user selects this button to open the printer environment dialog box (controller mode only) in order to set the printer environment.

[Help] button: Displays online help.

[Error Information Dialog Box (See FIG. 55)]

When the user selects the [Error Info] button on the Status sheet (FIG. 54), the Error Information Dialog Box shown in FIG. 55 is displayed. The Error Information Dialog Box (FIG. 55) is for displaying detailed information on a plurality of errors currently occurring in the device selected by the user. The Error Information Dialog Box (FIG. 55) is only applicable to error occurring and includes warning level errors. When a plurality of errors occur at the same time, the errors are displayed in order of high priority.

In errors occurring in controller mode, error skip and print stop can be implemented. The error skip operation is equivalent to skipping over the error and is performed when the user presses the paper feed/eject key on the printer operating panel or presses the online key. The print stop operation is equivalent to halting the printing and is performed by the user pressing the reset (soft) key on the printer operating panel.

The error skip and the print stop functions may not be valid according to the type of error that occurs. Therefore, the user must choose the correct operation: error skip or print stop according to the error that occurs.

Detailed Specifications

[Printer Exterior]: Display the printer exterior. The printer exterior design may change according to the paper deck, envelope feeder, and steeplestacker options that are installed. However option installation such as the dual-side unit, network interface board, expansion RAM, font ROM and control ROM do not affect the printer exterior design. When an error occurs in the printer unit (excluding warning level) a symbol mark indicating an error in the printer exterior design is displayed. A red "O" mark is affixed to the location of the error when discovered.

[Error Details]: Displays a list of all errors currently occurring. The errors displayed include warning level errors. When the location where the error occurred is discovered that position is displayed.

[OK] button: The user selects this button to close the dialog box.

[Feed/Eject Paper (I)] button: The user presses this button to open the Printer Feed/Eject Dialog Box in order to select printer paper feed or eject. (Controller mode only)

[Online (O)] button: The user selects this button set the printer to online. (Controller mode only)

[Reset (R)] button: The user selects this button to set a soft reset for the printer. (Controller mode only). The user implements soft reset of the printer after setting to off-line.

[Help] button: Displays online help.

Figure 56:
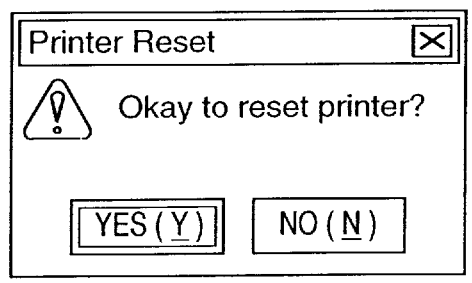
FIG. 56 is a sample message display showing when the "Reset (R)" button of FIG. 55 was pressed.

Other operations: The message in FIG. 56 is displayed when the user selects the [Reset (R)] button. Here, when the user selects the [Yes (Y)] button, soft reset of the printer is performed and the display returns to the Error Information Dialog Box (FIG. 55). When the user selects the [No (N)] button, the display returns to the Error Information Dialog Box (FIG. 55) with no other operations being performed.

[Printer Paper Feed/Eject Dialog Box (See FIG. 57)]

The Printer Paper Feed/Eject Dialog Box shown in FIG. 57 is displayed when the user selects the

[Feed/Eject Paper] button on the Error Information Dialog Box (FIG. 55). This Printer Paper Feed/Eject Dialog Box (FIG. 57) is for allowing the user to select paper feed or eject of the device selected by the user and is only applicable in controller mode.

Detailed Specifications

[Paper Feed section]: The user selects the paper feed section. The user selects from among "Auto(U)" "Paper feed tray(I)" "Upper cassette(C)" "Lower cassette(S)" "Paper Deck(P)" and "Envelope Feeder(V)". The "Paper Deck(P)" and "Envelope Feeder(V)" are only available when each are provided as options. The paper size for each paper feed section is displayed. Displays "A5" "B5" "A4(R)" "B4" "A3" "Letter (R)" "Legal" "Executive" "Free" "User paper" "YOGATA 4GO" "KAKUGATA 2GO". The remaining amount of paper for each feed section is also displayed. In the case of the paper feed tray and envelope feeder, display is available in two stages "YES" and "NONE". In the case of a cassette, displays in five stages of "0%" "25%" "50%" "75%" and "100%".

[Paper Eject Section] The user selects the paper eject section here. The user selects from among "Eject tray (O)" and "Eject Subtray (B)" when the not equipped with the staple stacker option.

[OK] button: The user selects this button to validate the settings that were entered and to close the dialog box. The printer settings are updated at this time.

[Cancel] button: The user selects this button to invalidate the settings that were made and close the dialog box.

[Update(A)] button: The user selects this button to update the printer settings.

[Help (H)] button: The user selects this button to display the online help.

[Printer Environment Dialog Box (See FIG. 143)]

The Printer Environment Dialog Box shown in FIG. 143 appears when the user selects the [Printer Set] button of the Status sheet (FIG. 54). This Printer Environment Dialog Box is for making printer environmental settings for the device selected by the user. The Printer Environment Dialog Box is basically comprised of five sheets with tabs as follows.

(1) Printer paper feed/eject basic sheet (FIG. 58)

(2) Shared print environment basic sheet (FIG. 59)

(3) LIPS print environment basic sheet (FIG. 69)

(4) N201 print environment basic sheet (FIG. 76)

(4) ESC/P print environment basic sheet (FIG. 88)

When the print environment dialog box is opened by the user, the foremost sheet shown is the default sheet which is the printer paper feed/eject basic sheet (FIG. 58). As a typical view, the Printer Environment Dialog Box shown as a common (shared) sheet is displayed in FIG. 143.

When the user clicks one of the [Feed/Eject Paper] [Shared] [LIPS] [N201] [ESC/P] tabs on the upper part of the Printer Environment Dialog Box, the sheet corresponding to that tab, moves to the foremost place on the Printer Environment Dialog Box. This Printer Environment Dialog Box is only applicable in the controller mode. In controller mode, the functions indicated in Tables 6 through Table 11 are provided. A portion of the functions listed below are settings that accompany some manner of operation of the printer unit.

TABLE 6

Functions (List 1) supported on the printer environment dialog box

| ITEM NO. | FUNCTION | Admin | User |
|---|---|---|---|
| 1 | Printer feed eject section setting | ○ | |
| | Printer exterior bitmap display | | |
| | Feed selector | | |
| | Auto feed selector | | |
| | Tray priority selector | | |
| | Tray paper size selector | | |
| | Envelope size selector | | |
| | Eject paper selector | | |
| 2 | Shared printer environment basic settings | ○ | |
| | Copy sheet count | | |
| | Super smooth selector | | |
| | Toner economy mode | | |
| | Toner contrast | | |
| | Data processing resolution | | |
| | Double-side mode | | |
| | Binding width | | |
| | Binding direction | | |

TABLE 7

Functions (List 2) supported on the printer environment dialog box

| ITEM NO. | FUNCTION | Admin | User |
|---|---|---|---|
| 3 | Shared printer environment expansion settings | ○ | |
| | Default cassette paper size | | |
| | Paper direction | | |
| | Job time-out | | |
| | Job time-out time setter | | |
| | Sleep selector | | |
| | Select time until sleep | | |
| | Low toner alarm | | |
| | Auto error skip | | |
| | Warning display | | |
| | Buzzer warning | | |
| | Language display | | |
| | Vertical offset | | |
| | Horizontal offset | | |
| 4 | Print adjust selector | | ○ |
| | MaxiMem | | |
| | Band control | | |
| | Print assurance memory | | |
| | System work memory | | |
| | Image quality warning | | |
| | Halftone adjust | | |

TABLE 7-continued

Functions (List 2) supported on the printer environment dialog box

| ITEM NO. | FUNCTION | Admin | User |
|---|---|---|---|
| 5 | Print operating mode settings | ○ | |
| | Operating mode | | |
| | Auto emulation | | |
| | Priority operation emulation | | |

TABLE 8

Functions (List 3) supported on the printer environment dialog box

| ITEM NO. | FUNCTION | Admin | User |
|---|---|---|---|
| 6 | LIPS custom print environment basic settings | ○ | |
| | Enlarge/reduce | | |
| | Multiple page printing | | |
| | Print direction | | |
| | Chinese character code | | |
| | Character size | | |
| | Chinese character style | | |
| | ANK style | | |
| 7 | LIPS custom print environment basic settings | ○ | |
| | Number of lines | | |
| | Set number of lines | | |
| | Number of columns select | | |
| | Set number of lines | | |
| | Auto page revision | | |
| | Select auto return select | | |
| | Select LF function | | |
| | Select CR function | | |
| | Auto paper save | | |
| | Time-out control | | |
| | Chinese character graphic set | | |
| | Crosshatch resolution | | |
| | Start-up macro | | |
| | Overlay1 select | | |
| | Overlay1 set | | |
| | Overlay2 select | | |
| | Overlay2 set | | |
| 8 | LIPS custom utility | | ○ |
| | Status print | | |
| | Overlay print | | |
| | Overlay list | | |
| | Font list | | |
| | Macro list | | |

TABLE 9

Functions (List 4) supported on the printer environment dialog box

| ITEM NO. | FUNCTION | Admin | User |
|---|---|---|---|
| 9 | N201 custom print environment basic setting | ○ | |
| | Select page format | | |
| | Select paper position | | |
| | Set upper border | | |
| | Fine feed adjust for paper position | | |
| | Image offset | | |

TABLE 9-continued

Functions (List 4) supported on the printer environment dialog box

| ITEM NO. | FUNCTION | Admin | User |
|---|---|---|---|
|  | Paper size |  |  |
|  | 2 page print setting |  |  |
|  | Chinese character style |  |  |
|  | Font ID setting |  |  |
|  | Chinese character size |  |  |
|  | External character size |  |  |
|  | Graphic |  |  |
| 10 | N201 custom print environment expansion 1 set |  | ○ |
|  | Zone select |  |  |
|  | Right margin specified value |  |  |
|  | Single form paper length function |  |  |
|  | Dash line skip setting |  |  |
|  | Paper length function |  |  |
|  | Paper length setting |  |  |
|  | Registration level select |  |  |
|  | Zero style select |  |  |
|  | Country letter select |  |  |
|  | Chinese character graphic set |  |  |
|  | CR function |  |  |
|  | Print command |  |  |
|  | Buffer file select |  |  |

TABLE 10

Functions (List 5) supported on the printer environment dialog box

| ITEM NO. | FUNCTION | Admin | User |
|---|---|---|---|
| 11 | N201 custom environment basic settings |  | ○ |
|  | Select page format |  |  |
|  | Fix line function |  |  |
|  | Fixed number of line function |  |  |
|  | Fixed column function |  |  |
|  | Fixed number of columns set |  |  |
|  | OCR font |  |  |
|  | New line width |  |  |
|  | Chinese character rate |  |  |
|  | Start-up macro set |  |  |
|  | System overlay |  |  |
|  | System overlay set |  |  |
|  | User overlay1 |  |  |
|  | User overlay2 |  |  |
|  | Ignore new line after HEX mode |  |  |
|  | HEX/LIPS function |  |  |
|  | LIPS form |  |  |
| 12 | N201 custom utility |  | ○ |
|  | Status print |  |  |
|  | Overlay print (only when option installed) |  |  |
| 13 | ESC/P custom print environment basic setting |  | ○ |
|  | Page format |  |  |
|  | Set upper border |  |  |
|  | Fine feed adjust for paper position |  |  |
|  | Reduce print character |  |  |
|  | Image offset |  |  |
|  | Paper size |  |  |
|  | 2 page printing |  |  |
|  | Chinese character style |  |  |
|  | Font ID |  |  |
|  | Chinese character size |  |  |

TABLE 11

Functions (List 6) supported on the printer environment dialog box

| ITEM NO. | FUNCTION | Admin | User |
|---|---|---|---|
| 14 | ESC/P custom print environment expansion 1 setting | ○ |  |
|  | Zone select |  |  |
|  | Right margin specified value |  |  |
|  | Continuous paper length function |  |  |
|  | Continuous paper length setting |  |  |
|  | Single form length function |  |  |
|  | Single form length setting |  |  |
|  | Dash line skip function |  |  |
|  | Dash line skip setting |  |  |
|  | Character code table |  |  |
|  | Country letter select |  |  |
|  | Registration level |  |  |
|  | New line function |  |  |
| 15 | ESC/P custom print environment expansion 2 setting (only when option is installed) |  | ○ |
|  | Fixed line function |  |  |
|  | Fixed number of lines |  |  |
|  | Fixed columns |  |  |
|  | Fixed number of columns setting |  |  |
|  | Chinese character rate |  |  |
|  | Start-up macro setting |  |  |
|  | System overlay |  |  |
|  | System overlay setting |  |  |
|  | User overlay1 |  |  |
|  | User overlay2 |  |  |
|  | Ignore new line after HEX mode |  |  |
|  | HEX/LIPS function |  |  |
|  | LIPS fonn |  |  |
| 16 | ESC/P custom utility |  |  |
|  | Status print |  |  |
|  | Overlay print (only when option is installed) |  |  |

[Printer Feed/Eject Section Sheet (See FIG. 58)]

When the user selects the [Print Set] button on the Status sheet (FIG. 54) or clicks the tab shown as [Feed/Eject] on the upper part of the printer environment dialog box, the foremost sheet shown is the default sheet which is the Printer Paper Feed/Eject Sheet (FIG. 58). This Printer Paper Feed/Eject Sheet is for the user to make printer paper feed/eject settings for the device selected by the user.

Detailed Specifications

[Printer Exterior]: Display the printer exterior. The printer exterior design may change according to the paper deck, envelope feeder, and steeple stacker options that are installed. However option installations such as the dual-side unit, network interface board, expansion RAM, font ROM and control ROM do not affect the printer exterior design. When the user makes a selection other than "Auto"" in [Paper Feed (I)], a color is affixed to the feed section selected in [Paper Feed (I)]. When the user does make a selection from "Auto" in [Paper Feed (I)], a color is affixed to the feed section selected in [Auto Feed (K)]. A color is also assigned to the eject section selected by the user with [Paper Eject (O)].

[Paper Feed section (I)]: Displays the names of the paper feed section for selection by the user. The user makes a selection from among "Auto" "Paper feed tray" "Envelope feeder" "Upper cassette" "Lower cassette" and "Paper Deck". The "Paper deck" and the "Envelope Feeder" are only valid when installed as options.

[Auto Feed (K)]: Selects auto feed for the feed section selected by the user (multiple selection allowed). The user selects a plurality of feed sections from among: "Paper feed tray" "Upper cassette" "Lower cassette" and "Paper Deck". The "Paper deck" is only valid when installed as an option.

[Tray Priority (E)]: The user selects whether or not to assign a priority to the paper feed tray in auto feed. This [Tray Priority (E)] is only operable when "Paper Tray" was selected by the user in [Auto Feed (K)]. The user selects a priority (or not) for the paper feed tray during auto paper feed with ON or OFF.

[Tray Paper Size (S)]: The user selects a paper size for the tray with this item. This function is only valid when "Paper Tray" has been selected by the user in [Paper Feed (I)], or when "Auto" was selected in [Paper Feed (I)], or when the user selects "Paper Feed Tray" with [Auto Feed (K)]. The user selects the tray size from among "A5" "B5" "A4" "B4" "A3" "Letter(R)" "Legal" "Executive" "Free" and "User paper" "YOGATA 4GO" "KAKUGATA 2GO".

[Envelope Size (F)]: The user selects the envelope feeder size with this item. This is only valid when the envelope feeder option has been installed and the "Paper Feeder" selected with [Paper Feed (I)]. The user selects the envelope size from among "YOGATA 4GO" "Free" and "User Paper".

[Eject paper (O)] button: The user selects the paper eject section with this item. The user selects eject from the "Eject paper tray" or "Sub eject tray".

[OK] button: The user selects this button to validate the settings for the Printer Paper Feed/Eject Sheet (FIG. 58) and close the dialog box. The printer settings are updated (changed) when the user has made changes to the settings.

[Cancel] button: The user selects this button to invalidate the settings that were made in the Printer Paper Feed/Eject Sheet (FIG. 58) and close the dialog box.

[Update (A)] button: The user selects this button to update the printer settings that were made in the Printer Paper Feed/Eject Sheet (FIG. 58).

[Help (H)] button: The user selects this button to display the online help.

Operation with the [Update(A)] button is only valid when the user has made changes to the settings.

[Help] button: Displays online help.

[Shared Print Environment Basic Set Sheet (See FIG. 59)]

When the user clicks the [Share] tab on the upper side of the Printer Environment Set Dialog Box the Shared Print Environment Basic Set Sheet o FIG. 59 appears. This Shared Print Environment Basic Set Sheet is making basic settings to the shared print environment for the device selected by the user.

Detailed Specifications

[Copy sheet count (P)]: Sets the number of copy sheets in a range from 1–255.

[Super smooth (Z)]: The user selects whether or not to use the Super smooth function. The user selects with ON or OFF whether or not to use Super smooth.

[Toner economy mode (X)]: The user selects whether or not to use the toner economy mode. The user selects with ON or OFF whether or not to use toner economy mode.

[Toner contrast (N)]: The user selects the toner contrast in increments of 1–8.

[Data resolution]: The user selects data resolution (Fine (600 DPI) (Quick 300 DPI). The user selects the data resolution from among "Fine(G)" and "Quick(Q)".

[Doublesided Mode]: The user selects here whether or not to perform doublesided printing. The user selects doublesided mode from among "one-sided print (S)" and "double-sided print (D)". Doublesided printing (D) is only available when the doublesided unit option is installed.

[Binding width (B)]: The user enters a bind width (border for binding allowance) from −30.0–30.0 mm in 0.5 segments.

[Binding direction]: The user selects the binding direction here (direction of binding paper edge). The user selects the direction from among "Longitudinal (L)" and "Width-wise (W)".

[Expand (E)] button: The user selects the [Expand (E)] button to make expanded settings to the shared print environment on the opened Shared Print Environment Expansion Dialog Box (FIG. 63).

[Print adjust (C)] button: The user selects the [Print adjust (C)] button to open the Print Adjust Dialog Box (FIG. 67) and make print adjustment related settings.

[Operating mode (M)] button: The user selects this [Operating mode (M)] button to open the Print Operating Mode Dialog Box (FIG. 68) and set the print operating mode.

[OK] button: The user selects this button to validate the settings for the Shared Print Environment Basic Set Sheet (FIG. 59) and close the dialog box. The printer settings are updated (changed) when the user has made changes to the settings.

[Cancel] button: The user selects this button to invalidate the settings that were made in the Shared Print Environment Basic Set Sheet (FIG. 59) and close the dialog box.

[Update (A)] button: The user selects this button to update the printer settings that were made in the Shared Print Environment Basic Set Sheet (FIG. 59). This function is only valid when the user has made changes to the settings.

[Help (H)] button: The user selects this button to display the online help.

Figure 60:
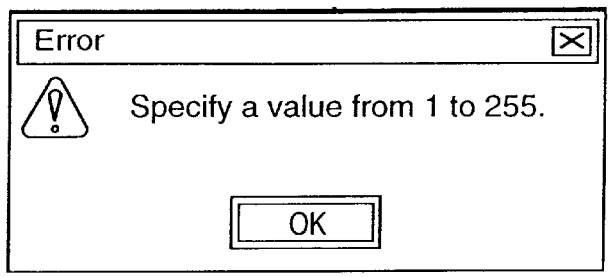
FIG. 60 is an illustration showing the sample message displayed when an entry outside the allowable range was made for "Copy Sheet Count (P)" of FIG. 59.
Figure 61:
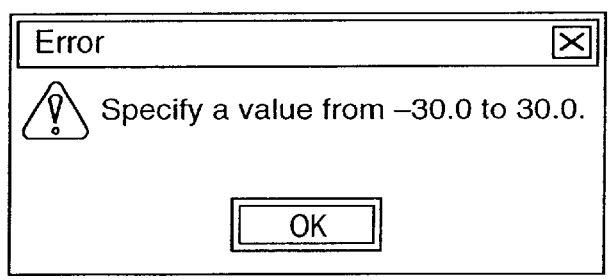
FIG. 61 is an illustration showing the sample message displayed when an entry outside the allowable range was made for "Bind Width (B)" of FIG. 59.
Figure 62:
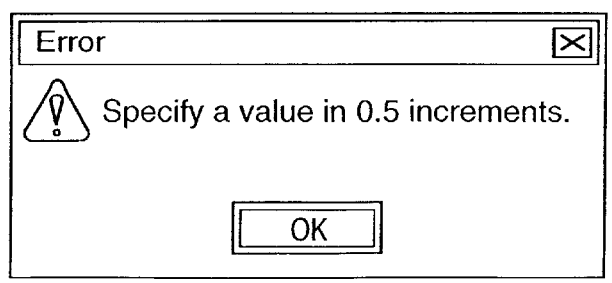
FIG. 62 is an illustration showing the sample message displayed when an entry not in a 0.5 segment was made for "Bind Width (B)" of FIG. 59.

Other operations:

In [Copy sheet count (P)] when the user enters a value other than 1 to 255, the message in FIG. 60 appears. and the display returns to the Printer Environmental Set Dialog Box. In [Binding Width(B)] when the user enters a value between −30.0 and 30.0 mm, the message in FIG. 61 appears and the display returns to the Printer Environmental Set Dialog Box. In [Binding Width(B)] when the user enters a value not in 0.5 increments between −30.0 and 30.0 mm, the message in FIG. 62 appears and the display returns to the Printer Environmental Set Dialog Box.

Detailed Specifications

[Default cassette paper size (C)]: The user selects the default cassette paper size with this item. The user selects the default cassette paper size from among "A5" "B5" "A4" "B4" and "A3".

[Paper direction]: The user selects the direction the paper is transported with this item. The user selects from "Longitudinal (L)" and "Width-wise (W)".

[Job time-out (T)]: The user selects whether or not a job time-out will be issued. The user selects from ON or OFF for setting whether time-out is issued. The user inputs the time at which the job time-out is issued. Also, the job time-out entry is only valid when made with [Job time-out (T)] and ON is selected. As the time for issuing the job time-out, the user enters a time from 5 to 300 seconds.

[Time until sleep (P)]: The user selects whether to shift to sleep mode with this item. The user selects ON or OFF depending on whether sleep mode is to be implemented. The user selects the time to shift to sleep mode. The time the user enters is only valid in when [Time until sleep (P)] is set with ON also selected. The user selects the time to shift to sleep mode from among "15 minutes" 30 minutes" or "60 minutes".

[Auto error skip (X)]: The user selects here whether to implement Auto error skip mode. The user selects ON or OFF as needed to implement (or not) the Auto error skip mode.

[Warning display (D)]: The user selects here whether to display a message when the user issues a warning (alarm). The user selects ON or OFF as needed to issue (or not issue) the display.

[Warning response]: The user selects here whether to continue or to stop printing when a warning (alarm) is issued. The user selects from among "Continue (K)" or "Stop (N)".

[Buzzer warning]: The user selects how buzzer warning will sound when an error (alarm) occurs. The user selects from "Once (F)" and "Continuous (O)".

[Language Display]: The user selects the language shown on the panel message. The user selects the message language from among "Japanese(J)" or "English(E)".

[Vertical offset (U)]: The user inputs here the amount of movement longitudinally in the print position. The user enters the movement amount in 0.5 segments from −50.0 to 50.0 mm.

[Horizontal offset (Y)]: The user inputs here the amount of movement horizontally in the print position. The user enters the movement amount in 0.5 segments from −50.0 to 50.0 mm.

[OK] button: The user selects this button to validate the settings that were entered in the Shared Print Environment Expansion Dialog Box (FIG. 63) and to close the dialog box. The printer settings are updated at this time.

[Cancel] button: The user selects this button to invalidate the settings that were made in the Shared Print Expansion Environment Dialog Box (FIG. 63) and close the dialog box.

[Update (A)] button: The user selects this button to update the printer settings made in the in the Shared Print Environment Expansion Dialog Box (FIG. 63). This [Update (A)] button can only be used when changes in the settings have been made by the user.

[Help (H)] button: The user selects this button to display the online help.

Figure 64:
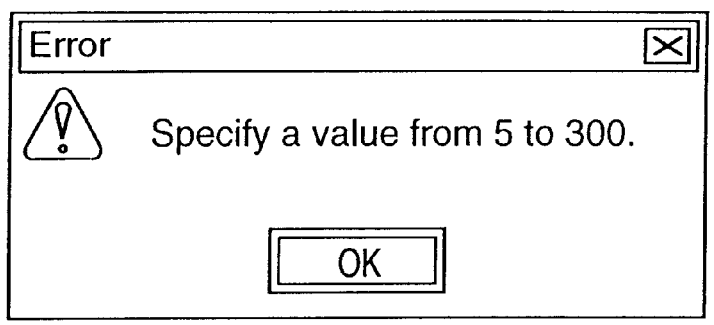
FIG. 64 is an illustration showing the sample message displayed when an entry outside the allowable range was made for "Job-Time Out (T)" of FIG. 63.
Figure 65:
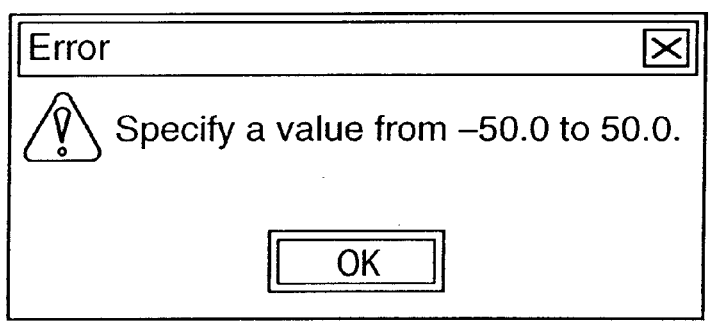
FIG. 65 is an illustration showing the sample message displayed when an entry outside the allowable range was made for "Vertical Correct (U)"—"Horizontal Correct (Y)" in FIG. 63.
Figure 66:
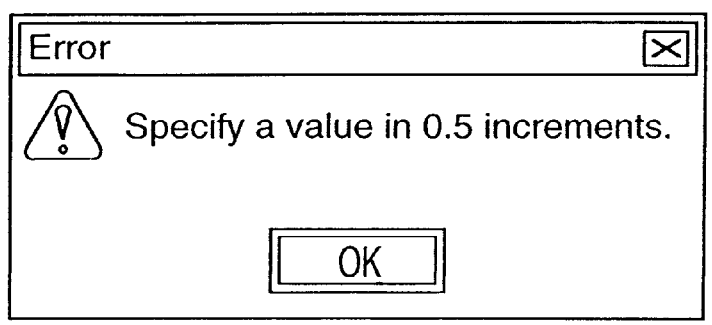
FIG. 66 is an illustration showing the sample message displayed when an entry outside the allowable range not in 0.5 segments was made in "Vertical Correct (U)"—"Horizontal Correct (Y)" in FIG. 63.

In [Job time-out (T)] when the user enters a value other than 5 to 300 seconds, the message in FIG. 64 appears. and the display returns to the Printer Environmental Set Dialog Box. In [Vertical offset (U)] or [Horizontal offset (Y)] when the user enters a value between −50.0 and 50.0 mm, the message in FIG. 65 appears and the display returns to the Shared Print Environment Expansion Dialog Box (FIG. 63). In [Vertical offset (U)] or [Horizontal offset (Y)] when the user enters a value not in 0.5 increments between −50.0 and 50.0 mm, the message in FIG. 66 appears and the display returns to the Printer Environmental Expansion Dialog Box (FIG. 63).

[Print Adjust Dialog Box (See FIG. 67)]

When the user selects the [Print Adjust] button on the Shared Print Environment Basic Set Sheet (FIG. 54), the Print Adjust Dialog Box shown in FIG. 67 appears. This Print Adjust Dialog Box (FIG. 67) is for the user to make settings relating to print adjustments for devices selected by the user.

Detailed Specifications

[MaxiMem(M)]: This allows the user to select whether or not to use band decompression during subclose for Fine mode (600 DPI). The user selects ON or OFF as needed to use (or not) band decompression during subclose for Fine mode (600 DPI).

[Band control (B)]: The user selects whether or not to use band processing as the data processing method. The user selects from ON or OFF to choose whether to use band control.

[Print assurance memory (P)]: The user selects print assurance memory for Fine mode (600 DPI) data processing. The user selects from among "Auto" "Do Not Use" "A4" "B4-" ""B4" "A3" "B4×2" "A3×2" "B4×3" "A3×3" for Fine mode (600 DPI) data processing with print assurance memory. The values capable of being set into the print assurance memory vary depending on the total RAM capacity as shown below.

| Total RAM capacity | Auto | Do Not Use | A4 | B4- | B4 | A3 | B4 × 2 | A3 × 2 | B4 × 3 | A3 × 3 |
|---|---|---|---|---|---|---|---|---|---|---|
| 8MB (standard) | ○ | ○ | ○ | ○ | X | X | X | X | X | X |
| 12MB (+4MB) | ○ | ○ | ○ | ○ | ○ | ○ | X | X | X | X |
| 16MB (+8MB) | ○ | ○ | ○ | ○ | ○ | ○ | ○ | X | X | X |
| 20MB (+12MB) | ○ | ○ | ○ | ○ | ○ | ○ | ○ | ○ | X | X |
| 24MB (+16MB) | ○ | ○ | ○ | ○ | ○ | ○ | ○ | ○ | ○ | X |
| 28MB (+20MB) | ○ | ○ | ○ | ○ | ○ | ○ | ○ | ○ | ○ | X |
| 32MB (+24MB) | ○ | ○ | ○ | ○ | ○ | ○ | ○ | ○ | ○ | ○ |
| 40MB (+32MB) | ○ | ○ | ○ | ○ | ○ | ○ | ○ | ○ | ○ | ○ |

[System work memory (S)]: The user selects here a memory capacity suitable for use as a work memory. The user selects from among "Auto" "200K" "400K" "600K" "1000K" as usable work memories. Some work memory settings may not be possible due to the memory environment of the printer.

[Image quality warning] The user selects whether to stop or to continue printing when the resolution and image quality deteriorates. The user selects from "Continue (K)" or "Stop (N)" when image quality has deteriorated.

[Halftone adjust]: The user selects this pattern during conversion from a multi to a binary value. The user selects the pattern, from "Pattern1 (R)" "Pattern2 (G)" during conversion to the binary pattern.

[OK] button: The user selects this button to validate settings made in the Print Adjust Dialog Box (FIG. 67) and then close the dialog box. The printer settings are updated at this point, when the user has made changes to the settings.

[Cancel] button: The user selects this button to invalidate the settings that were made in the Print Adjust Set Dialog Box (FIG. 67) and close the dialog box.

[Update (A)] button: The user selects this button to update the printer settings made in the in the Print Adjust Set Dialog Box (FIG. 67). This [Update (A)] button can only be used when changes in the settings have been made by the user.

[Help (H)] button: The user selects this button to display the online help.

[Print Operation Mode Dialog Box (FIG. 68)]

When the user selects the [Operation mode] button from shared print environment set sheet (FIG. 59), the Print Operation Mode Dialog Box of FIG. 68 appears. This Print Operation Mode Dialog Box is for the user to set the print operating mode for the device selected by the user.

Detailed Specifications

[Operating mode (M)]: This user selects the operating mode with this item. The user selects the operating mode from among; "LIPS" "N201" "ESC/P" "HEX-DUMP" and "LIPS-DUMP".

[Auto emulation (S)]: The user selects an emulator subject to auto emulation (a plurality can be selected). This [Auto emulation (S)] can only be selected when "Auto" has been selected in [Operating Mode (M)]. The user selects a plurality of emulators subject to auto emulation from among "LIPS "N201" and "ESC/P".

[Priority operation emulation (E)]: The user assigns emulation priority with this item during auto emulation. This [Priority operation emulation (E)] is only valid when "Auto" has been selected in [Operating Mode (M)]. The user selects the auto emulation for priority from among "LIPS" "N201" and "ESC/P".

[OK] button: The user selects this button to validate settings made in the Print Operation Mode Dialog Box (FIG. 68) and then close the dialog box. The printer settings are updated at this point, when the user has made changes to the settings.

[Cancel] button: The user selects this button to invalidate the settings that were made in the Print Operation Mode Dialog Box (FIG. 68) and close the dialog box.

[Update (A)] button: The user selects this button to update the printer settings made in the Print Operation Mode Dialog Box (FIG. 68). This [Update (A)] button can only be used when changes in the settings have been made by the user.

[Help (H)] button: The user selects this button to display the online help.

[LIPS Print Environment Basic Set Sheet (See FIG. 69)]

When the user clicks the tab indicating [LIPS] on the upper side of the LIPS Print Environment Basic Environment Dialog Box, LIPS Print Environment Basic Set Sheet (See FIG. 69) appears. This LIPS Print Environment Basic Set Sheet (See FIG. 69) is a sheet for the user to set the basic LIPS print environment for the device selected by the user.

Detailed Specifications

[Enlarge/Reduce (R)]: The user selects the enlarge/reduce mode for LIPS with this item. The user selects from among "Do Not Use" "→A3" "→B4" "→A4" "→B5" "→A5" "→Legal" and "→Letter" for the enlarge/reduce mode.

[Multiple page printing (N)]: The user selects multiple page printing for LIPS with this item. The user selects from among "Do Not Use" "2-Page left" "2-Page right" "4-Page side left" "4-Page side right" "4-Page vertical left" and "4-Page vertical right" for multiple page printing mode with LIPS.

[Print direction]: The user selects this item to set the LIPS printing direction.

The user sets the LPS printing direction from among Portrait (P)" and "Landscape (L)".

[Chinese character code (K)]: The user selects the Chinese character code for LIPS with this item. The user selects from among "JIS" "SJIS" "EUC" and "DEC" for the Chinese character code.

[Character size (S)]: The user selects the LIPS character size with this item. The user selects from among "8 Point" "10 Point" and "12 Point" for the LIPS character size.

[Chinese character style (J)]: The user selects the LIPS character style with this item, from among "Gothic" and others.

[ANK style (I)]: The user selects the ANKS style for LIPS with this item, from among "Gothic" "Line Printer" and others.

[Expand (E)] button: This button opens the LIPS print environment expansion dialog box shown in FIG. 70 for making environment expansion settings of the LIPS print environment.

[Utility (U)] button: This button opens the LIPS utility dialog box shown in FIG. 74 for implementing the LIPS utility.

[OK] button: The user selects this button to validate settings made in the LIPS Print Environment Basic Set Sheet (FIG. 69) and then close the dialog box. The printer settings are updated at this point, when the user has made changes to the settings.

[Cancel] button: The user selects this button to invalidate the settings that were made in the LIPS Print Environment Basic Set Sheet (FIG. 69) and close the dialog box.

[Update (A)] button: The user selects this button to update the printer settings made in the LIPS Print Environment Basic Set Sheet (FIG. 69). This

[Update (A)] button can only be used when changes in the settings have been made by the user.

[Help (H)] button: The user selects this button to display the online help.

[LIPS Print Environment Expansion Set Dialog Box (See FIG. 70)]

Pressing the [Expand] button on the LIPS Print Environment Basic Set Sheet (FIG. 69) shows the LIPS Print Environment Expansion Set Dialog Box on FIG. 70. This LIPS Print Environment Expansion Set Dialog Box (FIG. 70) is for setting the details of the LIPS print environment on the device selected by the user.

Detailed Specifications

[Number of lines]: The user selects the page line set mode for one page of LIPS with this item. The user selects the LIPS page line set mode for one page from among "6LPI (B)" "8LPI (G)" and "Set number of lines (L)".

[Set number of lines (L)]: The user enters the number of lines for one page of LIPS with this item. This [Set number of lines (L)] is only valid when "Set number of lines" has been selected with [No. of lines] by the user. The user enters from 10–99 lines here in one line increments.

[Number of columns]: The user selects the number of columns mode for one page of LIPS with this item. This number of columns mode is selected for one page from among "Auto(V)" "10CPI(I)" "12CPI(M)" "15CPI(F)" "Number of columns set (C)".

[Set number of columns (C)]: The user enters the number of columns for one page of LIPS with this item. This function is only valid when [Set number of columns (C)] in [Number of columns] is used. The user sets the number of columns from 10–200 columns.

[Auto new page (P)]: The user sets here whether to use automatic new page function in LIPS. Uses sets ON or OFF to select use (or not) of automatic new page function in LIPS.

[Auto new line (D)]: The user sets here whether to use automatic new line function in LIPS. Uses sets ON or OFF to select use (or not) of automatic new line function in LIPS.

[LF function]: The user sets here whether to use the LF function in LIPS. The user selects the LF function for LIPS from among "LF(U) and "LF+CR(R)".

[CR function]: The user sets here whether or not to use the CR function in LIPS. The user selects the CR function for LIPS from among "CR(J) and "CR+LF(E)".

[Auto paper save (W)]: The user sets here whether to use automatic paper save function in LIPS. Uses sets ON or OFF to select use (or not) of automatic paper save function in LIPS.

[Time-out control (T)]: The user sets here whether to use time-out control function in LIPS. Uses sets ON or OFF to select use (or not) of the time-out control function in LIPS.

[Chinese character graphic set]: The user sets here whether or not to use Chinese character graphic set in LIPS. The user selects the Chinese character graphic set for LIPS from among "JIS78(O) and "JIS90(N)".

[Crosshatch resolution] The user selects crosshatch resolution for LIPS with this item. The user selects from among "Fine(X) and "Quick(Y)" for crosshatch resolution.

[Start-up macro (S)]: The user inputs here the start-up macro number desired for implementing with LIPS. The user inputs a desired macro number from 0 through 32767.

[Overlay1 (K)]: The user selects whether or not to implement the overlay print1 on LIPS. The user sets ON or OFF to select use (or not) of the overlay print1 function in LIPS. The user enters the format data number for use with Overlay Print1. This function is valid only when the number is input with [Overlay1 (K)] set at ON by the user. The user enters numbers 0–32767 as format data numbers for using the Overlay Print1.

[Overlay2 (Q)]: The user selects whether or not to implement the Overlay Print2 on LIPS. The user sets ON or OFF to select use (or not) of the Overlay Print2 function in LIPS. The user enters the format data number for use with Overlay Print2. This function is valid only when the number is input with [Overlay2 (Q)] set at ON by the user. The user enters numbers 0–32767 as format data numbers for using the Overlay Print2.

[OK] button: The user selects this button to validate settings made in the LIPS Print Expansion Environment Set Sheet (FIG. 70) and then close the dialog box. The printer settings are updated at this point, when the user has made changes to the settings.

[Cancel] button: The user selects this button to invalidate the settings that were made in the LIPS Print Expansion Environment Set Sheet (FIG. 70) and close the dialog box.

[Update (A)] button: The user selects this button to update the printer settings made in the LIPS Print Expansion Environment Set Sheet (FIG. 70). This [Update (A)] button can only be used when changes in the settings have been made by the user.

[Help (H)] button: The user selects this button to display the online help.

Figure 71:
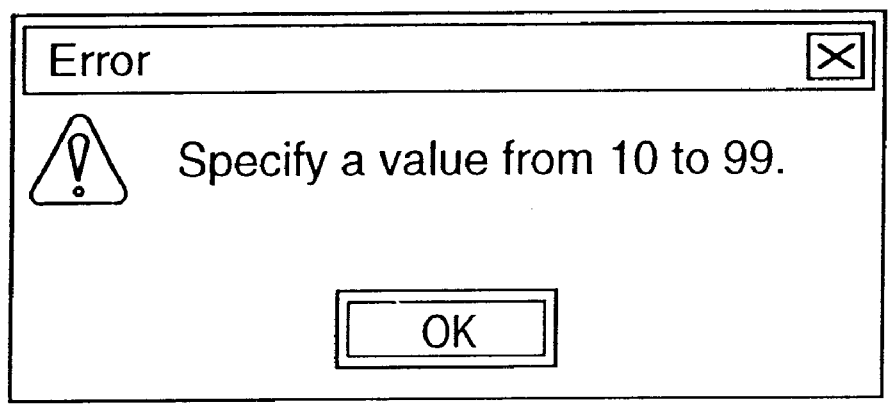
FIG. 71 is an illustration showing the sample message when an entry outside the allowable range was made in "Line Count (L)" of FIG. 70.
Figure 72:
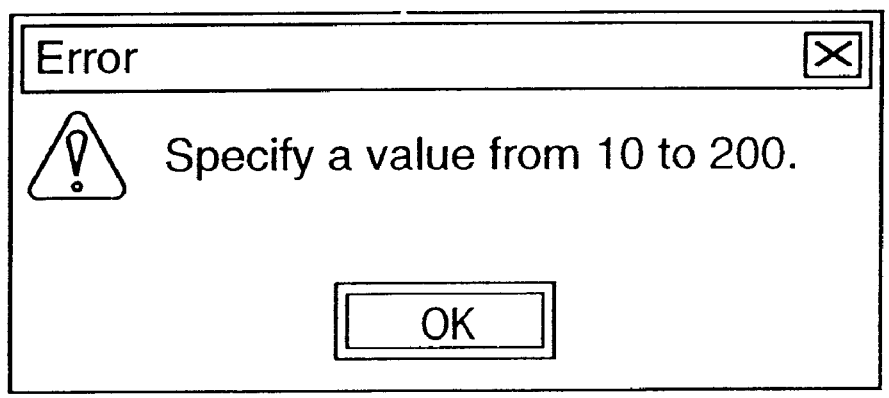
FIG. 72 is an illustration showing the sample message when an entry outside the allowable range was made in "Row Count (L)" of FIG. 70.

Other operations:

In [Set number of lines (L)] when the user enters a value other than 10 to 99, the message in FIG. 71 appears. and the display returns to the LIPS Print Expansion Environment Dialog Box. In [Set number of columns (C)] when the user enters a value between 10 and 200 columns, the message in FIG. 72 appears and the display returns to the LIPS Print Expansion Environment Dialog Box. In [Start-up macro (S)] or [Overlay1 (K)] or

Figure 73:
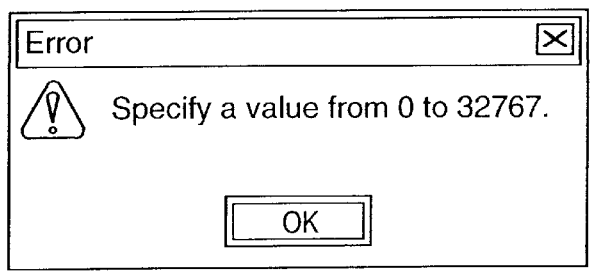
FIG. 73 is an illustration showing the sample message when an entry outside the allowable range was made in "Start-Up Macro" "Overlay1" "Overlay2"in FIG. 70.

[Overlay2 (Q)] when the user enters a value not between 0 and 32767, the message in FIG. 73 appears and the display returns to the LIPS Print Expansion Environment Dialog Box.

[LIPS Utility Dialog Box (See FIG. 74)]

When the user selects the [Utility] button on the LIPS Print Environment Basic Sheet (FIG. 69), the LIPS Utility Dialog Box of FIG. 74 appears. This LIPS Utility Dialog Box is for implementing the LIPS utility for the device that the user selected.

Detailed Specifications

[Status print (S)]: Implements the LIPS status print when selected by the user. The LIPS status print is implemented after being set online.

[Overlay print (O)]: Implements the LIPS overlay print when selected by the user. The LIPS overlay print is implemented after being set online.

[Overlay list (V)]: Prints out the LIPS overlay list when selected by the user. The LIPS overlay list is printed after being set online.

[Font list (F)]: Outputs the LIPS font list when selected by the user. The LIPS font list is output after being set online.

[Macro list (M)]: Outputs the LIPS macro list when selected by the user. The LIPS macro list is output after being set online.

[OK] button: The user selects this button to close the dialog box.

[Help (H)] button: The user selects this button to display the online help.

Figure 75:
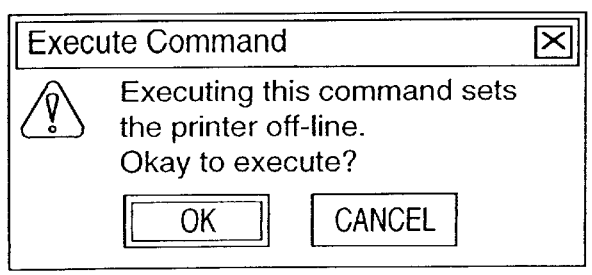
FIG. 75 is an illustration showing the sample message displayed when the printer is in on-line status when the "Status Print" "Overlay Print" "Overlay List" "Font List" or "Macro List" buttons are pressed.

Other operations:

When the user selects the [Status print (S)] or [Overlay print (O)] or [Overlay list (V)] or [Font list (F)] or [Macro list (M)] buttons with the printer set online, the message in FIG. 75 appears. When the user selects the [OK] button and implements the target utility, the display returns to the LIPS Utility Dialog Box (FIG. 74). When the user selects the [Cancel] button, the display returns to the LIPS Utility Dialog Box (FIG. 74) with no other operations performed.

[N201 Print Environment Basic Set Sheet (FIG. 76)]

When the user clicks the tab indicating [N201] on the upper part of the Printer Environment Set Dialog Box, the N201 Print Environment Basic Set Sheet appears as shown in FIG. 76. This N201 Print Environment Basic Set Sheet (FIG. 76) is for setting the N201 basic print environment for the device the user has selected.

Detailed Specifications

[Page format (P)]: The user selects the N201 page format with this item. The user selects from "Actual size (Vertical)" "Actual size (Horizontal)" "10"→A4Vert, "15"→A4Horiz, "15"→B4Horiz., "⅔Vert", "⅔Horiz." for the N201 page format.

[Paper position]: The user selects the N201 paper position here. The user selects from "Center(Y)" and "Left(L)" as the N201 paper position.

[Upper border(W)]: The user inputs the N201 upper border here. The user inputs from −127 to 127 as the N201 upper border.

[Paper position fine adjust (B)]: The user inputs the N201 paper position (left-right fine adjust value) here. The user inputs from −127 to 127 as the N201 paper position.

[Image offset (I)]: The user selects whether or not to correct image data on the N201 with this item. The user sets ON or OFF to select use (or not) of correction of image data on LIPS.

[Paper size (D)]: The user selects the N201 paper size. The user selects the N201 paper size from among "Current paper size" "A3" "B4" "A4" "B5" and "A5".

[2-page print set (N)]: The user selects whether or not to 2-page printing on the N201 with this item. The user sets "Do not use "Left" or "Right" for 2-page printing on the N201.

[Chinese character style (J)]: The user selects the Chinese character style for the N201 with this item. The user selects from among "Mincho" "Gothic" "Round Gothic" and "ID2" for the N201 Chinese character style.

[Font ID (E)]: This item is only valid when "ID" was selected in [Chinese character style (J)]. The user enters the font ID for the Chinese character style option on the N201 as a value between 1 and 999.

[Chinese character size (S)]: The user selects the Chinese character size for the N201 with this item. The user selects the Chinese character size on the N201 from among "System" "8 Point" "10 Point" and "12 Point".

[External character size]: The user selects the External character size for use on the N201 with this item. The user selects the External character size on the N201 from among "10.8 Point (G)" and "10 Point (M)".

[Graphic]: The user selects the N201 graphic dot pitch with this item. The user selects the graphic dot pitch for the N201 from among "Native (Q)" and "Copy (R)".

[Expansion1 (K)] button: The user uses this button to open the N201 Print Environment Expansion1 Dialog Box (FIG. 79) for making expansion setting(1) of the N201 print environment.

[Expansion2 (X)] button: The user uses this button to open the N201 Print Environment Expansion2 Dialog Box (FIG. 82) for making expansion setting(2) of the N201 print environment.

[Utility (U)] button The user uses this button to open the N201 Utility Dialog Box (FIG. 86) for implementing the N201 utility.

[OK] button: The user selects this button to validate settings made in the N201 Print Environment Basic Set Sheet (FIG. 76) and then close the dialog box. The printer settings are updated at this point, when the user has made changes to the settings.

[Cancel] button: The user selects this button to invalidate the settings that were made in the N201 Print Environment Basic Set Sheet (FIG. 76)) and close the dialog box.

[Update (A)] button: The user selects this button to update the printer settings made in the N201 Print Environment Basic Set Sheet (FIG. 76). This [Update (A)] button can only be used when changes in the settings have been made by the user.

[Help (H)] button: The user selects this button to display the online help.

Figure 77:
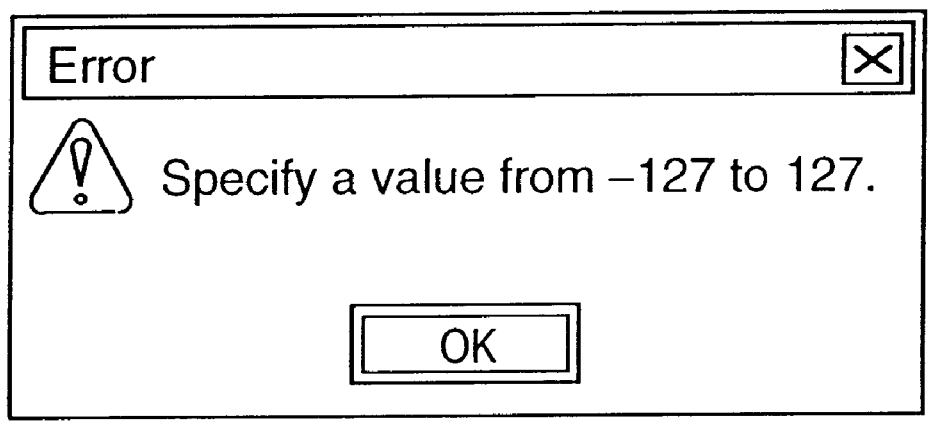
FIG. 77 is an illustration showing the message displayed when an entry outside the allowable range was made in "Upper Border (W)" "Paper Position Fine Adjust (B)" in FIG. 76.
Figure 78:
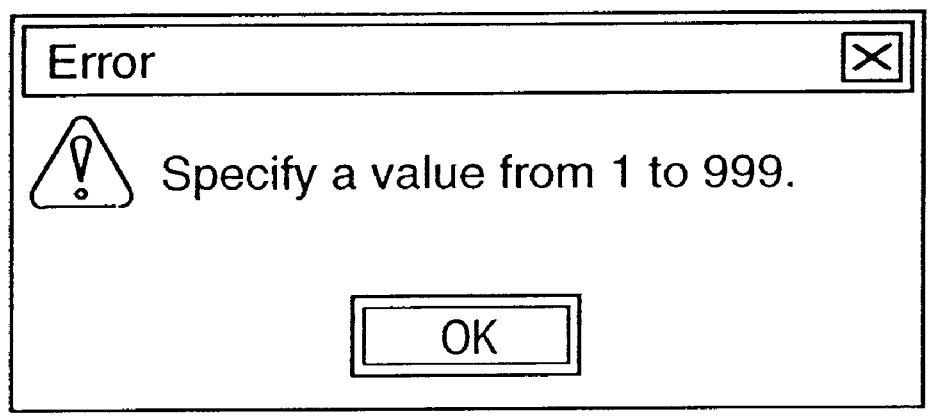
FIG. 78 is an illustration showing the message displayed when an entry outside the allowable range was made in "Font ID".

Other operations:

When the user inputs a value other than −127 to 127 in [Upper border(W)] or in [Paper position fine adjust (B)], then the message in FIG. 77 appears and the display returns to the Printer Environment Set Dialog Box. When the user inputs a value other than 1 through 999 in [Font ID (E)], the message in FIG. 78 appears and the display returns to the Printer Environment Set Dialog Box.

[N201 Print Environment Expansion1 Dialog Box (FIG. 79)]

When the user clicks the [Expandl] button on the N201 Print Environment Basic Set Sheet (FIG. 76),the N201 Print Environment Expansion1 Dialog Box (FIG. 79) appears. This N201 Print Environment Expansion1 Dialog Box (FIG. 79) is for making detailed N201 basic print environment settings for the device the user has selected.

Detailed Specifications

[Zone]: The user selects the N201 print zone mode with this item. The user selects the N201 print zone mode from among "Standard (Q)" and "Wide (W)".

[Right margin]: The user selects the right margin position for the N201 with this item. The user selects the N201 right margin position from among "136col.(Y)" and "Right edge (R)".

[Single form length (S)]: The user selects here whether or not to specify the page length of cut paper in N201. The user selects this function (or not) by selecting ON or OFF.

[Dash line skip (M)]: The user inputs here the number of lines to skip from the bottom edge in N201. The user enters from 0 to 197 lines.

[Paper length (L)]: The user selects here whether or not to specify page length during reset in N201. The user selects this function (or not) by selecting ON or OFF.

[Paper length set (D)]: The user enters here the page length of the continuous paper form and the cut paper form in the N201. This can only be selected when

[Paper length set (D)] is set to ON in [Paper length (L)] by the user. The user inputs the page length of the continuous or cut paper in a figure from 1 to 199 lines.

[Register level]: The user selects here the level to store the registration characters in N201. The user selects from "Permanent (P)" and "Temporary (T)" for the level to store the registration characters in N201.

[Zero style]: The user selects [0] style half-size characters on N201. The user selects from "No slash 0 (E)" and "Slash 0 (F)".

[Country letter]: The user selects a character set suitable for matching 1 byte codes matching letters used in different countries. The user selects from among "Japan" "America" "England" "Germany" and "Sweden".

[Chinese character graphic set]: The user selects the Chinese character graphic set used by a JIS code in N201. The user selects this JIS code from among JIS78 (O) and JIS90 (N).

[CR function]: The user selects the print position movement method during reception of the return code (CR) in N201. The user selects from "Return only (G)" and "Return/New line" (J).

[Print command]: The user selects the print start command forming the control code in the N201. The user selects the control code from among "CR only (V)" and "CR and so on (K)".

[Buffer file]: The user selects operation when the print position has exceeded the right margin in the N201. The user selects the operation from among "Return/New line" (I)" and "Return only (U)" on N201.

[OK] button: The user selects this button to validate settings made in the N201 Print Environment Expansion1 Dialog Box (FIG. 79) and then close the dialog box. The printer settings are updated at this point, when the user has made changes to the settings.

[Cancel] button: The user selects this button to invalidate the settings that were made in the N201 Print Environment Expansion1 Dialog Box (FIG. 79) and close the dialog box.

[Update (A)] button: The user selects this button to update the printer settings made in the N201 Print Environment Expansion1 Dialog Box (FIG. 79). This [Update (A)] button can only be used when changes in the settings have been made by the user.

[Help (H)] button: The user selects this button to display the online help.

Figure 80:
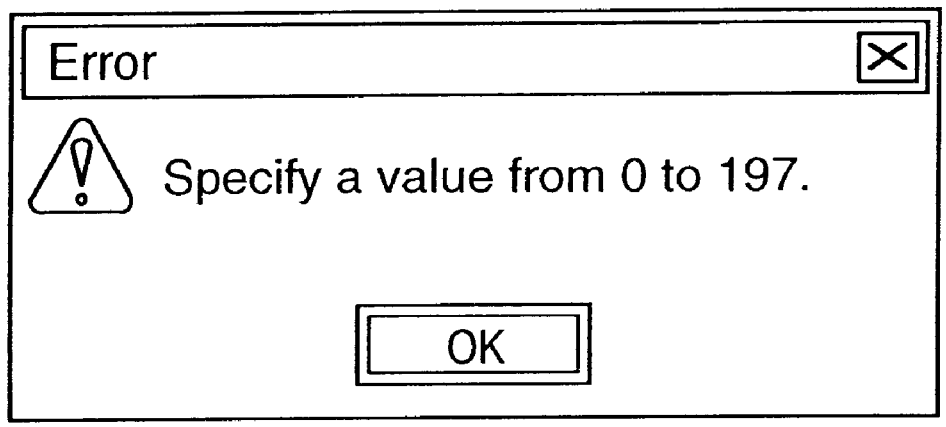
FIG. 80 is an illustration showing the message displayed when an entry outside the allowable range was made in "Dotted Line Skip (M)" of FIG. 79.
Figure 81:
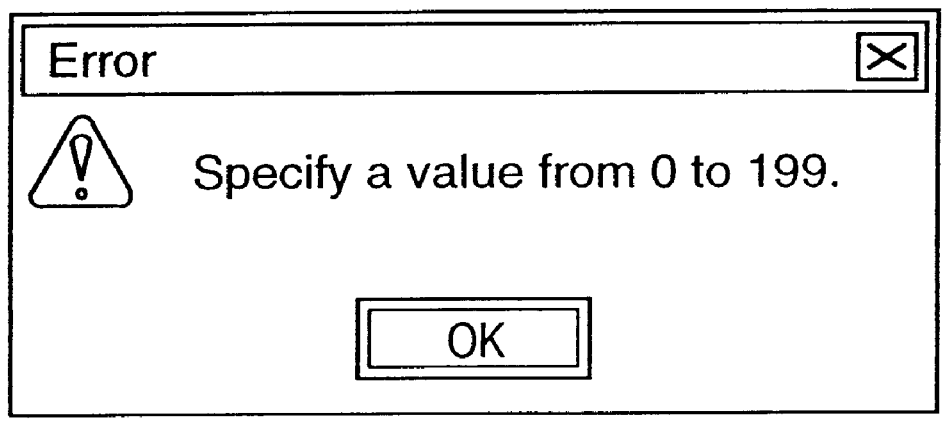
FIG. 81 is an illustration showing the message displayed when an entry outside the allowable range was made in "Paper Length (D)" of FIG. 79.

Other operations:

In [Dash line skip (M)], the message in FIG. 80 appears when a value other than from 0 to 197 is input and the display returns to the N201 Print Environment Expansion1 Dialog Box (FIG. 79). In [Paper length set (D)] when the user inputs a value other than 1 to 199 then the message shown I FIG. 81 appears and the display returns to the N201 Print Environment Expansion1 Dialog Box (FIG. 79).

[N201 Print Environment Expansion2 Dialog Box (FIG. 82)]

When the user clicks the [Expand2] button on the N201 Print Environment Basic Set Sheet (FIG. 76), the N201 Print Environment Expansion2 Dialog Box (FIG. 82) appears. This N201 Print Environment Expansion2 Dialog Box (FIG. 82) is for making detailed N201 basic print environment settings for the device the user has selected.

Detailed Specifications

[Fix line (L)]: The user selects whether or not to use the fix line function for N201. The user selects with ON or OFF whether to use this function.

[Fixed number of lines (E)]: The user here inputs the fixed number of lines for the Fix Line function in N201. This function is only valid when the user has set ON in [Fix line (L)]. The user inputs a value from 1 to 400 lines as the fixed number of lines for use in this function.

[Fixed columns (C)]: The user selects whether or not to use the fixed column function in N201 here. The user selects with ON or OFF whether to use this function.

[Fixed number of columns set (N)]: The user inputs the number of fixed columns for this function in N201. This [Fixed number of columns set (N)] function is only valid when the user has set ON in [Fixed columns (C)]. The user inputs a value from 10 to 400 columns as the fixed column value in N201.

[OCR font (F)]: The user selects the OCR font for use in N201. The user selects from "Do not use "OCR-B" "OCR-A" "OCR-B+OCR-kana" "OCR-A+OCR-kana".

[New line width (D)]: The user selects the new line width for N201 here. The user selects from "3LPI" "4LPI" "6LPI" and "8LPI".

[Chinese character rate (R)]: The user selects here the Chinese character rate for use in N201. The user selects from among "2/1" "3/2" "4/3" "5/3" and "1/1".

[Start-up macro (M)]: The user enters here the number of the start-up macro to implement on N201. The user inputs a start-up macro number from 0 to 255.

[System overlay1 (O)]: The user selects here whether or not to implement the system overlay print in N201. The user selects with ON or OFF whether to use this System overlay1 (O) function. This format data number is only valid when ON has been selected in

[System overlay1 (O)]. The user enters the format data number for using the system overlay print selected by the user. The user inputs a value from 1 to 5 as the format data number for using the system overlay print function.

[The user overlay1 (U)]: The user selects here whether or not to implement the user overlay print1 in N201. The user selects whether or not to implement in N201 by selecting ON or OFF.

[The user overlay2 (V)]: The user selects here whether or not to implement the user overlay print2 in N201. The user selects whether or not to implement in N201 by selecting ON or OFF.

[Ignore new line after HEX (I)]: The user selects here whether or not to set ignoring of new line after HEX mode in N201. The user selects this function (or not) by selecting ON or OFF.

[HEX/LIPS (X)]: The user selects here whether or not to use the HEX/LIPS function in N201. The user selects this function (or not) by selecting ON or OFF.

[LIPS form]: The user selects the LIPS form for N201 with this item. The user selects from among "LIPS2(P)" and "LIPS4(P)" as the LIPS form in N201.

[OK] button: The user selects this button to validate settings made in the N201 Print Environment Expansion2 Dialog Box (FIG. 82) and then close the dialog box. The printer settings are updated at this point, when the user has made changes to the settings.

[Cancel] button: The user selects this button to invalidate the settings that were made in the N201 Print Environment Expansion2 Dialog Box (FIG. 82) and close the dialog box.

[Update (A)] button: The user selects this button to update the printer settings made in the N201 Print Environment Expansion2 Dialog Box (FIG. 82). This

[Update (A)] button can only be used when changes in the settings have been made by the user.

[Help (H)] button: The user selects this button to display the online help.

Figure 83:
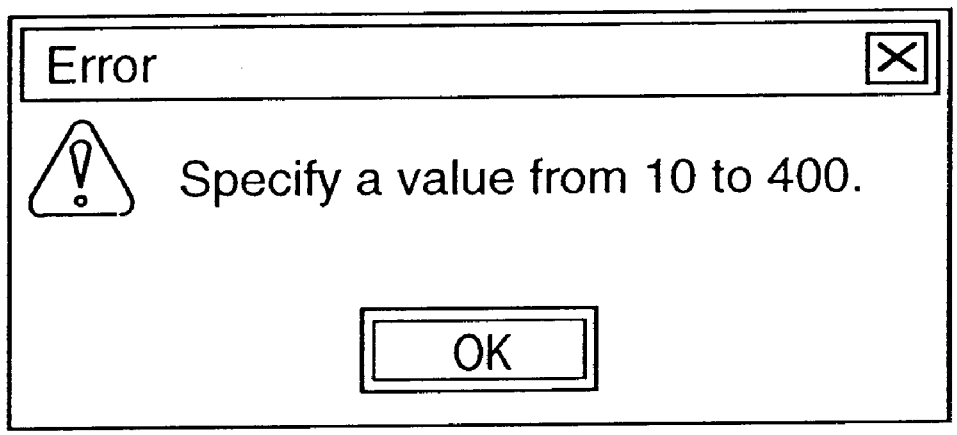
FIG. 83 is an illustration showing the message displayed when an entry outside the allowable range was made in "Fixed Line Count (E)"—"Fixed Row Count (N)" in FIG. 82.
Figure 84:
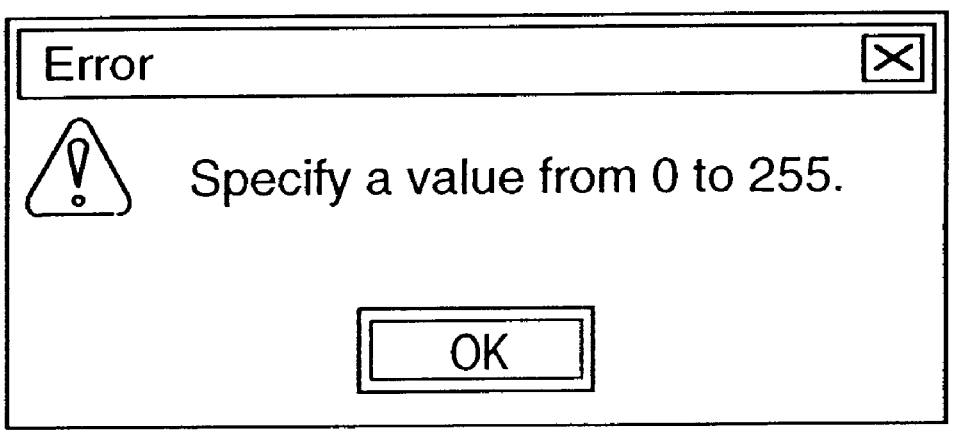
FIG. 84 is an illustration showing the message displayed when an entry outside the allowable range was made in "Start-Up Macro (M)" in FIG. 82.
Figure 85:
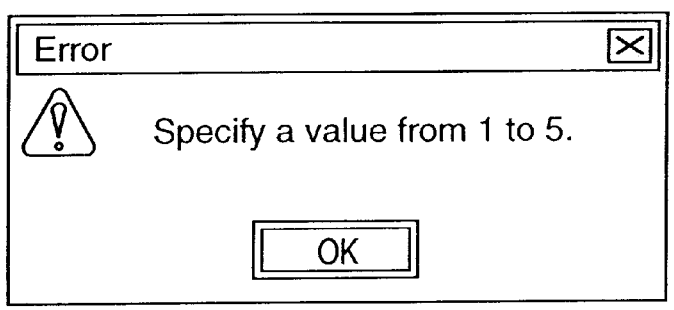
FIG. 85 is an illustration showing the message displayed when an entry outside the allowable range was made in "System Overlay (0)" in FIG. 82.

Other operations:

When the user enters a value other than 10 to 400 for [Fixed number of lines] or [Fixed columns], the message in FIG. 83 appears and the display returns to the N201 Print Environment Expansion2 Dialog Box (FIG. 82). When the user enters a value other than 0 to 255 in the [Start-up macro (M)] the message in FIG. 84 appears and the display returns to the N201 Print Environment Expansion2 Dialog Box (FIG. 82). When the user enters a value other than 1 to 5 in [System overlay (O)], the message in FIG. 85 appears and the display returns to the N201 Print Environment Expansion2 Dialog Box (FIG. 82).

[N201 Utility Dialog Box (See FIG. 86)

The N201 Utility Dialog Box shown in FIG. 86 appears when the user clicks the [Utility] button of the N201 Print Environment Basic Set Sheet (FIG. 76). This N201 Utility Dialog Box (FIG. 86) is for implementing the N201 utility for the device selected by the user.

Detailed Specifications

[Status print (S)] button: The user selects this item to implement the status print for N201. Status print is implemented after setting the N201 online.

[Overlay print (O)] button: The user selects this item to implement the overlay print for N201. Overlay print is implemented after setting the N201 online.

[OK] button: The user selects this button to close the dialog box.

[Help (H)] button: The user selects this button to display the online help.

Figure 87:
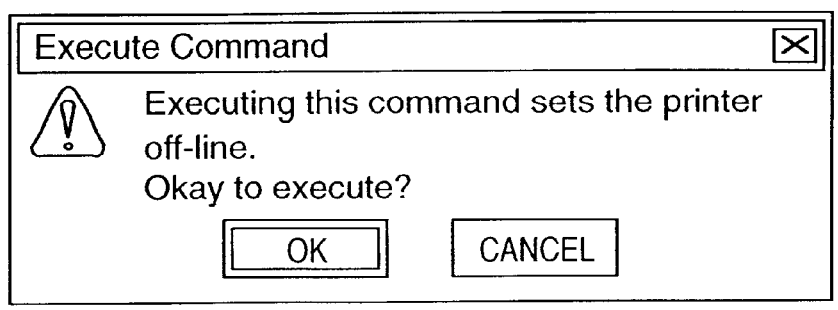
FIG. 87 is an illustration showing the message displayed when the printer is on-line when the "Status Print (S)"—"Overprint(O)" buttons are pressed in FIG. 86.

Other operations:

When the user selects the [Status print (S)] or [Overlay print (O)] buttons with the printer set online, the message in FIG. 87 appears. When the user selects the [OK] button and implements the target utility, the display returns to the N201 Utility Dialog Box (FIG. 86). When the user selects the [Cancel] button, the display returns to the N201 Utility Dialog Box (FIG. 86) with no other operations performed.

[ESC/P Print Environment Basic Set Sheet (See FIG. 88)]

When the user clicks the [ESC/P] on the upper part of the Printer Environment Set Dialog Box, the ESC/P Print Environment Basic Set Sheet of FIG. 88 appears. The ESC/P Print Environment Basic Set Sheet (FIG. 88) is for setting the basic ESC/P print environment for the device selected by the user.

Detailed Specifications

[Page format (P)]: The user selects the ESC/P page format with this item. The user selects from "Actual size (Vertical)" "Actual size (Horizontal)" "10"→4Vert", "15"→A4Horiz", "15"→B4Horiz.", "B4"→A4Vert." and "B4"→A4Horiz." for the ESC/P page format.

[Upper border (W)]: The user inputs the ESC/P upper border here. The user inputs from −127 to 127 as the upper border.

[Paper position fine adjust (B)]: The user inputs the ESC/P paper position (left-right fine adjust value) here. The user inputs from −127 to 127 as the ESC/P paper position.

[Reduce print (I)]: The user selects here whether or not to reduce the print character size for ESC/P. The user makes this selection by choosing ON or OFF.

[Image offset (M)]: The user selects here whether or not to correct image data for ESC/P. The user makes this selection by choosing ON or OFF.

[Paper size (D)]: The user selects the paper size for ESC/P here. The user selects from "Current paper" "A3" "B4" "A4" "B5" and "A5".

[2-page print set (N)]: The user selects whether or not to 2-page printing on the ESC/P with this item. The user sets "Do not use "Left" or "Right" for 2-page printing on the ESC/P.

[Chinese character style (J)]: The user selects the Chinese character style for ESC/P with the [Chinese character style (J)]. The user selects from among "Mincho" "Gothic" "Round Gothic" and "ID" for the ESC/P Chinese character style.

[Font ID (E)]: The user enters the font ID for ESC/P for the Chinese character style here. This item is only valid when "ID" was selected in [Chinese character style (J)]. The user enters the font ID for the Chinese character style option on the ESC/P as a value between 1 and 999.

[Chinese character size (S)] The user selects the Chinese character size for the ESCIP with this item. The user selects the Chinese character size on the ESCIP from among "System" "8 Point" "10 Point" and "12 Point".

[Expansion1 (K)] button: The user uses this button to open the ESC/P Print Environment Expansion Dialog Box (FIG. 91) for making expansion setting(1) of the ESC/P print environment.

[Expansion2 (X)] button: The user uses this button to open the ESC/P Print Environment Expansion2 Dialog Box (FIG. 94) for making expansions setting of the ESC/P print environment.

[Utility (U)] button: The user uses this button to open the ESC/P Utility Dialog Box (FIG. 98) for implementing the ESC/P utility.

[OK] button: The user selects this button to validate settings made in the ESC/P Print Environment Basic Set Sheet (FIG. 88) and then close the dialog box. The printer settings are updated at this point, when the user has made changes to the settings.

[Cancel] button: The user selects this button to invalidate the settings that were made in the ESC/P Print Environment Basic Set Sheet (FIG. 88) and close the dialog box.

[Update (A)] button: The user selects this button to update the printer settings made in the ESC/P Print Environment Basic Set Sheet (FIG. 88). This

[Update (A)] button can only be used when changes in the settings have been made by the user.

[Help (H)] button: The user selects this button to display the online help.

Figure 89:
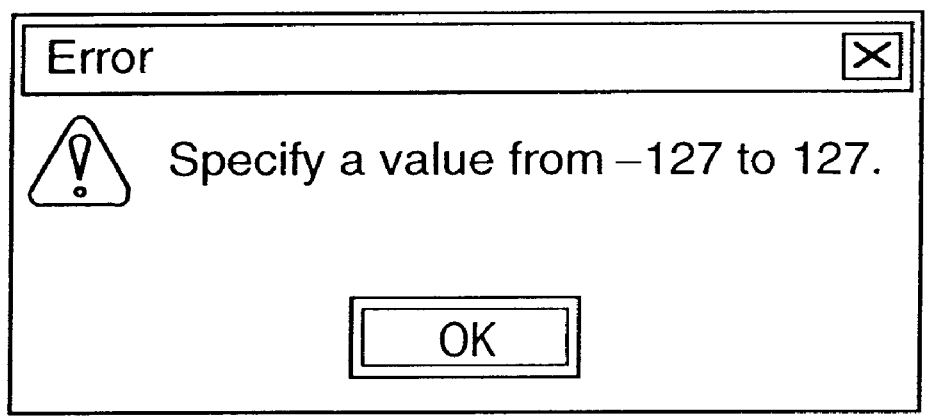
FIG. 89 is an illustration showing the message displayed when an entry outside the allowable range was made in "Upper Border (W)" "Paper Position Fine Adjust (B)" in FIG. 88.
Figure 90:
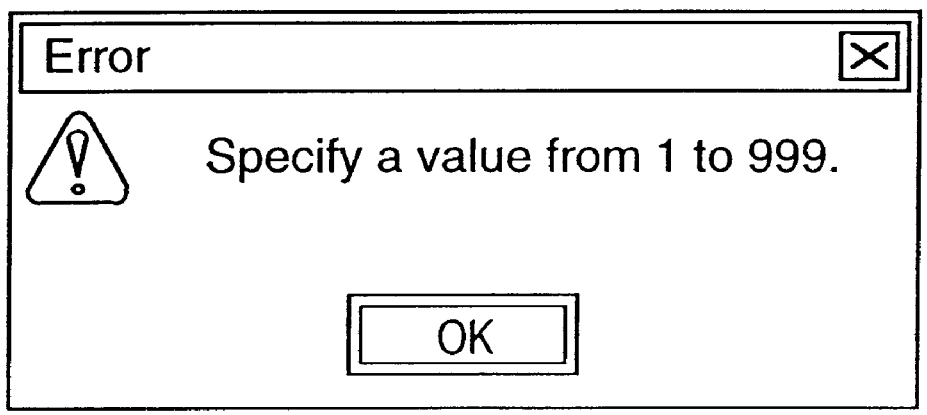
FIG. 90 is an illustration showing the message display when an entry outside the allowable range was made in "Font ID (E)" in FIG. 88.

Other operations:

When the user inputs a value other than −127 to 127 in [Upper border (W)] or in [Paper position fine adjust (B)], then the message in FIG. 89 appears and the display returns to the Printer Environment Set Dialog Box. When the user inputs a value other than 1 through 999 in [Font ID (E)], the message in FIG. 90 appears and the display returns to the Printer Environment Set Dialog Box.

[ESC/P Print Environment Expansion1 Dialog Box (FIG. 91)]

When the user clicks the [Expand1] button on the ESC/P Print Environment Basic Set Sheet (FIG. 88), the ESC/P Print Environment Expansion1 Dialog Box (FIG. 91) appears. This ESC/P Print Environment Expansion1 Dialog Box (FIG. 91) is for making detailed ESC/P basic print environment settings for the device the user has selected.

Detailed Specifications

[Zone]: The user selects the ESC/P print zone mode with this item. The user selects the ESC/P print zone mode from among "Standard (Q)" and "Wide (W)".

[Right margin]: The user selects the right margin position for the ESC/P with this item. The user selects the ESC/P right margin position from among "136col. (y)" and "Right edge (R)".

[Continuous paper length (L)]: The user selects here whether or not to specify the page length of continuous form paper in ESC/P. The user inputs here the page length of the continuous form paper in ESC/P. This function is only valid when the user selects ON in [Continuous paper length (L)]. The user inputs a value from 1 to 199 for the continuous paper page length in ESC/P.

[Single form length (S)]: The user selects here with ON or OFF whether or not to specify the page length of cut paper in ESC/P. The user inputs here the page length of the cut paper in ESC/P. This function is only valid when the user selects ON in [Single form length (S)]. The user inputs a value from 1 to 199 for the cut paper page length in ESC/P.

[Dash line skip (M)]: The user inputs here whether to specify the number of lines to skip from the bottom edge in ESC/P. This function is only valid when the user selects ON in [Dash line skip (M)]. The user enters from 1 to 31 lines as the number of lines to skip from the bottom edge in ESC/P.

[Character code table]: The user selects a character set for setting in a 1 byte code table for ESC/P. The user selects the character set from "Katakana (J)" and "Graphics (O)" for entry in the code table for ESC/P.

[Country letter (C)]: The user selects a suitable character set corresponding to the country for the one byte code in ESC/P. The user makes a selection from among "Japan" "Norway" "Denmark2" "Spain2" "Latin America" "America" "France" "Germany" England" "Denmark" "Sweden" "Italy" and "Spain".

[Register level]: The user selects here the level to store the registered characters for ESC/P. The user selects from "Permanent (P)" and "Temporary (T)" as the level to store the registration characters for ESC/P.

[New line]: The user selects how to move the print position when the return code (CR) was received for ESC/P. The user selects from among "Standby for LF command(F) and "New line (E)".

[OK] button: The user selects this button to validate settings made in the ESC/P Print Environment Expansion1 Dialog Box (FIG. 91) and then close the dialog box. The printer settings are updated at this point, when the user has made changes to the settings.

[Cancel] button: The user selects this button to invalidate the settings that were made in the ESC/P Print Environment Expansion1 Dialog Box (FIG. 91) and close the dialog box.

[Update (A)] button: The user selects this button to update the printer settings made in the ESC/P Print Environment Expansion1 Dialog Box (FIG. 91). This [Update (A)] button can only be used when changes in the settings have been made by the user.

[Help (H)] button: The user selects this button to display the online help.

Figure 92:
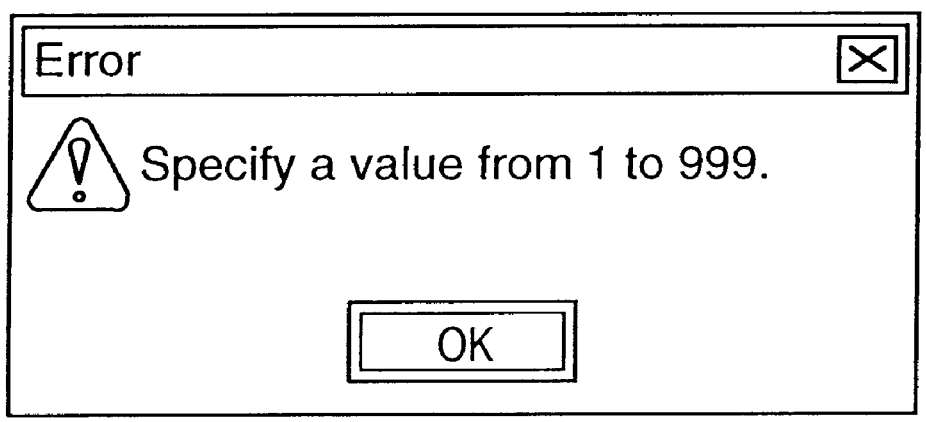
FIG. 92 is an illustration showing the message displayed when an entry outside the allowable range was made in "Continuous Paper Length (L)"—"Single Form Length (S)" of FIG. 91.
Figure 93:
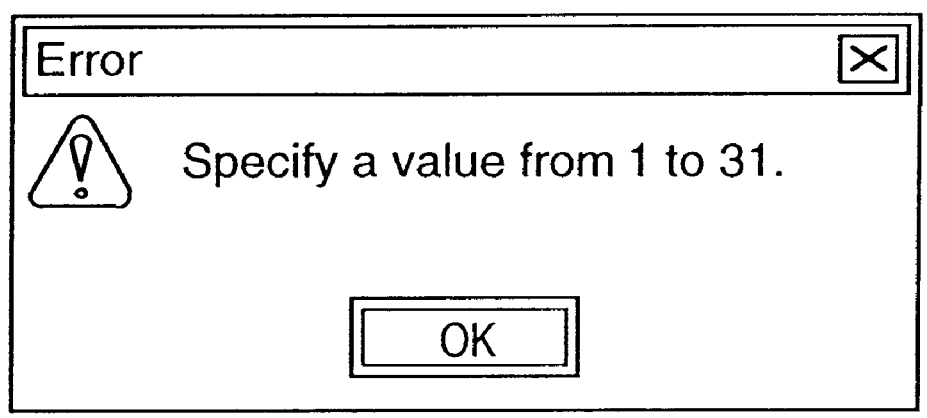
FIG. 93 is an illustration showing the message displayed when an entry outside the allowable range was made in "Dotted Line Skip (M)" of FIG. 91.

Other operations:

When the user inputs a value other than 1 to 199 in [Continuous paper length (L)] or [Single paper length (S)], the message in FIG. 92 appears and the display returns to the ESC/P Print Expansion 1 Set Dialog Box (FIG. 91). When the user inputs a value other than 1 to 31 in [Dash line skip (M)], the message in FIG. 93 appears and the display returns to the ESC/P Print Expansion 1 Set Dialog Box (FIG. 91).

[ESC/P Print Environment Expansion2 Dialog Box (FIG. 94)]

When the user clicks the [Expand2] button on the ESC/P Print Environment Basic Set Sheet (FIG. 88), the ESC/P Print Environment Expansion2 Dialog Box (FIG. 94) appears. This ESC/P Print Environment Expansion2 Dialog Box (FIG. 94) is for making detailed ESC/P basic print environment settings for the device the user has selected.

Detailed Specifications

[Fix line (L)]: The user selects whether or not to use the fix line function for ESC/P. The user selects with ON or OFF whether to use this function.

[Fixed number of lines (E)]: The user here inputs the fixed number of lines for the Fix Line function in ESC/P. This function is only valid when the user has set ON in [Fix line (L)]. The user inputs a value from 10 to 400 lines in 1 increment as the fixed number of lines for use in this function.

[Fixed columns (C)]: The user selects whether or not to use the fixed column function in ESC/P here. The user selects with ON or OFF whether to use this function.

[Fixed number of columns set (N)] The user inputs the number of fixed columns for this function in ESC/P. This [Fixed number of columns set (N)] function is only valid when the user has set ON in [Fixed columns (C)]. The user inputs a value from 10 to 400 columns in 1 increment as the fixed column value in ESC/P.

[Chinese character rate (R)]: The user selects here the Chinese character rate for use in ESC/P. The user selects from among "2/1" "3/2" "4/3" "5/3" and "1/1".

[Start-up macro (M)]: The user enters here the number of the start-up macro to implement on ESC/P. The user inputs a start-up macro number from 0 to 255.

[System overlay1 (O)]: The user selects here whether or not to implement the system overlay print in ESC/P. The user selects with ON or OFF whether to implement this system overlay print. This format data number is only valid when ON has been selected in [System overlay1 (O)]. The user enters this number for using the system overlay print when selected by the user. The user inputs a value from 1 to 5 in 1 increment as the format data number for using the system overlay print function.

[User overlay1 (U)]: The user selects here whether or not to implement the user overlay print1 in ESC/P. The user selects whether or not to implement in ESC/P by selecting ON or OFF.

[User overlay2 (V)]: The user selects here whether or not to implement the user overlay print2 in ESC/P. The user selects whether or not to implement in ESC/P by selecting ON or OFF.

[Ignore new line after HEX (I)]: The user selects here whether or not to set ignoring of new line after HEX mode in ESC/P. The user selects this function (or not) by selecting ON or OFF.

[HEX/LIPS (X)]: The user selects here whether or not to use the HEX/LIPS function in ESC/P. The user selects this function (or not) by selecting ON or OFF.

[LIPS form]: The user selects the LIPS form for ESC/P with this item. The user selects from among "LIPS2(P)" and "LIPS4(P)" as the LIPS form in ESC/P.

[OK] button: The user selects this button to validate settings made in the ESC/P Print Environment Expansion2 Dialog Box (FIG. 94) and then close the dialog box. The printer settings are updated at this point, when the user has made changes to the settings.

[Cancel] button: The user selects this button to invalidate the settings that were made in the ESC/P Print Environment Expansion2 Dialog Box (FIG. 94) and close the dialog box.

[Update (A)] button The user selects this button to update the printer settings made in the ESC/P Print Environment Expansion2 Dialog Box (FIG. 94). This [Update (A)] button can only be used when changes in the settings have been made by the user.

[Help (H)] button: The user selects this button to display the online help.

Figure 95:
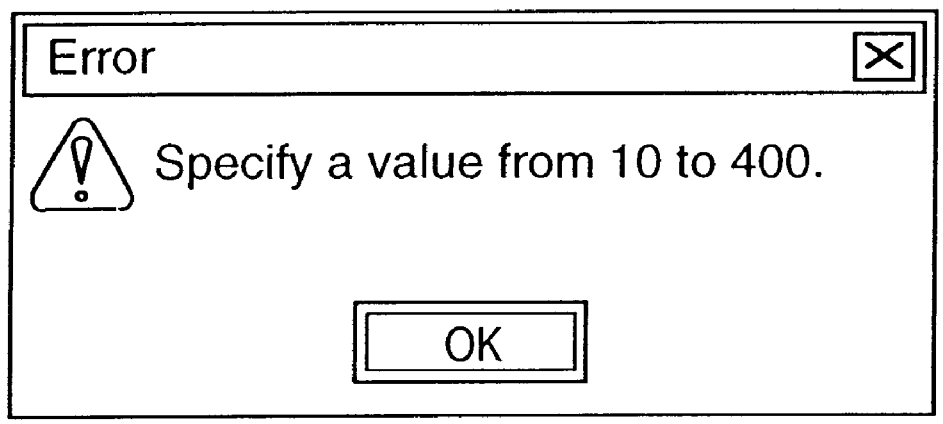
FIG. 95 is an illustration showing the message displayed when an entry outside the allowable range was made in "Fixed Line Count (E)"—"Fixed Row Count (N)" in FIG. 9
Figure 96:
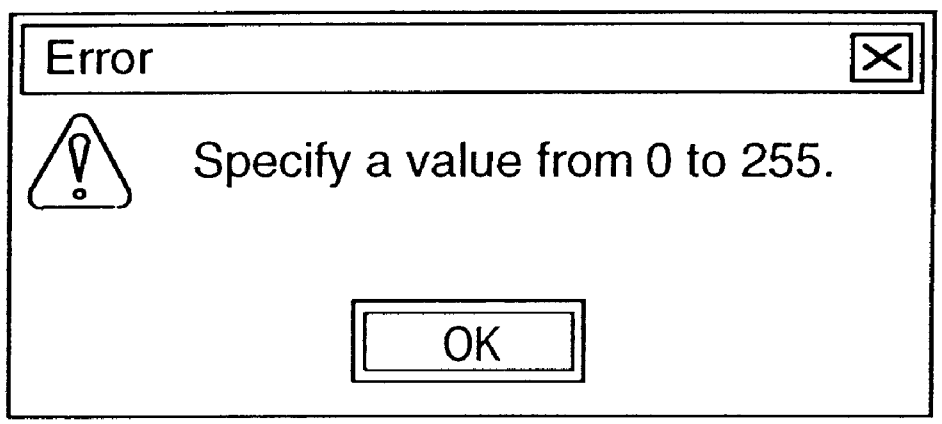
FIG. 96 is an illustration showing the message displayed when an entry outside the allowable range was made in "Start-Up Macro (M)" in FIG. 94.
Figure 97:
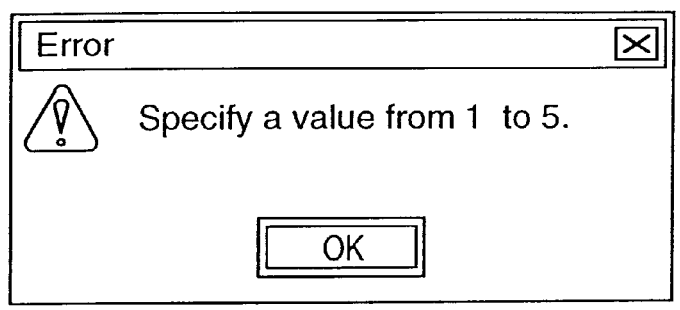
FIG. 97 is an illustration showing the message displayed when an entry outside the allowable range was made in "System Overlay (0)" in FIG. 94.

When the user enters a value other than 10 to 400 for [Fixed number of lines] or [Fixed columns], the message in FIG. 95 appears and the display returns to the ESC/P Print Environment Expansion2 Dialog Box (FIG. 94). When the user enters a value other than 0 to 255 in the [Start-up macro (M)] the message in FIG. 96 appears and the display returns to the ESC/P Print Environment Expansion2 Dialog Box (FIG. 94). When the user enters a value other than 1 to 5 in [System overlay (O)], the message in FIG. 97 appears and the display returns to the ESC/P Print Environment Expansion2 Dialog Box (FIG. 94).

[ESC/P Utility Dialog Box (See FIG. 98)

The ESC/P Utility Dialog Box shown in FIG. 88 appears when the user clicks the [Utility] button of the ESC/P Print Environment Basic Set Sheet (FIG. 98). This ESC/P Utility Dialog Box (FIG. 98) is for implementing the ESC/P utility for the device selected by the user.

Detailed Specifications

[Status print (S)] button: The user selects this item to implement the status print for ESC/P. Status print is implemented after setting the ESC/P online.

[Overlay print (P)] button: The user selects this item to implement the overlay print for ESC/P. Overlay print is implemented after setting the ESC/P online.

[OK] button: The user selects this button to close the dialog box.

[Help (H)] button: The user selects this button to display the online help.

Figure 99:
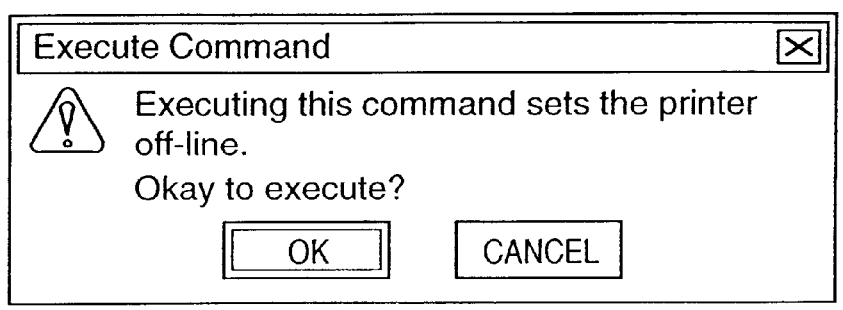
FIG. 99 is an illustration showing the message displayed when the printer is on-line when the "Status Print (S)"—"Overprint(0)" buttons are pressed in FIG. 98.

Other operations:

When the user selects the [Status print (S)] or [Overlay print (O)] buttons with the printer set online, the message in FIG. 99 appears. When the user selects the [OK] button and implements the target utility, the display returns to the ESC/P Utility Dialog Box (FIG. 98). When the user selects the [Cancel] button, the display returns to the ESC/P Utility Dialog Box (FIG. 98) without performing other operations.

[jobs sheet (See FIG. 100)]

Figure 100:
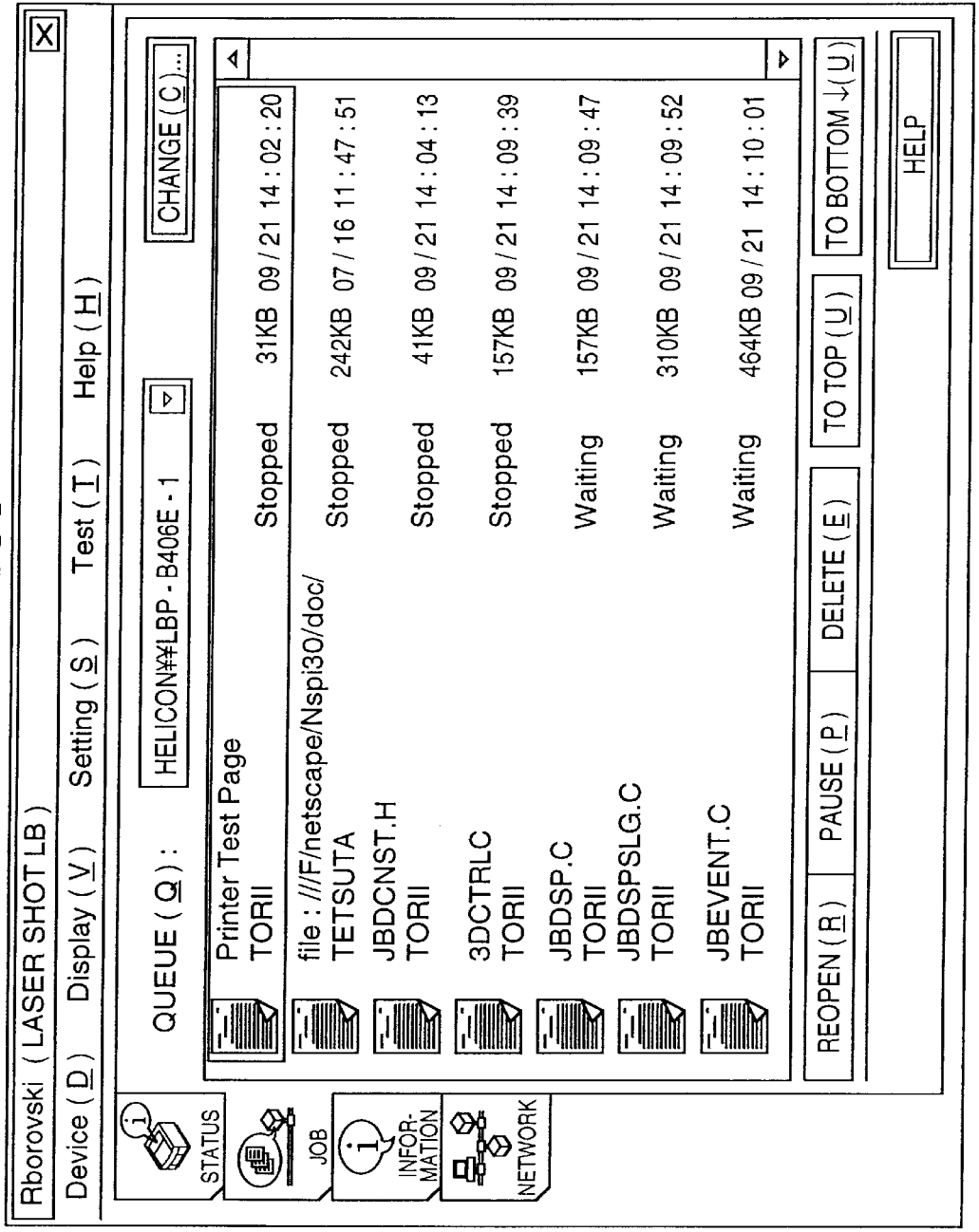
FIG. 100 is an illustration showing the Jobs sheet.

NetSpot shows the Job sheet in FIG. 100 when the user clicks the [job] tab on the left side of the device window (FIG. 43). This Jobs sheet is for showing the current Job status for the device selected by the user.

All functions for this Jobs she et (FIG. 100) are implemented by utilizing NetWare services so the Jobs sheet is only valid when the NetWare service is available. The functions shown next in Table 12 are provided by the Jobs sheet (FIG. 100) in the controller mode and general user mode.

For some of these functions, the NetWare file server must be logged into as the Administrator in order to make use of the function, regardless of the mode being operated.

TABLE 12

List of functions supported by Jobs sheet

| ITEM NO. | FUNCTION | Admin | User |
|---|---|---|---|
| 1 | Monitoring of all jobs | ○ | ○ |
| | Document name | | |
| | Owner | | |
| | Status (while printing/in | | |

TABLE 12-continued

List of functions supported by Jobs sheet

| ITEM NO. | FUNCTION | Admin | User |
|---|---|---|---|
| | standby/spooling)<br>Progress status (document size or 0) byte units))<br>Start time (Time job is registered with print queue) | | |
| 2 | Job control implemented by logged-in user for own job | ○ | ○ |
| 3 | Delete job in standby<br>Pause/restart job in standby<br>Implement control of all jobs<br>(only when logged in to Netware file server as administrator) | ○ | ○ |
| 4 | Delete job in standby<br>Pause/restart jog in standby<br>Interchange job priority order during standby<br>Change printer queue settings | ○ | ○ |
| | Select Netware file server<br>Log in to NetWare file server<br>Display list of all printer queues<br>Display list of registered printer queues<br>Add to printer queue registration<br>Delete from printer queue registration | | |

In "Monitoring of all jobs" each job queue relating to the logged-in NetWare file server: Document name, Status (while printing/in standby/spooling), Owner, Progress status (document size or 0) byte units)), Start time (Time that job is registered with print queue) are displayed for the job matching the device the user has selected.

In terms of control for implementing jobs, those possessed by the user himself can be deleted in standby, or can be paused/restarted in standby. Further, when logged in as an administrator to the NetWare file administrator; deletion of jobs in standby, pause/restart of jobs in standby and interchanging of job priority of jobs in standby is possible.

Detailed Specifications

[Queue (Q)]: The user selects the printer queue for displaying the list of jobs with this item. When this item is selected, the printer queues shown in [Registered printer queues (R)] in the Printer Queue Change Dialog Box (FIG. 101) become selection candidates. When the selected printer queue is not logged-in to the associated NetWare file server, a NetWare dialog box(FIG. 34) opens to allow login to the NetWare file server.

[Change (C)]: Clicking this button opens the Printer Queue Change Dialog Box (FIG. 101) for changing the printer queue settings.

[Job list display]: Displays the list of document names, owners, status, progress status, start dates for each job selected with [Queue (Q)]. The user selects the job from the list.

[Restart(R)] button: Restarts previously stopped jobs selected with the [Job list display]. This function is only valid when the stopped job of the user himself was selected.

[Stop (P)] button: Stops jobs selected with the [Job list display]. This function is only valid when a non-stopped job of the user himself was selected.

[Delete (E)] button: Deletes the job selected with the [Job list]. This button is only valid for jobs selected by the user himself.

[TO FRONT (V)] button: Moves the job selected with [Job list] forwards. This button is only valid when logged in as administrator to the NetWare file server and only for the selected job.

[TO REAR (N)] button: Moves the job selected with [Job list] to the rear. This button is only valid when logged in as administrator to the NetWare file server and only for the selected job.

[Help (H)] button: The user selects this button to display the online help.

[[Printer Queue Change Dialog Box (See FIG. 101)

The Printer Queue Change Dialog Box shown by NetSpot in FIG. 101 is displayed when the user selects the [Change] button of the Jobs sheet in FIG. 100. This Printer Queue Change Dialog Box (FIG. 101) is for adding or deleting the printer queue set for the corresponding device that was selected.

Detailed Specifications

[NetWare server (S)]: The user selects the NetWare file server with this item. NetWare file servers registered in the bindery are selected as candidates.

[Log-in (L)] button: Opens the NetWare Log-in Dialog Box (FIG. 34) for logging in to the NetWare file server selected with [NetWare server (S)]. This button is only valid when a NetWare file server still not logged-in with [NetWare server (S)] is selected.

[Printer queue (Q)]: Displays the printer queue. The user selects the printer queue from the list. Displays the list of printer queues registered in the bindery when logged in to the NetWare file server selected with[NetWare server (S)]. Printer queues registered in the bindery of the NetWare file server selected with [NetWare server (S)] become candidates for selection.

[Add (A)] button: Adds a printer queue registration. Adds a printer queue selected with [Printer queue (Q)] to the [Registered printer queue (R)]. This button is only valid when the printer queue was selected with [Printer queue (Q)].

[Registered printer queue (R)]: Displays a list of registered printer queues. The user selects a registered printer queue. Printer queues registered with the [Add (A)] button are displayed on the list. The user selects from printer queues registered with the [Add (A)] button.

[Delete (D)] button: Deletes a printer queue registration. Deletes a printer queue selected with [Printer queue (Q)] to the [Registered printer queue (R)]. This button is only valid when the printer queue was selected with [Registered printer queue (R)].

[OK] button: The user selects this button to validate settings made and then close the dialog box.

[Cancel] button The user selects this button to invalidate the settings that were made and close the dialog box.

[Help (H)] button: The user selects this button to display the online help.

[Information Sheet (See FIG. 102)]

The Information Sheet shown in FIG. 102 by Netspot is displayed when the user clicks [Info] on the left side of the device window in FIG. 43. This Information Sheet (FIG. 102) is for displaying various information for the selected device.

Table 13 shows functions provided by the Information Sheet (FIG. 102) in the controller mode and general user mode.

TABLE 13

List of functions supported by the information sheet

| ITEM NO. | FUNCTION | Admin | User |
|---|---|---|---|
| 1 | Printer information display | ○ | ○ |
|  | Manufacturer | | |
|  | Product name | | |
|  | Installation location | | |
|  | Product version | | |
|  | Toner cartridge model No. | | |
| 2 | Environmental Information Display | ○ | ○ |
|  | Emulator information | | |
|  | Flash ROM information | | |
|  | RAM information | | |
|  | Cassette information | | |
|  | Doublesided unit information | | |
|  | Envelope feeder information | | |
|  | Paper deck information | | |
|  | Font information | | |
| 3 | Controller information display | ○ | ○ |
|  | Controller name | | |
|  | Controller address | | |

Settings cannot be made on the information sheet just by displaying information.

Detailed Specifications

[Manufacturer]: Displays the name of the manufacturer of the printer.

[Product name]: Displays the product name in a character string of 0 to 63 character spaces.

[Installation location]: Displays the installation location in a character string of 0 to 63 character spaces.

[Product version]: Displays the product version of the printer in a character string of 0 to 31 character spaces.

[Toner cartridge model No.]: Display the toner cartridge model No. "EP-W" usable in the printer.

[Environment setting]: Displays the list of environment settings. Shows the status of the "Emulator" "Total flash ROM capacity" "Available flash ROM capacity" "Total RAM capacity" "Available RAM capacity" "Number of cassettes" "Doublesided unit" "Envelope feeder" "Paper deck" and "Font". The "Font" only displays items with a Font ID.

[Controller info (M)] button: Opens the Controller Information Dialog Box (FIG. 103).

[Help (H)] button: The user selects this button to display the online help.

[Controller Information Dialog Box (FIG. 103)]

NetSpot displays the Controller Information Dialog Box shown in FIG. 103 when the user selects the [Controller Info] button of the Information Sheet (FIG. 102). This Controller Information Dialog Box shown in FIG. 103 is for displaying information on the controller of the device that was selected.

Detailed Specifications

[Name]: Displays the name of the controller in a character string within 0 to 63 spaces.

[Address]: Displays the address of the controller in a character string within 0 to 63 spaces.

[OK] button: The user selects this button to close the dialog box.

[Help (H)] button: The user selects this button to display the online help.

[Network Sheet (See FIG. 104)]

Figure 104:
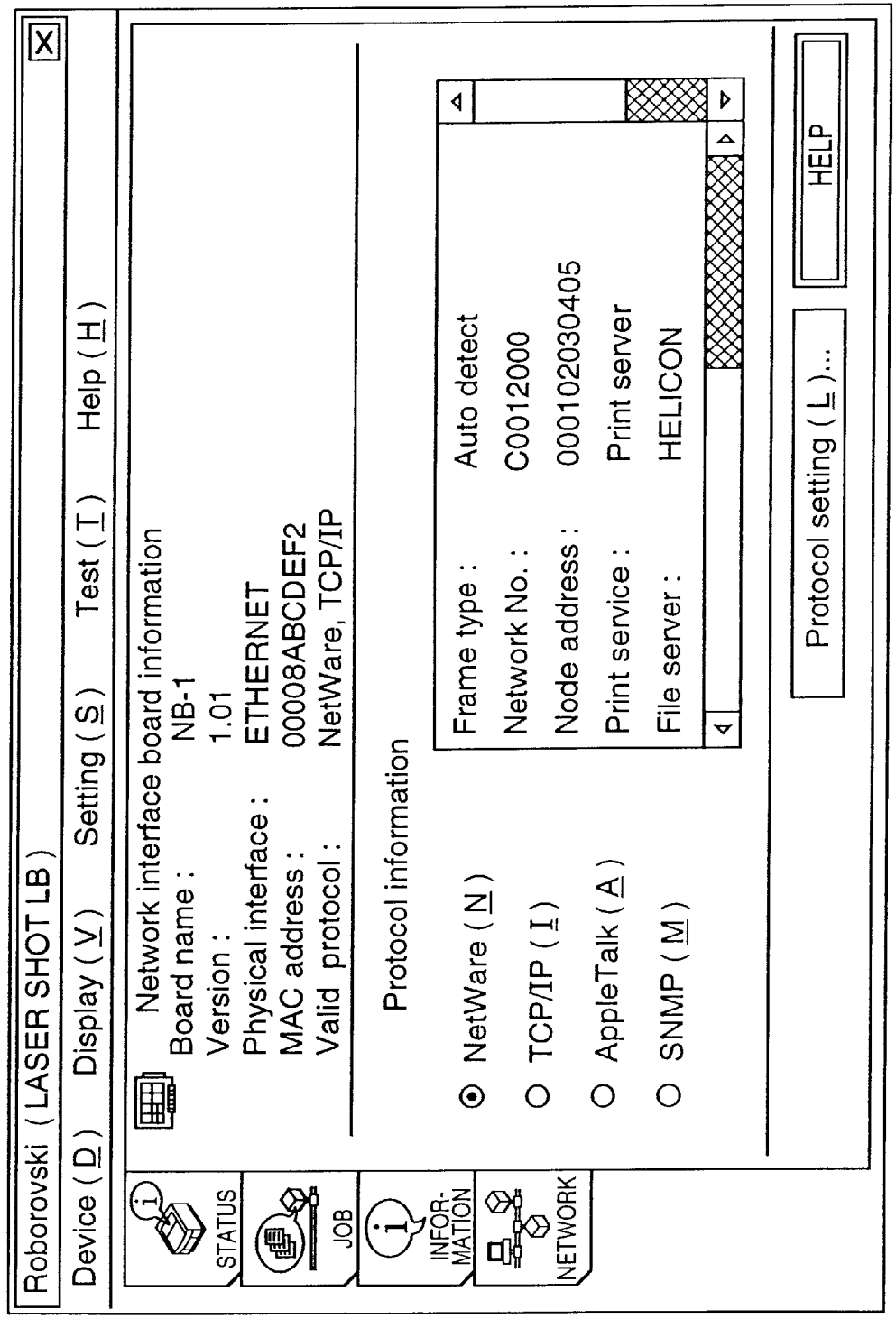
FIG. 104 is an illustration showing the network sheet.

Netspot displays the Network sheet shown in FIG. 104 when the user clicks the tab indicating [Network] on the left side of the device window (FIG. 43). This network sheet is for setting or displaying network information for the selected device. This network sheet (FIG. 104) is only displayed when NetSpot is operating in controller mode. The network sheet provides the functions shown in Table 14 in controller mode.

TABLE 14

List of functions supported by the network sheet

| ITEM NO. | FUNCTION | Admin | User |
|---|---|---|---|
| 1 | Network interface board information display | ○ | |
|  | Board name | | |
|  | Version | | |
|  | Physical interface | | |
|  | MAC address | | |
|  | Valid protocol | | |
| 2 | Netware Information display | ○ | |
|  | Setting information | | |
| 3 | TCP/IP information display | | |
|  | Setting information | ○ | |
| 4 | AppleTalk information display | ○ | |
|  | Setting information | | |
| 5 | SNMP information display | ○ | |
|  | Statistical information | | |

Detailed Specifications

[Board name]: Displays the network interface board name.

[Version]: Displays the formware version of the network interface board.

[Physical interface]: Displays the physical interface of the network interface board.

[MAC address]: Displays the MAC address of the network interface board.

[Valid protocol]: Displays the valid protocol of the network interface board.

[Protocol info]: The user selects the setting information for display for the protocol. The user selects from among "NetWare (N)" "AppleTalk (A)" "SNMP (M)" or "TCP/IP (I)". NetSpot displays on a list at the right, setting information relating to the protocol or statistical SNMP information selected by the user. A list of items relating to setting information for each protocol is given for the NetWare Set Sheet (FIG. 105), TCP/IP Set Sheet (FIG. 114) or AppleTalk Set Sheet (FIG. 120). A list of the following items is displayed relating to SNMP statistic information. "Total receive SNMP packet count" "Total transmit SNMP packet count" "SNMP packets receive count for unknown community names" "SNMP packet receive count for inapplicable access modes" "Valid Get-Request packet receive count" "Valid Get-Next packet receive count" "Valid Set-Request packet receive count" "Valid generated trap packet count".

[Protocol set (L)] button: Opens the Protocol Set Dialog Box (FIG. 144) for making protocol settings.

[Help (H)] button: The user selects this button to display the online help.

[Protocol Set Dialog Box (See FIG. 144)]

NetSpot displays the Protocol Set Dialog Box (FIG. 144) when the user selects the [Protocol Set] button of the Network Sheet (FIG. 104). This Protocol Set Dialog Box (FIG. 144) is for making network protocol information settings for the selected device. The Protocol Set Dialog Box (FIG. 144) is basically comprised of the following three sheets having tabs.

(1) NetWare set sheet (FIG. 105)
(2) TCP/IP set sheet (FIG. 114)
(3) AppleTalk set sheet (FIG. 120)

When the Protocol Set Dialog Box (FIG. 144) is opened the first display is the default sheet called the NetWare Set Sheet (FIG. 105).

Among these protocol set dialog boxes in FIG. 144, NetWare Set Sheet (FIG. 105) NetWare Set Sheet (FIG. 105) provides a typical view of the NetWare Set Sheet first appearing on the display.

When the user clicks one of the [NetWare] [TCP/IP] or [AppleTalk] tabs at the upper side of the Protocol Set Dialog Box (FIG. 144), NetSpot then displays as the initial sheet on the Protocol Set Dialog Box (FIG. 144), the sheet that corresponds to the tab that was clicked. The functions provided by the Protocol Set Dialog Box (FIG. 144) are shown in Table 15.

TABLEA 15

List of functions supported by the protocol set dialog box

| ITEM NO. | FUNCTION | Admin | User |
|---|---|---|---|
| 1 | NetWare settings | ○ | |
| | Frame type selection | | |
| | Display network No. | | |
| | Display node address | | |
| | Select print service | | |
| | Set file server name | | |
| | Log in to NetWare file server | | |
| | Set print server name | | |
| | Set printer No. | | |
| | Set form No. | | |
| | Set polling interval | | |
| | Set buffer size | | |
| | Select service mode | | |
| | Set print server password | | |
| | Return to standard value | | |
| 2 | TCP/IP settings | ○ | |
| | Select frame type | | |
| | Select IP address set method | | |
| | Set IP address | | |
| | Set subnet mask | | |
| | Set gateway address | | |
| | Display BOOTP address | | |
| | Display broadcast address | | |
| | Select print service | | |
| | Return to standard value | | |
| 3 | AppleTalk setting | | |
| | Select phase type | ○ | |
| | Display network No. | | |
| | Display node No. | | |
| | Set name | | |
| | Select or display zone | | |
| | Display type | | |
| | Return to standard value | | |

[NetWare Set Sheet (FIG. 105)]

Clicking the [Protocol set] button on the Network Sheet (FIG. 104) or clicking the tab indicating [NetWare] on the upper part of the Protocol Set Dialog Box (FIG. 144), causes NetSpot to display the NetWare Set Sheet in FIG. 105 as the default sheet first shown on the display. This NetWare Set Sheet (FIG. 105) is for setting information relating to NetWare for the device that was selected.

When the NetWare frame type is changed and the network interface board is reset while NetSpot is operating NetWare protocol, accessing the device may prove impossible. In an environment where the NetWare service cannot be used, the user must set "None" in the NetWare print service setting.

Detailed Specifications

[Frame type (F)]: The user selects this item to choose the NetWare frame type. The user selects from among: "Invalid" "Auto Detect" "Ethernet II" "Ethernet 802.2" "Ethernet 802.3" and "Ethernet Snap". When the user has set the network interface board to "Auto Detect", NetSpot will continue to display that setting unless the user changes this setting.

[Network No. (N)]: The user enters the 8 digit base 16 network number used in NetWare here.

[Node address]: The user enters the 8 digit base 16 node address used in NetWare here.

[Print service set]: The user selects the print service for use with NetWare here. The user selects from "Print server (S)" "Remote printer (R)" and None (N)".

[File server name (E)]: The user inputs with the NetWare print server, a character string from 0 to 47 digits for use as the NetWare file server name. This function is only valid when "Print server (S)" was selected with [Print service set]. The NetWare file server names registered in the bindery are available for selection when use of the NetWare service is available.

[Log-in (L)] button: Clicking this button opens the NetWare Log-in Dialog Box (FIG. 34) for logging-in the NetWare file server selected with [File server name (E)]. This function is only possible while NetWare service is available, when "Print server (S)" was selected with [Print service set], or when a still non-logged in NetWare file server was selected in [File server name (E)].

[Print server name (P)]: The user inputs a character string from 0 to 47 digits for use as the NetWare print server name. This function is valid on when "None (N)" is selected in [Print service set]. The NetWare print server names registered in the bindery are available for selection when the Window (OS) is being used, when "Print server (S)" was selected with [Print service set] or when a logged in NetWare file server was selected with [File server name (E)].

[Printer name (U)]: The user inputs a printer name from 0 to 15 characters for use with NetWare. This function is only valid when "None (N)" was selected with [Print service set]. The user must set the same values as set in PCONSOLE of NetWare.

[Form No. (O)]: The user inputs a form number from 0 to 255 characters for use with NetWare. This function is only valid when "Print server (S)" was selected with [Print service set]. The user must set the same values as set in PCONSOLE of NetWare.

[Polling interval (I)]: The user inputs the polling interval here in a figure from 1 to 15 seconds on the NetWare print server. This function is only valid when "Print server (S)" was selected with [Print service set].

[Buffer size (B)]: The user inputs the buffer size for use in the NetWare print server in kilobyte units from 1 to 20. This function is only valid when "Print server (S)" was selected with [Print service set] The user must set the same values as set in PCONSOLE of NetWare. When using NetWare 4.1J, the user must enter a value from 3 to 20.

[Service mode (M)]: The user selects the service mode used with the NetWare print server. This function is only valid when "Print server (S)" was selected with [Print service set]. The selectable service modes are: "Only currently set paper OK" "Paper change OK when needed" "Minimum paper change" and "Minimum paper change within queue". The user must set the same values as set in PCONSOLE of NetWare

[Printer server password (W)]: The user inputs a character string of 0 to 19 characters for use with the NetWare print server. This function is only valid when "Print server (S)" was selected with [Print service set]. The user must set the same values as set in PCONSOLE of NetWare

[Standard (D)] button: Returns to the standard setting. Writes all standard values held by NetSpot.

[OK] button: The user selects this button to close the dialog box. When changes have been made in the settings, the network interface board settings are updated.

[Cancel] button: The user selects this button to invalidate the settings that were made and close the dialog box.

[Update (A)] button: When changes have been made in the settings, the network interface board settings are updated. This [Update (A)] button can only be used when changes in the settings have been made.

[Help (H)] button: The user selects this button to display the online help.

Figure 106:
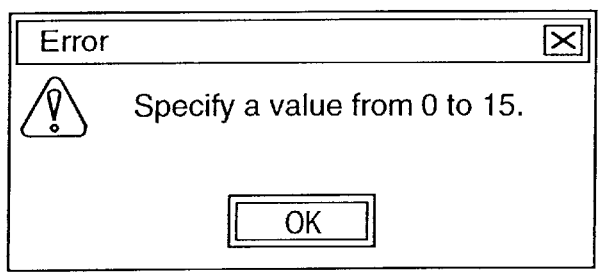
FIG. 106 is an illustration showing the message displayed when the user made an entry outside the allowable range in "Printer No.(U)" in FIG. 105.
Figure 107:
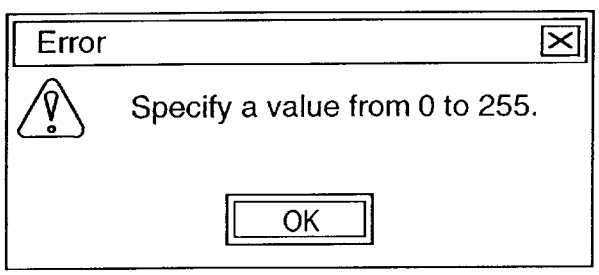
FIG. 107 is an illustration showing the message displayed when the user made an entry outside the allowable range in "Form No. (0)" in FIG. 105.
Figure 108:
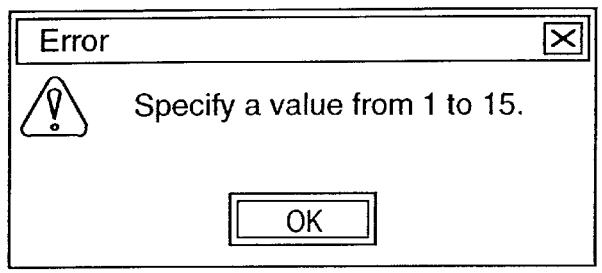
FIG. 108 is an illustration showing the message displayed when the user made an entry outside the allowable range in "Polling Interval(1)" in FIG. 105.
Figure 109:
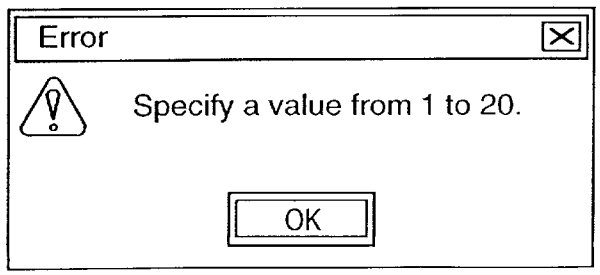
FIG. 109 is an illustration showing the message displayed when the user made an entry outside the allowable range in "Buffer Size (B)" in FIG. 105.

Other operations:

When the user inputs a value other than 0 to 15 in [Printer No. (U)], the message in FIG. 106 appears and the display returns to the Protocol Set Dialog Box (FIG. 144). When the user inputs a value other than 0 to 255 in [Form No. (O)], the message in FIG. 107 appears and the display returns to the Protocol Set Dialog Box (FIG. 144). When a value other than 1 to 15 is input for [Polling interval (I)], the message in FIG. 108 appears and the display returns to the Protocol Set Dialog Box (FIG. 144). When the user enters a value other than 1 to 20 for kilobyte unit in [Buffer size (B)], the message in FIG. 109 appears, and the display returns to the Protocol Set Dialog Box (FIG. 144).

Figure 110:
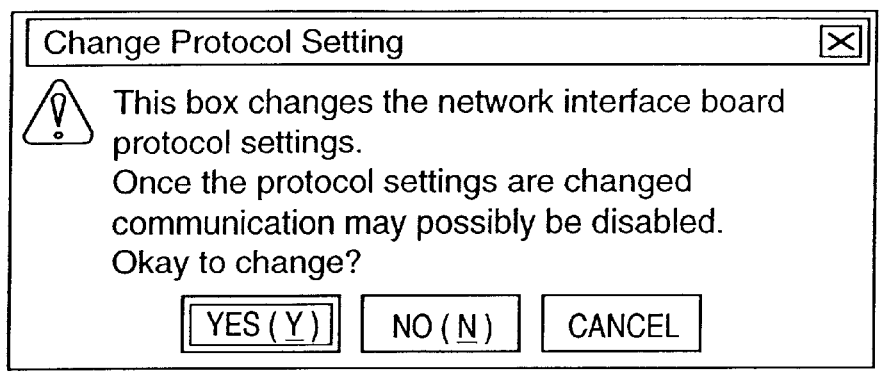
FIG. 110 is an illustration showing the message displayed when any of the settings in FIG. 105 was changed and the "OK" button was pressed.

When the user makes a change in any of the settings in the NetWare Set Sheet (FIG. 105) and the user clicks the [OK] button, the message in FIG. 110 appears. When the user clicks the [Yes (Y)] button in the dialog box of FIG. 110, the protocol settings of the network interface board are changed and the Protocol Set Dialog Box (FIG. 144) closes. When the user clicks the [No (N)] button, the Protocol Set Dialog Box (FIG. 144) closes without any other operations being performed. When the [Cancel] button is pressed, the display returns to the Protocol Set Dialog Box (FIG. 144) without making any protocol settings.

Figure 111:
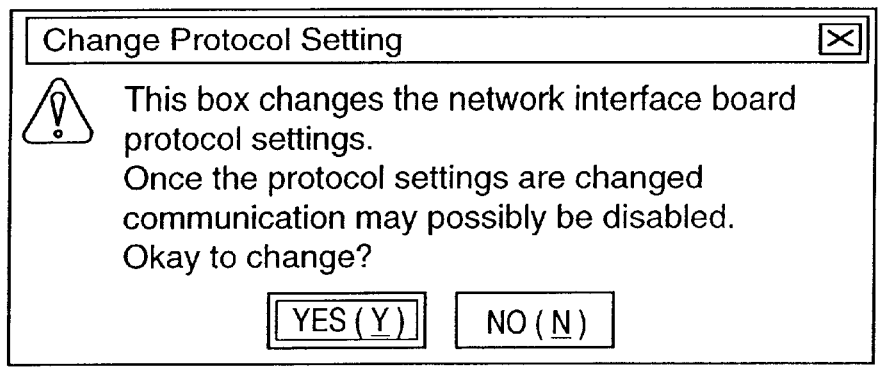
FIG. 111 is an illustration showing the message displayed when any of the settings in FIG. 105 was changed and the "Update(A)" button was pressed.

When the user makes changes to any of the settings on the NetWare Sheet (FIG. 105) and clicks the [Update (A)] button, the message in FIG. 111 is displayed. When the user clicks the [Yes (Y)] button in the dialog box of FIG. 111, the protocol settings for the network interface board are changed and the display returns to the Protocol Set Dialog Box (FIG. 144). When the [No] button is pressed, the display returns to the Protocol Set Dialog Box (FIG. 144) without making any protocol settings.

Figure 112:
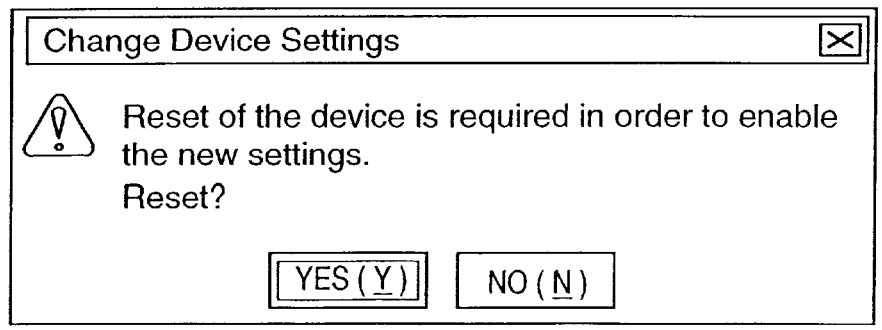
FIG. 112 is an illustration showing the message displayed when any of the required software resets of the network interface board in FIG. 105 was changed and the "Update (A)" button was pressed when the changes were completed.

When the user makes a change requiring a soft reset of the network interface board in FIG. 105 on the NetWare Sheet and these changes are completed, the message in FIG. 112 is displayed. When the user clicks the [Yes (Y)] button in the dialog box of FIG. 112, the soft reset of the network interface board is performed. When the user clicks the (No (N)] button, the soft reset of the network interface board is not performed.

When the user simultaneously makes a change to the [Name (E)] setting on the AppleTalk Set Sheet (FIG. 120), the soft reset of the network interface board is preferably performed after waiting several seconds for a message displaying this status.

Figure 113:
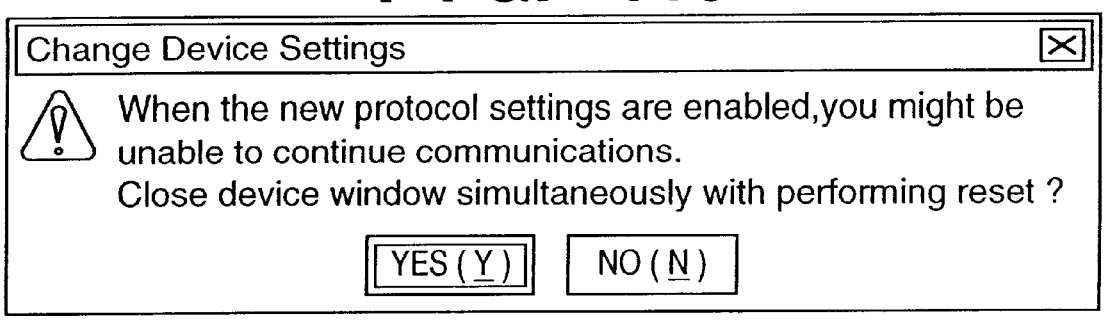
FIG. 113 is an illustration showing the message displayed when a software reset of the network interface board was selected and the NetSpot has triggered the NetWare protocol.

When the user changes the settings for [Frame type (F) in the NetWare Set Sheet (FIG. 105) and protocol settings for the network interface board have been completed; in cases where a soft reset of the network interface board was selected and NetSpot is operating the NetWare protocol, the message in FIG. 113 appears just before the soft reset of the network interface board. When the user selects the [Yes (Y)] button in the dialog of FIG. 113, the device window (FIG. 43) closes after performing soft reset of the network interface board. When the user selects the [No (N)] button, the device window (FIG. 43) does not close after performing soft reset of the network interface board.

[TCP/IP Set Sheet (See FIG. 114)]

The TC/P Set Sheet shown in FIG. 114 appears when the user clicks the tab indicating [TCP/IP] on the upper side of the Protocol Set Dialog Box (FIG. 144). This TCP/IP Set Sheet (See FIG. 114) is for setting information on TCP/IP for the device selected by the user.

When the user. changes TCP/IP frame type and IP address settings while the NetSpot is operating the TCP/IP protocol, and the network interface board is reset, access to the device may prove impossible.

Detailed Specifications

[Frame type (F)]: The user selects the frame type used with TCP/IP. The user selects the frame type from among "Invalid" and "ETHERNET II".

[IP address set method]: The user selects the IP address set method for use with TCP/IP. The user selects from among "IP(I)" "RARP (R)" and "BOOTP (B)".

[IP address (P)]: The user enters an IP address from 0 to 255 in base10 in 4 segments for use with TCP/IP. This function is only valid when "IP (I)" is selected with [IP address set method].

[Subnet mask (M)]: The user enters a subnet mask from 0 to 255 in base10 in 4 segments for use with TCP/IP. This function is only valid when other than BOOTP(P)" is selected with [IP address set method].

[Gateway address (G)]: The user enters a gateway address from 0 to 255 in base10 in 4 segments for use with TCP/IP. This function is only valid when other than "BOOTP(B)" is selected with [IP address set method].

[BOOTP address]: The user enters a gateway address from 0 to 255 in base10 in 4 segments for use with TCP/IP. This function is only valid when "BOOTP(B)" is selected with [IP address set method].

[Broadcast address] Displays the 0 or 255 broadcast address for use with TCP/IP.

[Print service (S)] The user selects the print service used with TCP/IP. The user selects from among "None" and "LPD".

[Standard (D)] button: Returns to the preset standard values. Writes all standard values held by NetSpot.

[OK] button: The user selects this button to close the dialog box. When changes have been made in the settings, the network interface board settings are updated.

[Cancel] button: The user selects this button to invalidate the settings that were made and close the dialog box.

[Update (A)] button: When changes have been made in the settings, the network interface board settings are updated. This [Update (A)] button can only be used when changes in the settings have been made.

[Help (H)] button: The user selects this button to display the online help.

Figure 115:
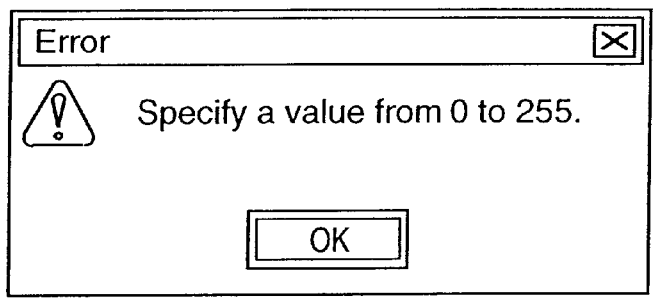
FIG. 115 is an illustration showing the message displayed when the user made an entry outside the allowable range in "IP Address (P)"—"Subnet Mask (M)"—"Gateway Address (G)".
Figure 116:
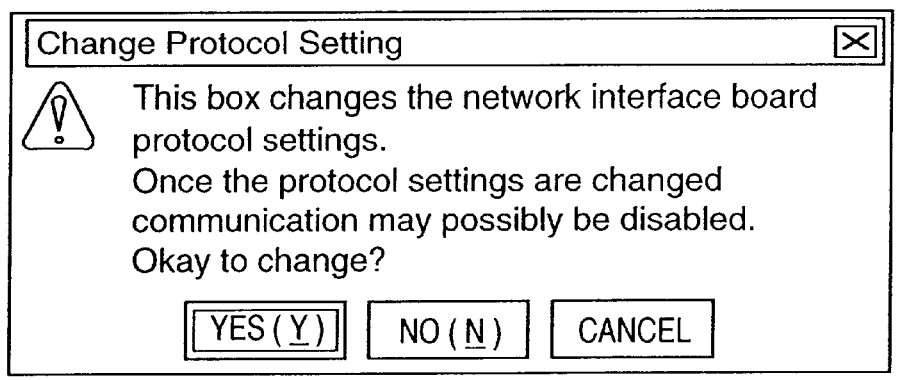
FIG. 116 is an illustration showing the message displayed when any of the settings of FIG. 114 was changed and the "OK" button pressed.

Other operations:

When the user enters a value higher than 256 in [IP address (P)] or [Subnet mask (M)] or in [Gateway address (G)] the message in FIG. 115 appears and the display returns to the Protocol Set Dialog Box (FIG. 144). When the user has changed any of the settings in the TCP/IP Sheet (FIG. 114) and clicked the [OK] button, the message in FIG. 116 is displayed. When the user selects the [Yes (Y)] button in the dialog of FIG. 116, the protocol settings of the network interface board are changed and the Protocol Set Dialog Box (FIG. 144) closes. When [No (N)] is selected, the Protocol Set Dialog Box (FIG. 144) closes with no other operations performed. When the [Cancel] button is selected, the display returns to the Protocol Set Dialog Box (FIG. 144) with no other operations performed.

Figure 117:
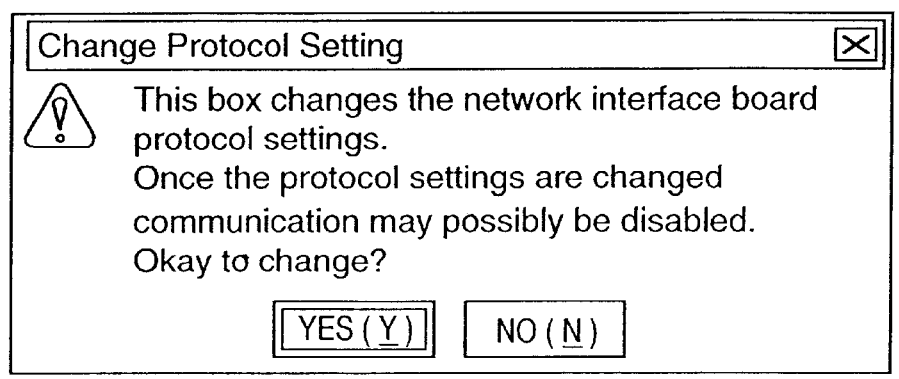
FIG. 117 is an illustration showing the message displayed when any of the settings of FIG. 114 was changed and the "Update (A)" button was pressed.

When the user has changed any of the settings in the TCP/IP Sheet (FIG. 114) and clicked the [Update (A)] button, the message in FIG. 117 is displayed. When the user selects the [Yes (Y)] button in the dialog of FIG. 116, the protocol settings of the network interface board are changed and the Protocol Set Dialog Box (FIG. 144) returns. When [No (N)] is selected, the Protocol Set Dialog Box (FIG. 144) returns with no other operations performed.

Figure 118:
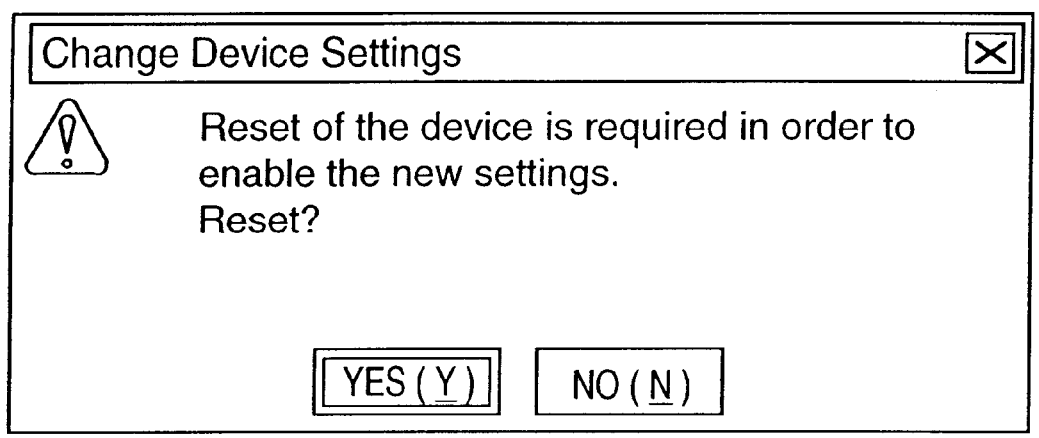
FIG. 118 is an illustration showing the message displayed when any of the required software resets of the network interface board in FIG. 114 was changed and the changes were completed.

The message in FIG. 118 appears when settings required for soft reset have been completed for the network interface board of FIG. 114. When the user selects the [Yes (Y)] button in the dialog of FIG. 118, soft reset of the network interface board is performed. When [No (N)] is selected, the soft reset of the network interface board is not performed.

When the user at the same time makes settings in [Name (E)] of the AppleTalk Set Sheet (FIG. 120), soft reset of the network interface board is performed after waiting per the displayed message status.

Figure 119:
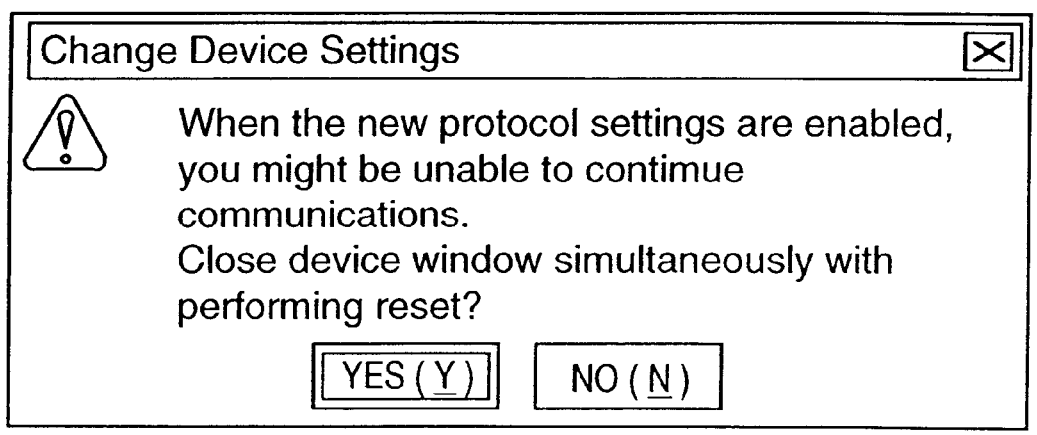
FIG. 119 is an illustration showing the message displayed when a software reset of the network interface board of FIG. 114 was selected and the NetSpot has triggered the TCP/IP.

On the TCP/IP Set Sheet (FIG. 114), when changes have been in made to the [Frame type (F)] or [IP address set method] or [IP address (P)] or [Subnet mask (M)] or the [Gateway address (G)] settings by the user and the protocol settings on the network interface board completed, once the soft reset of the network interface board is selected, the message in FIG. 119 is displayed just prior to the soft reset of the network interface board during TCP/IP operation by NetSpot. When the user selects the [Yes (Y)] button in the dialog of FIG. 119, after soft reset of the network interface board is performed, the device window (FIG. 43) closes. When the user selects the [No (N)] button, the device window (FIG. 43) does not close after soft reset of the network interface board is performed.

[AppleTalk Set Sheet (FIG. 120)]

When the tab indicating [AppleTalk] on the upper part of the Protocol Set Dialog Box (FIG. 144) is clicked, NetSpot display the AppleTalk Set Sheet shown in FIG. 120. This AppleTalk Set Sheet is for setting information relating to AppleTalk for the device that the user selected.

Detailed Specifications

[Frame type (F)]: The user selects this item to choose the AppleTalk frame type. The user selects from among: "Invalid" and "Phase2".

[Network No. (N)]: Displays the network No. in integers from 0 to 65535 for use with AppleTalk. The [Phase type (F)] value acquired from the network interface board is only valid for "Phase2". A display of the currently set values is shown.

[Node address]: Integers from 0 to 255 for display as node No.s for use with AppleTalk are displayed. The [Phase type (F)] value acquired from the network interface board is only valid for "Phase2". A display of the currently set values is shown.

[Name (E)]: The user inputs the object name in a character string from 1 to 32 spaces for use with AppleTalk. The [Phase type (F)] value acquired from the network interface board is only valid for "Phase2". A display of the currently set values is shown. When the user changes settings and the network interface board settings were updated, the network interface board must not be reset for several seconds.

[Zone] Displays the zone name for use with AppleTalk.

[Type] Displays the "LasershotLT" type name for use with AppleTalk. The [Phase type (F)] value acquired from the network interface board is only valid for "Phase2". A display of the currently set values is shown.

[Standard (D)] button: Returns to the preset standard values. Writes all standard values held by AppleTalk.

[OK] button: The user selects this button to close the dialog box. When changes have been made in the settings, the network interface board settings are updated.

[Cancel] button: The user selects this button to invalidate the settings that were made and close the dialog box.

[Update (A)] button: When changes have been made in the settings, the network interface board settings are updated. This [Update (A)] button can only be used when changes in the settings have been made.

[Help (H)] button: The user selects this button to display the online help.

Figure 121:
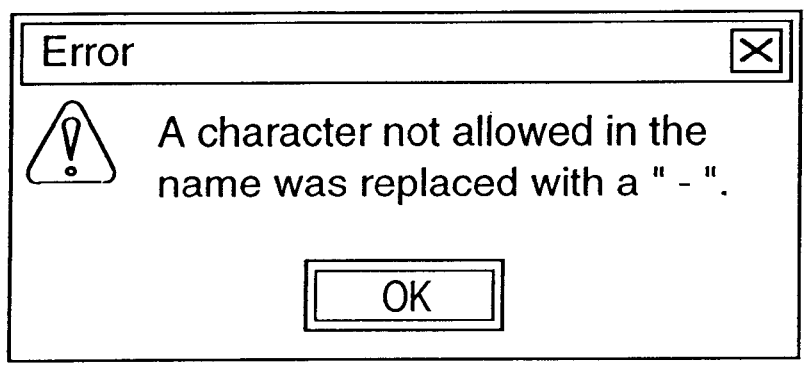

Other operations:

In [Name (E)] the four character codes of "=" ":" "*" and "@" cannot be input. If the user enters a two byte character code containing "=" ":" "*" or "@" in [Name (E)], then the message in FIG. 121 appears and the display returns to the Protocol Set Dialog Box (FIG. 144).

Figure 122:
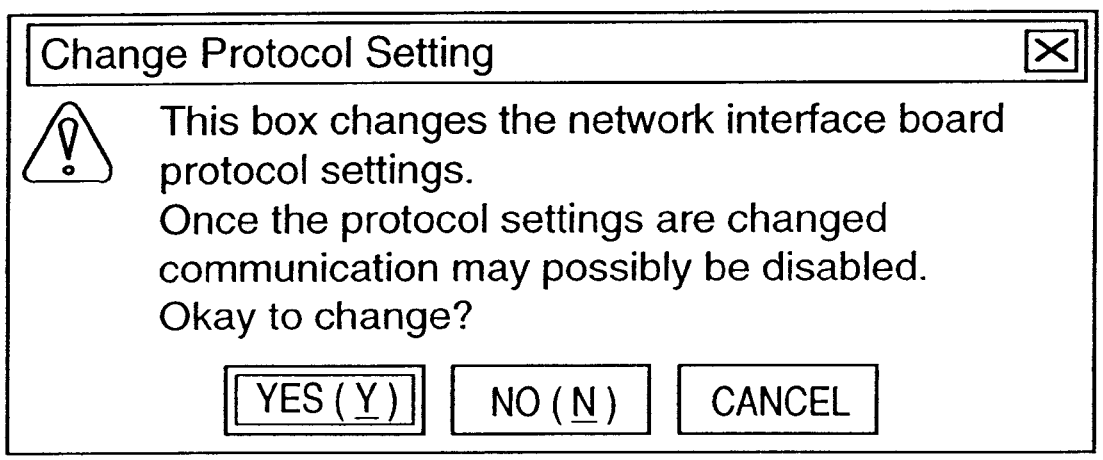

When the user has changed any of the settings in the AppleTalk Sheet (FIG. 120) and clicked the [OK] button, the message in FIG. 122 is displayed. When the user selects the [Yes (Y)] button in the dialog of FIG. 122, the protocol settings of the network interface board are changed and the Protocol Set Dialog Box (FIG. 144) closes. When [No (N)] is selected, the Protocol Set Dialog Box (FIG. 144) closes with no other operations performed. When the [Cancel] button is selected, the display returns to the Protocol Set Dialog Box (FIG. 144) with no other operations performed.

Figure 123:
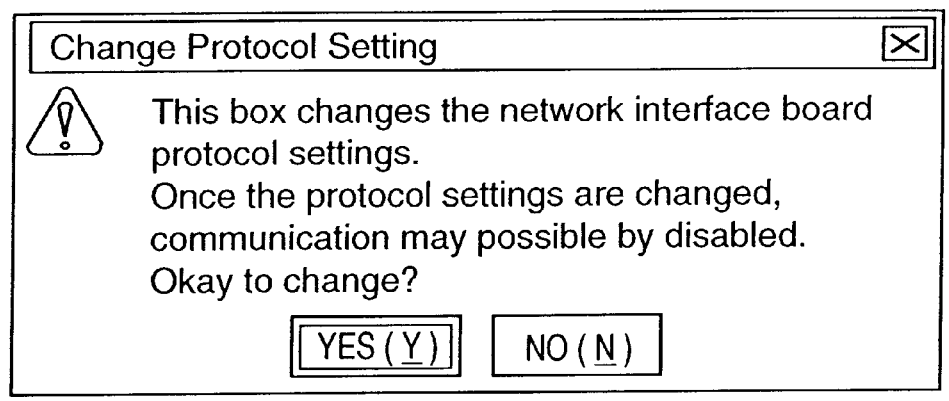

When the user has changed any of the settings in the AppleTalk Sheet (FIG. 120) and clicked the [Update (A)] button, the message in FIG. 123 is displayed. When the user selects the [Yes (Y)] button in the dialog of FIG. 123, the protocol settings of the network interface board are changed and the Protocol Set Dialog Box (FIG. 144) closes. When the user selects [No (N)], the Protocol Set Dialog Box (FIG. 144) returns with no other operations performed.

Figure 124:
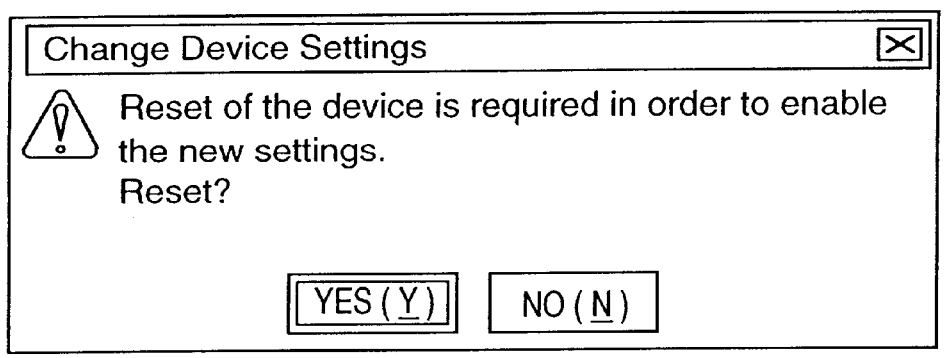

The message in FIG. 124 appears when settings required for soft reset have been completed by the user on the AppleTalk Set Sheet (FIG. 120). When the user selects the [Yes (Y)] button in the dialog of FIG. 124, soft reset of the network interface board is performed. When [No (N)] is selected, the soft reset of the network interface board is not performed.

When the user at the same time makes settings 191 . in [Name (E)] of the AppleTalk Set Sheet (FIG. 120), preferably soft reset of the network interface board should be performed after waiting for several seconds in the status of the displayed message shown in FIG. 124.

[Device Window Menu Function (See FIG. 43)]

The Device Window (FIG. 43) Menu Bar (817 to 822) provides the menu functions shown in Table 16 and Table 17 in controller mode and general user mode.

TABLE 16

List(1) of menu functions supported by the device window

| ITEM NO. | FUNCTION | Admin | User |
|---|---|---|---|
| 1 | Printer control<br>Online control (online/offline)<br>([Device]- [Online])<br>([Device]- [Offline])<br>Paper eject ([Device]-[Paper eject]) | ○ | |

TABLE 16-continued

List(1) of menu functions supported by the device window

| ITEM NO. | FUNCTION | Admin | User |
|---|---|---|---|
| | Printer reset ([Device] - [Printer reset]) Return to printer environment default settings ([Device]- [Printer default]) | | |
| 2 | Network interface board control Network interface board reset ([Device]- [Network interface board reset]) Return to network interface board reset default settings ([Device]- [Network interface board reset default settings]) | ○ | |
| 3 | Quitting device window Close device window (FIG. 43) ([Device]- [Close]) or ([File]- [Close]) | ○ | ○ |
| 4 | Display menu Switch sheets ([Display]- [Status]/ [Job]- [Information]/[Network]) Update information of each item ([Display]- [Update info]) | ○ | ○ |
| 5 | Trap report condition set menu Select trap report conditions ([Set] - [Trap report]) | ○ | |
| 6 | Display auto change set menu Auto change select & Change interval device windows ([Set]- [Printer auto change . . . ]) | ○ | ○ |
| 7 | Printer info set menu ([Set] - [Printer info . . . ]) Display product name Set printer name Set installation location | ○ | |

TABLE 17

List(2) of menu functions supported by the device window

| ITEM NO. | FUNCTION | Admin | User |
|---|---|---|---|
| 8 | Controller info set menu ([Set]- [Controller info . . . ]) Name (including affiliation, etc.) Address (telephone numbers, etc.) Comments (notes) | ○ | |
| 9 | Printer environment set menu Open the printer environment set menu dialog box (FIG. 143) [Settings]-[Printer . . . ]) | ○ | |
| 10 | Protocol set menu Open protocol set dialog box (FIG. 144) ([Set] - [Protocol . . .]) | ○ | |
| 11 | Device password change menu Change device password per each network interface board ([Set]- [Change device password . . . ]) | | ○ |
| 12 | Joint utility menu Joint test print ([Test]-[Test print]) Joint status print ([Test]-[Status print]) Joint font list ([Test]- [Font print]) | ○ | |
| 13 | Help menu Index ([Help]- [Index]) Search with keyword ([Help]- [Search with keyword]) | ○ | ○ |
| 14 | Version info menu ([Help]- [Version info]) or ([Apple menu]- [Netspot-related]) | ○ | ○ |

TABLE 17-continued

List(2) of menu functions supported by the device window

| ITEM NO. | FUNCTION | Admin | User |
|---|---|---|---|
| | Device product title and name SNMP version used by device | | |

When the user has returned the network interface board to the default settings by means of
λDevice]-[Network interface board reset default settings], the user must again perform setup of for adding a new device to the device list. The user performs this setup with the [Device]-[Add New] menu in the device window (FIG. 15. Detailed Specifications

[Device (D)]-[Online (O)] Sets the printer online (controller mode only).

[Device (D)]-[Offline (F)] Sets the printer offline (controller mode only).

[Device (D)]-[Eject paper (E)]: Ejects the printer paper (controller mode only). Ejects paper after setting to offline. Eject is discontinued when the user implements this menu.

[Device (D)]-[Printer reset (R)]: Resets the printer (controller mode only). Either soft reset or hard reset can be selected. Soft reset here signifies returning the current RAM value to its NVRAM value. Hard reset signifies rebooting of the printer. Printer reset is performed after setting to offline. When printer reset is completed, registration onto the manager information table is performed.

[Device (D)]-[Printer reset (I)]: Resets the printer environment settings to the factory default settings (controller mode only). Printer environmental settings are initialized or reset after setting to offline. When printer reset is completed, registration onto the manager information table is performed.

[Device (D)]-[Network interface board reset (B)]: Resets the network interface board (controller mode only). Only hard reset can be selected. When network interface board reset is completed, registration onto the manager information table is performed.

[Device (D)]-[Network interface board initialize (D)]: Initializes the network interface board returning it to the factory default settings (controller mode only). When initializing of the network interface board is completed, the device window (FIG. 43) closes.

[Device (D)]-[Close (C)]: Closes the device window (FIG. 43).

[Display (V)]-[Status (S)]: Opens the Status Sheet (FIG. 54). [Status (S)] sets to ON when selected and otherwise is OFF.

[Display (V)]-[Job (J)]: Opens the Jobs Sheet (FIG. 100). The [Jobs (J)] sets to ON when selected and otherwise is OFF. This function is only valid when NetWare service is available.

[Display (V)]-[Info (I)]: Opens the Information Sheet (FIG. 102). The [Info (I)] sets to ON when selected and otherwise is OFF.

[Display (V)]-[Network (N)]: Opens the Network Sheet (FIG. 104) (controller mode only). [Network (N)] sets to ON when the user selects this item and otherwise is OFF.

[Display (V)]-[Update info (R)]: Updates the information in the sheet to the latest information.

[Set (S)]-[Trap report]: Opens the Trap Report Condition Dialog Box (FIG. 132) for selecting the trap report information method (controller mode only)

[Set (S)]-[Printer auto change (A) . . . ]: Opens the device display Auto Change Set Dialog Box (FIG. 133) for the user to specify the auto change interval on the device display.

[Set (S)]-[Printer info (I) . . . ]: Opens the Printer Information Set Dialog Box (FIG. 135) for the user to set the printer information (controller mode only).

[Set (S)]-[Controller info (M) . . . ]: Opens the Controller Information Set Dialog Box (FIG. 136) for the user to set the controller information (controller mode only).

[Set (S)]-[Printer (P) . . . ]: Opens the Printer Environment Set Dialog Box (FIG. 143) for the user to set the printer environment information (controller mode only).

[Set (S)]-[Protocol (L) . . . ]: Opens the Protocol Set Dialog Box (FIG. 144) for the user to set the protocol (controller mode only).

[Set (S)]-[Change device password (W) . . . ]: Opens the Device Password Change Dialog Box (FIG. 137) for the user to change the password when the device window (FIG. 43) is open (controller mode only).

[Test (T)] [Test print (P)]: Implements a joint test print (controller mode only). Implements the joint test print after being set offline.

[Test (T)] [Status print (P)]: Implements a joint status print (controller mode only). Implements the joint status print after being set offline.

[Test (T)] [Font list (F)]: Implements output of a joint font list (controller mode only). Implements the joint font list printout after being set offline.

[Help (H)]-[Index (C)]: Displays the NetSpot online help index.

[Help (H)]-[Search with keyword (S) . . . ]: Displays NetSpot online help keyword search.

[Help (H)]-[Version info (A) . . . ]: Opens the Device Version Information Dialog Box (FIG. 141) for displaying the device version information.

Figure 125:
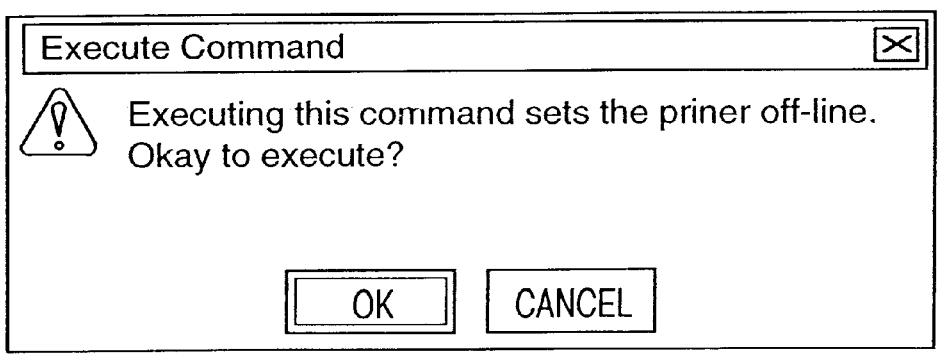

Other operations:

The message shown in FIG. 125 appears when if the printer is in online status when [Device (D)]-[Eject paper (E)] is selected. If the [OK] button is selected by the user in the dialog of FIG. 125, then the printer paper is ejected after setting the printer offline and the display returns to the device window (FIG. 43). When the [Cancel] button is selected and the display returns to the device window (FIG. 43) with no other operations performed.

Figure 126:
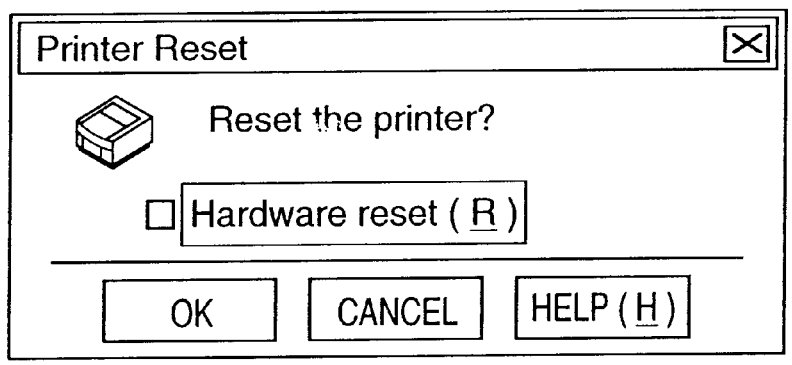

The message in FIG. 126 appears when the user selects [Device (D)]-[Printer reset (R)]. When the user selects the [OK] button with "Hard reset (R)" set to ON in the dialog of FIG. 126, then hard reset of the printer is performed and the display returns to the device window (FIG. 43). When the user sets the "Hard reset (R)" to OFF and selects the [OK] button, soft reset of the printer is performed and the display returns to the device window (FIG. 43). When the [Cancel] button is selected and the display returns to the device window (FIG. 43) with no other operations performed.

Figure 127:
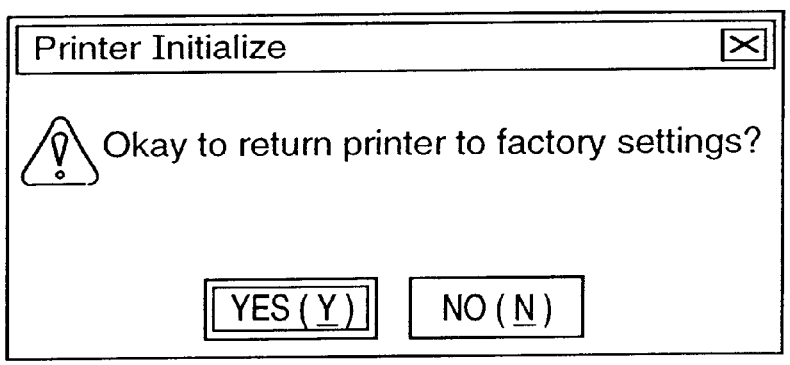

When [Device (D)]-[Printer reset (I)] is selected, the message in FIG. 127 appears. When the user selects the [Yes (Y)] button in the dialog of FIG. 127, the printer environment settings are returned to the factory default settings and the display returns to the device window (FIG. 43). When the [No (N)] button is selected and the display returns to the device window (FIG. 43) with no other operations performed.

Figure 128:
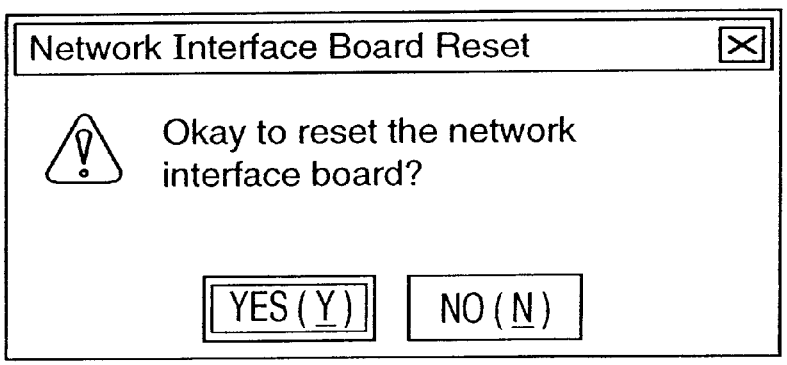

When [Device (D)]-[Network interface board reset (B)] is selected, the message in FIG. 128 appears. When the user selects the [Yes (Y)] button in the dialog of FIG. 128, hard reset of the network interface board is performed and the display returns to the device window (FIG. 43). When the [No (N)] button is selected and the display returns to the device window (FIG. 43) with no other operations performed.

Figure 129:
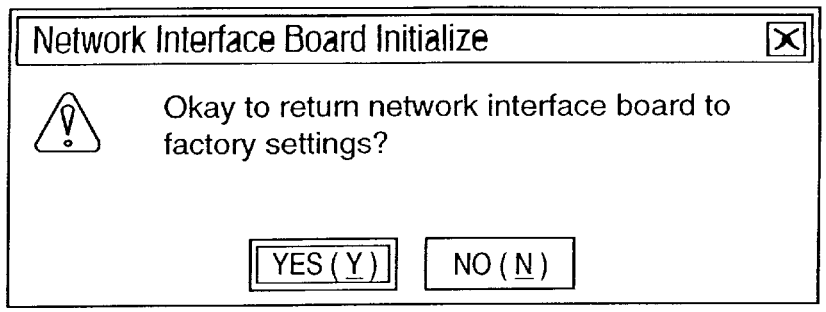

When [Device (D)]-[Network interface board initialize (D)] is selected, the message in FIG. 129 appears. When the user selects the [Yes (Y)] button in the dialog of FIG. 129, the network interface board is returned to the factory default settings. When the [No (N)] button is selected and the display returns to the device window (FIG. 43) with no other operations performed.

Figure 130:
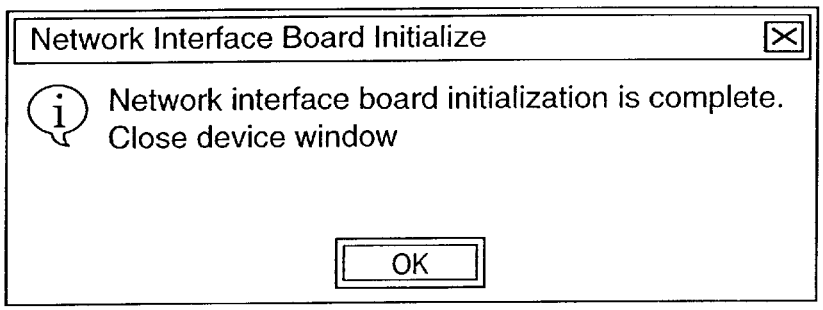

When the network interface board has been returned to the factory default settings, the message in FIG. 130 appears and the device window (FIG. 43) closes.

Figure 131:
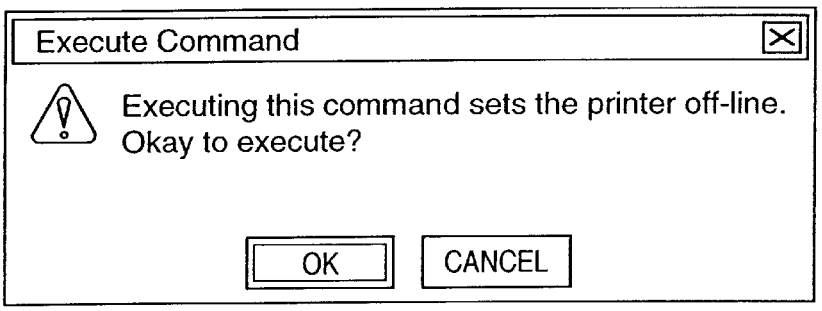

When the user selects [Test (T)]-[Test print (P)] or [Test (T)]-[Status print (S)] or [Test (T)]-[Font list (F)] while the printer was set offline, the message in FIG. 131 appears. When the user selects the [OK] button in the dialog of FIG. 131, the joint test print or the font list output or the joint status print are implemented after the printer has been set offline, and the display returns to the device window (FIG. 43). When the [Cancel] button is selected and the display returns to the device window (FIG. 43) with no other operations performed.

[Trap Report Condition Dialog Box (See FIG. 132)]

When the [Set (S)]-[Trap report] menu of the device window (FIG. 43) is selected by the user, NetSpot displays the Trap Report Condition Dialog Box of FIG. 132. This Trap Report Condition Dialog Box (FIG. 132) is for setting trap report conditions. This Trap Report Condition Dialog Box is only applicable for the controller mode.

Detailed Specifications

[Report on changed conditions (S)]: The user selects whether to report on a trap when status (operating panel message) has changed. The user selects either ON or OFF.

[Report when error occurs (E)]: The user selects whether to report on a trap when an error has occurred. The user selects either ON or OFF.

[OK] button: The user selects this button to validate the settings and close the dialog box. When changes have been made in the settings, the printer settings are updated.

[Cancel] button: The user selects this button to invalidate the settings that were made and close the dialog box.

[Update (A)] button: When changes have been made in the settings, the printer settings are updated. This [Update (A)] button can only be used when changes in the settings have been made.

[Help (H)] button: The user selects this button to display the online help.

[Device Display Auto Change Dialog Box (See FIG. 133)]

The Device Display Auto Change Dialog Box of FIG. 133 is shown by NetSpot when the user selects the [Set]-[Display auto change . . . ] menu of the device window (FIG. 43). This Device Display Auto Change Dialog Box of FIG. 133 is for setting the auto change interval on the display in the device window (FIG. 43).

Detailed Specifications

[Automatically update display (A)]: The user selects whether or not to automatically change (update) the device display. The user selects either ON or OFF.

[Change interval (I)]: The user inputs a change interval between 10 and 600 seconds. This function is only valid when [Automatically update display (A)] is set to ON.

[OK] button: The user selects this button to validate the settings and close the dialog box.

[Cancel] button: The user selects this button to invalidate the settings that were made and close the dialog box.

[Help (H)] button: The user selects this button to display the online help.

Other operations:

When a value other than 10 to 600 seconds in entered in [Change Interval1], the message in FIG. 134 appears and the display returns to the Device Display Auto Change Dialog Box (FIG. 133).

[Printer Information Set Dialog Box (See FIG. 135)]

NetSpot displays the Printer Information Set Dialog Box shown in FIG. 135 when the user selects the [Set]-[Printer info . . . ] menu of the device window (FIG. 143). This Printer Information Set Dialog Box (FIG. 135) is for setting the printer information. The Printer Information Set Dialog Box (FIG. 135) is only applicable to the controller mode.

Detailed Specifications

[Product name]:Display the product name in a character string from 0 to 63 spaces.

[Printer name (N)]: The user enters the printer product name in a character string from 0 to 63 spaces.

[Installation location (L)]:The user enters the printer installation location in a character string from 0 to 63 spaces.

[OK] button: The user selects this button to validate the settings and close the dialog box. When changes have been made in the settings, the device settings are updated.

[Cancel] button The user selects this button to invalidate the settings that were made and close the dialog box.

[Update (A)] button: When changes have been made in the settings, the device settings are updated. This [Update (A)] button can only be used when changes in the settings have been made.

[Help (H)] button: The user selects this button to display the online help.

[Controller Info Setting Dialog Box (See FIG. 136)]

The Controller Info Setting Dialog Box is shown by NetSpot in FIG. 136 when the user selects the [Set]-[Controller info . . . ] from the device window (FIG. 43). This Controller Info Setting Dialog Box of FIG. 136 is for setting the controller information. This Controller Info Setting Dialog Box is only applicable in controller mode.

Detailed Specifications

[Name]: The user enters the controller name in a character string from 0 to 63 spaces.

[Address (T)]: The user enters the controller address in a character string from 0 to 63 spaces.

[Comment (C)]: The user enters a comment on the controller in a character string from 0 to 63 spaces.

[OK] button: The user selects this button to validate the settings and close the dialog box. When changes have been made in the settings, the device settings are updated.

[Cancel] button: The user selects this button to invalidate the settings that were made and close the dialog box.

[Update (A)] button: When changes have been made in the settings, the device settings are updated. This [Update (A)] button can only be used when changes in the settings have been made.

[Help (H)] button: The user selects this button to display the online help.

[Device Password Change Dialog Box (See FIG. 137)

NetSpot displays the Device Password Change Dialog Box of FIG. 173 when the user selects the [Set]-[Change device window . . . ] menu of the device window (FIG. 43) This Device Password Change Dialog Box of FIG. 137 is for changing the device password. This Device Password Change Dialog Box (FIG. 137) is only applicable in controller mode.

Detailed Specifications

[Old password (O)]: The user enters here the old device password when opening the device window (FIG. 43) in a character string of 0 to 15 spaces. Large letters and small letters are handled separately.

[New password (N)]: The user enters here the new device password when opening the device window (FIG. 43) in a character string of 0 to 15 spaces. This function is only valid when [Use NetSpot password (S9] is set to OFF. Large letters and small letters are handled separately.

[Check new password (F)]: The user reenters here the new device password used when opening the device window (FIG. 43) in a character string of 0 to 15 spaces. This function is only valid when [Use NetSpot password (S9] is set to OFF. Large letters and small letters are handled separately.

[Use NetSpot password (S)]: The user selects whether or not to use the NetSpot password as the new password. The user selects either ON or OFF.

[OK] button: The user selects this button to validate the settings and close the dialog box. When changes have been made in the settings, the device settings are updated.

[Cancel] button: The user selects this button to invalidate the settings that were made and close the dialog box.

[Help (H)] button: The user selects this button to display the online help.

Other operations:

When the user makes a mistaken password entry in [Old password (O)], the message in FIG. 138 is displayed and the display returns to the Device Password Change Dialog Box (FIG. 137).

When the new password of [New password (N)] entered by the user does not match the new device password reentered with [Check new password (F)], then the message in FIG. 139 appears and the display returns to the Device Password Change Dialog Box (FIG. 137). When the device password is changed by the user entering the correct password, the message in FIG. 140 appears and the display returns to the Device Password Change Dialog Box (FIG. 43).

[Device Version Information Dialog Box (See FIG. 141)

NetSpot displays the Device Version Information Dialog Box of FIG. 141 when the user selects the [Help]-[Version info] menu of the device window in FIG. 43. This Device Version Information Dialog Box (FIG. 141) is for displaying the device version information.

Detailed Specifications

[Version information]: Displays the product title and name. This item shows the copyright. Displays the SNMP version used by this device.

[OK] button: Closes the dialog box.

[Error Popup Window (See FIG. 142)]

When an error occurs in the device opened in the device window (FIG. 43), an Error Popup Window is displayed in FIG. 142 to show an error has occurred. A detailed message relating to the error that occurred is given in the Error Information Dialog Box (FIG. 55). Error restore operations such as error skip can be performed when the user selects the button on the dialog box.

However, when an error occurs in a device not opened in the device window (FIG. 43), the error is shown with an icon in the device window (FIG. 15). The Error Popup Window (FIG. 142) performs the functions shown in Table 18.

TABLE 18

List of functions supported by error popup window

| ITEM NO. | FUNCTION | Admin | User |
|---|---|---|---|
| 1 | Report on error that occurred in device Display error popup window showing device error Sound a beep tone | ○ | ○ |

When an error occurs in a device opened on the Device Window (FIG. 43) by the menu of the Device List Window (FIG. 15), the user can select whether to display an error popup window or to sound a beep tone.

This function is implemented by using the SNMP trap message. The name of the device in which the error occurred is specified as a NetSpot address for use as a transmit destination address in NetSpot controller mode and a Trap message sent. Therefore, in general user mode in NetSpot the error popup window may sometimes not occur due to the positional relation between NetSpot general user mode and the device on the network.

Detailed Specifications

[Error contents]: Displays details of the error that occurred.

[OK] button: Closes the dialog box.

[Help (H)] button: Displays the online help.

Hereafter, the operation during settings and entry of the network device password (hereafter referred to as device password) in the network management software (hereafter referred to as NetSpot) of the embodiment of this invention is explained. In all explanations related from hereon, the CPU501 (FIG. 5) will serve as the main element of the hardware unless otherwise stated. However, the main item in software control is NetSpot, the network management software which is stored in the hard disk (HD) 511 (FIG. 5). In this embodiment, NetSpot is installed with the controller mode and the setting of a password (hereafter referred to as Netspot password) required when starting up with the controller mode during the NetSpot install is assumed to have been made. Refer to <<NetSpot Install>> explanation for detailed information on this installation and to the <<NetSpot Operating Mode>> for detailed information relating t the controller mode.

FIG. 150 is a flowchart showing the process implemented by NetSpot and the personal computer (103, 104 etc.) for a printer 102 connected to the LAN100 by way of the network board (NB) shown in FIG. 1. In particular, the flowchart shows NetSpot operation during device password entry for data set in a RAM 302 of the network board (NB) 101.

In Step S100 in this same figure, NetSpot which was installed in the hard disk (HD) 511 (FIG. 5) is started by the user. The process next proceeds to Step S101, in which a NetSpot Password Entry Dialog Box (FIG. 10) appears requesting entry of the NetSpot password. Then in Step 102 the user enters the NetSpot password in the NetSpot Password Entry Dialog Box (FIG. 10). In Step S103 it is determined made as to whether the NetSpot password entered by the user in Step S102 matches the password set during the NetSpot install. If the two passwords are a match, the process proceeds to Step S105 and if the two passwords do not match the process proceeds to Step S104.

In Step S104, the warning message of FIG. 11 appears to instruct the user to enter the correct NetSpot password. Once the user selects the OK button, the process once again proceeds to Step S102.

In this way, the process with the matching passwords then proceeds to Step S105 where the device list window shown in FIG. 15 is displayed and a list of network printers capable of acquiring information and settings is shown. Then in Step S106, the user selects the desired network printer from the network printer list shown in the device list window (FIG. 15) Step S105. Then in Step S107 the device word stored in the RAM 302 of the network board (NB) 101 for the network printer 102 selected in Step S106, is acquired.

The process next proceeds to Step S108, in which it is determined whether the device password acquired in Step S107 matches the NetSpot password entered by the user in Step S102. If the two passwords match the process shifts to Step S113 and if the two do not match the process shifts to Step S109. In this Step S109, the password acquired in Step S107 is determined not to match the NetSpot password entered by the user so that a device password entry dialog box (FIG. 50) is displayed to request the user to enter the correct password and the process standby for entry of the password by the user. Thus, in Step S110, the device password is entered in the device password entry dialog box (FIG. 50) shown in Step S109.

In Step Sill, a determination is made whether the device password acquired in Step S107 matches the device password entered by the use in Step S110 and if the two passwords match, the process proceeds to Step S113, while if the two passwords do not match, the process proceeds to Step S112.

In Step S112 a message appears to instruct the user to enter the correct password by means of the warning message displayed in FIG. 51 and after the user selects the OK button, the process proceeds again to Step S109. Also, in Step S113, the device window (FIG. 43) is displayed and acquisition and settings of detailed information are performed for the network printer selected by the user in Step S106.

In the above described embodiment, it is determined whether the device password acquired from the network printer in Step S107, matches the NetSpot password entered by the user in Step S110. When these two passwords match, detailed information on the device can be acquired in Step S113. Accordingly, the password entry operation of Step S109, Step S110, Step Sill and Step S113 can be eliminated. This eliminating unit that the operability of NetSpot can be drastically improved.

FIG. 151 is a flowchart showing the process when controlling the printer 102 from NetSpot in operation by the computer (103, 104, etc.) of this embodiment when setting the device password in that network board (NB) 101. Here, the flowchart in FIG. 151 shows NetSpot password settings during the NetSpot install and assumes that the device password has not yet been set for controlling the target network printer.

In the same figure, in Step S200, NetSpot installed in the hard disk (HD)511 in FIG. 5, by the user is started up. In Step S201, a NetSpot password entry dialog box (FIG. 10) appears to request NetSpot password entry by the user. The process then proceeds to Step S202 and awaits entry by the user of the NetSpot password in the NetSpot password entry dialog (FIG. 10) box shown in Step S201.

In Step S203, it is determined whether the device password set during the NetSpot install, matches the NetSpot password entered by the user in Step S202. If the two passwords match, the process proceeds to Step S205 and when these two passwords do not match the process proceeds to Step S204. In this Step S204, the warning message shown in FIG. 11 is displayed to instruct the user to enter the correct password. After the user selects the OK button, the process proceeds again to Step S202.

The process then proceeds to Step S205 where the device list window shown in FIG. 15 is displayed and a list of network printers capable of acquiring information and settings is shown. Then in Step 206, the process awaits selection by the user of the desired network printer from the network printer list shown in the device list window (FIG. 15). In Step S207, it is determined whether or not to use the device password at the NetSpot password. When using the device password at the NetSpot password, the process proceeds to Step S211. When not using the device password at the NetSpot password the process proceeds to Step S208.

The device window (FIG. 43) is displayed in Step S208 and acquisition and settings of detailed information are performed relating to the network printer selected by the user in Step S206. The process then proceeds to Step S209 where a device window change dialog box (FIG. 137) is displayed and in Step S206 settings are requested on the device window for the network printer that was selected. The process then proceeds to Step S210 where settings are performed for the network printer selected in Step S206.

The process proceeds to Step S211 when using the NetSpot password and the NetSpot password entered by the user in Step 202 is automatically set as the device password for the network printer selected in Step S202.

Next, the exclusive control sequence for the controller mode is explained. The following explanation is made while mainly referring to FIG. 153 (exclusive control sequence in controller mode), FIG. 154 (inquiry sequence to find if device can be accessed in controller mode), FIG. 155 (agent operation), FIG. 156 (SNMP message format), and FIG. 157 (Figure showing SNMP command exchange between manager and agent). Further, in the explanation of these figures, a description of the functions for the figure just mentioned is given while referring in particular to FIG. 3, FIG. 5, FIG. 15, FIG. 43, FIG. 52, FIG. 53 and FIG. 145 through FIG. 147.

FIG. 153 is a flowchart showing the exclusive control sequence of the controller mode for the embodiment of the present invention.

The user selects the device for control on the device window (FIG. 15) of NetSpot installed in controller mode, and when [Device-Open] is selected from the menu, or when the device to be controlled is double-clicked on the device list; the sequence shown in this flowchart starts up. In the following explanation, unless specified to the contrary, the CPU501 shown in FIG. 5 will serve as the main element of hardware for making determinations and implementing functions. On the other hand, the network management utility program stored in the hard disk 511 serves as the hardware.

In the exclusive control sequence of the controller mode shown in FIG. 153, a check is first made in Step S15301 as to whether the device to be controlled can be accessed in controller mode. Various methods are available to perform this check. For instance in one method, an MIB equivalent to flag is mounted in the device for showing if a user is obtaining access in controller mode and when a value is written from the network management utility program showing access in controller mode, a determination can be made based the written value.

The method is shown in FIG. 154. In the following sequence description, the operation in Step S15301 is described in detail utilizing FIG. 153.

The description assumes that an SNMP agent operates the device to be controlled and that a Canon MIB as described in FIG. 4 is installed.

This Canon MIB has an MIB object to show whether or not a user is operating the device in controller mode. A [1] is set as the value when no user is operating in controller mode; a [2] is set as the value when there is a user operating in controller mode. For detailed information relating to SNMP, see "Introduction to TCP/IP Network Management—For Practical Network Control" by M. T. Rose, translated by Takeshi Nishida, First edition Aug. 20, 1992 Toppan.

This SNMP protocol is briefly explained using on the following explanation. The PC (hereafter referred to as the manager) operated by the network manager utility software, and the SNMP agent operating the network device (hereafter referred to as agent) to be controlled, utilize the SNMP protocol to perform communications tasks. The SNMP protocol has five types of commands. These are called respectively, Get-Request, Get-next-request, Get-response, Set-request, and Trap. The situation in which these commands are exchanged between the manager and the agent is shown in FIG. 157.

The "Get-request" and "Get-next-request" are commands sent by the manager to the agent in order that the manager can acquire MIB object values of the agent. Agents that receive these commands send a "Get-response" command to the manager in order to report the MIB values to the manager (15701 and 15702 of FIG. 157).

The "Set-request" is a command sent by the manager to the agent in order to set MIB object values of the agent. The agent that receives these commands sends a "Get-response" command to the manager in order to report the setting results to the manager (15703).

The "Trap" is a command sent by the agent to the manager to report that a change has occurred in the agent's own status (15704).

FIG. 156 shows all commands except for the Trap. In other words, Get-Request, Get-next-request, Get-response, and Set-request.

FIG. 156 shows the SNMP message of 15600. This SNMP message comprises a version 15601, a community name 15602 and a zone 15603 referred to as a PDU. This PDU is shown in more detail with PDU15610. This PDU15610 has a PDU type 15611, a request ID15612, an error status 15613, an error status 15614 as well as an MIB information 15615. A value to identify commands is stored in the PDU type 15611. In other words, a value of [0] in this field signifies "Get-request, [1] signifies "Get-next-request", [2] signifies "Get-response", [3] signifies "Set-request". Values showing error information are stored in the error status 15313. The value in this field is "0" when no errors are present. Sets formed of object Ids and their values are stored in the MIB information 15615.

To investigate whether a device to be controlled can be accessed in controller mode, first in Step 15401 of FIG. 154, in order to determine whether access to the device to be controlled is possible in controller mode, a set request for writing of the value [2] in the MIB object is sent for the device to be controlled to find out if another user is operating the device in controller mode. Next, the process proceeds to Step S15402, where the process stands by for a reply from the SNMP agent operating the device to be controlled. More specifically, the process awaits a Get-response to come back from the SNMP agent in reply to the Set request. Once the Get-response comes back, the process proceeds to Step 15403 and a check is made as to whether the writing onto the MIB object succeeded. More specifically, the error status 15413 from among the Get-response packet is checked and the presence or absence of an error is determined. If the error status field 15413 is [0], in other words if the writing was a success, then the process proceeds to Step S15404 and access to the controller mode is now known to be possible so the access okay flag is raised (set to on). This access okay flag is assigned to one zone of the RAM503 in FIG. 5. This access okay flag is referred to in the subsequent Step S15302 in FIG. 153. When this procedure is completed in Step S15404, the process then ends with Step 15301 in FIG. 153.

However, in Step S15403, if the value in the error status field is other than [0], in other words if a write failure occurred, then the process proceeds to Step S15404 and the access okay flag is lowered (set to off) to show access is not possible in controller mode. When the process ends in this way in Step S15405, the process ends with Step S15301 in FIG. 153.

Next the explanation returns to FIG. 153, and a check is made in Step S15301 as to whether access to the device to be operated is possible in controller mode and the process then moves to Step S15302. In Step 15302, the access okay flag is checked for results reflecting the check in Step S15301 and if it is found that access is possible (flag at on) in controller mode for the device to be operated then the process moves to Step S15303 where the device window is opened in controller mode (FIG. 43) in order to access the device. Consequently, when the device window is opened in controller mode in Step S15303, then the exclusive control procedure for controller mode ends.

On the other hand, in Step S15302, when results of the check in Step 15301 show that access is not possible (flag is off) in controller mode to the device to be operated, then the process proceeds to Step S15304. In Step S15304, the information that the device to be operated is already being operated by another user in controller mode is displayed. More specifically, for instance as shown for the third device in FIG. 146 or FIG. 147, a key mark is affixed on the device display in order to show that the device is already locked (in use) by another user.

When the operation in Step S15304 ends, the process proceeds to Step S15305 in which an inquiry dialog is displayed (FIG. 52) to inquire whether to automatically operate in controller mode even when another user is already operating the device in controller mode. The process then waits for the user to enter a "Y" or an "N" from a keyboard 509 in FIG. 5, or utilize a pointing device to specify the "Yes" or the "No" button. Once the user has made entry, the process proceeds to Step S15306 and identifies the entry from the user. In Step S15306, if the input from the user was "Yes", in other words, when an automatic display in Controller Mode" is to be shown then the process proceeds to Step S15307. In this step S15307, a [1] value is written to show in the MIB installed in the device to be controlled, that there is currently no user accessing the device in controller mode. More specifically, a Set-request packet is sent for the device to be operated in order to write the [1] value. Further in this Step S15307, the process awaits the return of the Get-response from the device to be operated in response to the writing (Set) and once the response is received the process returns to Step S15301 and then continues. In this way when the process returns to Step S15301 after performing the process of Step S15307, the results of the check as to whether access of the device to be operated is possible in controller mode in Step S15301 will always show that access is possible. Accordingly, a decision on the results in Step S15302 will always cause the process to shift to Step S15303, and the device window will open in controller mode (FIG. 43).

On the other hand, if the user selects "No" in Step S15306, in other words, decides not to automatically display in "Controller Mode", then the process proceeds to Step S15308. In this Step S15308, an inquiry dialog box (FIG. 53) is displayed to inquire whether or not to open a device window for the user in user mode, in order to make available the chance to open a device window in user mode to display information relating to the device to be controlled, even when the device to be controlled is already being operated by another user in controller mode. The process then stands by for the use to enter "Y" or "N" from the keyboard 509 in FIG. 5 or to select the "Yes" or "No" buttons with a pointing device not shown in the display. Once the user makes this entry, the process moves to Step S15309 which identifies the users entry. If the user entry was "Yes", in other words, if the user specified displaying the device window in "User Mode" then the process moves to Step S15310 and the device window then opens up in "User Mode" (FIG. 145). In this way, the device window is opened in "User Mode" in Step S15310 and the exclusive control sequence for the controller mode ends.

However when it is identified in Step S15309 that the user entered "No", in other words, if display of the device window in User Mode was not specified, then the process ends without opening the device window.

Though not shown in FIG. 153, a Set is requested for writing a value [1] for the MIB object to display whether or not a user is accessing the device in controller mode, in order to determine that there is no user already accessing the device in controller mode when attempting to close the device window.

Next, referring to the flowchart in FIG. 155, the functioning of the agent that operates the device to be controlled is explained. This operation is performed in conjunction with the network management program shown in FIG. 154. The main element in the hardware for implementing the sequence described in FIG. 155 is a microprocessor 301 on the network board 101 shown in FIG. 3. The main software element in implementing the same sequence is the agent program stored in the ROM303 in FIG. 3. This agent communicates with a PC, for instance a PC103, operated by the network management software and provides information on the network device in which the agent is mounted according to the request from the network management software by way of the LAN100. The network management program in the PC103 shows the various screen displays as in FIG. 7 based on information acquired from the agent and shows on that screen display the various information acquired from the agent. The information set on the screen display is also set into the agent.

In the agent operation, the arrival of an SNMP packet from the PC operated by the network management program connected via the LAN 100, is awaited in Step S15501. This PC (personal computer) may for instance be the PC103 in FIG. 1. The SNMP packet sent from the PC103 arrives at the network board 101 by way of the LAN100. The SNMP packet that arrived from the network board 101 is deployed on the RAM302 in FIG. 3 and the receipt of the SNMP packet is reported to the microprocessor 301 by means of a break-in routine. Therefore when the SNMP packet is received, the process proceeds to Step S15502 and whether or not that SNMP packet is requesting Set operation is determined. More specifically, a check is made as to whether a value [3] is present in the PDU type 15611 in the SNMP message shown in FIG. 156.

When there has in fact been a request for Set operation the process moves to Step S15503 and a decision then made as to whether an exclusive control object subject to the Set operation is present, while referring to the MIB information field 15615 of FIG. 156. When this object subject to Set operation is in fact an exclusive control object the process moves to Step S15504. A decision is then made as to whether a [2] write value is present in this object or not for showing operation in controller mode. When a [2] is in fact present as the write value in the object for performing operation in controller mode, the process proceeds to Step S15505 and the presence or absence of a current value [2] in the exclusive control object for access in the RAM302 in FIG. 3 is determined.

If the current value [2] is present for the exclusive control object, then this agent is already in the midst of being operated in controller mode by means of another terminal different from the terminal that sent the SNMP packet in step S15501. So the operation then proceeds to Step S15506 and a Get-response packet is sent to show a write-failure by the terminal that sent the SNMP packet. More specifically, a "genErr" is entered and sent to show a general error in the error status field 15613 of the Get-response packet.

On the other hand, when the object subject to the set operation in Step S15503 is not an exclusive control object; or when there was no [2] as a write value in an object for exclusive control in Step S15504, to show the performing of operation in controller mode; or when the current value of the current object of exclusive control was not [2] in Step S15505; then the process shifts to Step S15507, the value of the MIB object is changed as requested in Set operation in the SNMP packet that was received. An appropriate Get-response packet is then sent according to the results according to the MIB object value, to the terminal that sent the Step S15501 packet in Step S15501. If there is no particular problem with the write operation, a Get-response packet whose error status field 15613 is [0] is sent.

In Step S15502 if the SNMP packet that was received is not requesting Set operation, in other words, if the value of the PDU type 15611 to identify commands is [0] or if the value is [1] for showing the Get-next-request, then the process proceeds to Step S15508 and Get or Get-next operation is performed according to the configuration of the SNMP packet that was received. Thus, when the process in Steps 15506, Step S15507 and Step S15508 ends, the process proceeds to Step S15501 and the operation repeats from the beginning.

The network device control program for the embodiment of the above described invention may be implemented with the PC500 through an externally installed program. Other methods for loading the PC500 are also applicable to this invention such as loading the program into the PC500 from a recording medium such as a CD-ROM, flash memory or floppy disk; or from an information group that includes a program from an external recording medium by way of a network such as via electronic mail or computer communications.

One example of a recording medium is shown by the CD-ROM memory map in FIG. 158. The numeral 9999 shows the zone for storing the directory information and shows the position of zone 9998 for storing the subsequent install programs as well as the position of zone 9997 for storing the network device control program. The numeral 9998 is the zone for storing the install program. The numeral 9997 is the zone for storing the network device control program. To install the network control program of the embodiment of this invention in the PC500, first the install program stored in the zone 9998 is loaded and then run by the CPU501. Next, the install program run by the CPU501, extracts the network device control program from the zone 9997 where the network device control program is stored and sets the program into the hard disk 511.

A system comprised of a plurality of devices (such as host computers, interface equipment) or an integrated unit or a unit consisting of one device are all applicable to this invention.

Needless to say, the objective of this invention may also be fulfilled by a recording medium (such as FIG. 152) for recording a software program code for implementing functions of the aforementioned embodiment which is supplied to the computer (or CPU or MPU) of the system or unit to load and run the program code stored in the recording medium.

In such a case, the program code loaded from the recording medium may itself be used to implement a novel function of this invention, and the recording medium that stores this program code may comprise this invention.

As a recording medium for supplying the program code; floppy disks, hard disks, optical disks, magneto-optical disks, CD-ROMs, CD-Rs, magnetic tape, non-volatile memory cards and ROMs may for instance be utilized. Further, besides implementing the aforementioned functions of the embodiment by running the program code loaded by the computer, the OS (operating system) of the computer may perform all or a portion of the actual processing based on the instructions in the program code and by this processing implements the aforementioned functions of the embodiment.

Still further, after the program code loaded from the recording medium is written into the memory having a consisting of a function board inserted in the computer or a function expansion unit connected to the computer; the CPU performs all or a portion of the actual processing and by this processing implements the aforementioned functions of the embodiment.

Needless to say, cases such as in which the program is sent to the person making the request by way of communications lines such as personal computer communications in which the program is loaded from a recording medium on which is recorded the software program code for implementing the functions of the aforementioned embodiment are also applicable to this invention.

In the above described embodiment therefore, a decision is made in Step S207 whether or not to use the NetSpot password as the device password. In cases where the NetSpot password is used as the device password, the NetSpot password can be automatically set as the device password for the network printer selected in Step S206 and the device password setting process in Steps S209 and Step S210 can be eliminated. Eliminating these steps drastically improves the operability of network device management in NetSpot while maintaining system security.

The embodiment of this invention also provides the benefit of preventing setting conflicts between users from occurring by limiting to one, the number of persons that can access one device for making changes to the settings in controller mode.

Further, when another user is already accessing the device in the mode for changing settings (controller mode), this fact is shown on the screen display, to instruct all other users that access as a controller is currently impossible.

Also, this embodiment provides a means for automatically accessing the device as controller even when another user is accessing the device in a mode that can change settings (controller mode).

Still further, this embodiment provides a means to access the target device in a mode just for the display of information (user mode) and display information about the device, even when another user is accessing the device in a mode for making settings (controller mode).

The embodiment of the inventions thus described therefore has the effect of allowing the same password to be used for both starting up the network management software, and for acquiring information and making settings in the target network device, so that password entry for access to a network device can be omitted and the operability of network management software can be greatly improved.

This invention also has the effect of automatically setting a password identical to the password at startup of the network management software, as the network device password so that the burden on the user of setting a password for the network device to be controlled is alleviated.

Another effect of the invention is preventing setting conflicts between users from occurring by limiting to one, the number of persons that can access one device for making changes to the settings in administrator mode.

Still, another effect of the invention is that when another user is already accessing the device in mode for changing settings (administrator mode), this fact is shown on the screen display, to instruct all other users that access as an administrator is currently impossible.

Yet another effect of this invention is that a means is provided for automatically accessing the device as an administrator even when another user is accessing the device in a mode that can change settings (administrator mode).

A yet further effect of this invention is that a means is provided to access the device to be controlled, in a mode solely for the display of information (user mode) and for displaying information about the device, even when another user is accessing the device in a mode for making settings (administrator mode).

As many apparently widely different embodiments of the present invention can be made without departing from the spirit and scope of the present invention, it is to be understood that this invention is not limited to the specific embodiments thereof except as defined in the appended claims.

What is claimed is:

1. A network device control method comprising the steps of:

detecting a first password entered by a user during start-up of a network management software;

selecting a network device to be controlled by the network management software;

acquiring a second password to limit access to the network device selected in said selection step;

determining whether or not a mode is set to utilize said first password for network management software as the password for said network device;

comparing the second password with the first password to determine whether or not said first and second passwords match each other when it is determined in said determining step that a mode is set to utilize said first password for network management software as the password for said network device; and controlling to omit entry of the second password when it is determined in said comparing step that the second password matches the first password.

2. A network device control method of claim 1, wherein said network management software controls a printer on a network.

3. A network device control unit comprising:

password detection means to detect a first password entered by a user during start-up of the network management software;

selection means to select a network device to be controlled by the network management software;

device password acquisition means for acquiring a second password to restrict access to said network device selected with said selection means;

determining means to determine if a mode is set to use the first password used as the password for said network device at start-up of said network management software;

password comparison means to compare the first password with the second password to determine if said first and second passwords match each other when said determining means determines that the mode is set to use the first password at start-up of the network management software as said network device password; and control means to omit the entry of the second password by the user when it is determined by said password comparison means that the second password and the first password match each other.

4. A recording medium capable of being scanned or read by a computer, comprising:

a password detection step module to detect a first password entered by a user at start-up of a network management software;

a selection step module to select a network device to be controlled by the network management software;

a password acquisition step module to acquire a second password set in order to restrict access to said network device selected with said selection step module;

a mode determination step module to determine whether or not a mode is set to use said first password as the password for said network device;

a comparison step module to compare said second password with said first password, when it is determined by means of said mode determination step module that a mode is set to use said first password as said network device password; and a control step module to omit the entry of the second password when it is determined by said comparison step module that said second password and said first password match each other.

5. A network device control method comprising the steps of:

detecting a first password entered by a user during the start-up of the network management software;

selecting a network device to be controlled by the network management software;

determining whether or not said first password for network management software is to be set as the network device password; and setting said first password as the network device password when it is determined that a mode is set for utilizing said first password as the network device password.

6. A network device control unit comprising:

password detection means to detect a first password entered by the user during the start-up of the network management software;

selection means to select the network device for control by the network management software;

determining means to determine whether or not said first password is set as the network device password; and password setting means to set said first password as the network device password when it is determined by said determining means that a mode is to be set for utilizing said first password as the network device password.

7. A recording medium capable of being scanned or read by computer, comprising:

password detection process module to detect a first password entered by the user at start-up of the network management software;

selection process module to select the network device to be controlled by the network management software;

determining process module to determine whether or not said first password for network management software is to be set as the network device password; and password setting module to set said first password as the network device password when it is determined in said determining process module that a mode is to be set for utilizing said first password as the network device password.

8. A network device control unit for controlling by means of a network, a device having information indicating whether or not a user performing access as an administrator is present, said network device control unit comprising:

inquiry means for issuing an inquiry to ask whether the user, as an administrator, may access the device subject to control;

display means for displaying a mark indicating the device is already being operated by a user of the device as the administrator, when it is determined as a result of said inquiry means that the device has already been operated by another user as the administrator;

shift inquiry means for inquiring whether or not the user who issued the inquiry can control said devices as the administrator when it is determined as a result of said inquiry means that the device has already been operated by another user as the administrator;

administrator mode shift means for allowing the user to access the device as the administrator when the user has specified to shift the right to acces, as a result of the inquiry by said shift inquiry means; and access means for the user to access said device as an administrator when results from said inquiry means have determined that access by the user of said device as an administrator is possible or when said administrator mode shift means allows the user to access the device as the administrator.

9. A network device control unit according to claim 8, wherein said unit is further comprised of inquiry means to inquire whether or not to control said device monitored in a user mode when it is determined as a result of said inquiry means that said device is already being operated by another user as the administrator; and access means to allow access to said device in the applicable user mode when results of inquiry to the user with said inquiry means show the applicable user has specified a shift to user mode.

10. A network device control method controlling by way of a network a device having information indicating whether a user is performing access as an administrator and said network device control method, said network device control method comprising the steps of:

inquiring as to whether access as an administrator is possible to a device targeted for control;

displaying a mark indicating the device is already being operated by a user of the device as the administrator, when it is determined as a result of said inquiry process that the device has already been operated by another user as the administrator;

shift inquiring to determine whether or not the user who issued said inquiry can control said devices as the administrator when it is determined as a result of said inquiry process that the device has already been operated by another user as the administrator; and allowing access to said device as an administrator, when results of said shift inquiry show that said user has specified a shift;

accessing said device as an administrator when it is determined from results of the above inquiry that the access to said device as an administrator is possible.

11. A network device control method according to claim 10, wherein said method is further comprised of an user mode when it is determined as a result of said inquiry means that said device is already being operated by another user as the administrator, and an access process to allow access to said device in said user mode when results of the applicable inquiry show the applicable user has specified a shift to user mode.

12. A recording medium capable of being scanned or read by computer having a program, comprising:

an inquiry process module for inquiring as to whether a device to be controlled can be accessed in an administrator mode;

an access process module to access said device in administrator mode when determined that access is possible in said administrator mode;

a process module for showing a mark indicating said device is already being operated by the administrator, when determined as a result of said inquiry process module for determining possible access, that said device is already being operated by another user as the administrator; and an inquiry process module for inquiring if another user is operating said device as an administrator; and a process module for allowing access to said device as an administrator when results of applicable inquiry reveal said user has specified a shift.

13. A recording medium according to claim 12, wherein said medium is further comprised of an inquiry process module to inquire whether or not to said user issuing inquiry can control said device monitored in user mode when determined as a result of said inquiry module for determining possible access, that said device is already being operated by another user as the administrator, and a process module for allowing access to said device as an administrator when results of applicable inquiry reveal said user has specified a shift to said user mode.

14. A computer readable storage medium capable of storing a program, the program comprising:

a code for detecting a first password entered by a user at start-up of a network management software;

a code for selecting a network device to be controlled by the network management software;

a code for acquiring a second password set in order to restrict access to said network device selected with said selection code;

a code for determining whether or not a mode is set to use said first password as the password for said network device;

code for comparing said second password with said first password, when it is determined by means of said mode determination that a mode is set to use said first password as said network device password; and a code for omitting the entry of the second password when it is determined by said comparison code that said second password and said first password match each other.

15. A computer-readable storage medium capable of storing a program, the program comprising:

code for password detection to detect a first password entered by the user at start-up of the network management software;

code for a selection process to select the network device to be controlled by the network management software;

code for determining whether or not said first password for network management software is to be set as the network device password; and code for password setting to set said first password as the network device password when it is determined in said determining code that a mode is to be set for utilizing said first password as the network device password.

16. A computer-readable storage medium capable of storing a program, the program comprising:

code for inquiring as to whether a device to be controlled can be accessed in an administrator mode;

code for accessing said device in administrator mode when determined that access is possible in said administrator mode;

code for showing a mark indicating said device is already being operated by the administrator, when determined as a result of said inquiry process module for determining possible access, that said device is already being operated by another user as the administrator;

code for inquiring if another user is operating said device as an administrator; and code for allowing access to said device as an administrator when results of applicable inquiry reveal said user has specified a shift.

* * * * *

UNITED STATES PATENT AND TRADEMARK OFFICE
CERTIFICATE OF CORRECTION

PATENT NO. : 6,182,225 B1
DATED : January 30, 2001
INVENTOR(S) : Tadashi Hagiuda et al.

It is certified that error appears in the above-identified patent and that said Letters Patent is hereby corrected as shown below:

Title page,
Item [56], References Cited, OTHER DOCUMENTS, insert -- Operation Manual of Printer Driver for Microsoft Windows 95, pp. 22-43, 1995 --.

Drawings,
Sheet 24, Figure 47, "untill" should read -- until --.

Column 1,
Line 8, "type" should read -- types --.
Line 9, "in" should read -- on --.
Line 15, "protocol." should read -- protocols. --.
Line 17, "structure" should read -- structures --.

Column 2,
Line 19, "involved" should read -- involves --.
Line 46, "an" should be deleted.
Line 52, "proposes to view" should read -- proposes, in view --.

Column 3,
Line 28, "password," should read -- password, and --.
Line 51, "device and," should read -- device, and --.
Line 61, "wherein;" should read -- wherein: --.
Line 62, "having," should read -- having: --.

Column 4,
Line 9, "of;" should read -- of: --.
Line 12, "control," should read -- control, and --.
Line 26, "cross sectional" should read -- cross-sectional --.
Line 53, "a" should read -- an --.

Column 5,
Line 18, "is FIG. 22" should be deleted.
Line 64, "FIG. 43" should read -- FIG. 43 is --.

Column 8,
Line 12, "FIG. 9" should read -- FIG. 94 --.

Column 10,
Line 5, "th" should read -- the --.

UNITED STATES PATENT AND TRADEMARK OFFICE
CERTIFICATE OF CORRECTION

PATENT NO. : 6,182,225 B1
DATED : January 30, 2001
INVENTOR(S) : Tadashi Hagiuda et al.

It is certified that error appears in the above-identified patent and that said Letters Patent is hereby corrected as shown below:

Column 11,
Line 7, "107 ." should read -- 107. --.
Line 47, "telephones" should read -- telephone --.

Column 12,
Line 41, "(MIB))." should read -- (MIB). --.

Column 15,
Line 65, "a" should read -- (a --; and "Corporation.)" should read -- Corporation). --.

Column 16,
Line 29, "have" should read -- has --.
Line 42, "TION:" should read -- TIONS: --.

Column 18,
Line 60, "above mentioned" should read -- above-mentioned --.

Column 20,
Line 2, "possible" should read -- possibly --.

Column 22,
Line 3, "above" should read -- above- --.

Column 23,
Line 3, "made" should read -- makes --.

Column 25,
Table 3, "latest" should read -- Latest --.

Column 26,
Line 47, "setup" should read -- set up --; and "a" should read -- an --.

Column 27,
Line 16, ""NetWare""" should read -- "NetWare" --.

Column 28,
Line 10, "(FIG. 43)" should read -- (FIG. 43). --.
Line 17, "(FIG. 43)" should read -- (FIG. 43). --.
Line 41, "EB-1" should read -- "EB-1 " --.

UNITED STATES PATENT AND TRADEMARK OFFICE
CERTIFICATE OF CORRECTION

PATENT NO.   : 6,182,225 B1
DATED        : January 30, 2001
INVENTOR(S)  : Tadashi Hagiuda et al.

It is certified that error appears in the above-identified patent and that said Letters Patent is hereby corrected as shown below:

Column 29,
Line 45,   ""Invalid"" should read   --"Invalid"--.

Column 33,
Line 39, "21)" should read -- 28) --.

Column 35,
Line 21, "Display" should read -- Displays --.

Column 37,
Line 32, "was" should read -- is --.
Line 41, "was" should read -- is --.

Column 38,
Line 6, "used:" should read -- used, --.
Line 63, "user" should read -- user. --.

Column 39,
Line 17, "but ton" should read -- button --.

Column 40,
Line 54, "steeplestacker" should read -- staple stacker --.

Column 41,
Line 49, "Display" should read -- Displays --.
Line 51, "steeplestacker" should read -- staple stacker --.

Column 42,
Line 28, "are" should read -- is --.
Line 40, "the" should be deleted.

Column 46,
Line 48, "Display" should read -- Displays --.
Line 50, "steeple" should read -- staple --.
Line 53, ""Auto""" should read -- "Auto" --.

Column 49,
Line 52, "the in" should be deleted.

UNITED STATES PATENT AND TRADEMARK OFFICE
CERTIFICATE OF CORRECTION

PATENT NO. : 6,182,225 B1
DATED : January 30, 2001
INVENTOR(S) : Tadashi Hagiuda et al.

It is certified that error appears in the above-identified patent and that said Letters Patent is hereby corrected as shown below:

Column 50,
Line 53, "among" should read -- among: --.
Line 58, "deteriorates." should read -- deteriorate. --.

Column 52,
Line 31, close up right margin.
Line 65, "Uses" should read -- The user --.

Column 53,
Line 2, "Uses" should read -- The user --.
Line 10, "Uses" should read -- The user --.
Line 14, "Uses" should read -- The user --.
Line 63, close up right margin.

Column 55,
Line 26, "button The" should read -- button: The --.

Column 57,
Line 40, close up right margin.

Column 59,
Line 21, "(S)]" should read -- (S)]: --.
Line 22, "ESCIP" should read -- ESC/P --.
Line 23, "ESCIP" should read -- ESC/P --.
Line 46, close up right margin.

Column 61,
Line 66, "button The" should read -- button: The --.

Column 62,
Line 42, "[jobs" should read -- [Jobs --.
Line 43, "Job" should read -- Jobs --.
Line 44, "[job]" should read -- [Job] --.
Line 47, "she et" should read -- sheet --.

UNITED STATES PATENT AND TRADEMARK OFFICE
CERTIFICATE OF CORRECTION

PATENT NO.     : 6,182,225 B1
DATED          : January 30, 2001
INVENTOR(S)    : Tadashi Hagiuda et al.

It is certified that error appears in the above-identified patent and that said Letters Patent is hereby corrected as shown below:

Column 63,
Table 12, "0)" should read -- (0 --.
Line 34, "0) byte units))," should read -- (0 byte units)), --.
Line 50, "box(FIG." should read -- box (FIG. --.

Column 64,
Line 54, "button The" should read -- button: The --.

Column 67,
Line 20, "TABLEA 15" should read -- TABLE 15 --.

Column 68,
Line 67, "NetWare" should read -- NetWare. --.

Column 69,
Line 5, "NetWare" should read -- NetWare. --.

Column 70,
Line 16, "user." should read -- user --.

Column 71,
Line 23, "per" should read -- for --.
Line 54, "No.s" should read -- Nos. --.

Column 72,
Line 47, "191." should be deleted.

Column 74,
Line 11, close up right margin.
Line 12, "λDevice]" should read -- [Device] --.
Line 13, "of for" should read -- for --.
Line 15, "15." should read -- 15). --.
Line 17, "[Online (0)]" should read -- [Online (0)]: --.
Line 19, "[Offline (F)]" should read -- [Offline (F,]: --.
Line 64, "only)" should read -- only). --.

UNITED STATES PATENT AND TRADEMARK OFFICE
CERTIFICATE OF CORRECTION

PATENT NO. : 6,182,225 B1
DATED : January 30, 2001
INVENTOR(S) : Tadashi Hagiuda et al.

It is certified that error appears in the above-identified patent and that said Letters Patent is hereby corrected as shown below:

Column 77,
Line 2, "seconds in" should read -- seconds is --.
Line 13, "Display" should read -- Displays --.
Line 21, "button The" should read -- button: The --.
Line 56, "43)" should read -- 43). --.

Column 78,
Line 2, "(S9]" should read -- (S)] --.
Line 6, "(S9]" should read -- (S)] --.

Column 79,
Line 32, "t" should read -- to --.
Line 46, "made as to" should be deleted.

Column 80,
Line 1, "two" should read -- two passwords --.
Line 9, "Step Sill," should read -- Step S111, --.
Line 22, "above described" should read -- above-described --.
Line 28, "Sill" should read -- S111, --.
Line 29, "This eliminating unit that" should read -- This elimination enables --; and "can be" should read -- to be --.

Column 81,
Line 47, "based" should read -- based on --.
Line 63, "using on" should read -- using --.

Column 82,
Line 64, "show" should read -- show that --.

Column 83,
Line 66, "users" should read -- user's --.

Column 85,
Line 27, "Steps" should read -- Step --.
Line 31, "above described" should read -- above-described --.

UNITED STATES PATENT AND TRADEMARK OFFICE
CERTIFICATE OF CORRECTION

PATENT NO. : 6,182,225 B1
DATED : January 30, 2001
INVENTOR(S) : Tadashi Hagiuda et al.

It is certified that error appears in the above-identified patent and that said Letters Patent is hereby corrected as shown below:

Column 86,
Line 16, "consisting of a" should be deleted.
Line 22, "communications" should read -- communication --.
Line 28, "above mentioned" should read -- above-mentioned --.
Line 34, "Steps" should read -- Step --.

Column 89,
Line 25, "acces," should read -- access, --.
Line 60, "administrator; and" should read -- administrator; --.
Line 64, "shift;" should read -- shift; and --.

Column 90,
Line 2, "an" should read --a--.
Line 6, "to" should read -- to the --.
Line 9, "by" should read -- by a --.
Line 13, "in" should read -- in the --.
Line 14, "when" should read -- when it is --.
Line 29, "to" should be deleted.
Line 30, "in" should read -- in a --.
Line 37, "computer readable" should read -- computer-readable --.

Column 91,
Line 9, "in" should read -- in the --.

Signed and Sealed this

Twelfth Day of November, 2002

Attest:

*Attesting Officer*

JAMES E. ROGAN
*Director of the United States Patent and Trademark Office*